US008528097B2

(12) United States Patent
Ginter et al.

(10) Patent No.: US 8,528,097 B2
(45) Date of Patent: *Sep. 3, 2013

(54) TRUSTED AND SECURE TECHNIQUES FOR ITEM DELIVERY AND EXECUTION

(75) Inventors: Karl L. Ginter, Beltsville, MD (US); Victor H. Shear, Bethesda, MD (US); Francis J. Spahn, El Cerrito, CA (US); David M. Van Wie, Sunnyvale, CA (US); Robert P. Weber, Menlo Park, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 688 days.

This patent is subject to a terminal disclaimer.

(21) Appl. No.: 11/780,955

(22) Filed: Jul. 20, 2007

(65) Prior Publication Data
US 2008/0022100 A1   Jan. 24, 2008

Related U.S. Application Data

(60) Continuation of application No. 11/102,514, filed on Apr. 7, 2005, now Pat. No. 7,281,133, which is a division of application No. 09/632,944, filed on Aug. 4, 2000, now Pat. No. 7,143,290, which is a continuation of application No. 09/221,479, filed on Dec. 28, 1998, now Pat. No. 6,185,683, which is a continuation of application No. 08/699,711, filed on Aug. 12, 1996, now abandoned, which is a continuation-in-part of application No. 08/388,107, filed on Feb. 13, 1995, now abandoned.

(51) Int. Cl.
*G06F 7/04* (2006.01)

(52) U.S. Cl.
USPC .............................................. 726/26; 705/51

(58) Field of Classification Search
USPC ............................................... 705/51; 726/26
See application file for complete search history.

(56) References Cited

U.S. PATENT DOCUMENTS

| 4,677,552 | A | 6/1987 | Sibley, Jr. |
| 4,885,777 | A | 12/1989 | Takaragi et al. |
| 5,018,196 | A | 5/1991 | Takaragi et al. |
| 5,103,392 | A | 4/1992 | Mori |
| 5,136,647 | A | 8/1992 | Haber et al. |
| 5,163,091 | A | 11/1992 | Graziano et al. |

(Continued)

OTHER PUBLICATIONS

Office Action dated Jun. 23, 1998, issued in related U.S. Appl. No. 08/699,711, filed Aug. 12, 1996, Ginter et al.

(Continued)

*Primary Examiner* — Christopher Brown
(74) *Attorney, Agent, or Firm* — Finnegan, Henderson, Farabow, Garrett & Dunner, LLP

(57) ABSTRACT

Documents and other items can be delivered electronically from sender to recipient with a level of trustedness approaching or exceeding that provided by a personal document courier. A trusted electronic go-between can validate, witness and/or archive transactions while, in some cases, actively participating in or directing the transaction. Printed or imaged documents can be marked using handwritten signature images, seal images, electronic fingerprinting, watermarking, and/or steganography. Electronic commercial transactions and transmissions take place in a reliable, "trusted" virtual distribution environment that provides significant efficiency and cost savings benefits to users in addition to providing an extremely high degree of confidence and trustedness. The systems and techniques have many uses including but not limited to secure document delivery, execution of legal documents, and electronic data interchange (EDI).

19 Claims, 203 Drawing Sheets

(56) References Cited

U.S. PATENT DOCUMENTS

| | | | |
|---|---|---|---|
| 5,191,613 A | | 3/1993 | Graziano et al. |
| 5,309,837 A | | 5/1994 | Nanzai |
| 5,311,591 A | | 5/1994 | Fischer |
| 5,337,360 A | | 8/1994 | Fischer |
| 5,390,247 A | | 2/1995 | Fischer |
| 5,412,717 A | | 5/1995 | Fischer |
| 5,418,559 A | | 5/1995 | Blahut |
| 5,420,927 A | | 5/1995 | Micali |
| 5,438,508 A | | 8/1995 | Wyman |
| 5,457,746 A | | 10/1995 | Dolphin |
| 5,457,747 A | | 10/1995 | Drexler et al. |
| 5,469,576 A | * | 11/1995 | Dauerer et al. ............... 726/2 |
| 5,499,298 A | | 3/1996 | Narasimhalu et al. |
| 5,534,855 A | | 7/1996 | Shockley et al. |
| 5,553,143 A | | 9/1996 | Ross et al. |
| 5,555,304 A | * | 9/1996 | Hasebe et al. ............... 705/51 |
| 5,629,770 A | | 5/1997 | Brassil et al. |
| 5,629,980 A | | 5/1997 | Stefik et al. |
| 5,634,012 A | | 5/1997 | Stefik et al. |
| 5,638,443 A | | 6/1997 | Stefik et al. |
| 5,649,117 A | | 7/1997 | Landry |
| 5,682,027 A | | 10/1997 | Bertina et al. |
| 5,701,463 A | | 12/1997 | Malcolm |
| 5,715,403 A | * | 2/1998 | Stefik ............... 705/44 |
| 5,717,755 A | * | 2/1998 | Shanton ............... 713/166 |
| 5,721,781 A | | 2/1998 | Deo et al. |
| 5,721,788 A | | 2/1998 | Powell et al. |
| 5,748,738 A | | 5/1998 | Bisbee et al. |
| 5,841,868 A | * | 11/1998 | Helbig, Sr. ............... 235/380 |
| 5,842,185 A | | 11/1998 | Chancey et al. |
| 5,873,072 A | | 2/1999 | Kight et al. |
| 5,933,497 A | | 8/1999 | Beetcher et al. |
| 5,949,881 A | | 9/1999 | Davis |
| 5,986,690 A | | 11/1999 | Hendricks |
| 6,590,998 B2 | | 7/2003 | Rhoads |
| 6,647,130 B2 | | 11/2003 | Rhoads |
| 6,944,555 B2 | | 9/2005 | Blackett et al. |
| 7,035,427 B2 | | 4/2006 | Rhoads |

OTHER PUBLICATIONS

Office Action dated Apr. 8, 1999, issued in related U.S. Appl. No. 08/699,711, filed Aug. 12, 1996, Ginter et al.
Office Action dated Nov. 12, 1999, issued in related U.S. Appl. No. 09/221,479, filed Dec. 28, 1998, Ginter et al.
Notice of Allowance dated Jun. 13, 2000, issued in related U.S. Appl. No. 09/221,479, filed Dec. 28, 1998, Ginter et al.
Office Action dated Mar. 25, 2005, issued in related U.S. Appl. No. 09/632,944, filed Aug. 4, 2000, Ginter et al.
Notice of Allowance dated Apr. 20, 2006, issued in related U.S. Appl. No. 09/632,944, filed Aug. 4, 2000, Ginter et al.
Office Action dated Sep. 13, 2006, issued in related U.S. Appl. No. 11/102,216, filed Apr. 7, 2005, Ginter et al.
Office Action dated Jun. 21, 2007, issued in related U.S. Appl. No. 11/102,216, filed Apr. 7, 2005, Ginter et al.
Notice of Allowance dated Jan. 29, 2008, issued in related U.S. Appl. No. 11/102,216, filed Apr. 7, 2005, Ginter et al.
Office Action dated Nov. 7, 2006, issued in related U.S. Appl. No. 11/102,514, filed Apr. 7, 2005, Ginter et al.
Notice of Allowance dated May 24, 2007, issued in related U.S. Appl. No. 11/102,514, filed Apr. 7, 2005, Ginter et al.
Office Action dated Sep. 18, 2008, issued in related U.S. Appl. No. 11/833,181, filed Aug. 2, 2007, Ginter et al.
Office Action mailed Apr. 1, 2009 for related U.S. Appl. No. 11/102,525, filed Apr. 7, 2005.
Office Action mailed Dec. 23, 2009 for related U.S. Appl. No. 11/102,525, filed Apr. 7, 2005.
Office Action mailed Mar. 9, 2010 for related U.S. Appl. No. 11/781,058, filed Jul. 20, 2007.
Office Action mailed Jan. 29, 2010 for related U.S. Appl. No. 11/781,024, filed Jul. 20, 2007.
Notice of Allowance mailed Jun. 18, 2009 for related U.S. Appl. No. 11/829,553, filed Jul. 27, 2007.
Office Action mailed Jul. 9, 2009 for related U.S. Appl. No. 11/833,181, field Aug. 2, 2007.
Advisory Action mailed Oct. 1, 2009 for related U.S. Appl. No. 11/833,181, filed Aug. 2, 2007.
Office Action mailed Apr. 14, 2009 for related U.S. Appl. No. 11/981,634.
Examination Report dated Jan. 14, 2000 for Australian Application No. 36840/97.
Office Action mailed Oct. 21, 2010 for related U.S. Appl. No. 11/781,024, filed Jul. 20, 2007.
Office Action mailed Nov. 23, 2010 for related U.S. Appl. No. 11/781,058, filed Jul. 20, 2007.
Office Action mailed Mar. 4, 2011 for related U.S. Appl. No. 11/781,024, filed Jul. 20, 2007.
Office Action mailed Apr. 4, 2011 for related U.S. Appl. No. 11/926,863, filed Oct. 29, 2007.
Office Action mailed Jun. 27, 2011 for related U.S. Appl. No. 12/645,291, filed Dec. 22, 2009.
Office Action mailed Jun. 9, 2011 for related U.S. Appl. No. 11/833,181, filed Aug. 2, 2007.
Office Action mailed Oct. 20, 2011 for related U.S. Appl. No. 12/645,291, filed Dec. 22, 2009.
Office Action mailed Nov. 21, 2011, for related U.S. Appl. No. 11/781,024, filed Jul. 20, 2007.
Office Action mailed Jan. 11, 2012, for related U.S. Appl. No. 11/926,863, filed Oct. 29, 2007.

* cited by examiner

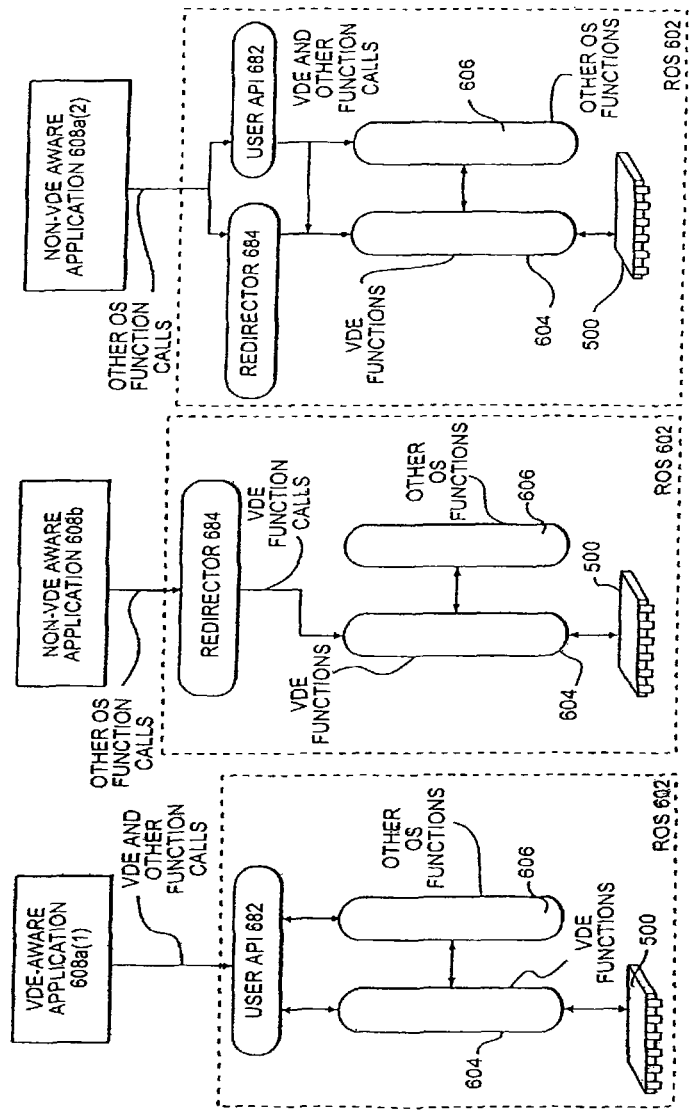

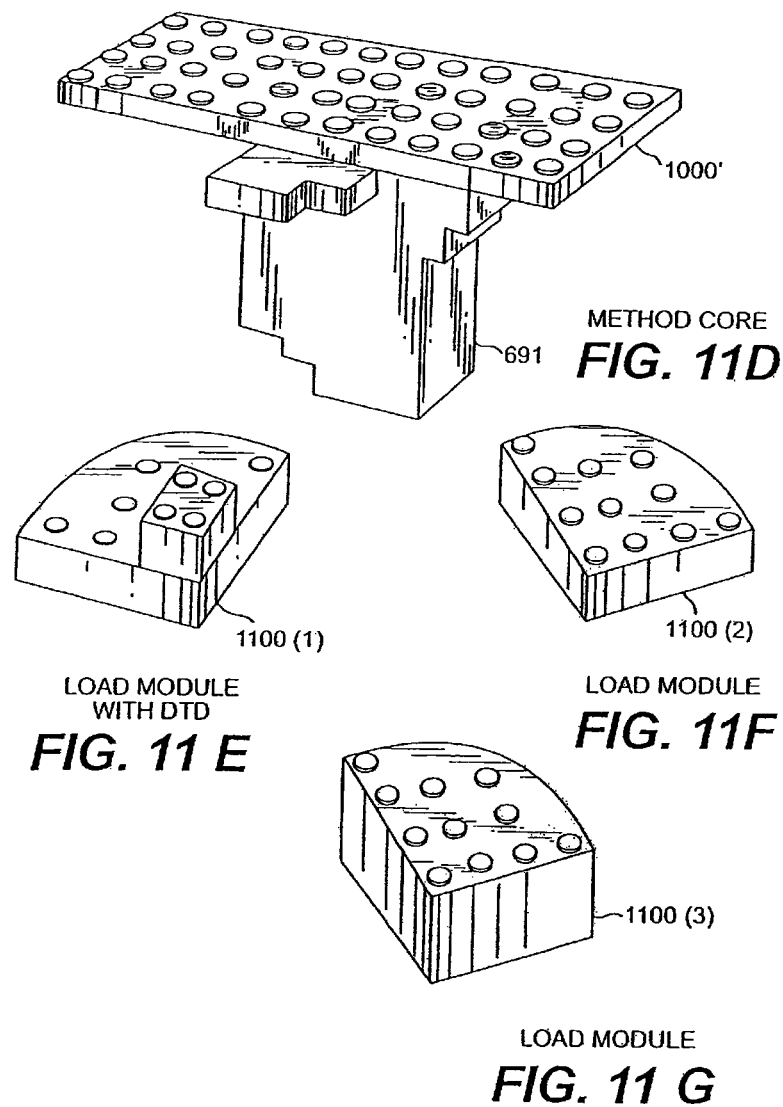

DATA STRUCTURES

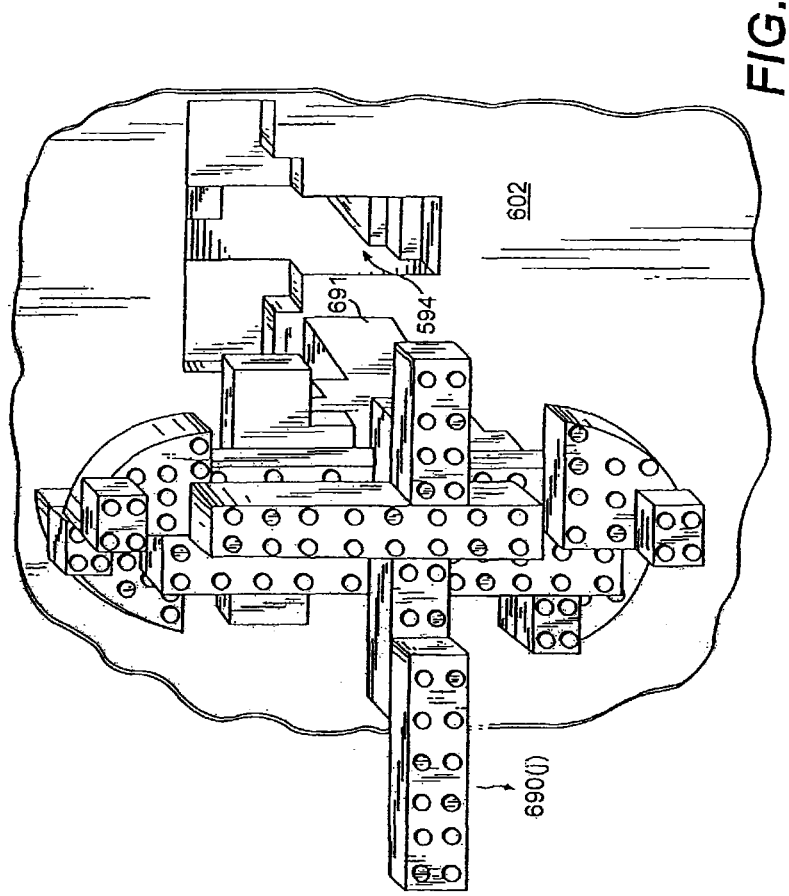

OBJECT CREATION

| | |
|---|---|
| DEVICE FIRM WIRE LOW LEVEL SERVICES 582 | TIME BASE MANAGER 554 |
| | ENCRYPTION/DECRYPTION MANAGER 556 |
| INITIALIZATION | PK |
| POST | BULK |
| DOWNLOAD | KEY AND TAG MANAGER 558 |
| CHALLENGE/RESPONSE AND | KEY STORAGE IN EEPROM |
| AUTHENTICATION | KEY LOCATOR |
| RECOVERY | KEY GENERATOR |
| EEPROM/FLASH MEMORY | CONVOLUTION ALGORITHM |
| MANAGER | SUMMARY SERVICES MANAGER 560 |
| KERNEL/DISPATCHER 552 | EVENT SUMMARIES |
| INITIALIZATION | BUDGET SUMMARIES |
| TASK MANAGER 576 | DISTRIBUTER SUMMARY SERVICES |
| (SLEEP/AWAKE/CONTEXT SWAP) | CHANNEL SERVICES MANAGER 562 |
| INTERRUPT HANDLER 584 | CHANNEL HEADERS |
| (TIMER/BIU/POWER FAIL/WATCHDOG | CHANNEL DETAILS |
| TIMER/ENCRYPTION COMPLETED) | LOAD MODULE EXECUTION SERVICES 568 |
| BIU HANDLER 586 | AUTHENTICATION MANAGER/ SECURE |
| MEMORY MANAGER 578 | COMMUNICATION MANAGER 564 |
| INITIALIZATION (SETTING MMU) | DATABASE MANAGER 566 |
| TABLES | MANAGEMENT FILE SUPPORT |
| ALLOCATE | TRANSACTION AND SEQUENCE |
| DELLOCATE | NUMBER SUPPORT |
| VIRTUAL MEMORY MANAGER 580 | SRN/HASH |
| SWAP BLOCK PAGING | DTD INTERPRETER 590 |
| EXTERNAL MODULE PAGING | LIBRARY ROUTINES 574 |
| MEMORY COMPRESS | I/O CALLS (STRING SEARCH ETC.) |
| RPC AND TABLES 550 | MISC. ITEMS THAT ARE PROBABLY |
| INITIALIZATION | LIBRARY ROUTINES |
| MESSAGING CODE/SERVICES | TAG CHECKING, MD5, CRC'S |
| MANAGER | INTERNAL LM'S 672 FOR BASIC METHODS |
| SEND/RECEIVE | METER LOAD MODULE(S) |
| STATUS | BILLING LOAD MODULE(S) |
| RPC DISPATCH TABLE | BUDGET LOAD MODULE(S) |
| RPC SERVICE TABLE | AUDIT LOAD MODULE(S) |
| ⋮ | READ OBJECT LOAD MODULE(S) |
| | WRITE OBJECT LOAD MODULE(S) |
| | OPEN OBJECT LOAD MODULE(S) |
| | CLOSE OBJECT LOAD MODULE(S) |
| | ⋮ |

FIG. 14A
SPU ROM/EEPROM/FLASH 532

LOGICAL OBJECT

STATIONARY OBJECT

TRAVELING OBJECT

CONTENT OBJECT

ADMINISTRATIVE OBJECT

METHOD "CORE"

RECEIVING TABLE

| HEADER 446A | |
|---|---|
| SITE RECORD NUMBER | 446A(1) |
| USER (GROUP) ID | 446A(2) |
| REF. TO "FIRST" COMPLETED INCOMING RECEIVING RECORD | 446A(3) |
| REF. TO "LAST" COMPLETED INCOMING RECEIVING RECORD | 446A(4) |
| REF. TO "FIRST" COMPLETED INCOMING RECEIVING RECORD | 446A(5) |
| REF. TO "LAST" COMPLETED INCOMING RECEIVING RECORD | 446A(6) |
| VALIDATION TAG FROM NAME SERVICES RECORD | 446A(7) |
| VALIDATION TAG FOR "FIRST" INCOMING RECEIVING RECORD(S) | 446A(8) |
| CHECK VALUE | 446A(9) |

| RECEIVING RECORD 447(1) | |
|---|---|
| SITE RECORD NUMBER | 447(1)(A) |
| FIRST DATE/TIME FOR SCHEDULED RECEPTION | 447(1)(B) |
| LAST DATE/TIME FOR SCHEDULED RECEPTION | 447(1)(C) |
| ACTUAL DATE/TIME OF COMPLETED RECEPTION | 447(1)(D) |
| OBJECT ID OF ADMINISTRATIVE OBJECT (TO BE) RECEIVED | 447(1)(E) |
| REF. TO ENTRY IN ADMINISTRATIVE EVENT LOG | 447(1)(F) |
| REF. TO NAME SERVICES RECORD NAMING SENDER | 447(1)(G) |
| PURPOSE OF RECEPTION | 447(1)(H) |
| STATUS OF RECEPTION | 447(1)(I) |
| REF. TO "PREVIOUS" INCOMING RECEIVING RECORD | 447(1)(J) |
| REF. TO "NEXT" INCOMING RECEIVING RECORD | 447(1)(K) |
| VALIDATION TAGS | 447(1)(L) |
| CHECK VALUE | 447(1)(M) |
| ⋮ | |
| RECEIVING RECORD N | 447(2) |

*FIG. 28*

BACKUP

RECOVER SECURE DATABASE

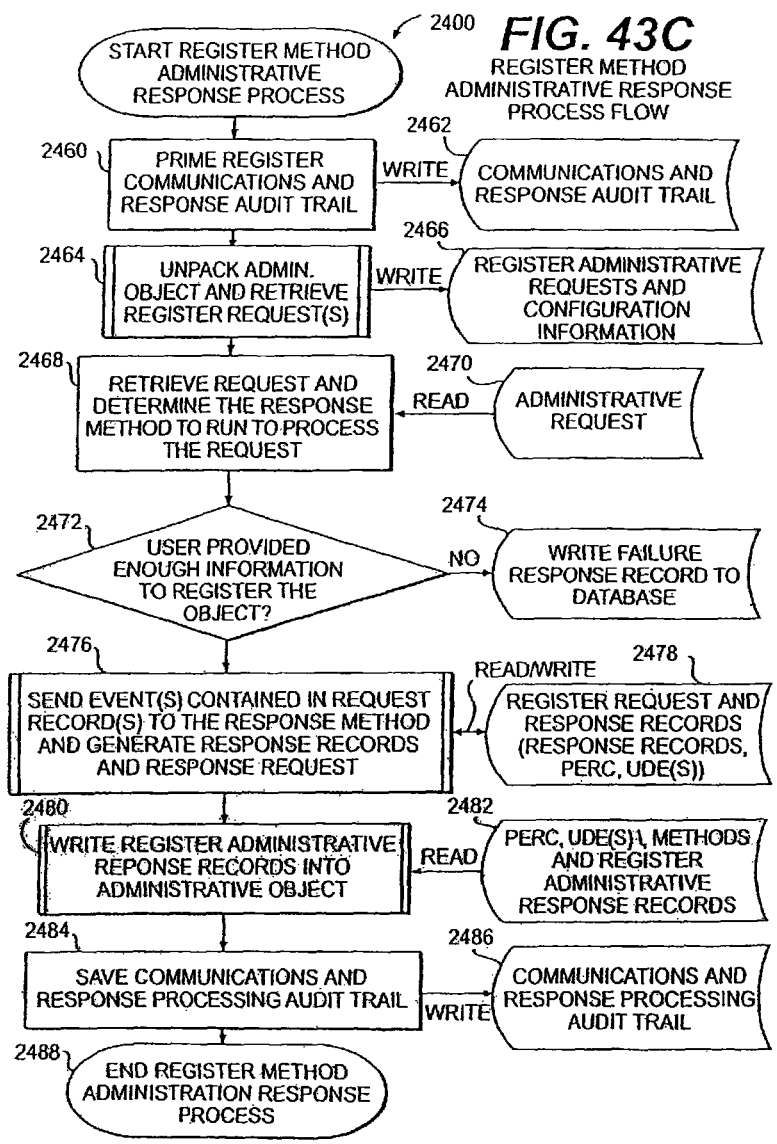

CLOCK OFFSET RESOLUTION WITH KEY CONVOLUTION

LOG IN USER INTERFACE
182

USER NAME  SHEAR, V.      LOGIN
PASSWORD  • • • • •        CANCEL
                           HELP
☐ LOGIN AT STARTUP

*FIG. 72A*

YOU HAVE REQUESTED THESE PROPERTIES:

⚠  LOONEY TUNES NEWS!    2660  CANCEL

2662  APPROVE      SUSPEND

PROPERTY INFO   YOUR COST: $7.50   MORE OPTIONS ♪
                           2664

*FIG. 72B*

YOU HAVE REQUESTED THESE PROPERTIES:

LOONEY TUNES NEWS!

YOUR COST: $7.50

[PROPERTY INFO]  [APPROVE]  [CANCEL]

MORE OPTIONS ☒  [SUSPEND]

SHOW THUMBNAIL

| PROPERTY: | SIZE: | PUBLISHER: | AMOUNT: | UNITS: | COST/UNIT: | TYPE: | USE?: | LINKS: | HIST: |
|---|---|---|---|---|---|---|---|---|---|
| CHUCK JONES BIOGRA... | 256KB | WARNER NEW MEDIA | 64 | KBYTE | $1.25 | PREVIEW | ✓ | • | |
| ▼BUGS BUNNY.JPE... | 1MB | WARNER NEW MEDIA | 1 | RECORD | $5.00 | DISPLAY | | • | ◀ |
| BUGS BUNNY.JPEG... | 1MB | WARNER NEW MEDIA | 10 | RECORD | $3.50 | DISPLAY | | • | ◀ |
| BUGS BUNNY.JPEG... | 1MB | WARNER NEW MEDIA | 25 | SECTOR | $2.50 | DSPLAY | ✓ | | |
| FRIZ FRELENG BIOGRA... | 256KB | WARNER NEW MEDIA | 120 | PERCENT | $5.00 | PRINT | | | ◀ |
| TEX AVERY BIOGRAP... | 256KB | WARNER NEW MEDIA | 50 | MINUTE | $2.50 | COPY | | | |
| ▶DUCKI RABBIT! DU... | 64MB | WARNER NEW MEDIA | 7.0 | SPECIAL | $7.50 | COPY-PRO | | • | ◀ |
| MEL BLANC BIOGRAPH... | 256KB | WARNER NEW MEDIA | 1 | OBJECT | $25.25 | INSTALL | | | ◀ |
| LOONEY TUNES DATAB... | 600MB | WARNER NEW MEDIA | 1 | | $2000.00 | ALL | | | |

[SET LIMITS...] [SHOW BUDGETS] [ACQUIRE BUDGET...] [HISTORY...] [TRANSFER...] [PREFERENCES...] [FEEDBACK...] [HELP!]

*FIG. 72D*

FIG. 88 TRUSTED ELECTRONIC DELIVERY

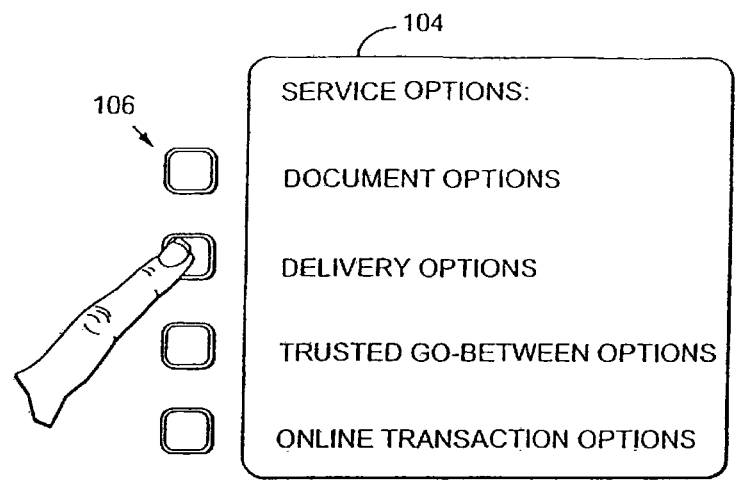
FIG. 90A    EXAMPLE MENU OPTIONS
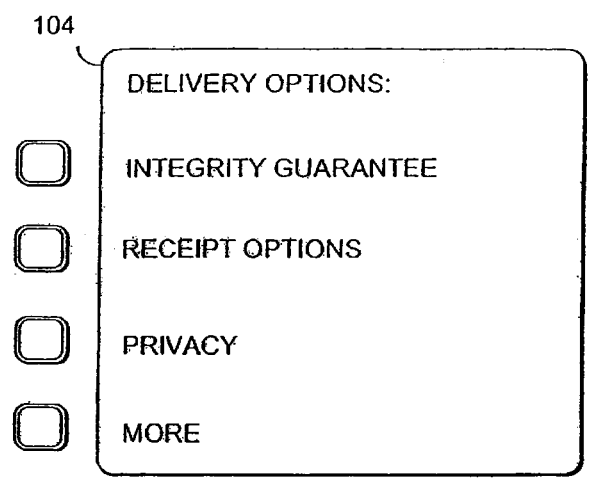
FIG. 90B    EXAMPLE DELIVERY MENU OPTIONS

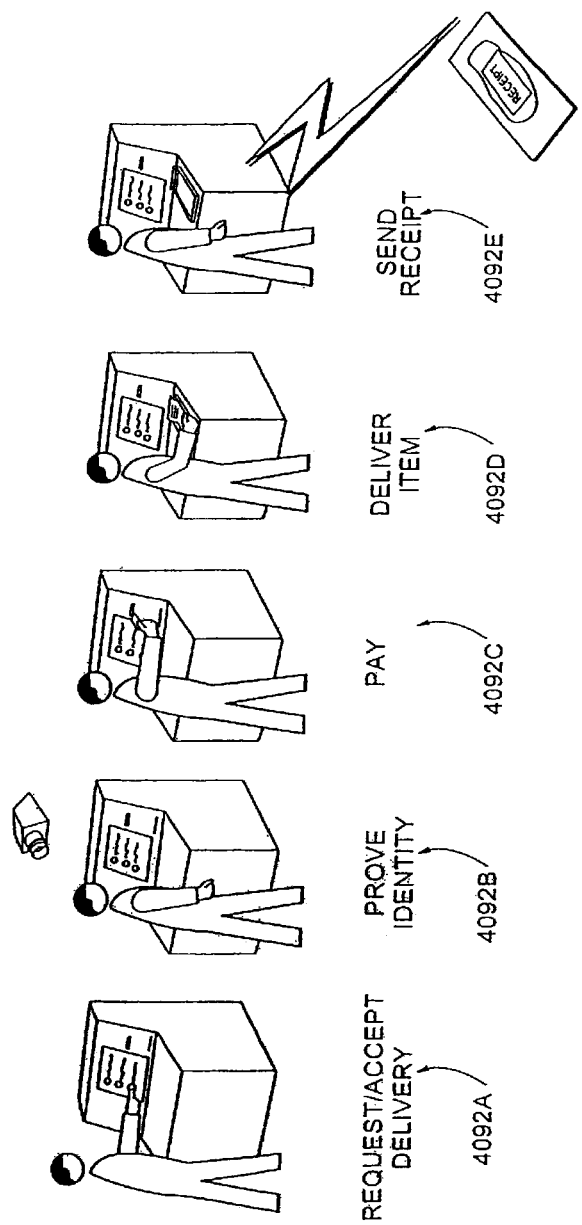

TRUSTED DIGITAL DELIVERY CAN PROVIDE SECURE RECEIPTS

EXAMPLE DELIVERY RECEIPT

FIG. 96    EXAMPLE TRUSTED ITEM HANDLING WITHIN AN ORGANIZATION

FIG. 98  MULTI PARTY CONTRACT EXECUTION

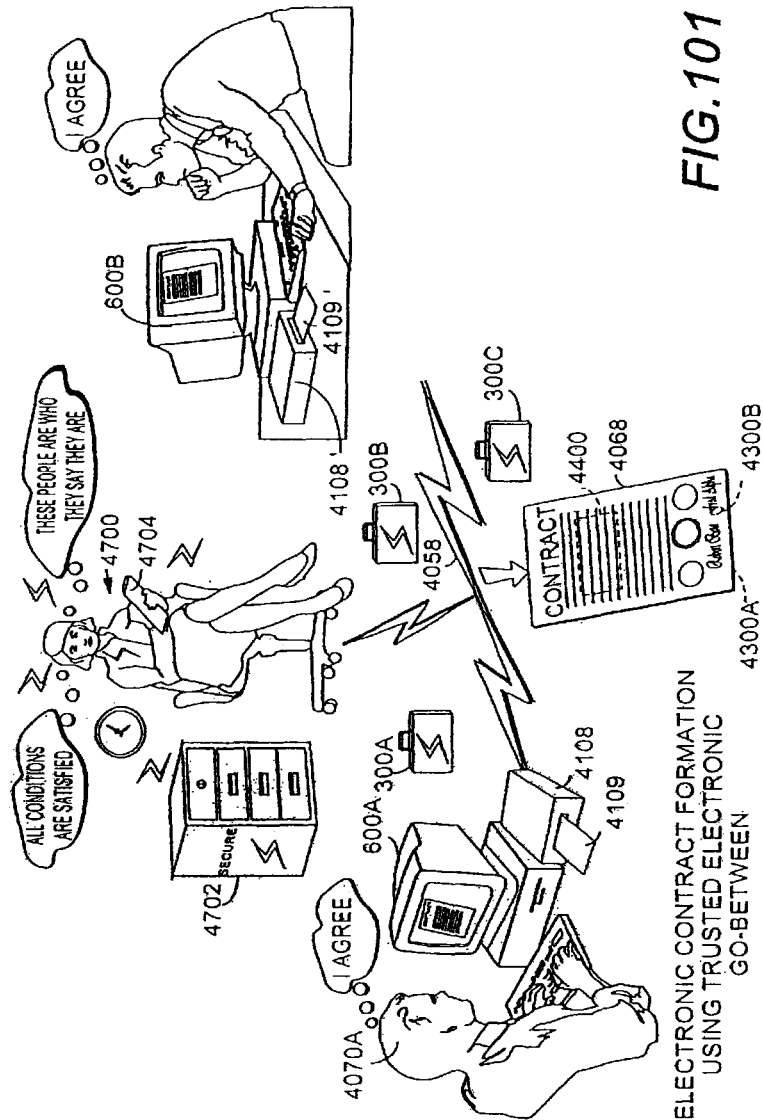

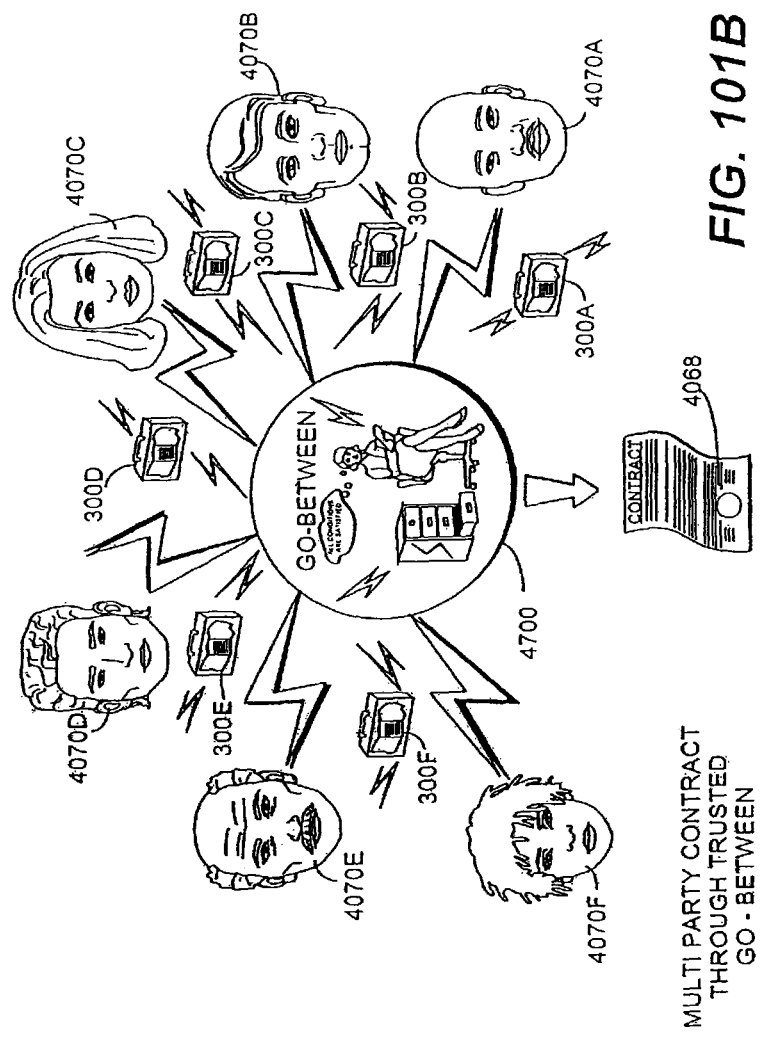

EXAMPLE INTER AND INTRA ORGANIZATION

EXAMPLE LINE SPACING ENCODING

EXAMPLE LETTER SPACING ENCODING

EXAMPLE
DOCUMENT FINGERPRINT

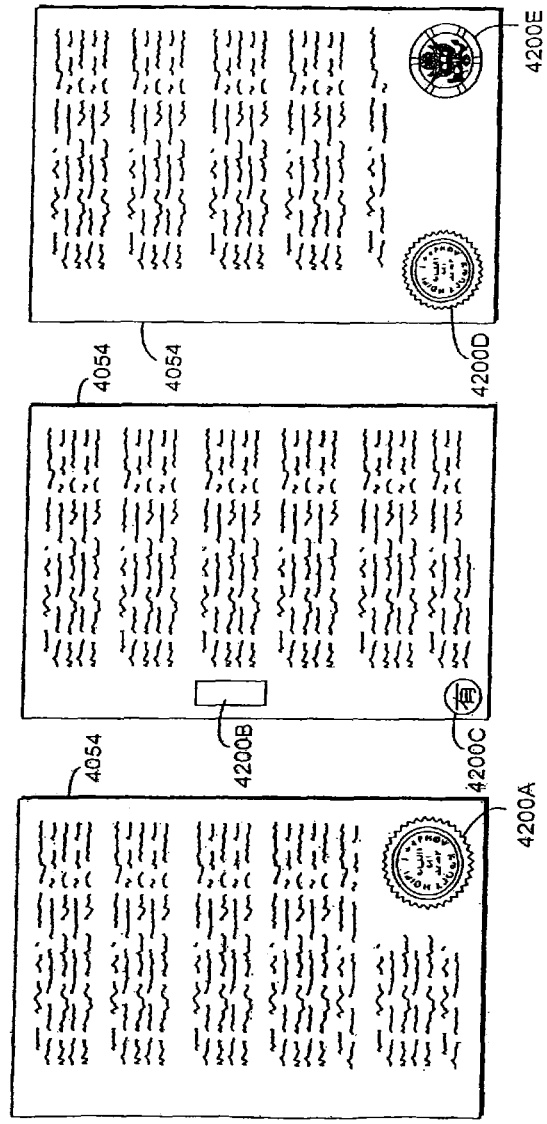

EXAMPLE TEMPLATE SEAL

EXAMPLE SEAL ENCODES
DIGITAL INFORMATION

EXAMPLE ELECTRONIC APPLIANCE

PPE EXAMPLE AUTHENTICATION METHOD

EXAMPLE ROUTING SLIP
DATA STRUCTURE

EXAMPLE AUDIT TRAIL
DATA STRUCTURE

PPE EXAMPLE REGISTER
OBJECT METHOD

PPE EXAMPLE
OPEN /VIEW
METHOD

PPE EXAMPLE
PRINT
METHOD

PPE EXAMPLE
DISTRIBUTE
METHOD

EXAMPLE TRUSTED GO-BETWEEN

EXAMPLE TRANSACTION

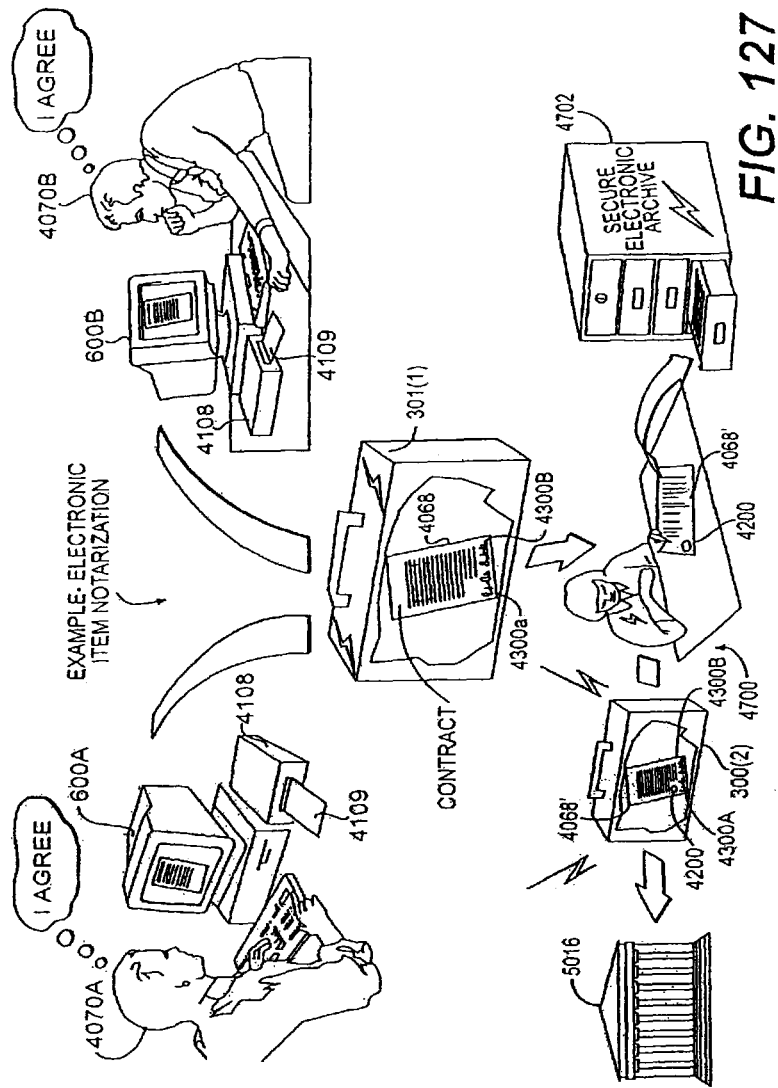

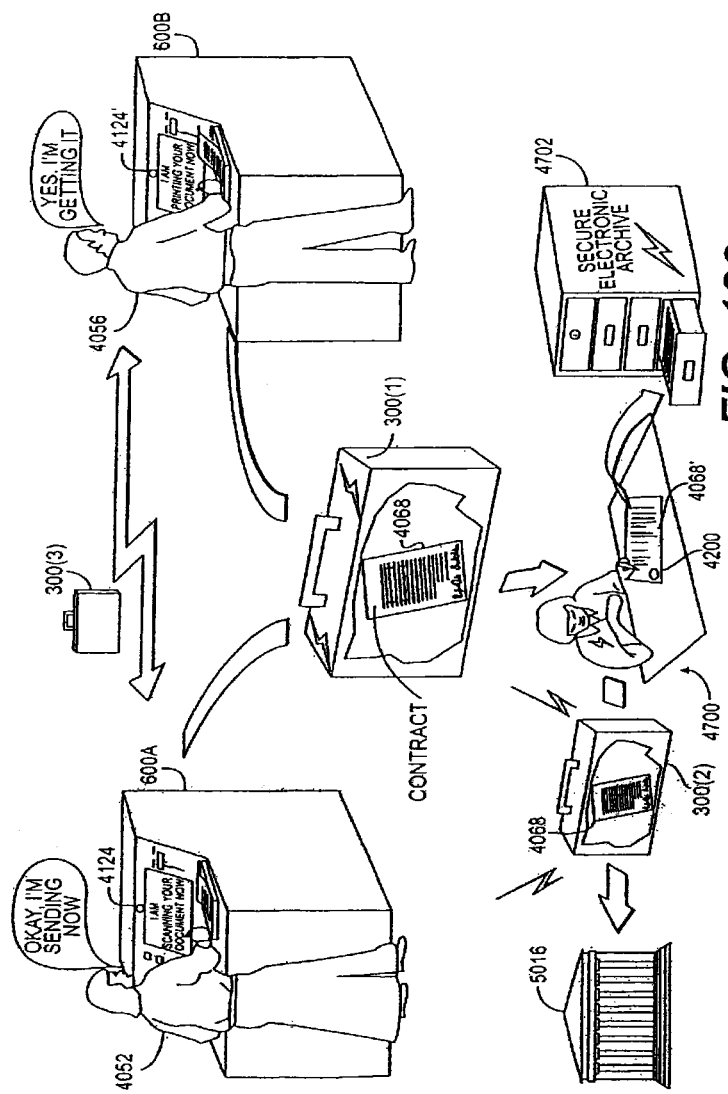
FIG. 128 EXAMPLE - TELECONFERENCES

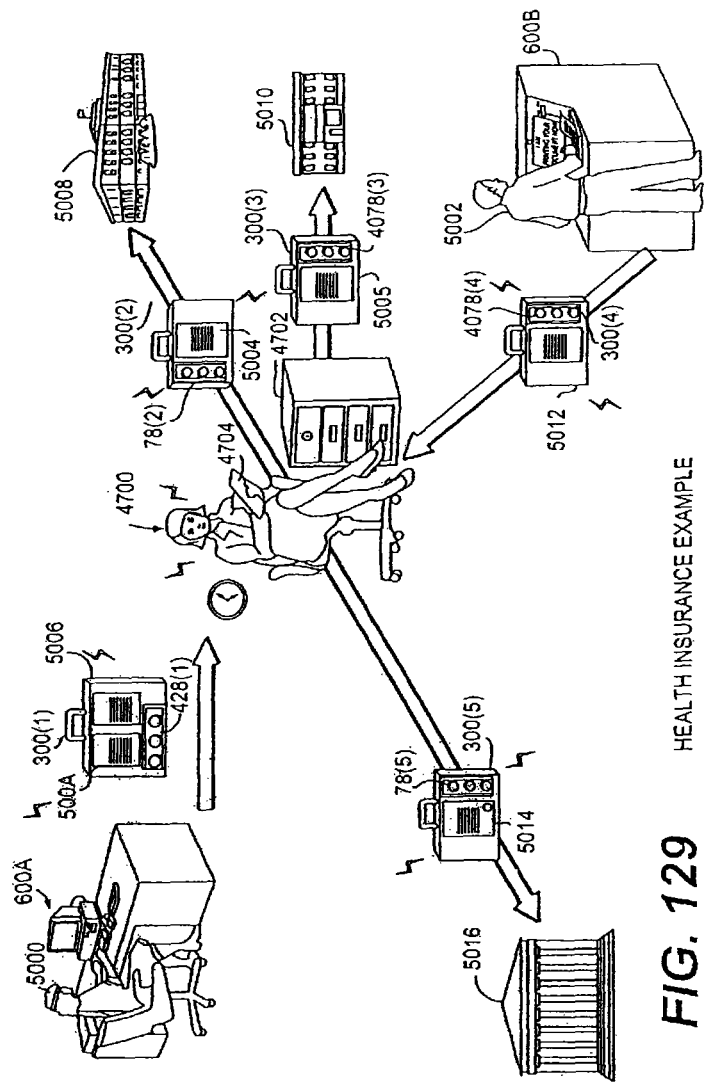
FIG. 129 — HEALTH INSURANCE EXAMPLE

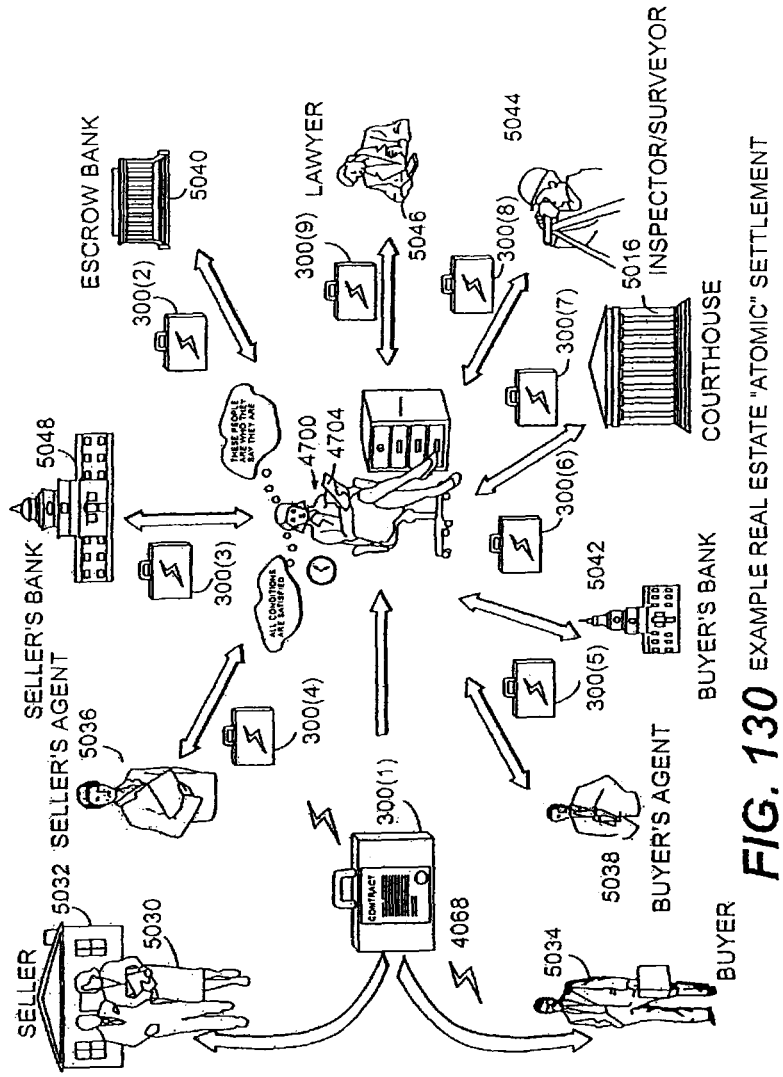
FIG. 130 EXAMPLE REAL ESTATE "ATOMIC" SETTLEMENT

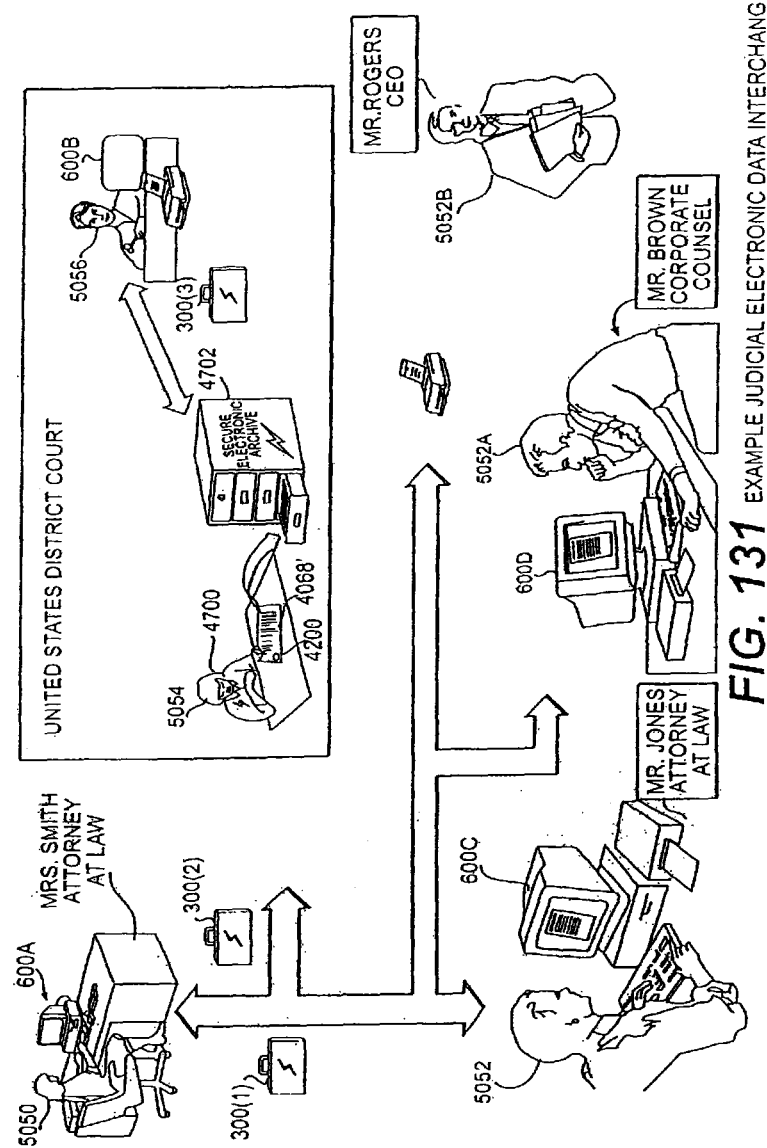
FIG. 131 EXAMPLE JUDICIAL ELECTRONIC DATA INTERCHANGE

EXAMPLE PATENT OFFICE AUTOMATION

TRUSTED AND SECURE TECHNIQUES FOR ITEM DELIVERY AND EXECUTION

CROSS-REFERENCE TO RELATED APPLICATIONS

This application is a continuation of application Ser. No. 11/102,514, filed Apr. 7, 2005, now U.S. Pat. No. 7,281,133 which is a division of application Ser. No. 09/632,944, filed Aug. 4, 2000, now U.S. Pat. No. 7,143,290, which is a continuation of application Ser. No. 09/221,479, filed Dec. 28, 1998, now U.S. Pat. No. 6,185,683, which is a continuation of application Ser. No. 08/699,711, filed Aug. 12, 1996, now abandoned, which is a continuation-in-part of application Ser. No. 08/388,107, filed Feb. 13, 1995, abandoned via file wrapper continuation, now U.S. Pat. No. 5,982,891, all of which are incorporated herein by reference.

FIELD OF THE INVENTION(S)

These inventions relate to secure and trusted delivery of digital information. More specifically, these inventions pertain to techniques, methods and systems for providing reliable, trusted, verifiable delivery, handling, creation and/or execution of digital items such as documents, executable code (e.g., Java applets), and/or any other information capable of being represented in digital form. The present invention also relates to commercial and other electronic activities involving a trusted third party electronic go-between (such as a computer controlled process) to audit, validate, and/or direct electronic transactions, executions and/or delivery and/or to archive information representing and/or at least in part comprising securely communicated digital information.

BACKGROUND AND SUMMARY OF THE INVENTIONS

There is a great need for convenient, cost effective techniques to securely handle and deliver documents and other items. Existing methods such as express and personal couriers, registered mail, facsimile and electronic mail fulfill some of these needs but these techniques each have their problems and are deficient in important ways.

Trusted Personal Couriers

Perhaps the ultimate in secure document handling is the personal trusted courier. Many of us have seen spy films showing a trusted courier delivering documents containing state secrets. In such scenarios, the document sender places the document or other item into a lockable attaché case. The sender seals and locks the case with a key or combination that only he and the recipient have. The courier handcuffs the case to his or her wrist, boards an airplane and flies to the required destination—all the while carefully guarding the attaché case and its contents. Upon arriving at the destination, the courier personally delivers the case to the intended recipient. The recipient unlocks the case and retrieves its contents, all the while having a high degree of assurance that the contents have been kept secret.

The confidentiality, security and reliability provided by a personal trusted document courier has never really been matched by any other form of document delivery. Even though we sometimes might want or need the services of a personal trusted document courier, it is likely that practical reasons (such as cost and availability) require us to use less trusted forms of delivery for even our most important and confidential documents or other items. Moreover, even the trusted courier technique does not provide a reliable means of later providing how and when the information was used by the recipient and/or subsequently handled by others to whom the recipient may pass the information and what information was actually sent. This approach also cannot provide the degree of interactivity between the sender and the recipient possible in a world of near instantaneous communications, including seamlessly supporting processes related to rights management, and document creation and dissemination.

As discussed below, existing alternatives to the trusted courier are more practical and less expensive, and some offer advantages such as instantaneous communications and interactivity—but all suffer from various disadvantages.

Express Courier Services

Federal Express and other express courier services provide rapid (for example, overnight) delivery services at a relatively high degree of trustedness.

In the typical case, the sender places the items to be delivered into a special, tear resistant sealed envelope, and fills out an "air bill" that lists the sender's name, address and telephone number, and the intended recipient's name, address and telephone number. The "air bill" also lists options such as, for example, the type of delivery service required (i.e., delivery next business morning, next business afternoon, or second business day), whether the sender requires Federal Express to obtain the recipient's signature, the payment method, and a unique "tracking number" used to uniquely identify the package.

Once the package is complete and ready to send, the sender may provide it to Federal Express through a number of different methods:

- the sender may take the package to a Federal Express office and personally hand it to a clerk,
- the sender may drop the completed envelope in any one of many pervasive Federal Express drop off boxes, and someone will come and collect the envelopes from the boxes sometime before the end of the business day and deliver them to a Federal Express office, or
- the sender can call Federal Express and arrange for a delivery person to come and pick up the package.

Federal Express maintains a fleet of aircraft that shuttle most packages to a central sorting and routing facility for subsequent dispatch to various destinations across the United States and the world. A fleet of delivery trucks deliver the packages from local airports to each recipient. At the sender's option, a delivery person may obtain a recipient's signature at the time she delivers the package—providing documentation that may later be used to prove the package was in fact received by the intended recipient or someone at his or her home or office.

Federal Express uses automated computer tracking and package handling equipment to route individual packages to their destinations. Delivery information is put into the tracking computer to allow customers and service people to automatically retrieve information about when and to whom particular packages were actually delivered, or where the package happens to be at the moment.

Federal Express and other similar document delivery services have been highly successful because they cost-effectively ensure reliable delivery of original documents and other items. Nevertheless, they do have some significant disadvantages and limitations. For example:

They are much more expensive than other delivery mechanisms at least in part because of the high labor, transportation, and infrastructure (many offices, planes, etc.) costs involved.

They do not provide the very high degree of confidentiality desired for certain confidential business or other documents.

They generally can only reliably verify that the package was delivered to the intended recipient (or his or her home or place of business)—and not that the intended recipient opened the package or read or saw or used the document.

The one (or two) day delay they introduce may be too great for time sensitive or time pressing items.

These problems are exacerbated when several individuals and/or organizations in different geographical locations are all parties to a transaction—a complex, multiparty contract, for example—and all must sign or otherwise process and/or execute one or more related documents.

Registered Mail

A relatively more secure delivery technique is registered mail. Registered mail correspondents can have a high degree of confidence that their packages will arrive at their required destinations—but may not like the time delays and additional expense associated with this special form of mail handling.

To use registered mail, the sender places her document or other items into a sealed envelope or package and takes her package to the nearest Post Office. For security, the Post Office may prohibit the use of resealable tape and mailing labels, and instead require the package to be sealed with paper tape and the address to be written directly on the package. These safeguards help to ensure that any attempts to tamper with the package or its contents will be detected.

The Post Office securely transports the registered mail package to the recipient, requiring each postal employee who accepts custody of the package along its journey to sign and time stamp a custody record. The postal carrier at the recipient's end personally delivers the package to the recipient—who also has to sign for it and may be asked to produce proof of identification. The custody record establishes a chain of custody, listing every person who has had custody of the package on its journey from sender to recipient.

As discussed above, registered mail is relatively secure and confidential but delivery takes a long time and is very labor and infrastructure intensive.

Facsimile

Facsimile is an electronic-based technology that provides virtually instantaneous document delivery. A facsimile machine typically includes a document scanner, a document printer, and electronic circuits that convert document images to and from a form in which they can be sent over a telephone line. Facsimile requires each of the sender and the intended recipient to have a facsimile machine. The sender typically places the document to be sent into a document feeder attached to a facsimile machine. The sender then typically keys in the telephone number of the intended recipient's facsimile machine and presses a "start" button. The sender's facsimile machine automatically dials and establishes contact with the recipient's facsimile machine.

Once a good connection is established, the sender's facsimile machine begins to optically scan the document one page at a time and convert it into digital information bits. The sender's facsimile machine converts the digital bits into a form that can be transmitted over a telephone line, and sends the bits to the intended recipient's facsimile machine. The sender's facsimile machine may also send as part of the document, a "header" on the top of each page stating the sender's identity, the page number of the transmission, and the transmission time. However, these headers can be changed at will by the sender and therefore cannot be trusted.

Since the recipient's facsimile machine receives the transmitted information at the same time the sender's facsimile machine is sending it, delivery is virtually instantaneous. However, sending a document to an unattended facsimile machine in an insecure location may result in the document falling into the wrong hands. Another common scenario is that the facsimile machine operator, through human error, dials the wrong telephone number and ends up delivering a confidential document to the wrong person (for example, the local grocery store down the street, or in some unfortunate cases, the opposing side of a negotiation, legal proceeding or other pitched battle). Thousands of faxes are lost every day in a "black hole"—never arriving at their desired destinations but possibly arriving at completely different destinations instead.

Some secure facsimile machines such as those used by government and military organizations, or by companies needing a significantly higher level of security provide an extra security/authentication step to ensure that the intended recipient is physically present at the receiving facsimile machine before the sender's machine will transmit the document. In addition, it is possible to use encryption to prevent the facsimile transmitted information from being understood by electronic eavesdroppers. However, such specially equipped facsimile machines tend to be very expensive and are not generally available for common commercial facsimile traffic. Moreover, facsimile machines typically can send and receive documents only—and therefore are not very versatile. They do not, for example, handle digital items such as audio, video, multimedia, and executables, yet these are increasingly part and parcel of communications for commerce and other purposes. Thus, despite its many advantages, facsimile transmissions do not provide the very high degree of trustedness and confidence required by extremely confidential documents, nor do they provide the degree of flexibility required by modern digital communications. As with Express Courier Services and Registered Mail, faxing can only indicate that the package was delivered to the intended recipient (or his or her home or place of business)—and not that the intended recipient opened the package or read or saw or used the document.

Electronic Mail

More and more, people are using electronic mail to send documents, messages, and/or other digital items. The "Internet explosion" has connected millions of new users to the Internet. Whereas Internet electronic mail was previously restricted primarily to the academic world, most corporations and computer-savvy individuals can now correspond regularly over the Internet.

Currently, Internet electronic mail provides great advantages in terms of timeliness (nearly instantaneous delivery) and flexibility (any type of digital information can be sent), but suffers from an inherent lack of security and trustedness. Internet messages must typically pass through a number of different computers to get from sender to recipient, regardless of whether these computers are located within a single company on an "Intranet" for example, or on Internet attached computers belonging to a multitude of organizations. Unfortunately, any one of those computers can potentially intercept the message and/or keep a copy of it. Moreover, even though some of these systems have limited "return receipt" capabilities, the message carrying the receipt suffers from the same security and reliability problems as the original message.

Cryptography (a special mathematical-based technique for keeping messages secret and authenticating messages) is now beginning to be used to prevent eavesdroppers from reading intercepted messages, but the widespread use of such cryptography techniques alone will not solve electronic mail's inherent lack of trustedness. These electronic mail messages, documents and other items (e.g., executable computer programs or program fragments) that might have been sent with them as "attachments," remain vulnerable to tampering and other unauthorized operations and uses once decrypted and while delivery may be reported, actual use can not be demonstrated. Some people have tried to develop "privacy enhanced" electronic mail, but prior systems have only provided limited improvements in reliability, efficiency and/or security.

The Present Inventions Solve These and Other Problems

As discussed above, a wide variety of techniques are currently being used to provide secure, trusted confidential delivery of documents and other items. Unfortunately, none of these previously existing mechanisms provide truly trusted, virtually instantaneous delivery on a cost-effective, convenient basis and none provide rights management and auditing through persistent, secure, digital information protection.

In contrast, the present inventions provide the trustedness, confidentiality and security of a personal trusted courier on a virtually instantaneous and highly cost-effective basis. They provide techniques, systems and methods that can bring to any form of electronic communications (including, but not limited to Internet and internal company electronic mail) an extremely high degree of trustedness, confidence and security approaching or exceeding that provided by a trusted personal courier. They also provide a wide variety of benefits that flow from rights management and secure chain of handling and control.

The present inventions preferred embodiment make use of a digital Virtual Distribution Environment (VDE) as a major portion of its operating foundation, providing unique, powerful capabilities instrumental to the development of secure, distributed transaction-based electronic commerce and digital content handling, distribution, processing, and usage management. This Virtual Distribution Environment technology can flexibly enable a wide variety of new business models and business practices while also supporting existing business models and practices.

The Virtual Distribution Environment provides comprehensive overall systems, and wide arrays of methods, techniques, structures and arrangements, that enable secure, efficient electronic commerce and rights management on the Internet and other information superhighways and on internal corporate networks such as "Intranets". The present inventions use (and in some cases, build upon and enhances) this fundamental Virtual Distribution Environment technology to provide still additional flexibility, capabilities, features and advantages. The present invention, in its preferred embodiment, is intended to be used in combination a broad array of the features described in Ginter, et al, including any combination of the following:

A. VDE chain of handling and control,
B. security trusted internodal communication,
C. secure database,
D. authentication,
E. cryptographic,
F. fingerprinting,
G. other VDE security and communication techniques,
H. rights operating system,
I. object design and secure container techniques,
J. container control structures,
K. ARPML rights and process control language,
L. electronic negotiation,
M. secure hardware, and
N. smart agent (smart object) techniques.

For example, parties using the Virtual Distribution Environment can participate in commerce and other transactions in accordance with a persistent set of rules they electronically define. Such techniques, systems and arrangements bring about an unparalleled degree of security, reliability, efficiency and flexibility to electronic commerce, electronic rights management and other important business models. The present inventions make use of these persistent electronic rules to provide secure, automated, cost-effective electronic control for electronic document and other digital item handling and/or delivery, and for the electronic formation and negotiation of legal contracts and other documents.

By way of non-exhaustive summary, these present inventions provide a highly secure and trusted item delivery and agreement execution services providing the following features and functions:

Trustedness and security approaching or exceeding that of a personal trusted courier.
Instant or nearly instant delivery.
Optional delayed delivery ("store and forward").
Broadcasting to multiple parties.
Highly cost effective.
Trusted validation of item contents and delivery.
Value Added Delivery and other features selectable by the sender and/or recipient.
Provides electronic transmission trusted auditing and validating.
Allows people to communicate quickly, securely, and confidentially.
Communications can later be proved through reliable evidence of the communications transaction—providing non-repudiatable, certain, admissible proof that a particular communications transaction occurred.
Provides non-repudiation of use and may record specific forms of use such as viewing, editing, extracting, copying, redistributing (including to what one or more parties), and/or saving.
Supports persistent rights and rules based document workflow management at recipient sites.
System may operate on the Internet, on internal organization and/or corporate networks ("Intranets" irrespective of whether they use or offer Internet services internally), private data networks, and/or using any other form of electronic communications.
System may operate in non-networked and/or intermittently networked environments.
Legal contract execution can be performed in real time, with or without face to face or ear-to-ear personal interactions (such as audiovisual teleconferencing, automated electronic negotiations, or any combination of such interactions) for any number of distributed individuals and/or organizations using any mixture of interactions.
The items delivered and/or processed may be any "object" in digital format, including, but not limited to, objects containing or representing data types such as text, images, video, linear motion pictures in digital format, sound recordings and other audio information, computer software, smart agents, multimedia, and/or objects any combination of two or more data types contained within or representing a single compound object.
Content (executables for example) delivered with proof of delivery and/or execution or other use.
Secure electronic containers can be delivered. The containers can maintain control, audit, receipt and other information and protection securely and persistently in association with one or more items.

Trustedness provides non-repudiation for legal and other transactions.

Can handle and send any digital information (for example, analog or digital information representing text, graphics, movies, animation, images, video, digital linear motion pictures, sound and sound recordings, still images, software computer programs or program fragments, executables, data, and including multiple, independent pieces of text; sound clips, software for interpreting and presenting other elements of content, and anything else that is electronically representable).

Provides automatic electronic mechanisms that associate transactions automatically with other transactions.

System can automatically insert or embed a variety of visible or invisible "signatures" such as images of handwritten signatures, seals, and electronic "fingerprints" indicating who has "touched" (used or other interacted with in any monitorable manner) the item.

System can affix visible seals on printed items such as documents for use both in encoding receipt and other receipt and/or usage related information and for establishing a visible presence and impact regarding the authenticity, and ease of checking the authenticity, of the item.

Seals can indicate who originated, sent, received, previously received and redistributed, electronically view, and/or printed and/or otherwise used the item.

Seals can encode digital signatures and validation information providing time, location, sender and/or other information and/or providing means for item authentication and integrity check.

Scanning and decoding of item seals can provide authenticity/integrity check of entire item(s) or part of an item (e.g., based on number of words, format, layout, image—picture and/or text—composition, etc.).

Seals can be used to automatically associate electronic control sets for use in further item handling.

System can hide additional information within the item using "steganography" for later retrieval and analysis.

Steganography can be used to encode electronic fingerprints and/or other information into an item to prevent deletion.

Multiple steganographic storage of the same fingerprint information may be employed reflecting "more" public and "less" public modes so that a less restricted steganographic mode (different encryption algorithm, keys, and/or embedding techniques) can be used to assist easy recognition by an authorized party and a more private (confidential) mode may be readable by only a few parties (or only one party) and comprise of the less restricted mode may not affect the security of the more private mode.

Items such as documents can be electronically, optically scanned at the sender's end—and printed out in original, printed form at the recipient's end.

Document handlers and processors can integrate document scanning and delivery.

Can be directly integrated into enterprise and Internet (and similar network) wide document workflow systems and applications.

Secure, tamper-resistant electronic appliance, which may employ VDE SPUs, used to handle items at both sender and recipient ends.

"Original" item(s) can automatically be destroyed at the sender's end and reconstituted at the recipient's end to prevent two originals from existing simultaneously.

Secure, non-repudiable authentication of the identification of a recipient before delivery using any number of different authentication techniques including but not limited to biometric techniques (such as palm print scan, signature scan, voice scan, retina scan, iris scan, biometric fingerprint and/or handprint scan, and/or face profile) and/or presentation of a secure identity "token."

Non-repudiation provided through secure authentication used to condition events (e.g., a signature is affixed onto a document only if the system securely authenticates the sender and her intention to agree to its contents).

Variety of return receipt options including but not limited to a receipt indicating who opened a document, when, where, and the disposition of the document (stored, redistributed, copied, etc.). These receipts can later be used in legal proceedings and/or other contexts to prove item delivery, receipt and/or knowledge.

Audit, receipt, and other information can be delivered independently from item delivery, and become securely associated with an item within a protected processing environment.

Secure electronic controls can specify how an item is to be processed or otherwise handled (e.g., document can't be modified, can be distributed only to specified persons, collections of persons, organizations, can be edited only by certain persons and/or in certain manners, can only be viewed and will be "destroyed" after a certain elapse of time or real time or after a certain number of handlings, etc.)

Persistent secure electronic controls can continue to supervise item workflow even after it has been received and "read."

Use of secure electronic containers to transport items provides an unprecedented degree of security, trustedness and flexibility.

Secure controls can be used in conjunction with digital electronic certificates certifying as to identity, class (age, organization membership, jurisdiction, etc.) of the sender and/or receiver and/or user of communicated information.

Efficiently handles payment and electronic addressing arrangements through use of support and administrative services such as a Distributed Commerce Utility as more fully described in the copending Shear, et al. application.

Compatible with use of smart cards, including, for example, VDE enabled smart cards, for secure personal identification and/or for payment.

Transactions may be one or more component transactions of any distributed chain of handling and control process including Electronic Data Interchange (EDI) system, electronic trading system, document workflow sequence, and banking and other financial communication sequences, etc.

The present inventions also provide for the use of a trusted third party electronic go-between or intermediary in various forms, including the "virtual presence" of such go-between through the rules and controls it contributes for distributed governance of transactions described in the present invention, and further through the use of a distributed, go-between system operating in on-line and/or off-line modes at various user and/or go-between sites. Such a trusted third-party go-between can provide enhanced and automated functionality, features and other advantages such as, for example:

Third party go-between can provide an independent, objective third party assurance of item authenticity, integrity, delivery and/or other actions and/or events.

Third party go-between can support non-repudiation of items having legal and/or other important consequences.

Third-party go-between can perform auditing, notarizing, authentication, integrity checking, archiving, routing, distributed chain of handling and control processing, and/or other processing.

Third party can provide store and forward capabilities.

Trusted go-between can supervise execution of legal items such as documents—ensuring that all required conditions are satisfied and that all parties agree before permitting a document to be executed and informing parties of any as-yet-unsatisfied requirements and allow parties to view completed documents on-screen and/or in printed form with "draft, not enforceable" or the like printed on the pages, before final agreement to commit. Actual execution (closing) occurs, for example, as the third party system verifies final, electronically asserted agreement and execution by all parties. Such "atomic" transactions are especially useful in supporting "closings" or the like.

Third party go-between can securely audit, manage, supervise, and/or control automated electronic negotiations, contract agreement, contract execution, contract notarization, and/or archiving of contracts, notarized contracts, and/or at least one VDE control set utilized in an electronic negotiation regardless whether or not that negotiation resulted in an executed contract, and regardless of whether or not the entire negotiation was conducted by electronic means.

Secure electronic controls can direct tasks to be performed by the third party go-between.

Third party go-between can provide a digital time stamp service to certify that a certain version of a certain document existed and was delivered to it at a certain day and time.

Third party go-between can legally notarize the item(s) if desired, and can also "notarize" electronic control structures associated with the item(s).

Third party go-between can authenticate an item by, for example, opening (e.g. decrypting content) one or more containers; digitally or otherwise "signing" one or more items to indicate the third party has seen the item(s); verifying the integrity of the item(s) (e.g., using a one way hash function); affixing its own distinctive seal and/or other information to the item; generating audit information for item tracking purposes; and collecting payment based on the services it has performed.

Third party go-between can maintain a secure archive of the item(s) and/or identification/authentication information associated with the item(s) (e.g., a "one way hash" value of item contents or portions thereof). A portion or all of such archive (e.g., a "one way hash") may be stored within the affixed, visible seal applied described above.

Go-between can also serve as an archive of controls relating to certain items or item types (e.g., to allow a sender to access common controls and/or templates from any of various electronic appliances).

Secure electronic controls can provide a message digest that can be delivered to and registered by a trusted go-between as part of the object registry/archiving process.

Third party go-between can deliver item(s) to an intended recipient, or simply oversee the delivery transaction as an impartial third party observer.

Trusted go-between can deliver a copy and/or the original of an item with or without a seal affixed by the go-between.

Trusted third party go-between can maintain or exert control over an item, distributed chain of handling and control process(s), and/or other processes or workflow associated with it.

Trusted go-between can support governmental regulatory requirements by acting as a cryptographic key repository for encrypted communications; such secure communications may be accessed by governmental authorities, for example, through a warrant process to provide court or otherwise mandated access to specific communications or communications related information (e.g., for encrypted communications employing long key lengths).

Trusted go-between can act as a user rights authority clearinghouse for additional and/or alternative rights which may, for example, be available to particular classes, specific users, at a certain cost, or as specified by the sender. Trusted go-between may also mediate between sender(s) and recipient(s) in response to recipient's request for new, different and/or modified rights or sender's and/or receiver's request for third party archived information (which may require the agreement by only one, expressly either one, or both sender(s) and recipient(s).

In addition to multiple individuals and/or parties in several organizations, a trusted go-between may also provide services to parties within a single organization, thus enhancing the security, reliability, auditability, authentication, efficiency, and timeliness of secure document delivery and secure transaction facilitation within a given organization.

Trusted go-between may provide services both on public networks, such as the Internet, on internal corporate networks ("Intranets"—irrespective of whether or not they use Internet type conventions), and on private networks connecting two or more individuals and/or organizations exchanging documents and other content in digital format and/or participating together in various transactions.

A third party go-between can provide a communications switching integration. For example, a communications service provider may automatically provide the go-between services for a connection. For example, certain telephone numbers might be offered that have these services built in to the switching network, or a special dialing sequence might be used to access a communications channel with these characteristics. This can provide data links for networks, or be integrated with traditional fax lines, or even voice lines. For example, a fax transmission might be archived, have a seal inserted during transmission, and/or have a hash value stored for later reference. A voice transmission could be similarly managed. Both of these examples have the advantage of compatibility with the existing infrastructure (albeit at the cost of lacking persistent control after delivery). Using this infrastructure for data links has the added advantage of transparency.

A third party go-between can provide Transaction Authority services as described in the copending concurrently filed Ginter et al patent application

BRIEF DESCRIPTION OF THE DRAWINGS

These and other features and advantages provided by the present invention will become better and more completely understood by studying the following detailed description of presently preferred exemplary embodiments in conjunction with the drawings, of which:

FIGS. 11A-11C show examples of functional relationship(s) between applications and the Rights Operating System;

FIGS. 11D-11J show examples of "components" and "component assemblies";

FIGS. 14A-14C are examples of SPU memory maps provided by the protected processing environment shown in FIG. 13;

FIG. 28 shows an example of a receiving table structure;

FIGS. 43A-43D show an example of a "reciprocal" REGISTER method;

FIGS. 72A-72D show examples of "pop-up" displays that may be generated by the user notification and exception interface;

FIGS. 86 and 86A show a further example of a chain of handling and control; and

FIGS. 90A and 90B show example options the sender can select for electronic delivery;

FIG. 91B shows example steps to receive an item;

FIG. 99 shows an example trusted electronic go-between;

FIG. 101 shows an example electronic legal contract execution using a trusted electronic go-between;

FIG. 101B shows an example multi-party electronic legal contract execution using a trusted electronic go-between;

FIGS. 106A-106C show example electronically generated seals;

FIG. 113B shows an example audit trail data structure;

FIG. 114A-118 show example processes for securely receiving an item;

FIG. 119 shows an example architecture for a trusted electronic go-between;

FIGS. 120A-120B show example reciprocal control set usage to provide a trusted electronic go-between having secure electronic notarization capabilities;

FIG. 121 shows example steps performed by a trusted third party go-between to receive an item;

FIGS. 122 and 123 show example trusted go-between processes;

FIGS. 124A-124B and 125A-125B show example contract execution processes;

FIG. 126 shows an example automobile purchase providing electronic contract execution through a trusted electronic go-between;

FIG. 127 shows an example use of a trusted electronic go-between to provide electronic item notarization;

FIG. 128 shows an example secure item delivery with real time teleconferencing capabilities;

FIG. 129 shows a health insurance example;

FIG. 130 shows an example real estate "atomic" settlement;

Figure 130A:
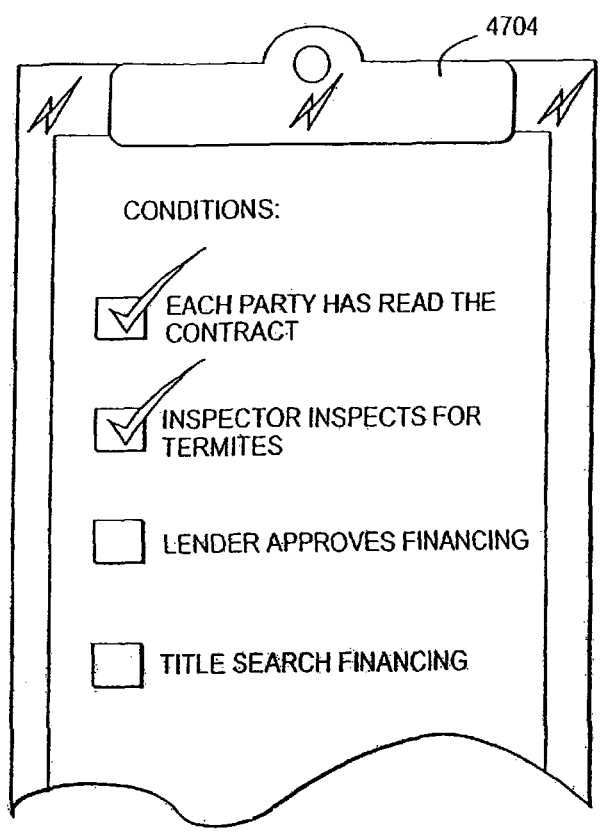
Figure 132:
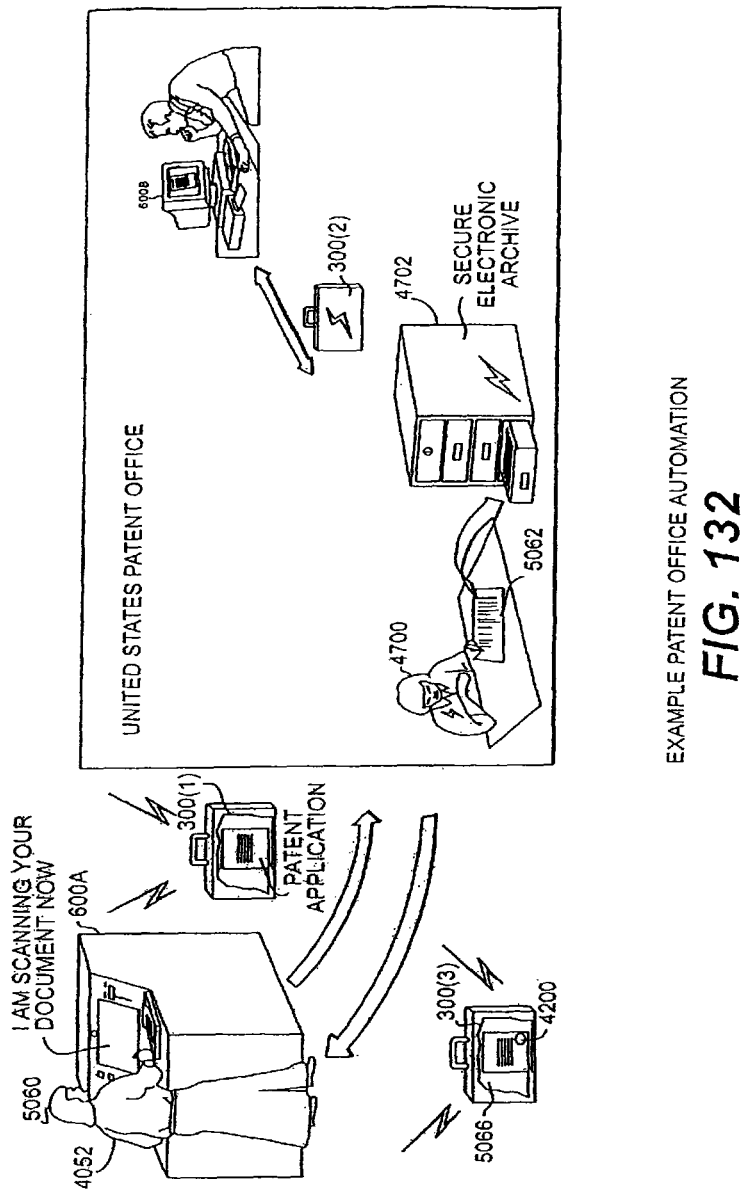
Figure 133:
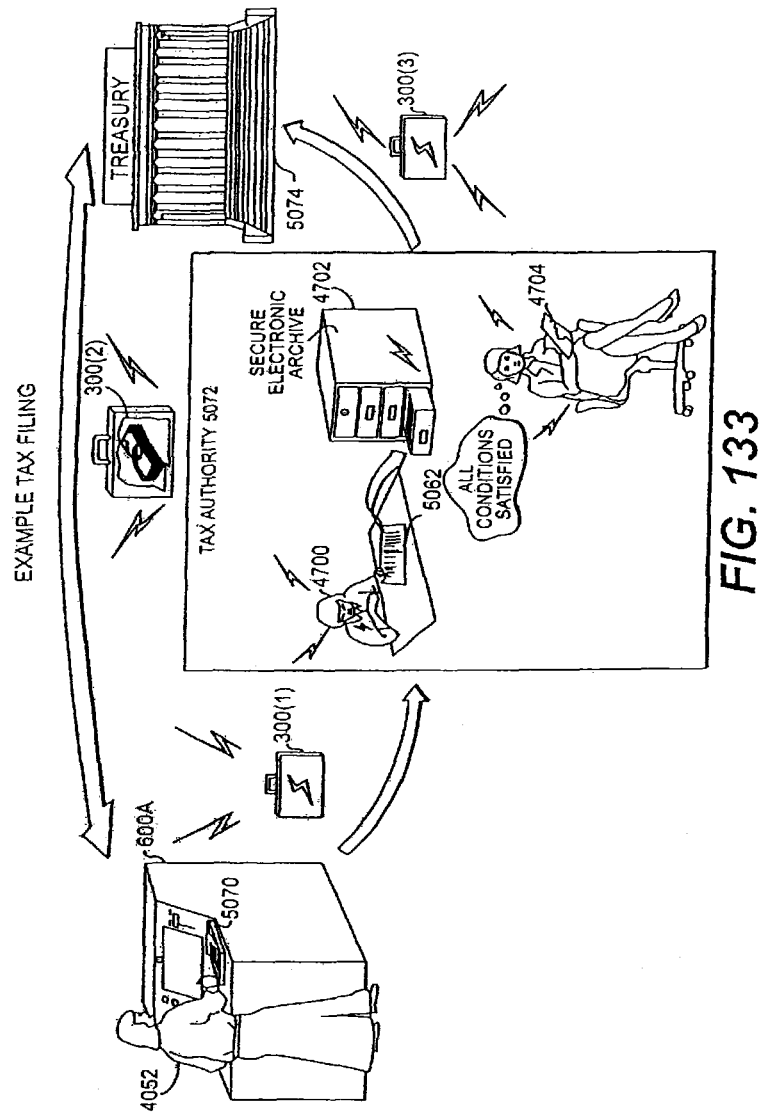

FIG. 130A shows example transaction rules;

FIG. 131 shows an example judicial electronic data interchange (EDI);

FIG. 132 shows an example Patent Office automation;

FIG. 133 shows an example tax filing; and

Figure 134:
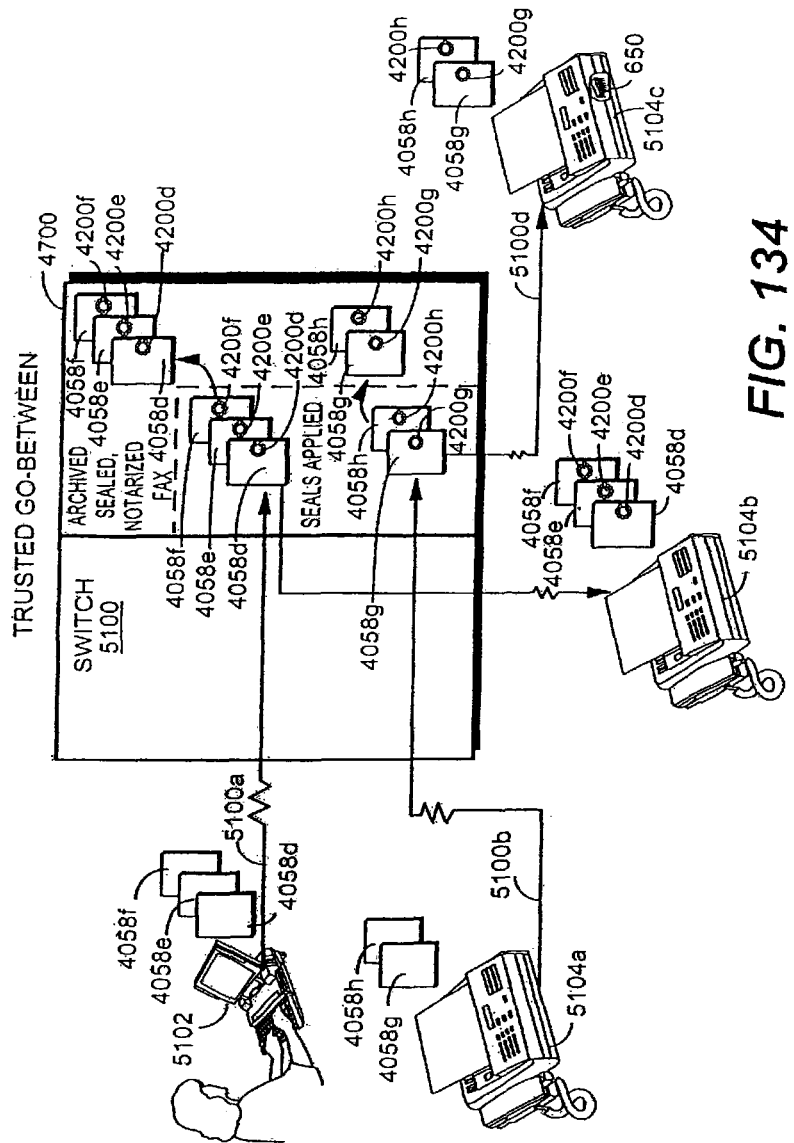

FIG. 134 shows an example using facsimile transmission.

DETAILED DESCRIPTION OF EXAMPLE EMBODIMENTS

Figure 1:
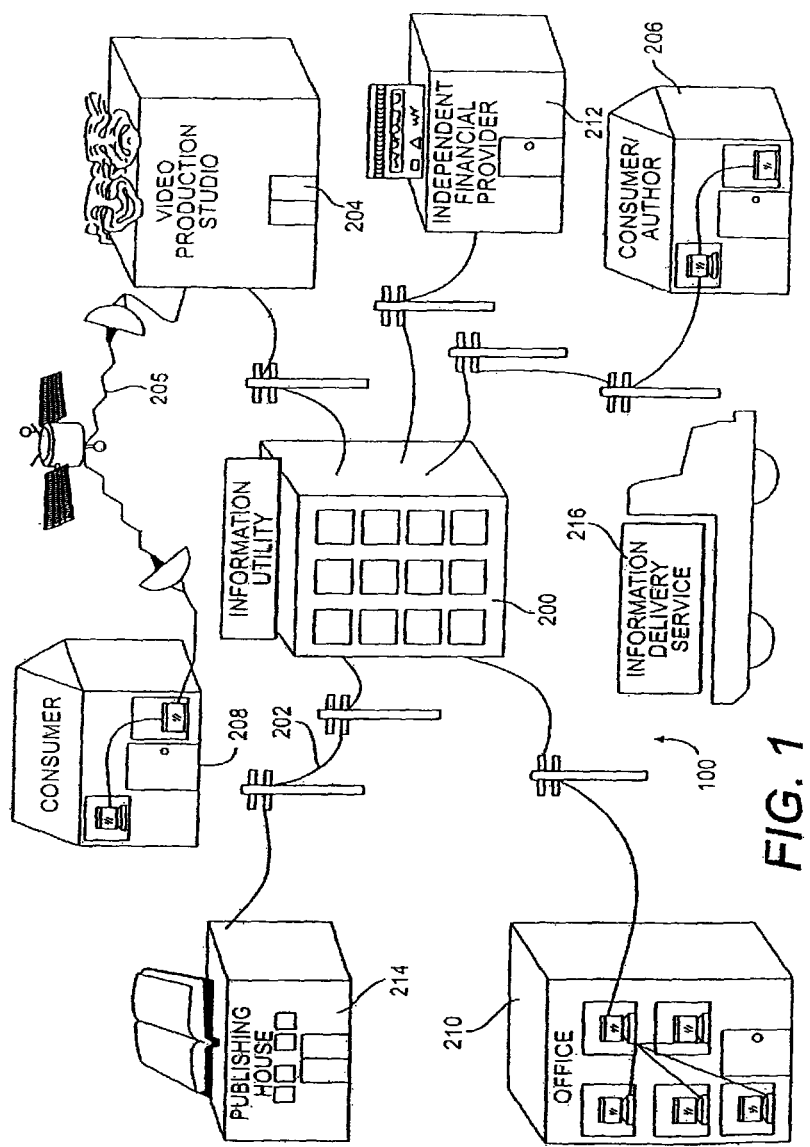
FIG. 1 illustrates an example of a "Virtual Distribution Environment"
Figure 87:
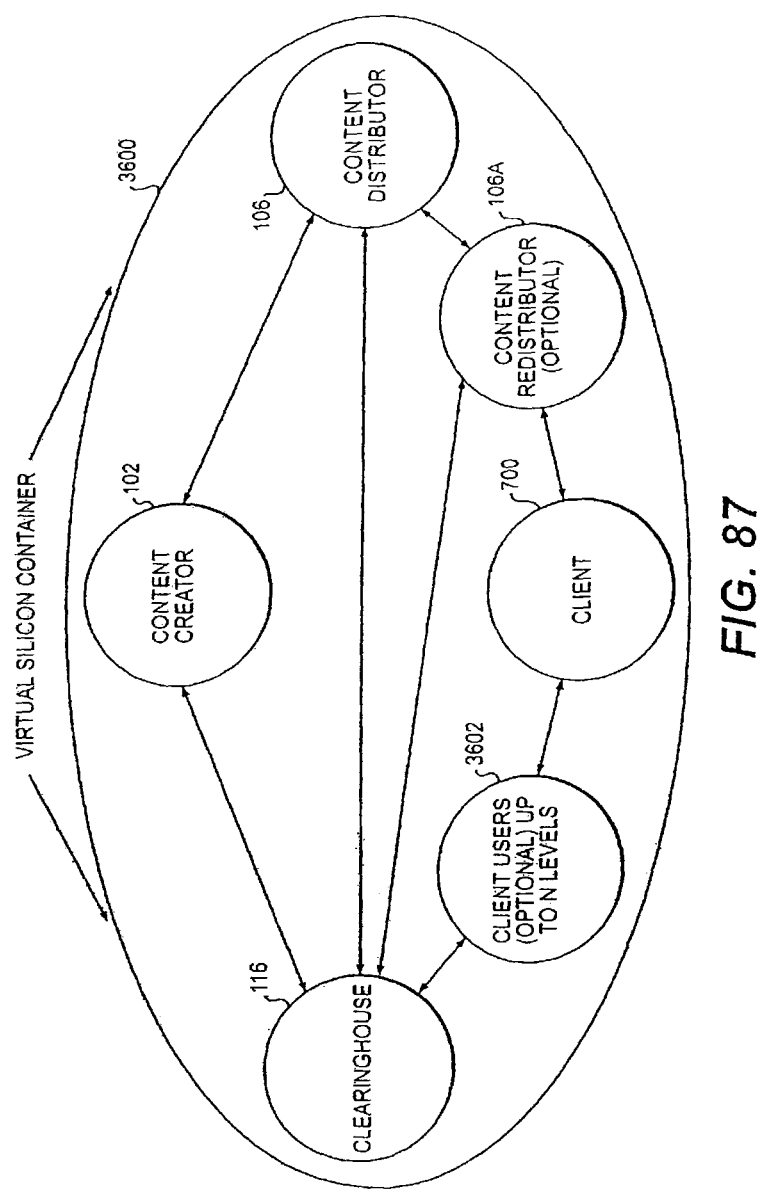
FIG. 87 shows an example of a virtual silicon container model.

The entire disclosure of the above-referenced Ginter et al. patent specification is incorporated by reference in connection with FIGS. 1-87.

Figure 88:
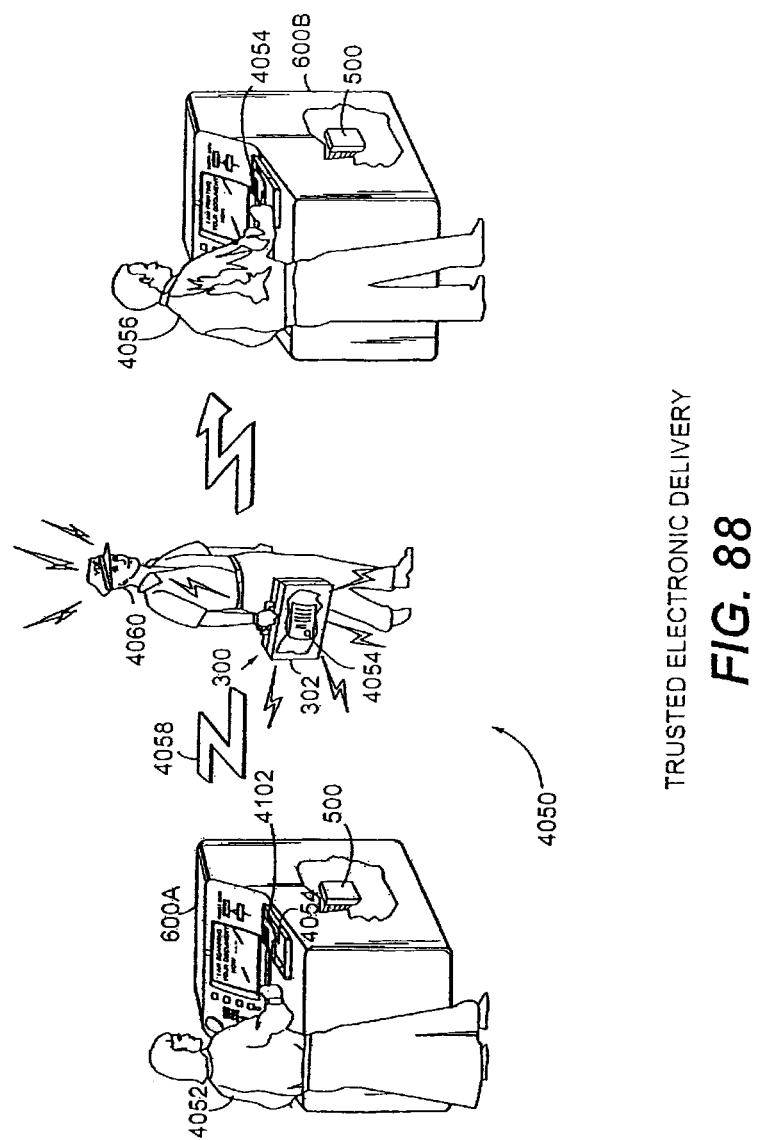
FIG. 88 shows an example trusted electronic delivery system.

FIG. 88 shows an electronic trusted delivery system 4050. In this example, sender 4052 is sending an item 4054 to a recipient 4056 over an electronic network 4058. In this example, electronic delivery over network 4058 is by way of a secure, trusted electronic delivery virtual distribution environment transport mechanism 4060 which is shown for purposes of illustration as an electronic delivery person. Delivery person 4060 is shown as a human being for purposes of illustration, but in the example is actually an automatic, trusted electronic delivery means supported and provided by virtual distribution environment 100.

Item 4054 might be a document such as a handwritten or typed letter, or it could be a legal document such as a contract. It could have both text and pictures, just text or just pictures. It could be a sound recording, a multimedia presentation, or a visual work such as a film or television program. Item 4054 could be any item or information capable of being represented in digital form. The item 4054 can be initially presented to the appliance 600 in electronic form (for example, on a diskette), or the appliance can convert it from some other form into electronic form.

Figure 5A:
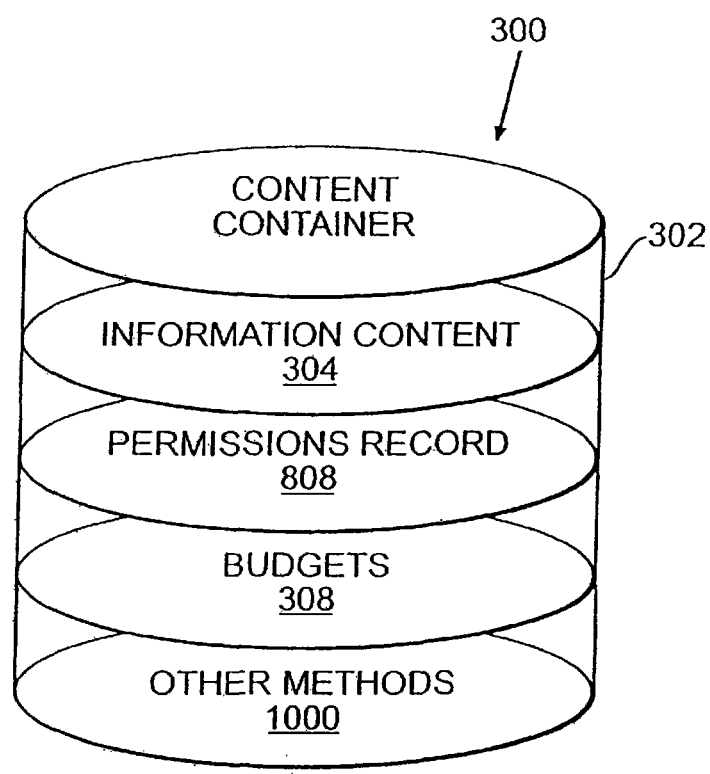
FIGS. 5A and 5B show an example of an "object"
Figure 5B:
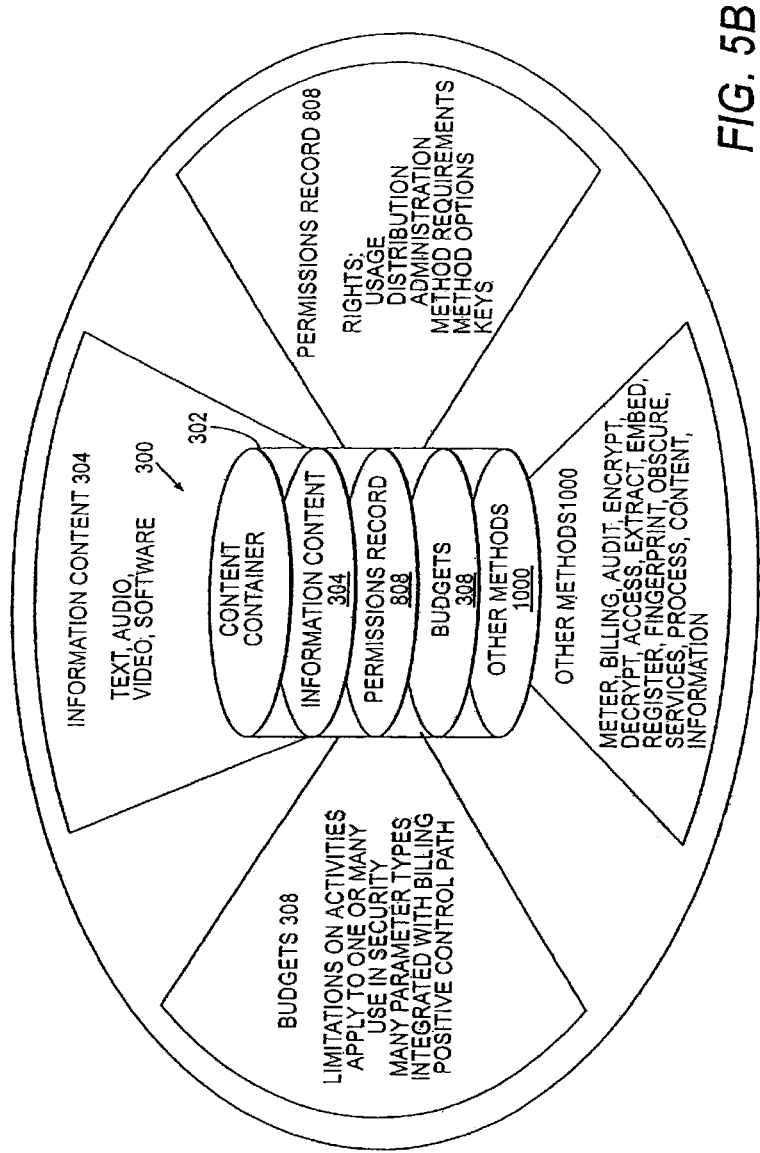

Electronic delivery person 4060 receives item 4054 in digital form and places it into a secure electronic container 302—thus forming a digital "object" 300. A digital object 300 may in this case be, for example, as shown in FIGS. 5A and 5B, and may include one or more containers 302 containing item 4054. FIG. 88 illustrates secure electronic container 302 as an attaché case handcuffed to the secure delivery person's wrist. Once again, container is shown as a physical thing for purposes of illustration only—in the example it is preferably electronic rather than physical, and comprises digital information having a well-defined structure (see FIG. 5A). Special mathematical techniques known as "cryptography" can be used to make electronic container 302 secure so that only intended recipient 4056 can open the container and access the electronic document (or other item) 4054 it contains.

Figure 2:
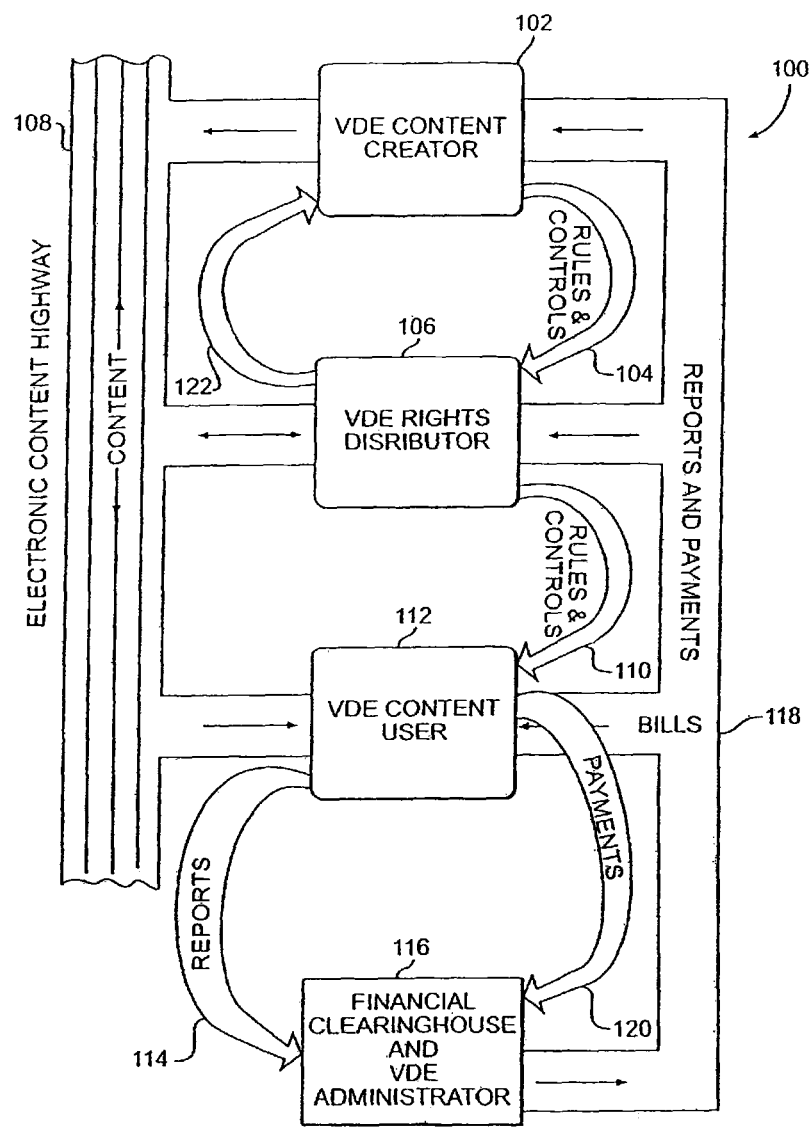
FIG. 2 illustrates an example of a chain of handling and control.
Figure 2A:
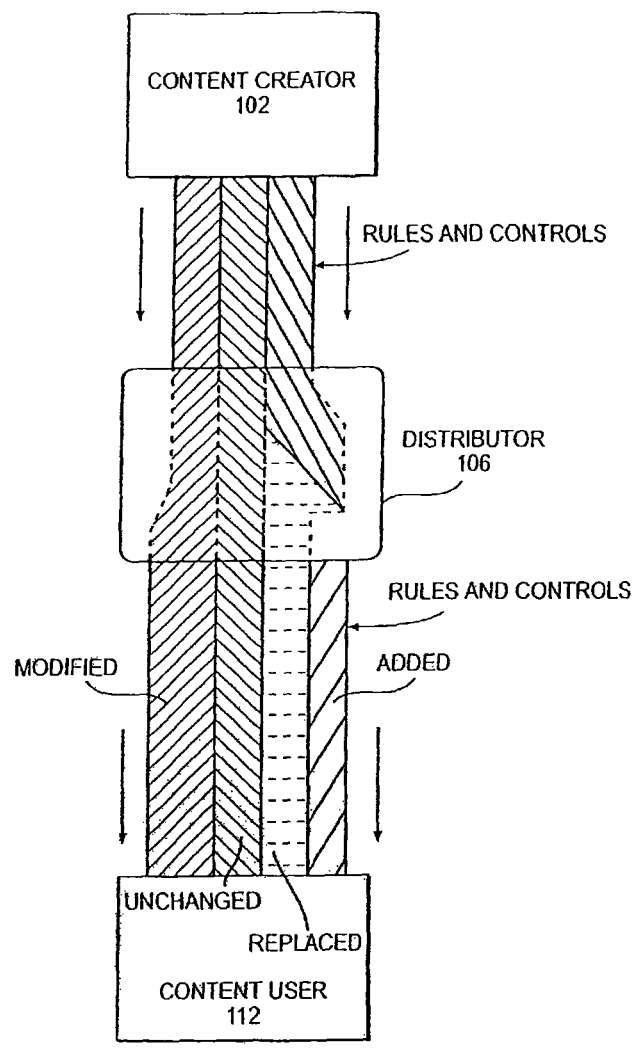
FIG. 2A illustrates one example of how rules and control information may persist from one participant to another in the FIG. 2 chain of handling and control.
Figure 3:
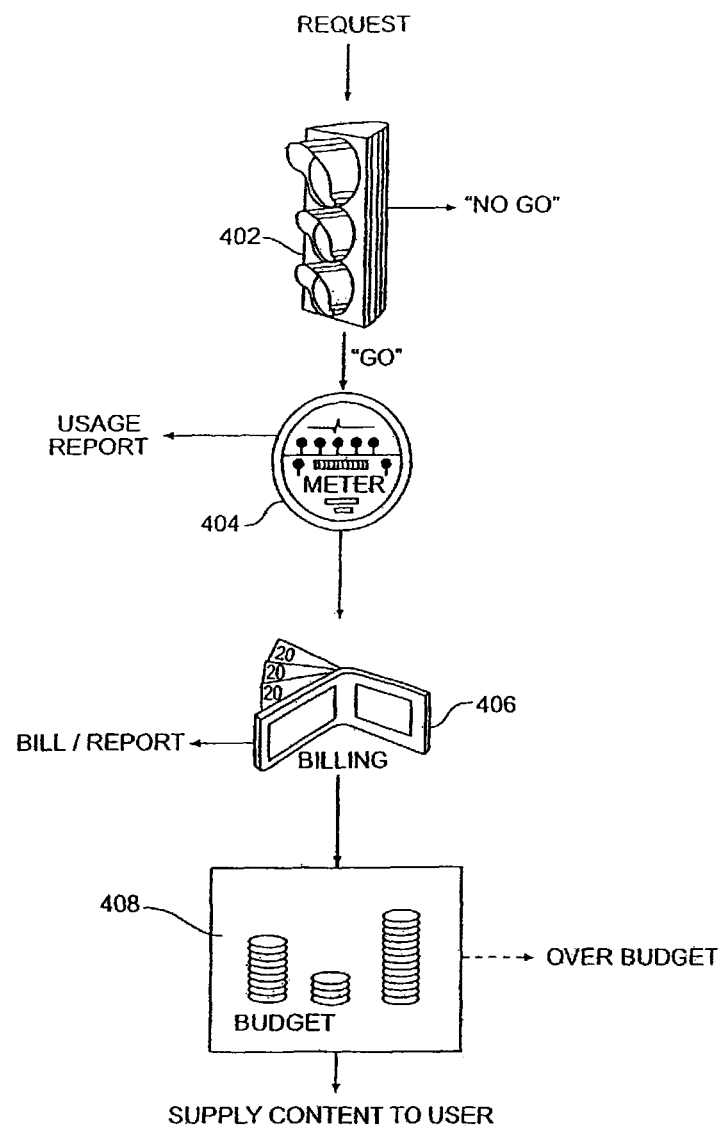
FIG. 3 shows one example of different control information that may be provided.
Figure 4:
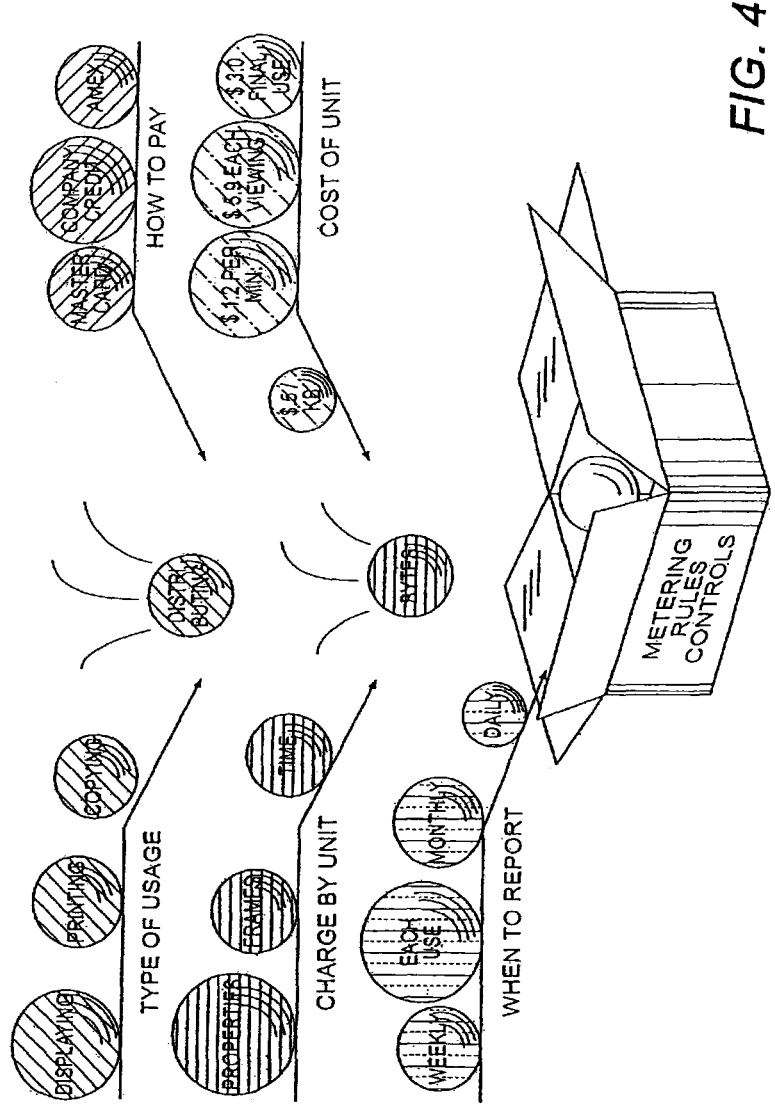
FIG. 4 illustrates examples of some different types of rules and/or control information.

In this example, sender 4052 sends item 4054 by supplying the document to an electronic appliance 600A. In this example, electronic appliance 600A is an intelligent electronic walk-up kiosk that may be located in a public place or on private property, such as the offices or work areas of a firm. Appliance 600A in this example has a document slot 4102 into which sender 4052 can feed item 4054. Electronic appliance 600A can automatically, optically scan the item 4054 and convert it into digital information for sending over an electronic connection or network 4058 (such as, for example, electronic highway 108 shown in FIG. 2). The item 4054 can be sent to one or many recipients specified by sender 4052.

Figure 89:
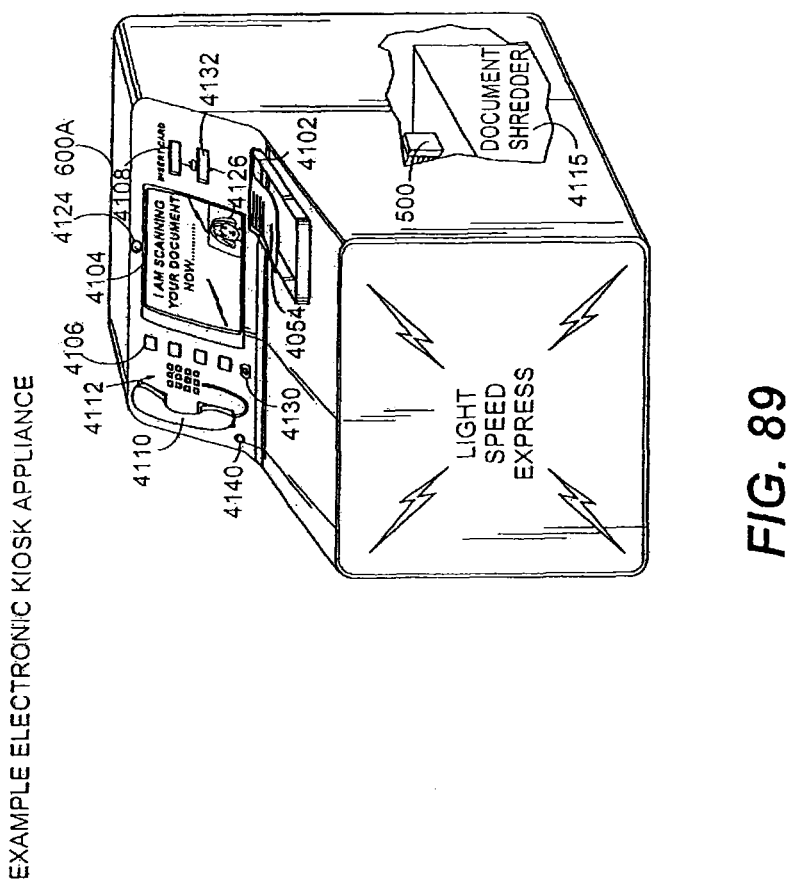
FIGS. 89 shows a detailed view of an example electronic intelligent kiosk appliance.

FIG. 89 shows an example appliance 600A in the form of an intelligent walk-up kiosk. This example kiosk appliance 600A could be installed in an office building lobby, shopping mall, office supply store, or other public place for walk-up use by members of the public. It could also be installed in a location within a corporate or business office (e.g., a mail room) for use by company employees. The kiosk appliance 600A is an example. Aspects of the present invention can be used with other types of electronic appliances such as personal computers or computer workstations for example (see FIGS. 7 and 8, and 93-93C for example).

Referring to FIG. 89, the example kiosk appliance 600A can include a computer screen 4104 for displaying informational messages, and user operable controls 4106 such as push buttons for allowing sender 4052 to select between delivery options. Appliance 600 in this example may also include a card reader 4108 for reading a credit card or other kind of card provided by the sender 4052. Additionally, if desired, electronic appliance 600A may include a telephone receiver 4110 and telephone dialing keypad 4112 (or other input devices) to allow sender 4052 to get information and assistance or give additional instructions. Electronic appliance 600A may optionally include a keyboard for entering textual and other information (not shown).

Also as shown in FIG. 89, electronic appliance 600A may optionally include a video camera 4124 and may display remote video in a "window" 4126 on screen 4104 (or on an optionally separate screen not shown). Camera 4124 allows appliance 600 to take a photograph of sender 4052 and/or recipient 4056. It may also allow sender 4052 and recipient 4056 to see each other in order to simultaneously authenticate each other's identity visually—and to have a "teleconference" discussion about item 4054 or other matters. The electronic appliance 600 may also have a microphone/speaker 4140 perhaps to coordinate details of the pending transaction. Appliance 600A might also include a media reader 4132 to read from a floppy diskette, smart card or other digital storage device. The appliance 600 can include, in addition, a document shredder/destroyer 4115.

Figure 6:
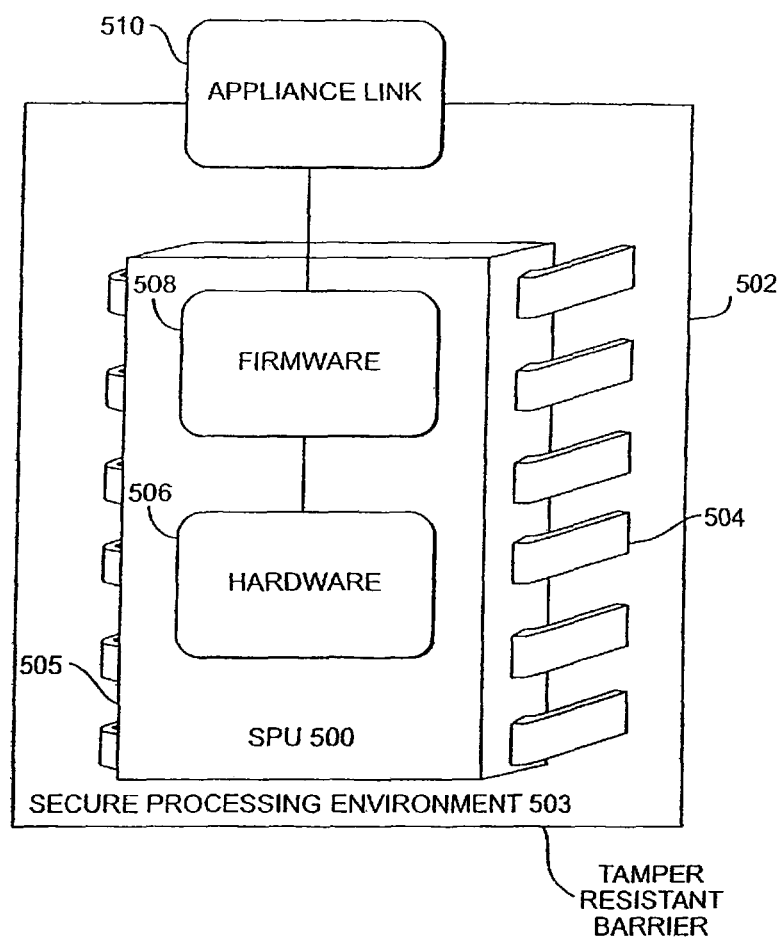
FIG. 6 shows an example of a Secure Processing Unit ("SPU")

Also as shown in FIGS. 88 and 89, appliance 600A in this example has a secure processing unit (SPU) 500 (see FIG. 6). SPU 500 provides a tamper-resistant protected processing environment ("PPE") in which processes and transactions can take place securely and in a trusted fashion.

Figure 91A:
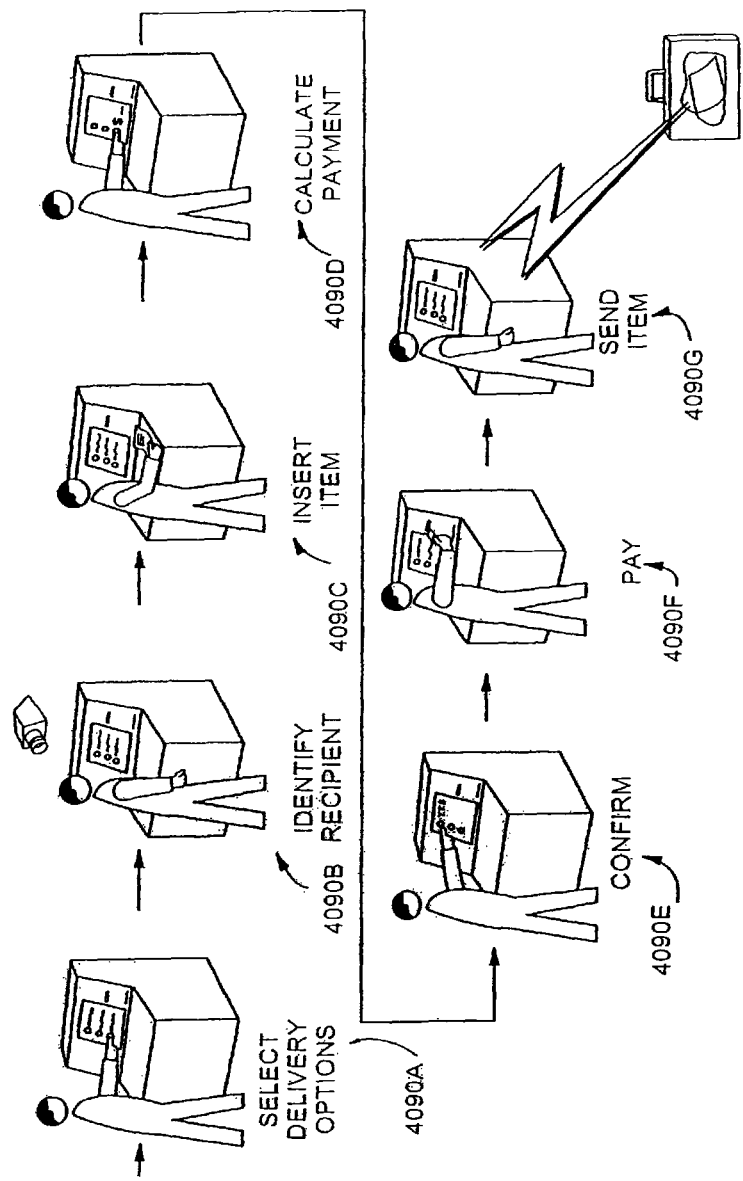
FIG. 91A shows example steps to send an item.

FIG. 91A shows example steps for sending an item such as item 4054. To send item 4054 to recipient 4056, sender 4052 may first press buttons 4106 and read display 4104 to select between different delivery options (see FIG. 91A, step 4090A). FIG. 90A shows some example service options, and FIG. 90B shows some more detailed delivery options. For example, sender 4052 might press a button corresponding to "delivery options," which might cause appliance 600A to display the FIG. 90A menu screen of various delivery options. These delivery options could include, for example:

receipt options (what kind of receipt, if any, sender 4052 wishes to receive documenting delivery of item 4054 to intended recipient 4056);

integrity guarantee options (providing high levels of assurance that item 4054 was delivered in its entirety without any errors, and without any accidental or intentional modifications);

privacy options (for example, whether recipient 4056 is to know who sender 4052 is or where she has sent the document from); and more options.

Electronic appliance 600A may also ask the user to identify intended recipient 4056 (FIG. 91A, step 4090B). Sender 4052 may select different ways to identify recipient 4056 based on the confidentiality of the document and the level of security the sender is willing to pay for. In one example, sender 4052 might require the recipient's appliance 600B to require recipient 4056 to prove that he is who he says he is. This secure "authentication" function might be met by, for example, requiring recipient 4056 to input a password, present digital proof of identity using, for example:

a digital document or "certificate" issued by a trusted third party, and/or have appliance 600 measure a biometric characteristic of the recipient such as, for example, taking the recipient's photograph (and possibly automatically compare it with a known photograph of the recipient supplied by sender 4052 or system 4050) or using any other biometric sensing technique.

Sender 4052 may also specify the electronic address of recipient 4056, or it might let system 4050 automatically, securely and confidentially locate the recipient using a secure directory service as described in the copending Shear et al. application.

Once sender 4052 has selected the service options she desires, appliance 600 may next display a message on computer screen 4104 asking sender 4052 to insert item 4054 into document slot 102 for electronic scanning. When the sender 4052 inserts the document 4054 or other item (FIG. 91A, block 4030C), electronic appliance 600 may (if necessary) automatically, optically scan item 4054 to create an electronic, digital form of the document (using conventional optical scanning and optical character recognition technology, for example). During this scanning process, appliance 600 might display a message on computer screen 4104 such as "I am scanning your document now . . . " Instead of feeding in a document, the sender might provide the document or other item in digital form by inserting a floppy diskette or smart card into reader 4132, or by connecting a portable computer up to port 4130 and having the portable computer "upload" the document into appliance 600.

The item 4054 to be sent need not be a document, but could be any type of item capable of being transformed into digital form such as, for example:
- pictures or other graphical information;
- sound information such as voice, music or both;
- executable computer program or other code;
- video, film or other moving image sequences;
- multimedia, video games and the like;
- any combination or subcombination of the above.

Figure 9:
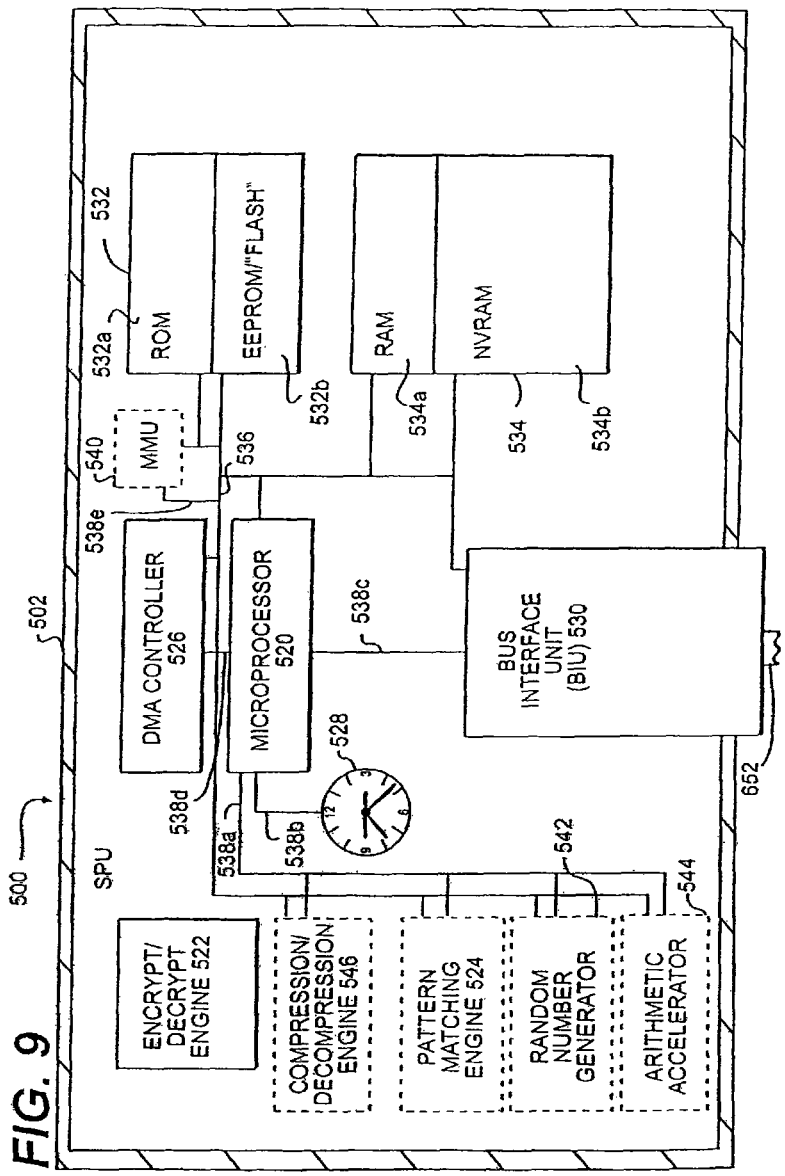
FIG. 9 is a detailed view of an example of the Secure Processing Unit (SPU) shown in FIGS. 6 and 8.
Figure 10:
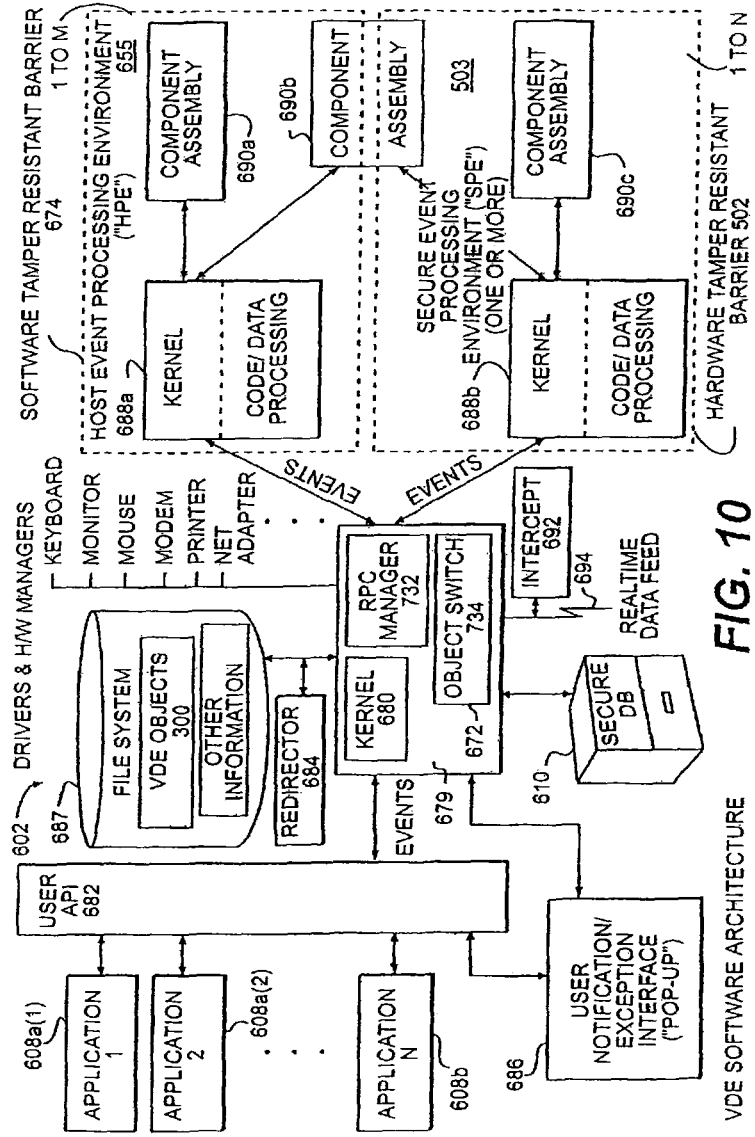
FIG. 10 shows an example of a "Rights Operating System" ("ROS") architecture provided by the Virtual Distribution Environment.
Figure 11H:
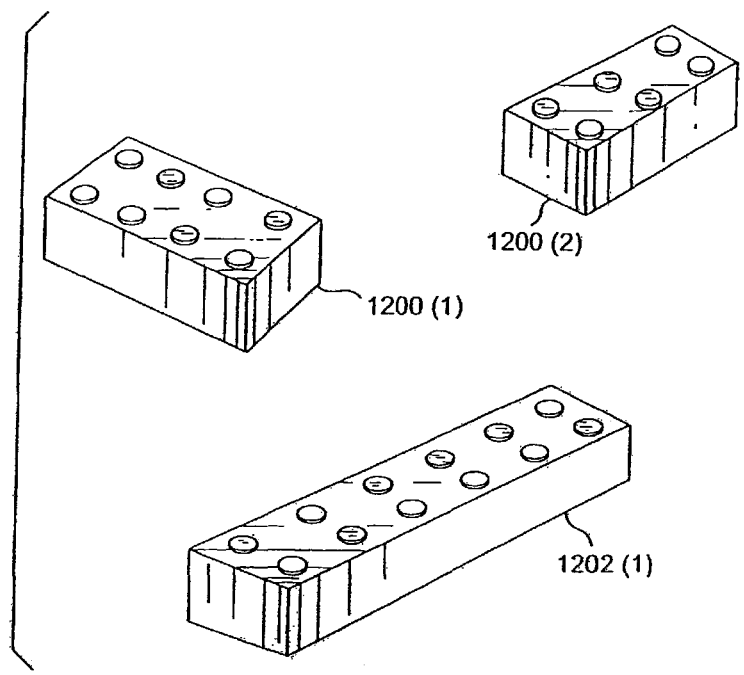
Figure 11I:
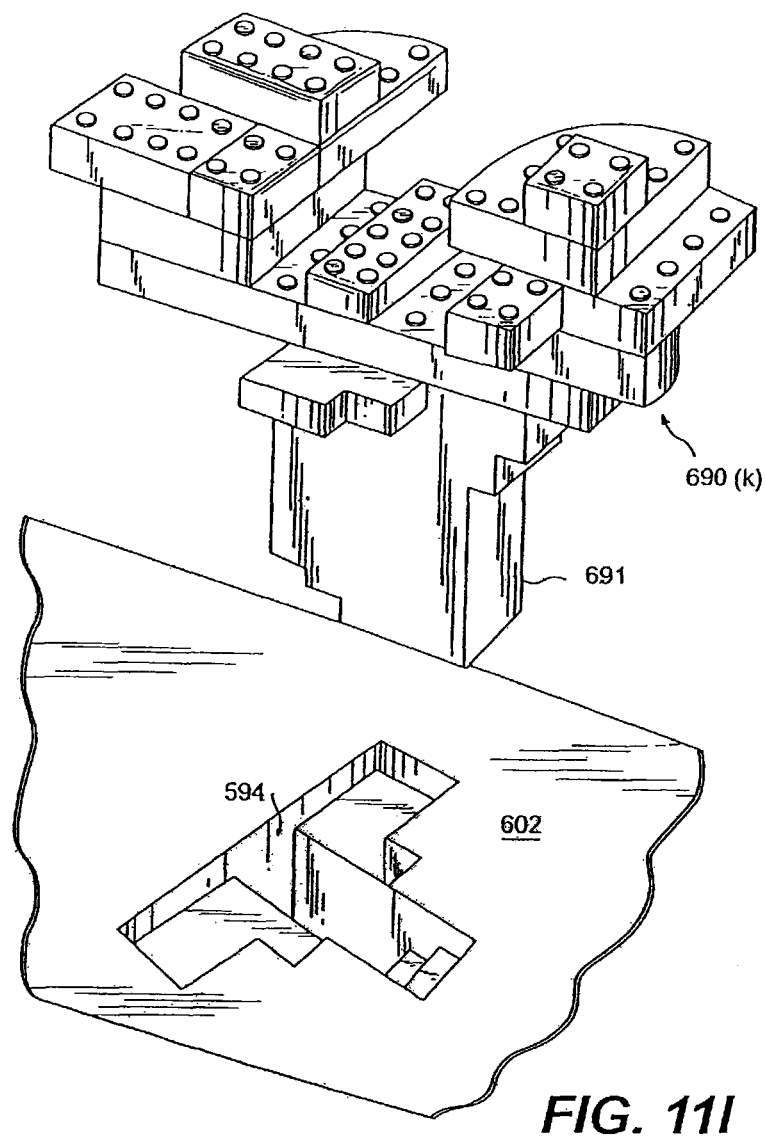

After appliance 600 has scanned or otherwise received the entirety of document 4054 or other item, appliance 600 may calculate and display a total price on computer screen 4104 and ask sender 4052 to pay for the service (FIG. 91A, block 4090D). The calculated price may, for example, depend in part on the size and/or number of items to be securely delivered. The appliance may then ask sender 4052 to confirm she wishes to send the document to the recipient 4056 (FIG. 91A, block 4090E). Upon receiving that confirmation (FIG. 91A, "y" exit to decision block 4090E), appliance 600 may request sender 4052 to pay, for example, by inserting her credit card into card reader 4108 as a form of payment, or it might use other payment arrangements (FIG. 9aA, block 4090F). Appliance 600 may then package the digital form of document into secure electronic container 302 and send it over electronic network 4058 for secure delivery to recipient 4056 (FIG. 91A, block 4090F). Because system 4050 uses the secure "virtual distribution environment" 100, sender 4052 can have a high degree of confidence and trust that item 4054 will be usable only by intended recipient(s) 4056 and to no one else.

FIG. 91B shows example steps for receiving an item. Intended recipient 4056 may receive delivery of the document by walking up to the same or different electronic appliance intelligent kiosk 600B and operate controls 4106 instructing the appliance to deliver the document to him (FIG. 91B, block 4092A). Depending upon the delivery options sender 4052 selected, appliance 600 may require recipient 4056 to prove he is who he says he is (FIG. 91B, block 4092B). For example, appliance 600B may require recipient 4056 to provide a secret password and/or it may require the recipient to insert a special card into card reader 108. This special card may certify the identity of recipient 4056. Appliance 600B might also take the recipient's picture using camera 4124, and automatically compare the picture with a known photographic image of the recipient to see if they match. Once appliance 600 is satisfied regarding the identity of recipient 4056, it may require the recipient to pay (FIG. 91B, block 4092C)—such as for example in a "collect on delivery" model. The appliance 600 may then open the secure electronic container ("attaché case") 302 and deliver the item it contains to recipient 4056 (FIG. 91B, block 4092D). For example, if the container 302 contains item 4054, prints the copy of the document, and provides the printed copy through document slot 4102. It could also give recipient 4056 a digital copy of the item 4054 (such as a document) via media drive 4132 and/or port 4130. Appliance 600B may deliver the digital copy of item 4054 within a container 302 and/or may protect the item with seals, electronic fingerprints, watermarks and/or other visible and/or hidden markings to provide a "virtual container" or some of the security or other characteristics of a container (for example, the ability to associate electronic controls with the item).

Example Electronic Delivery and Return Receipt

Figure 92:
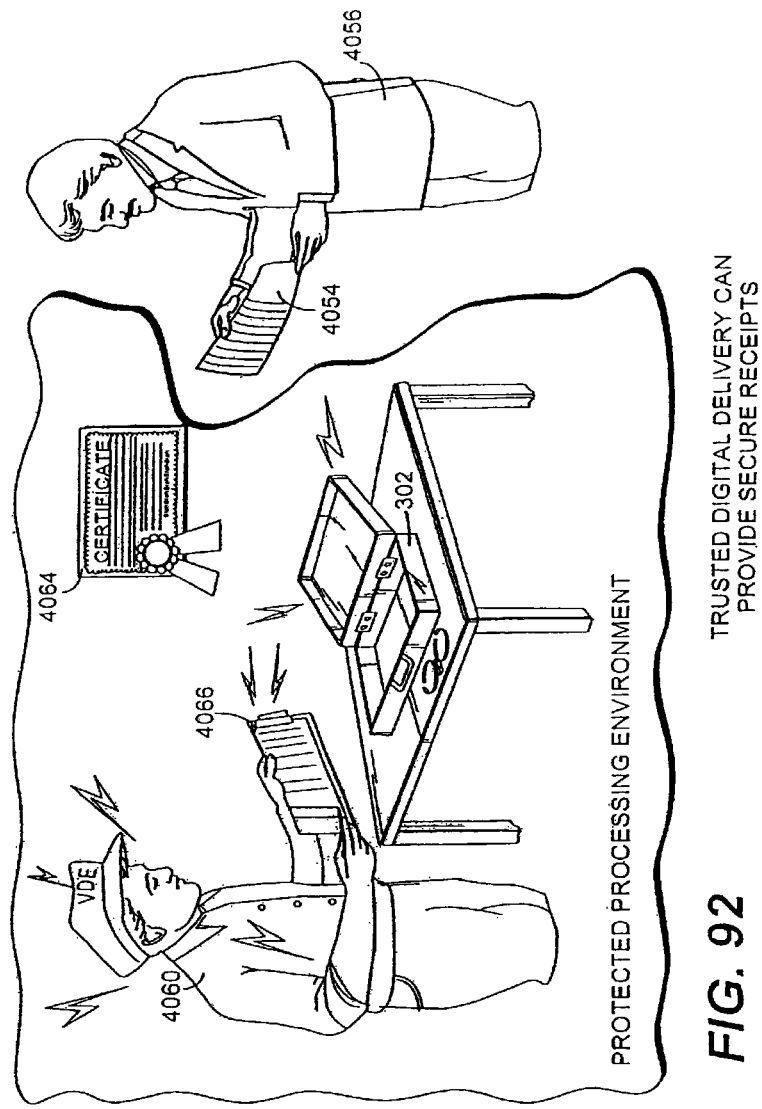
FIGS. 92 and 92A show example trusted electronic delivery providing a return receipt.

FIG. 92 illustrates one example delivery of item 4054 to recipient 4056. In this example, the virtual electronic delivery person 4060 demands to see a certificate or token 4064 proving that recipient 4056 is the same person sender 4052 designated to receive item 4054 (FIG. 91B, block 4092B). Recipient 4056 could provide this certificate 4064 by, for example, supplying a "smart" electronic card containing the certificate in digital form. Alternatively or in addition, if sender 4052 so required, electronic delivery person 4060 might require stronger forms of personal authentication such as, for example, a voice print, fingerprint or handprint test, identification based on other physical (biometric) characteristics such as face profile, retinal or iris patterns of the eye, or the like.

There are advantages to using multiple authentication techniques in combination. For example, a well made certificate is essentially unforgeable (which is to say, it would be easier to fabricate a electronic fingerprint carrying device, for example, than a well made certificate 4064 barring unforeseen advances in mathematics), but the trouble with certificates is the weakness of correlation between physical access (e.g., holding the card, or sitting at the appliance) and permission to use. Passwords are a weak form of authentication—that is, establishing this correlation. Biometric techniques, particularly iris and retinal scans, are stronger forms of authentication. It is possible for biometric information to be encoded in a field of a certificate 4064, and for the software controlling the card to confirm that the biometric input is consistent with the field in the certificate prior to authorizing use of the certificate or the card in general. This authentication may be limited in time (e.g., using an inactivity time out, each time the card is inserted, etc.) In addition, a transaction might require this authentication to occur simultaneous with use (rather than for an entire session, even if the card only requires one authentication per session).

After payment has been arranged (FIG. 91B, block 4092C), electronic delivery person 4060 will open secure container 302 and give recipient 4056 a printed and/or electronic copy of item 4054 only once he is satisfied—to the degree required by sender 4052—that the recipient 4056 is the correct person.

Electronic delivery person 4060 may also note various information about the delivery (illustrated here by having him write the information down on a clipboard 4066, but implemented in practice by electronically storing an "audit" trail). System 4050 may—based on the particular receipt options sender 4052 requested—provide the sender with an electronic and/or paper receipt of the type shown in FIG. 92A, for example (FIG. 91B, step 4092D). Such an example receipt 4066 might specify, for example:
- item and/or transaction number;
- name of actual recipient 4056 to whom the item was delivered;
- the company recipient 4056 works for;
- day, date and time of day of delivery;
- who actually opened and read or used an item 4054;
- when (day, date and time of day) item 4054 was actually opened and read, and
- the public key of the trusted third party that issued the digital certificate 4064 attesting to the identity of recipient 4056.

Figure 1A:
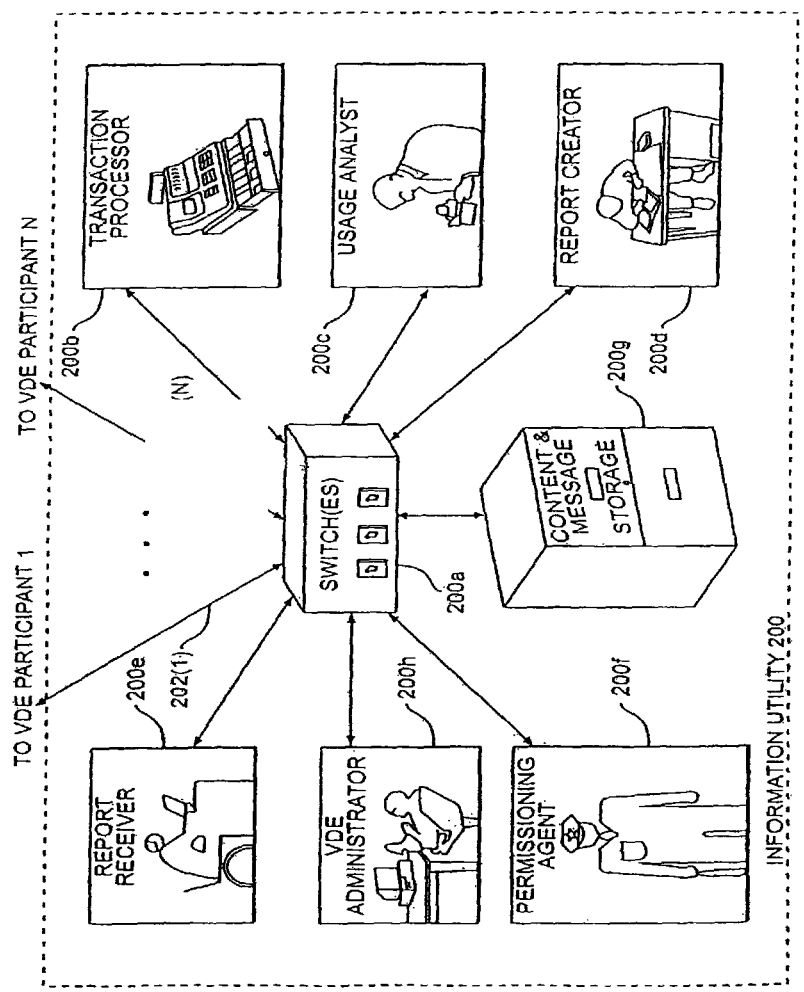
FIG. 1A is a more detailed illustration of an example of the "Information Utility" shown in FIG. 1.

The sender's electronic appliance 600A and the recipient's electronic appliance 600B can report their respective "audit trails" periodically or upon completion of delivery or some other event. They can report the audit information to a support facility such as information utility usage analyst 200C (see FIG. 1A). Usage analyst 200C can work with report creator 200D to issue a written or electronic report to sender 4052. Alternatively, since electronic appliances 600A, 600B are secure, the electronic appliances can maintain copies of the audit trail(s) and produce them in secure form on demand at a later date to evidence or prove that the document was sent and delivered (for example, so sender 4052 can't deny she sent the item and recipient 4056 can't deny he received the item). The appliances 600A, 600B could store an entire copy of the item 4054, or they could instead store a "message digest" that could later be used to securely prove which item was sent.

Other Types of Electronic Appliances Can Be Used

As mentioned above, the kiosk appliances 600 shown in FIGS. 88 and 89 are just one example of electronic appliances that can be used for secure document delivery.

Secure electronic delivery can also be from one personal computer 4116 to another. FIGS. 93-96 show that system 4050 can be used to deliver documents securely between various different kinds of electronic appliances—personal computers, for example.

Figure 93:
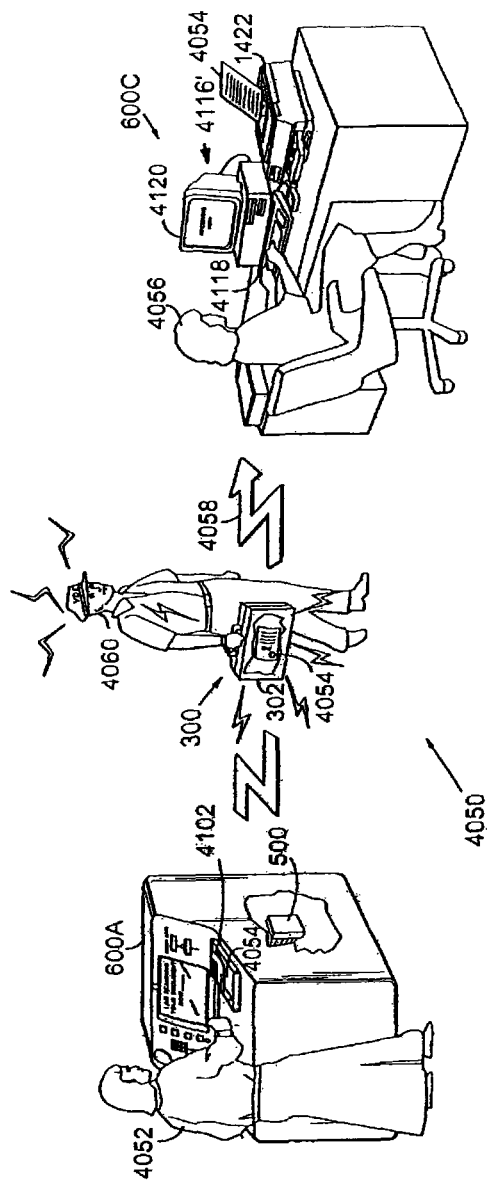
FIG. 93 shows example trusted item delivery from an intelligent kiosk to a personal computer.

FIG. 93 shows that electronic kiosk appliance 600A may send item 4054 to a different type of electronic appliance 600C such as a personal computer 4116 having a display 4120, a keyboard 4118 and a pointer 4122. Personal computer 4116 in this example is also provided with a secure processing unit 500 or software based HPE 655 (See FIG. 12) to provide secure, tamper-resistant trusted processing. In this example, kiosk appliance 600A and personal computer appliance 600C are both part of virtual distribution environment 100 and are interoperable with one another in a secure fashion.

Figure 94:
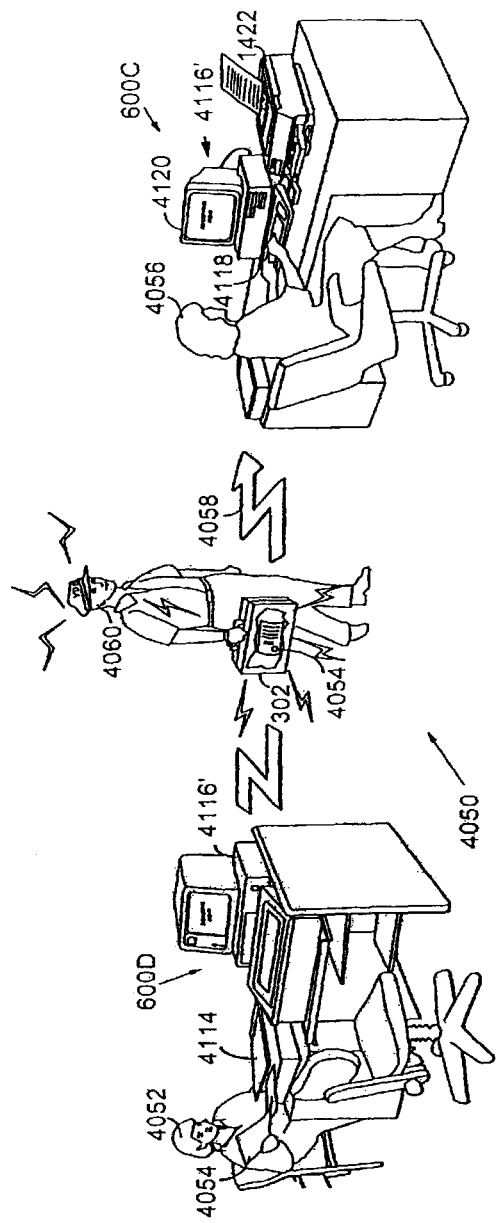
FIGS. 94 & 95 show examples of trusted electronic delivery between personal computers.

Secure delivery can also be from one personal computer 4116 to another. FIG. 94 shows a sender 4052 inputting item 4054 into an optical scanner 4114 connected to a personal computer 4116'. Electronic delivery person 4060 can deliver the electronic version of item 4054 within secure container attaché case 302 from personal computer 4116' to another personal computer 4116 operated by recipient 4056.

Figure 95:
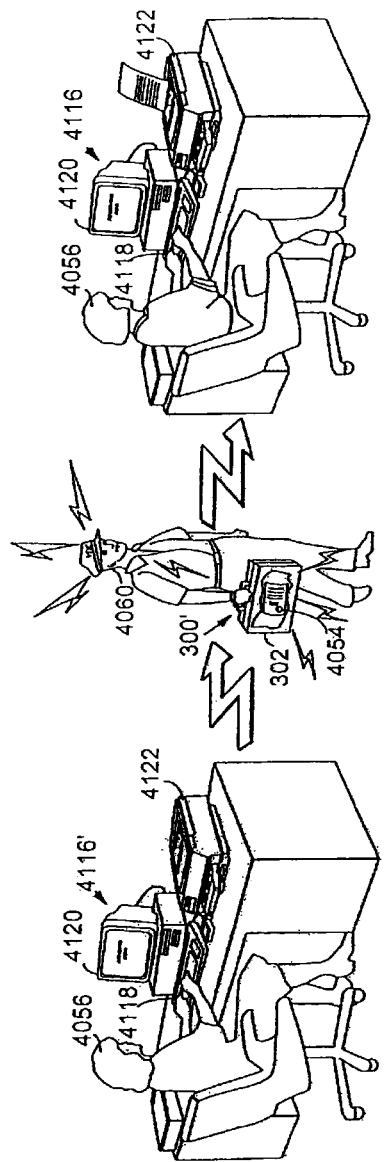

FIG. 95 shows that the item 4054 delivered by electronic delivery person 4060 need not ever exist in paper form. For example, sender 4052 might input digital information directly into personal computer 4116' through keyboard 4118—or the item could originate from any other secure or non-secure digital source. Sender 4052 may then cause electronic delivery person 4060 to deliver this digital item 4054 to the recipient 4056's personal computer 4116 for viewing on display 4120 and/or printing on printer 4122. Item 4054 can also be inputted from and/or outputted to a floppy diskette or other portable storage medium, if desired. As mentioned above, item 4054 can be any sort of digital information such as, for example text, graphics, sound, multi-media, video, computer software. The electronic delivery functions can be provided by software integrated with other software applications (e.g., electronic mail or word processing) executing on personal computer 4116.

Figure 96:
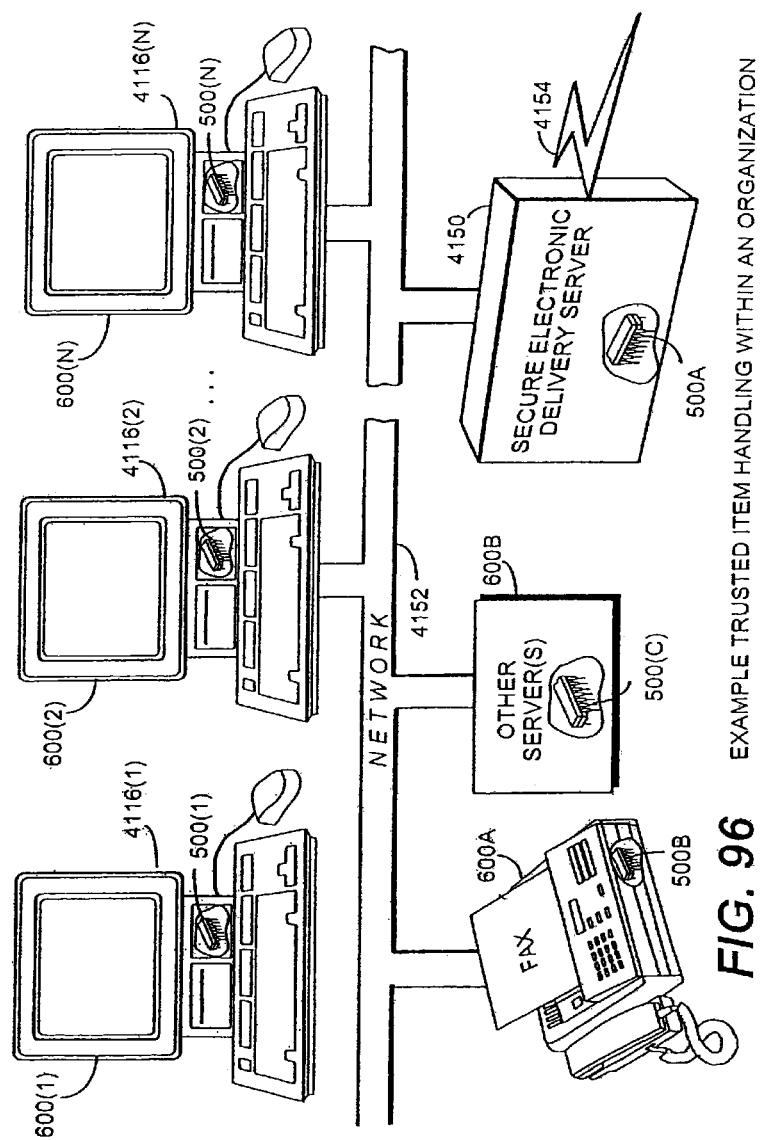
FIG. 96 shows an example trusted item handling and delivery within an organization.

FIG. 96 shows an example in which multiple electronic appliances 600(1), ..., 600(N), 600A and 600B communicate with a secure electronic delivery computer "server" 4150 over a network 4152. For example, appliances 600(1), ..., 600(N) may each be a personal computer or other workstation 4116. Appliance 600A may be, for example, a network facsimile device including a document scanner and document printer. Appliance 600B may be one or more additional "servers" of various types. Each of these various appliances 600 may use secure electronic delivery server 4150 to provide secure electronic item delivery and handling services. Server 4150 may include a secure processing unit 500 (PPE) interoperable with other VDE—capable electronic appliances, and may communicate with such other electronic appliances over a communications link 4154 such as the Internet or other electronic network. Each of the other appliances 600 may also include an SPU 500 (PPE) if desired to provide security and interoperability with other VDE-capable devices over network 4152.

Electronic Execution of a Legal Document

Figure 97:
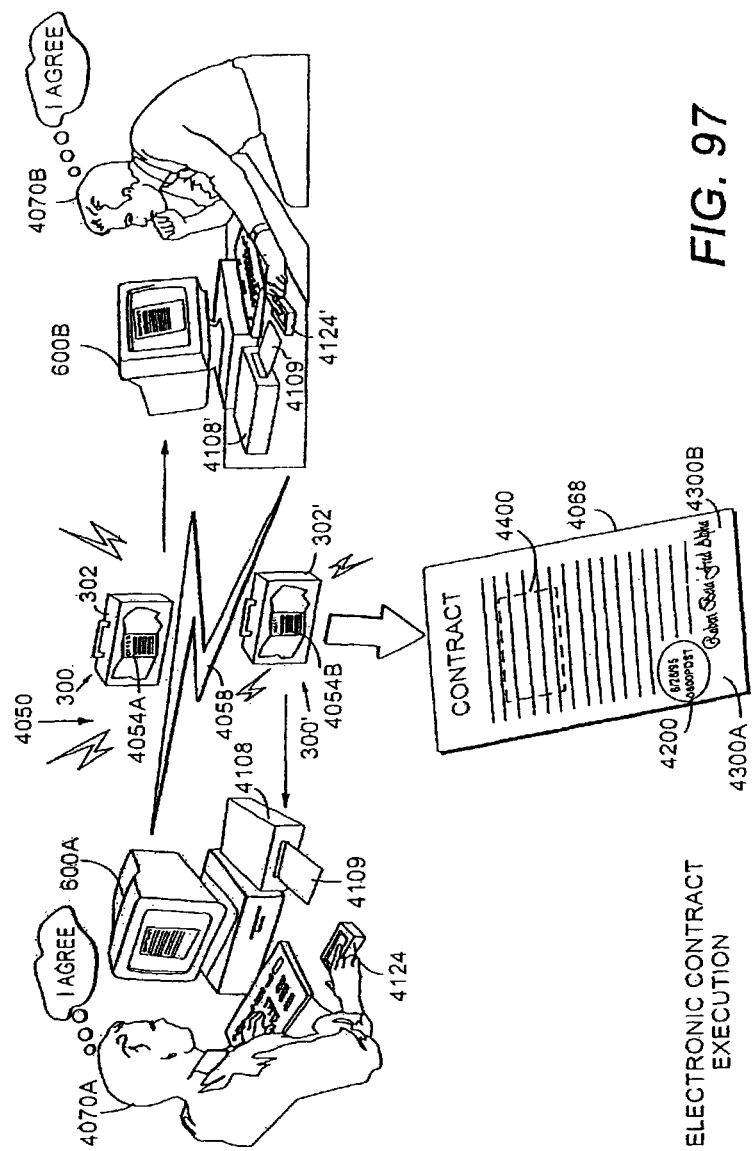
FIG. 97 shows an example trusted electronic document execution.

FIG. 97 shows that trusted delivery system 4050 can also be used to electronically execute a legal contract 4068. In many cases it may be very inconvenient for the parties 4070A, 470B to a legal contract 4068 to meet face-to-face and physically sign the contract. For example, one of the contracting parties may be geographically distant from the other. It may nevertheless be important for the contract 4068 to be finalized and executed rapidly, reliably and in a manner that cannot be repudiated by either party.

System 4050 supports "simultaneous" as well as non-simultaneous contract or other document execution among contracting parties 4070. Simultaneous completion allows multiple parties located in physically different locations to directly and simultaneously participate in the execution of legal documents and/or other transactions that require authorizations.

Currently, businesses often prefer simultaneous execution of documents at what is called a "closing." Such closings for important documents frequently require the presence of all participants at the same location to simultaneously sign all necessary legal documents. Business executives are often reluctant to sign a set of documents and then send them to the next party to sign, since special legal language may be required to release the first (or early) signing party if the documents are not quickly signed by other participants and since certain liabilities may exist during this interim period.

FIG. 97 shows an example in which two contracting parties 4070A, 4070B each simultaneously sit down in front of an electronic appliance 600 such as a personal computer or intelligent electronic kiosk. Each of the contracting parties 4070 may be required to securely identify themselves by, for example, inserting a card 4109 into a card reader 4108 and/or by allowing a biometric sensor 4124 to scan a part of their body such as a finger print or a retina pattern—thereby proving that they are who they say they are.

One relatively weak form of authentication is physical possession of the card 4109. Nonetheless, if some form of weak authentication is used and biometric information is gathered in real time by sensor 4124, it may be correlated with some trusted record stored elsewhere, and/or delivered along with the item 4054. If biometric information is codelivered with the item 4054, and it is ever actually used, it must be correlated with a trusted record (this trusted record could, for example, be generated by the person providing biometric data in the presence of a trusted party if the validity of a transaction is called into question, at the sacrifice of significant automation and "commercial confidence" benefits). The ability to establish trust as the transaction occurs, rather than having some degree of nonrepudiation later (imagine if the transaction were fraudulent, and a user relied on the person showing up to give a retinal scan) is one significant benefit of example system 4050.

If the parties are simultaneously at their respective electronic appliances 600, they may verify each other's identity using video cameras and screens built into the kiosk. Such simultaneous execution has the advantage of allowing multiple parties at different physical locations to negotiate a deal in real time and then simultaneously, reliably execute and receive final, signed agreement copies that are valid and legally binding.

Figure 23:
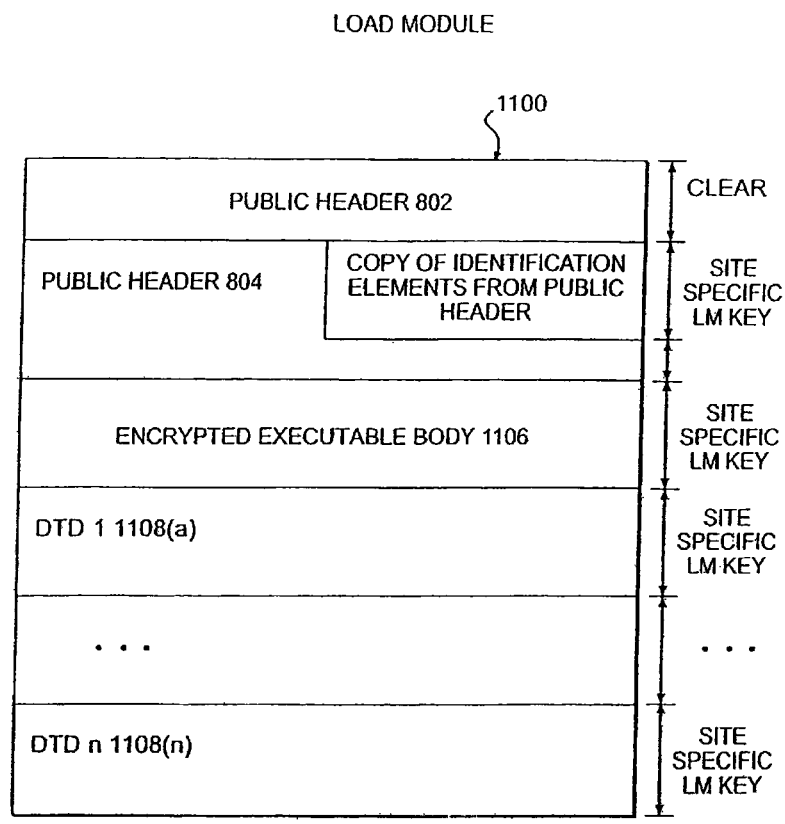
FIG. 23 shows an example of a load module structure.
Figure 24:
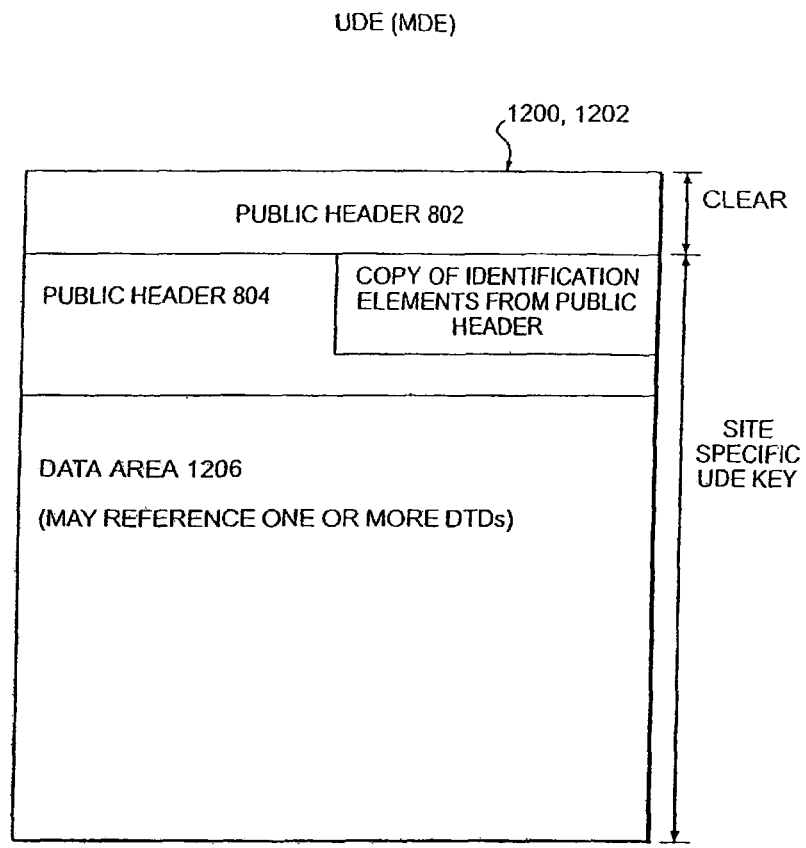
FIG. 24 shows an example of a User Data Element (UDE) and/or Method Data Element (MDE) structure.
Figure 25A:
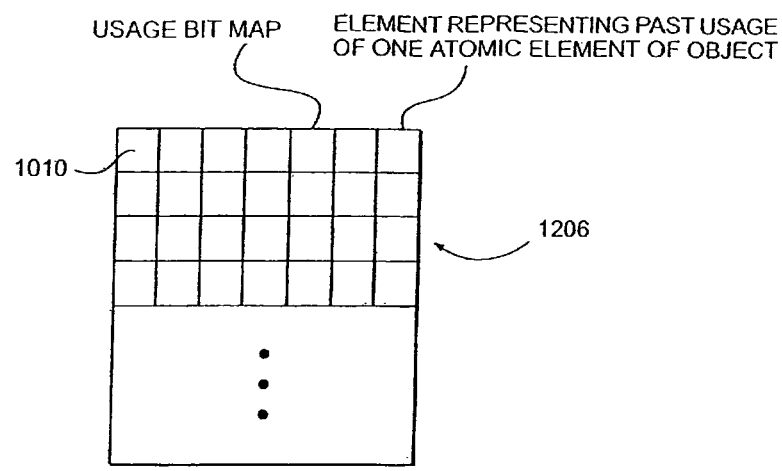
FIGS. 25A-25C show examples of "map meters"
Figure 25B:
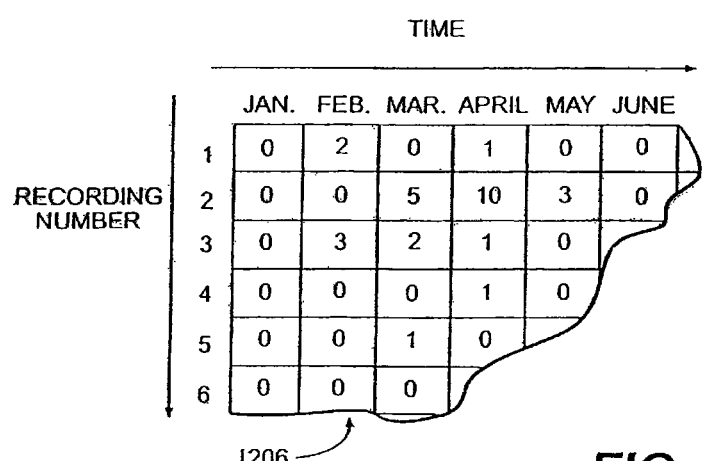
Figure 25C:
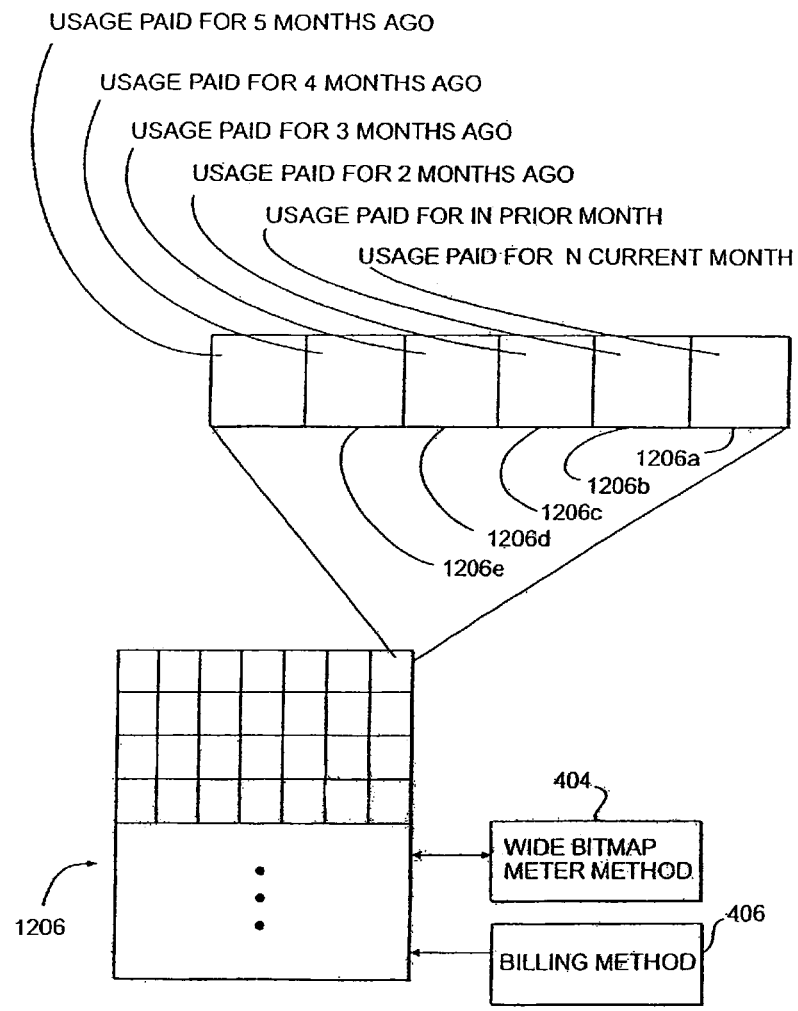
Figure 26:
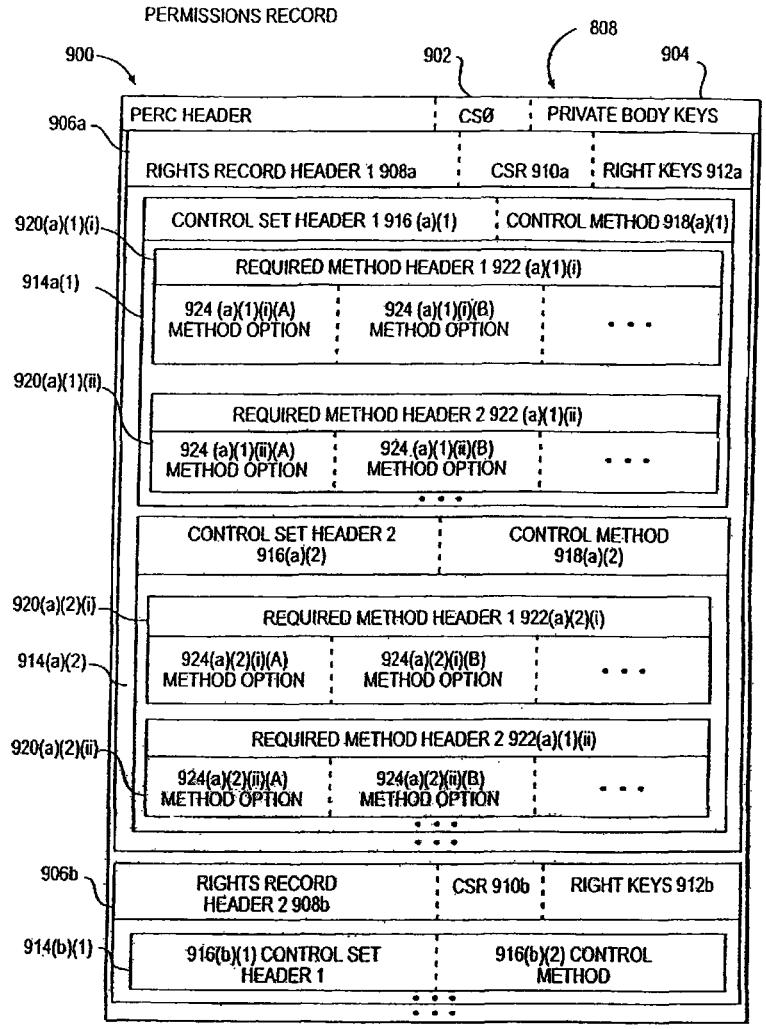
FIG. 26 shows an example of a permissions record (PERC) structure.
Figure 26A:
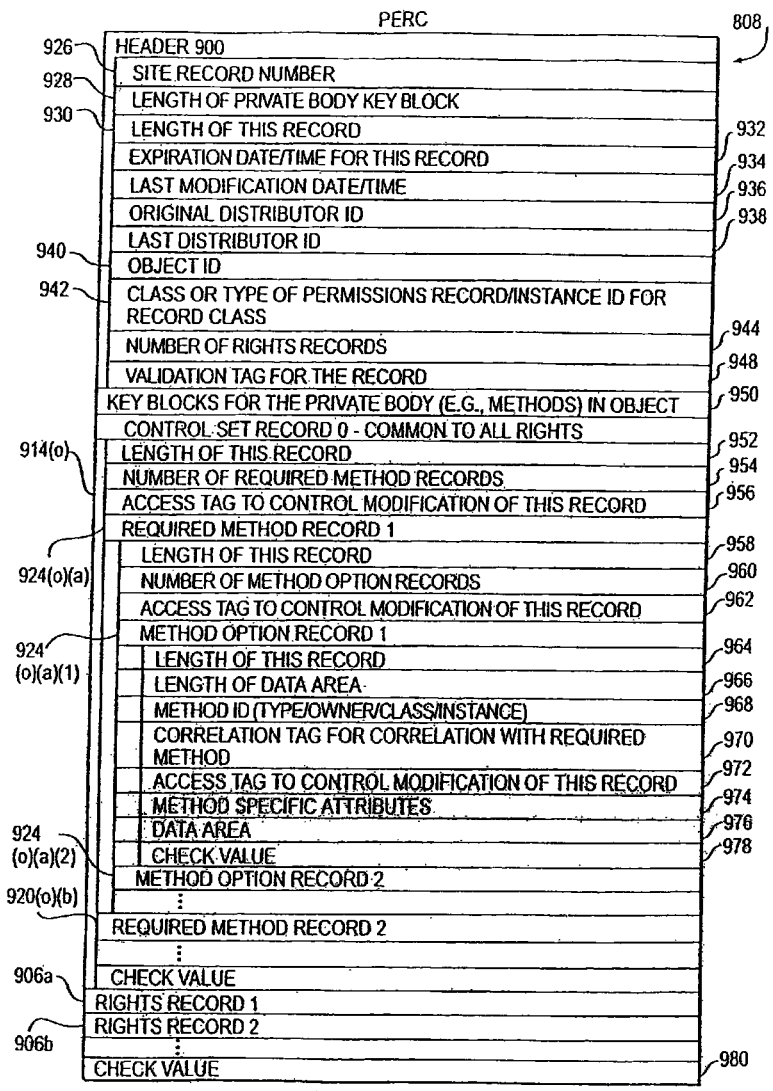
FIGS. 26A and 26B together show a more detailed example of a permissions record structure.
Figure 26B:
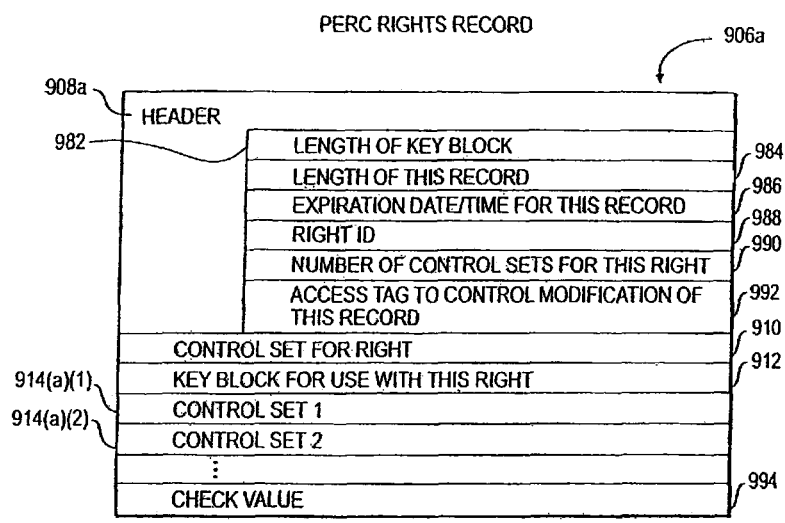
Figure 27:
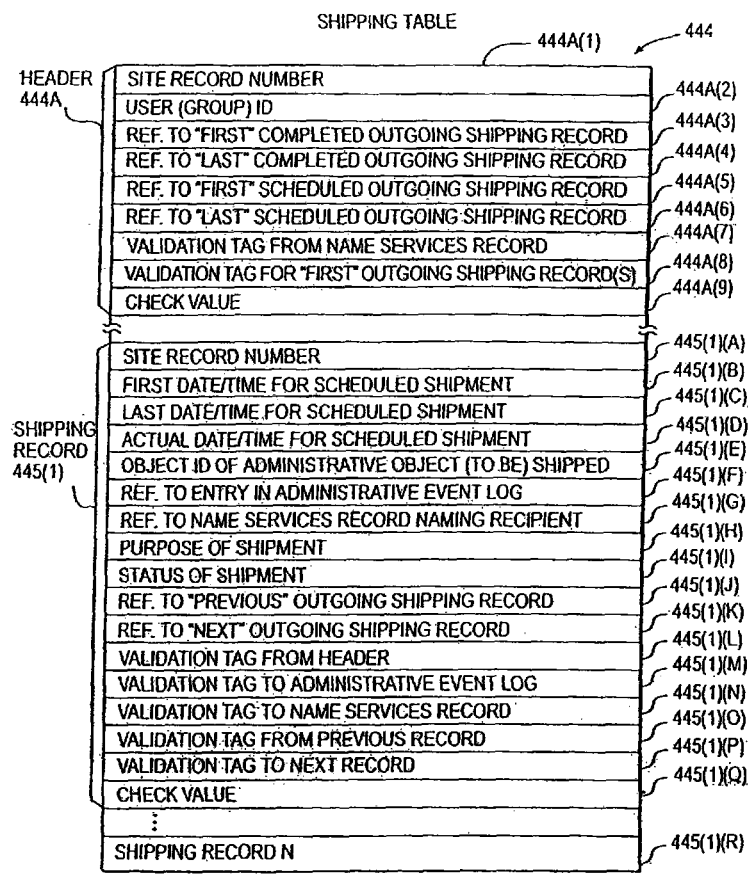
FIG. 27 shows an example of a shipping table structure.
Figure 29:
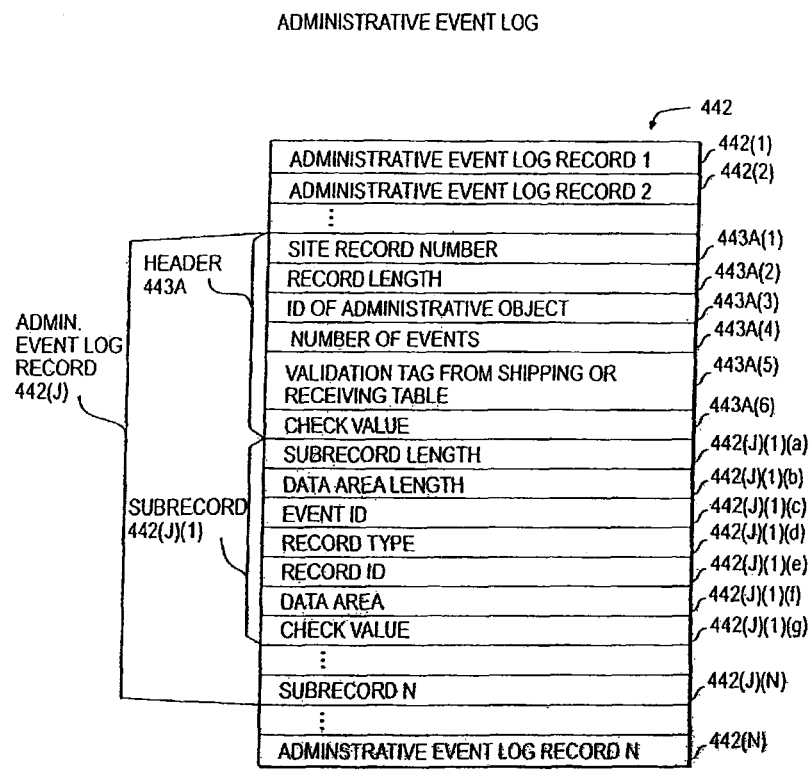
FIG. 29 shows an example of an administrative event log structure.
Figure 30:
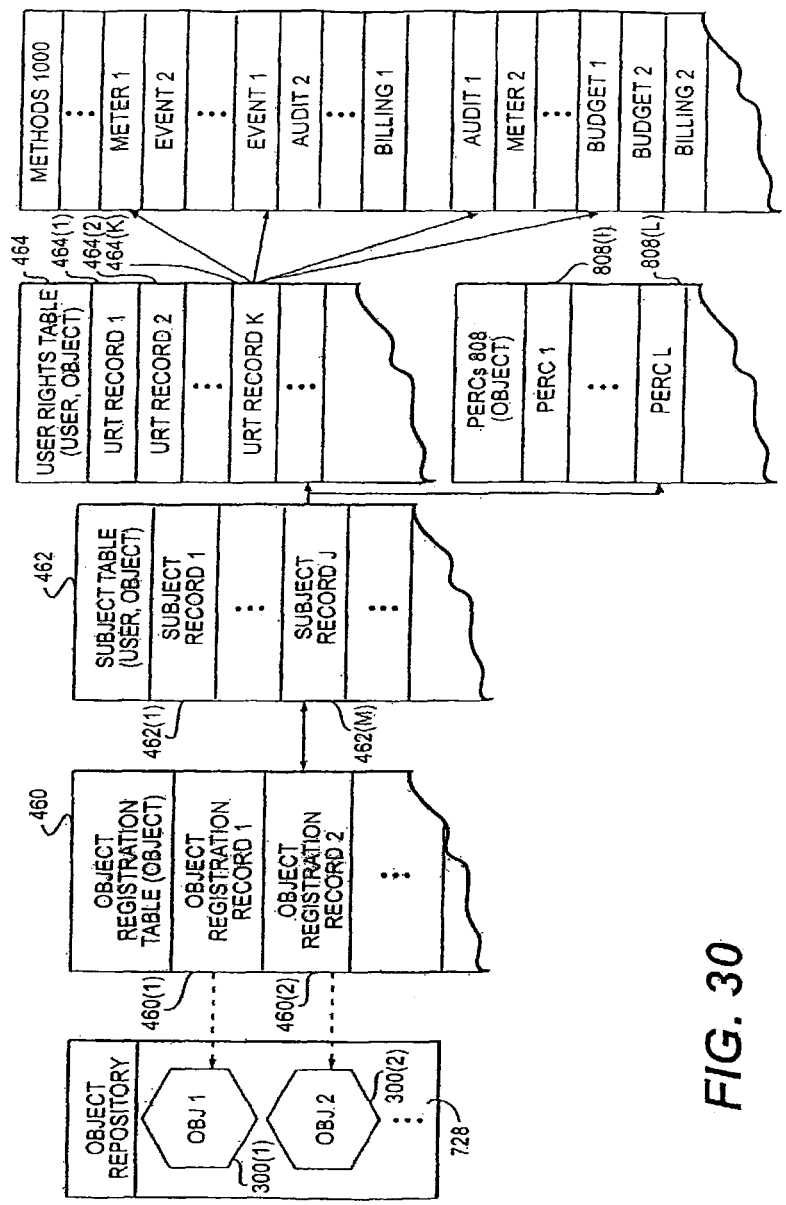
FIG. 30 shows an example inter-relationship between and use of the object registration table, subject table and user rights table shown in the FIG. 16 secure database.
Figure 31:
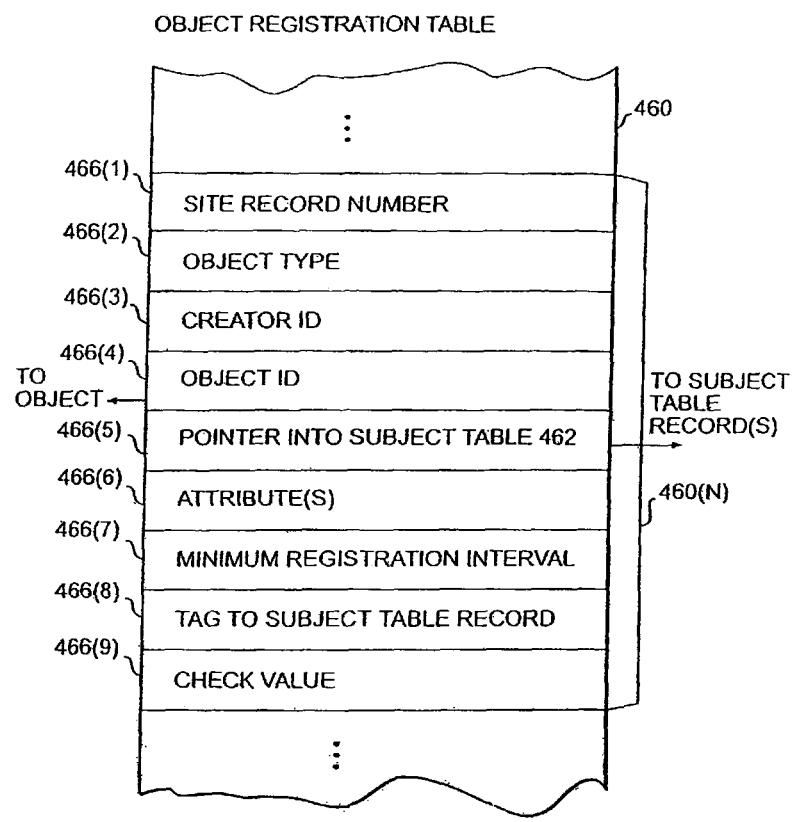
FIG. 31 is a more detailed example of an object registration table shown in FIG. 16.
Figure 32:
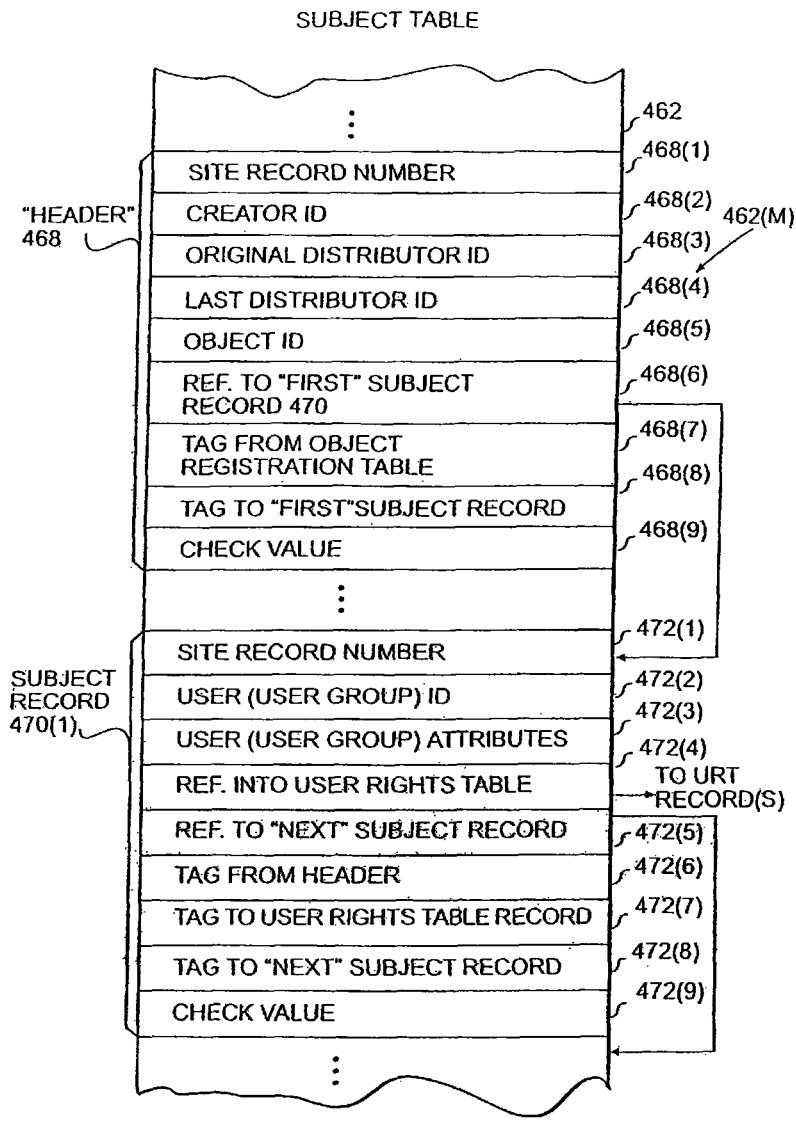
FIG. 32 is a more detailed example of subject table shown in FIG. 16.
Figure 33:
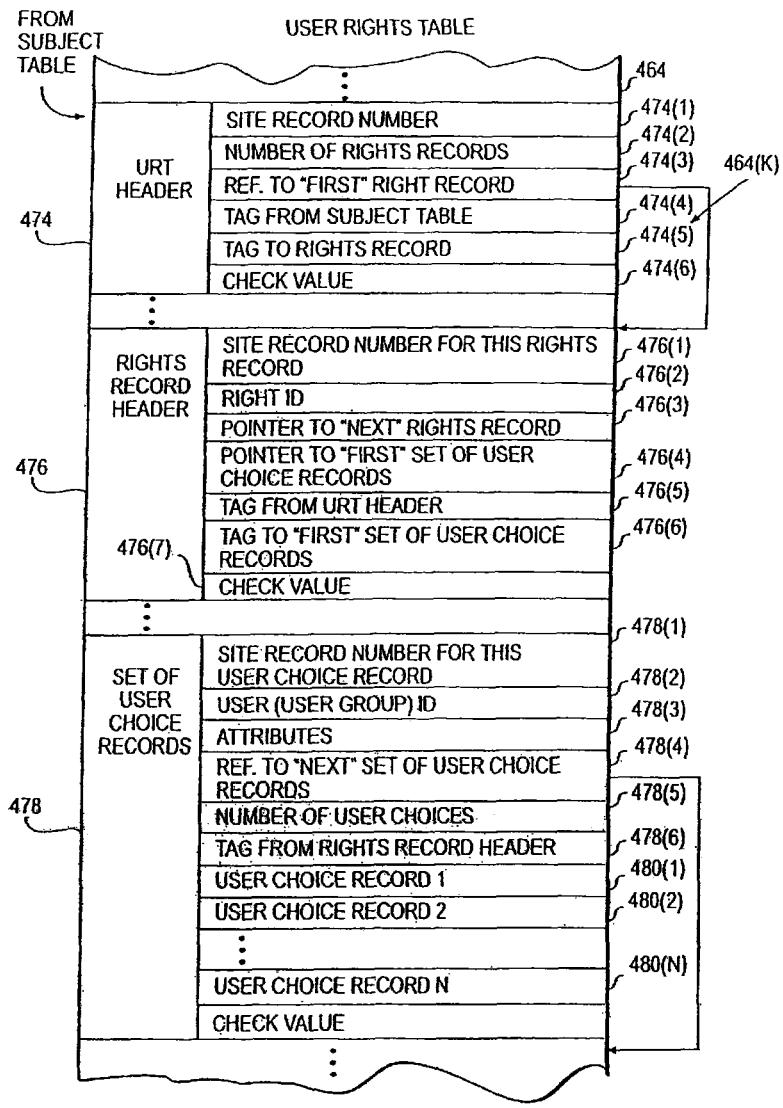
FIG. 33 is a more detailed example of a user rights table shown in FIG. 16.
Figure 34:
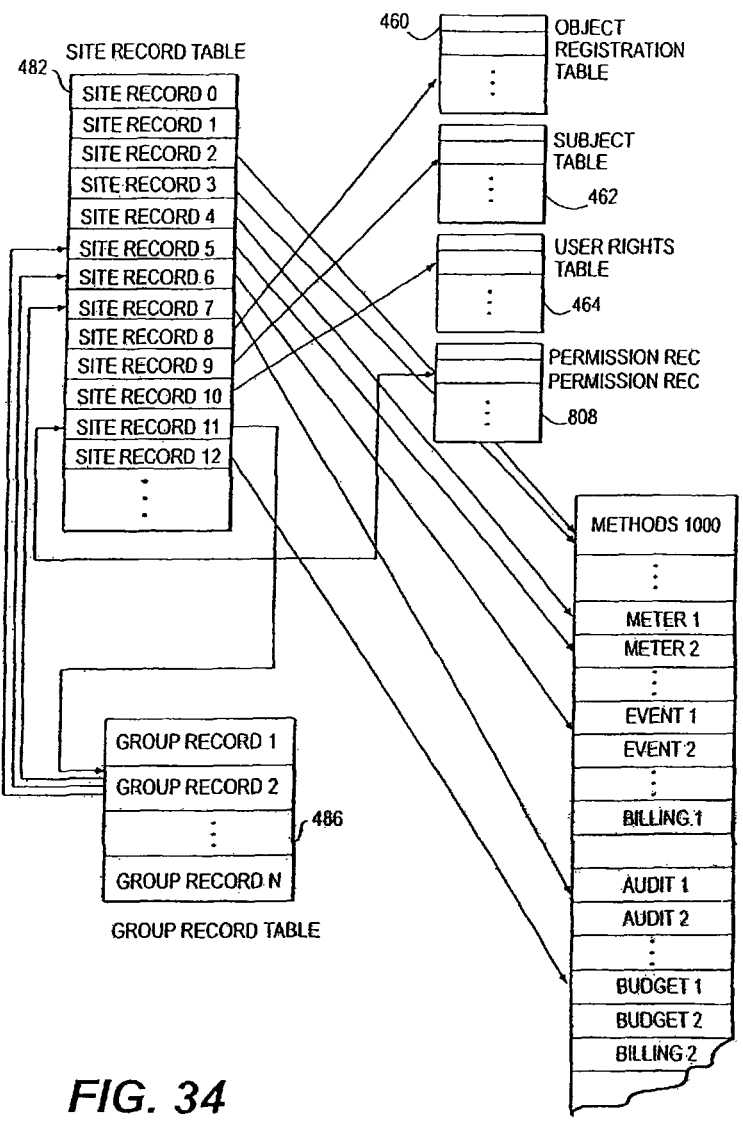
FIG. 34 shows a specific example of how a site record table and group record table may track portions of the secure database shown in FIG. 16.
Figure 34A:
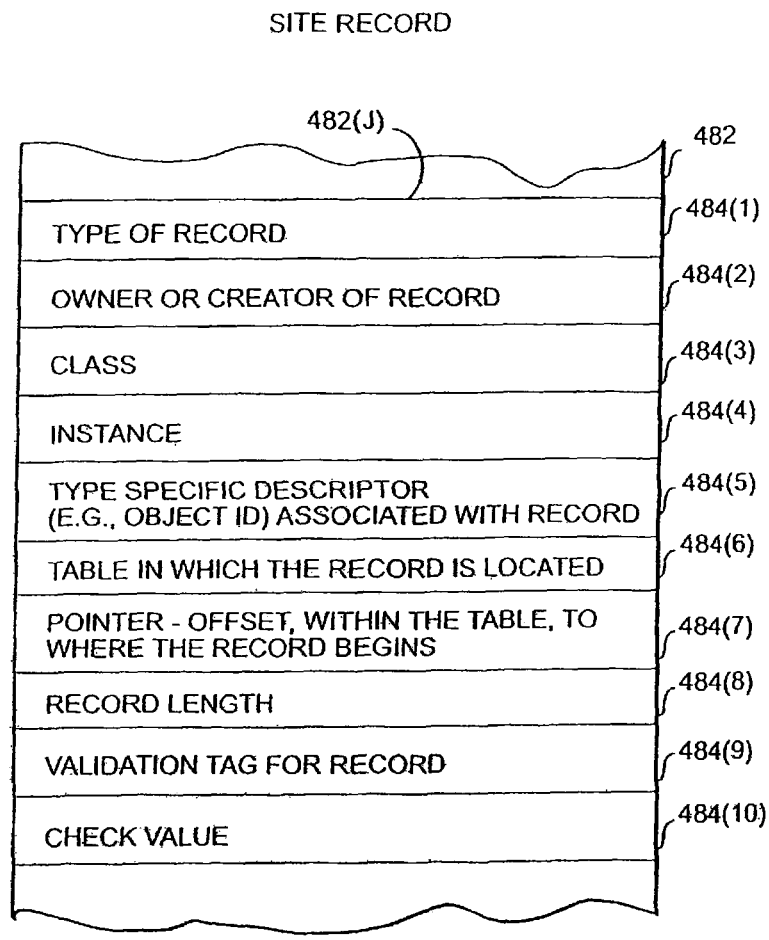
FIG. 34A is an example of a FIG. 34 site record table structure.
Figure 34B:
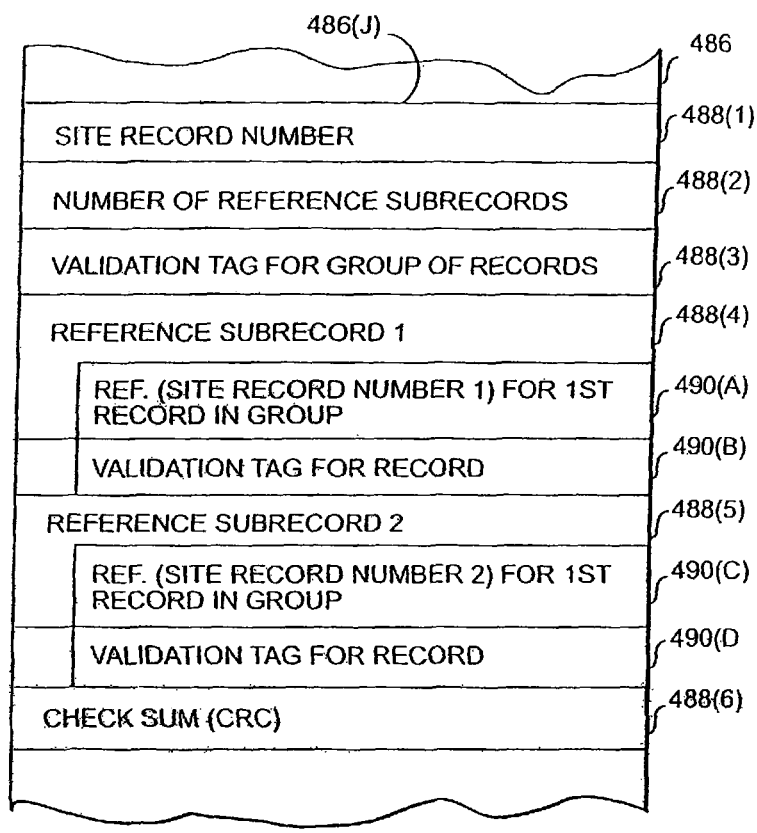
FIG. 34B is an example of a FIG. 34 group record table structure.
Figure 35:
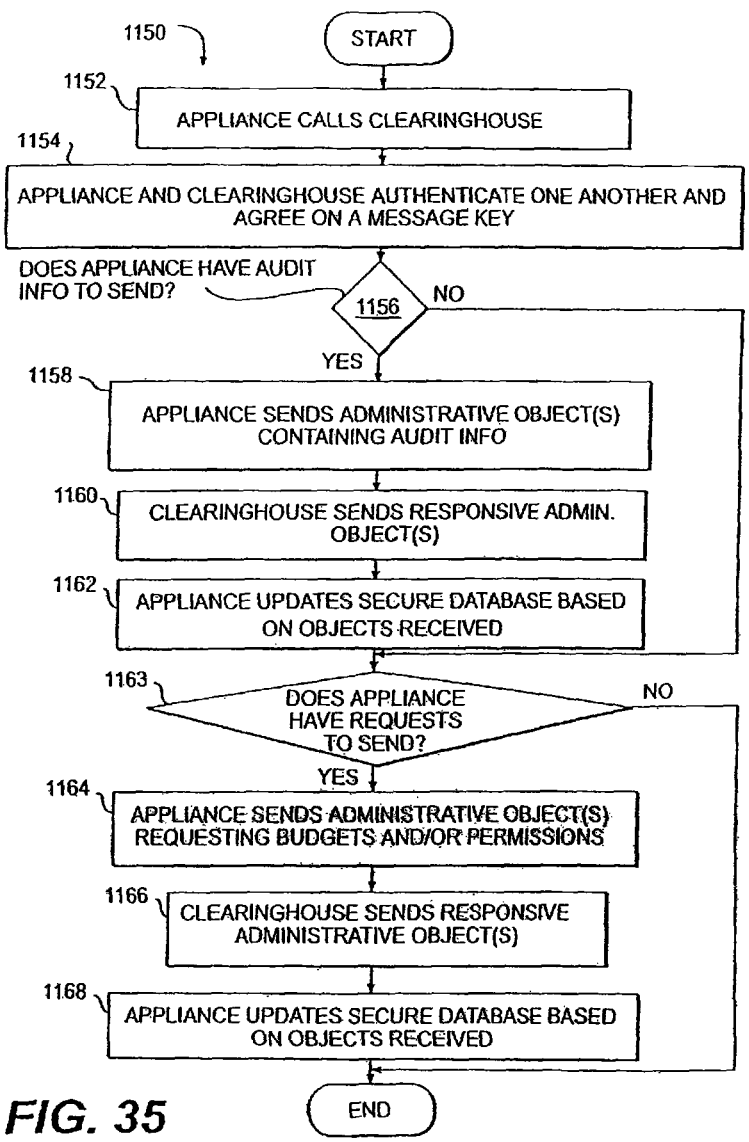
FIG. 35 shows an example of a process for updating the secure database.
Figure 36:
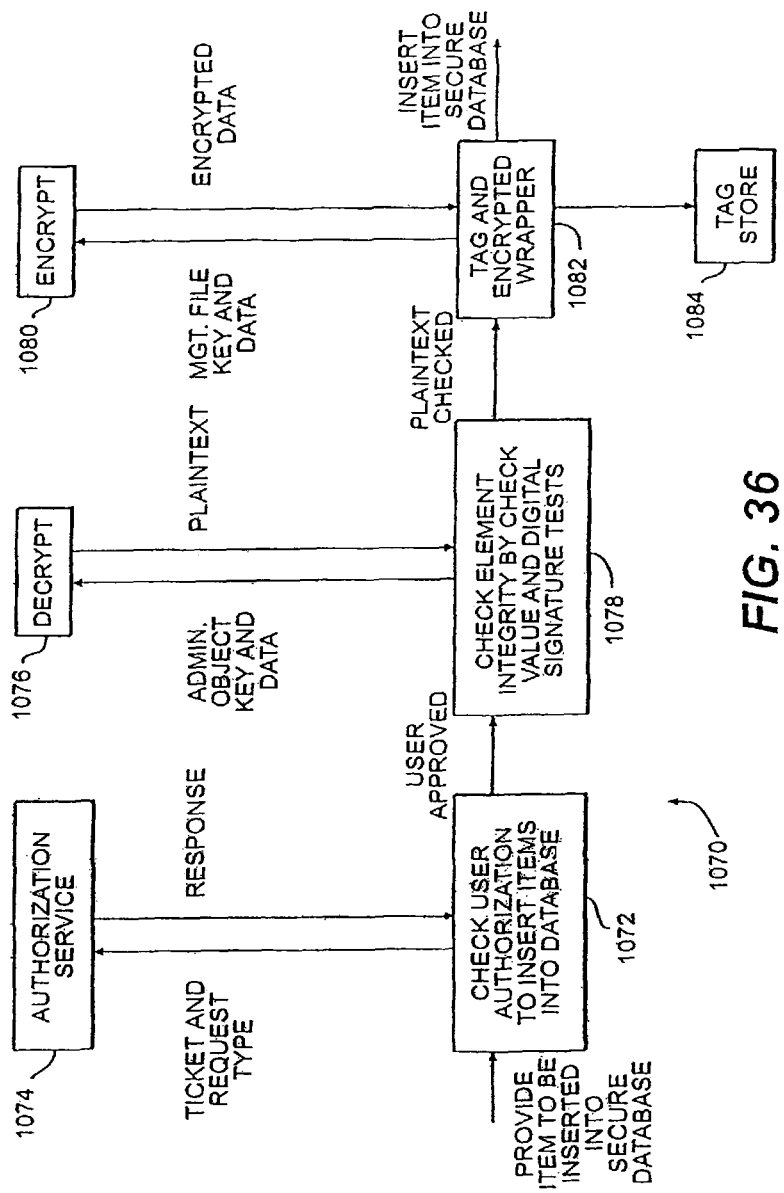
FIG. 36 shows an example of how new elements may be inserted into the FIG. 16 secure data base.
Figure 37:
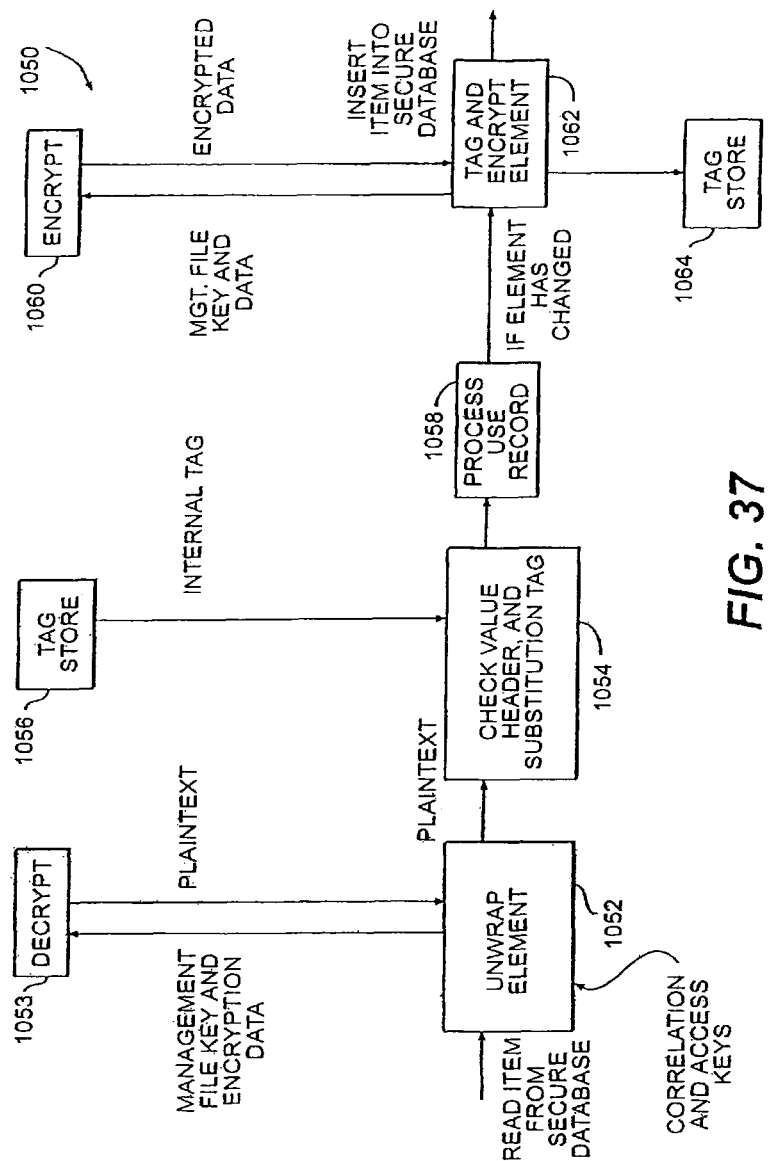
FIG. 37 shows an example of how an element of the secure database may be accessed.
Figure 38:
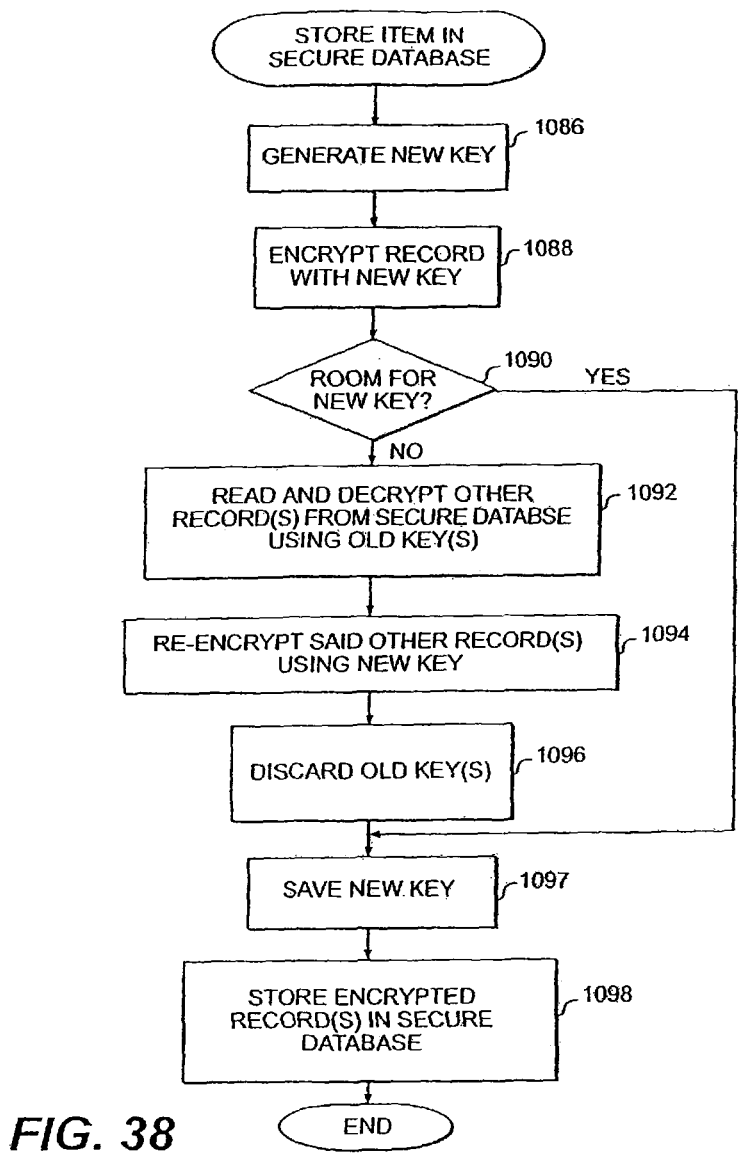
FIG. 38 is a flowchart example of how to protect a secure database element.
Figure 39:
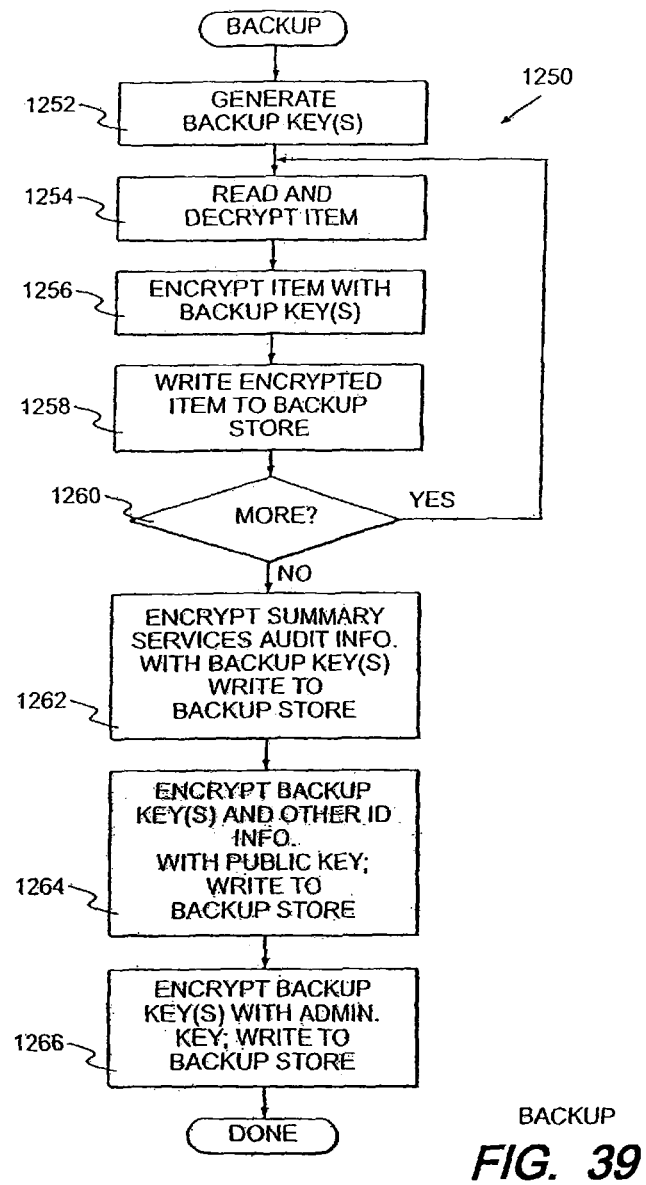
FIG. 39 is a flowchart example of how to back up a secure database.
Figure 40:
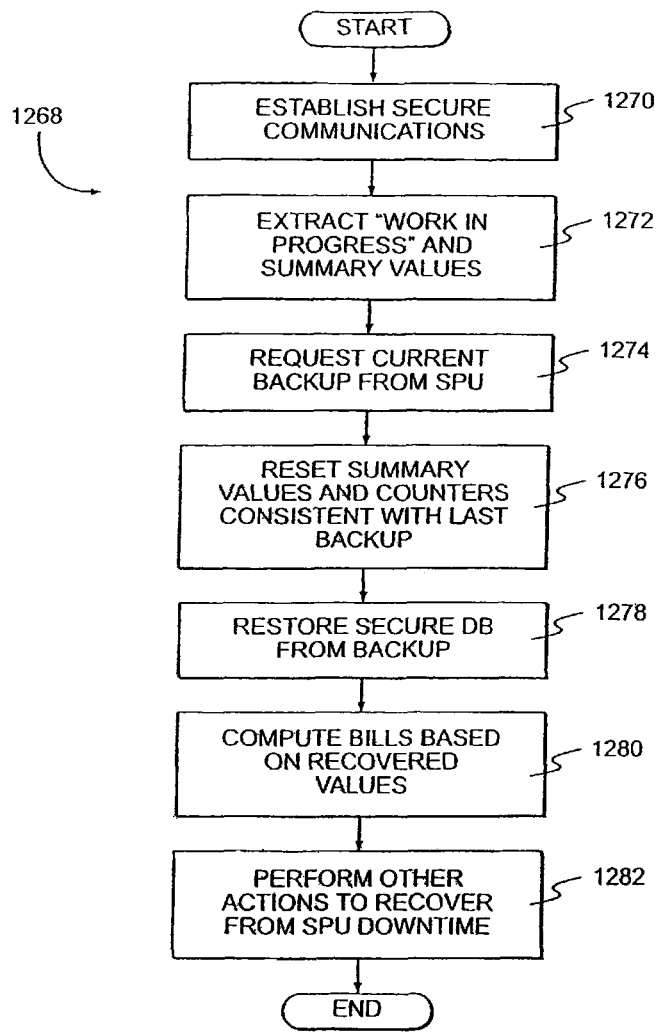
FIG. 40 is a flowchart example of how to recover a secure database from a backup.
Figure 41A:
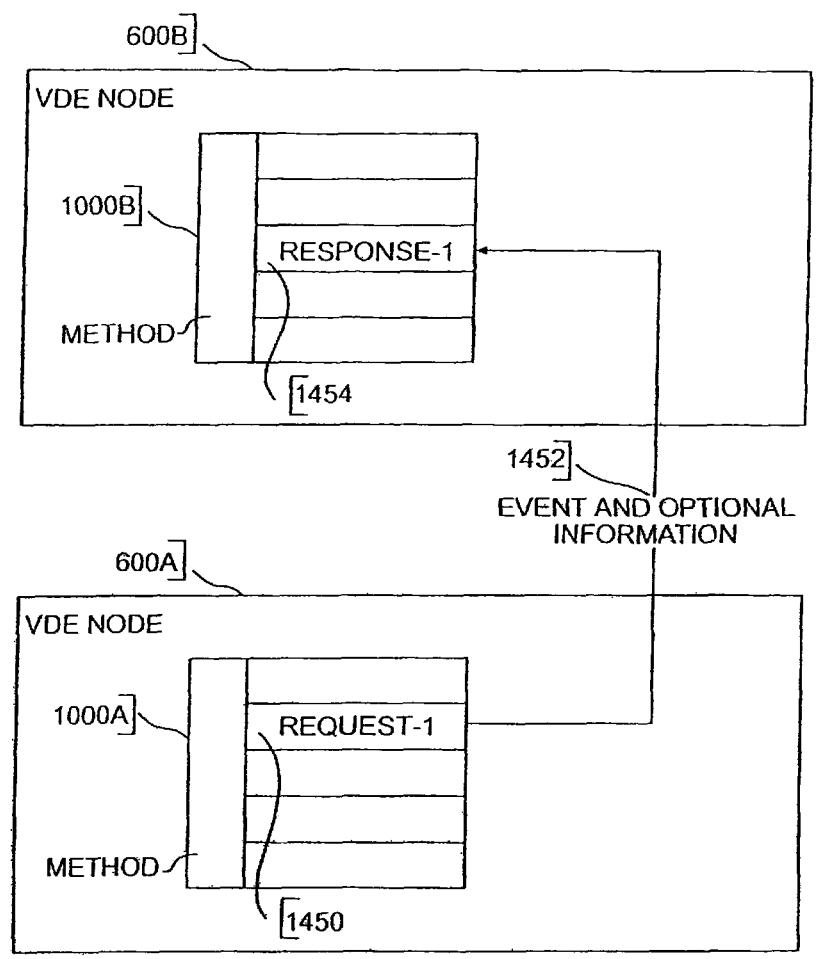
FIGS. 41A-41D are a set of examples showing how a "chain of handling and control" may be enabled using "reciprocal methods"
Figure 41B:
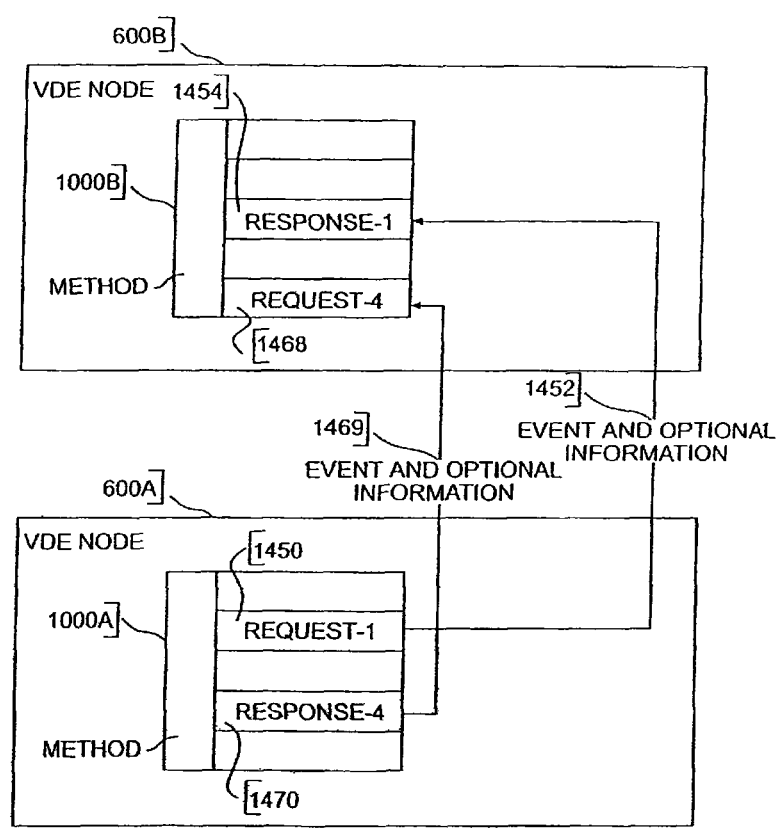
Figure 41C:
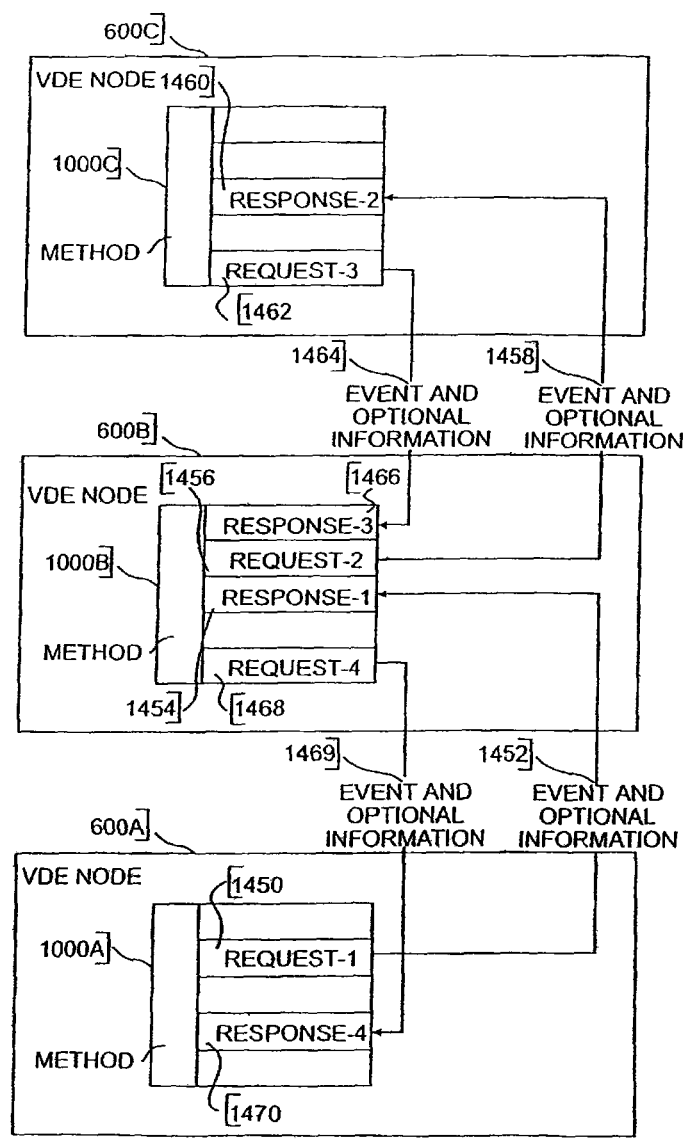
Figure 41D:
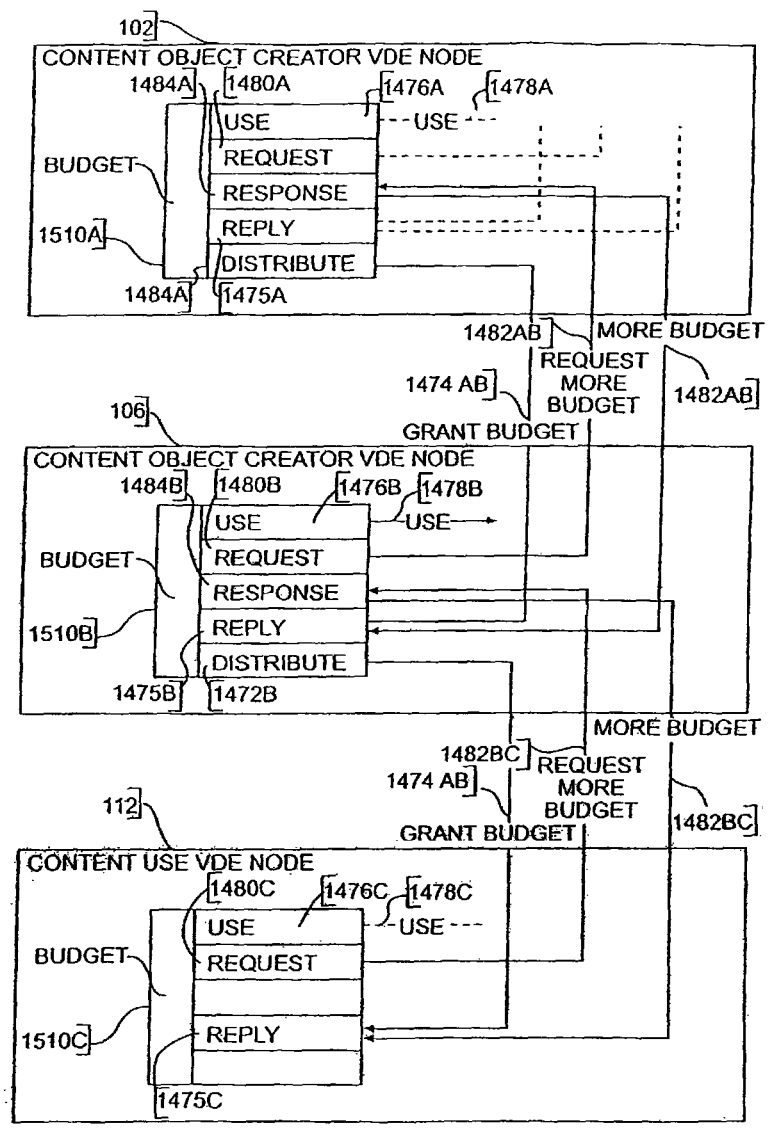
Figure 42A:
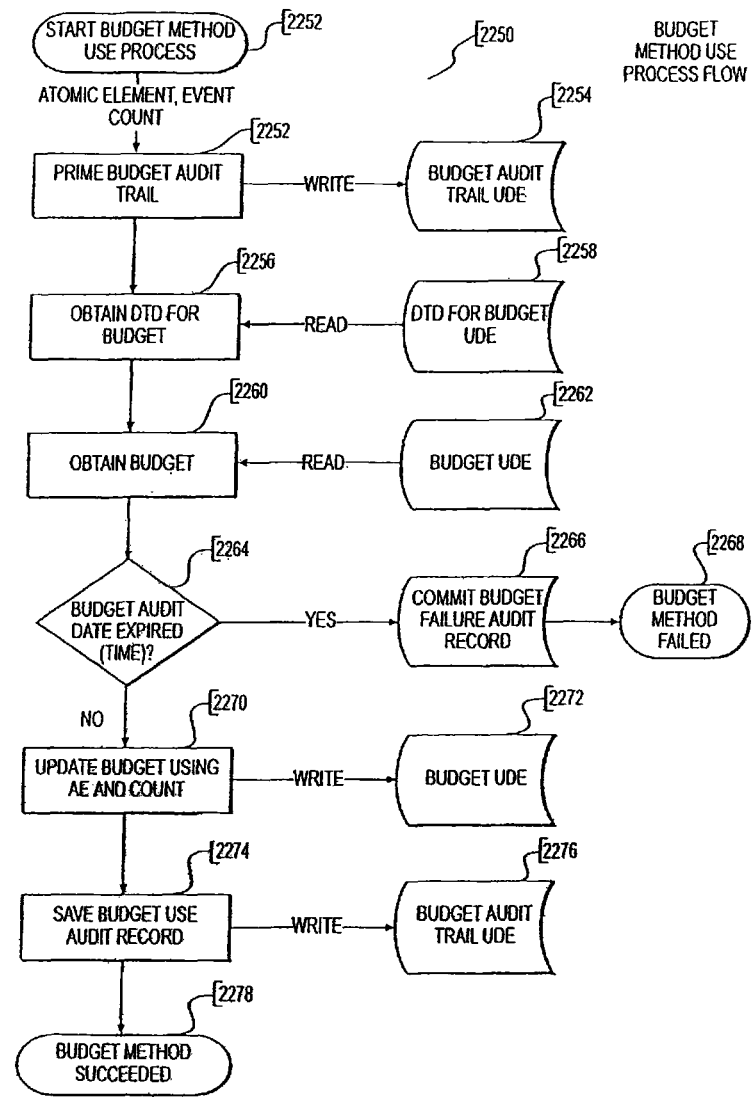
FIGS. 42A-42D show an example of a "reciprocal" BUDGET method.
Figure 42B:
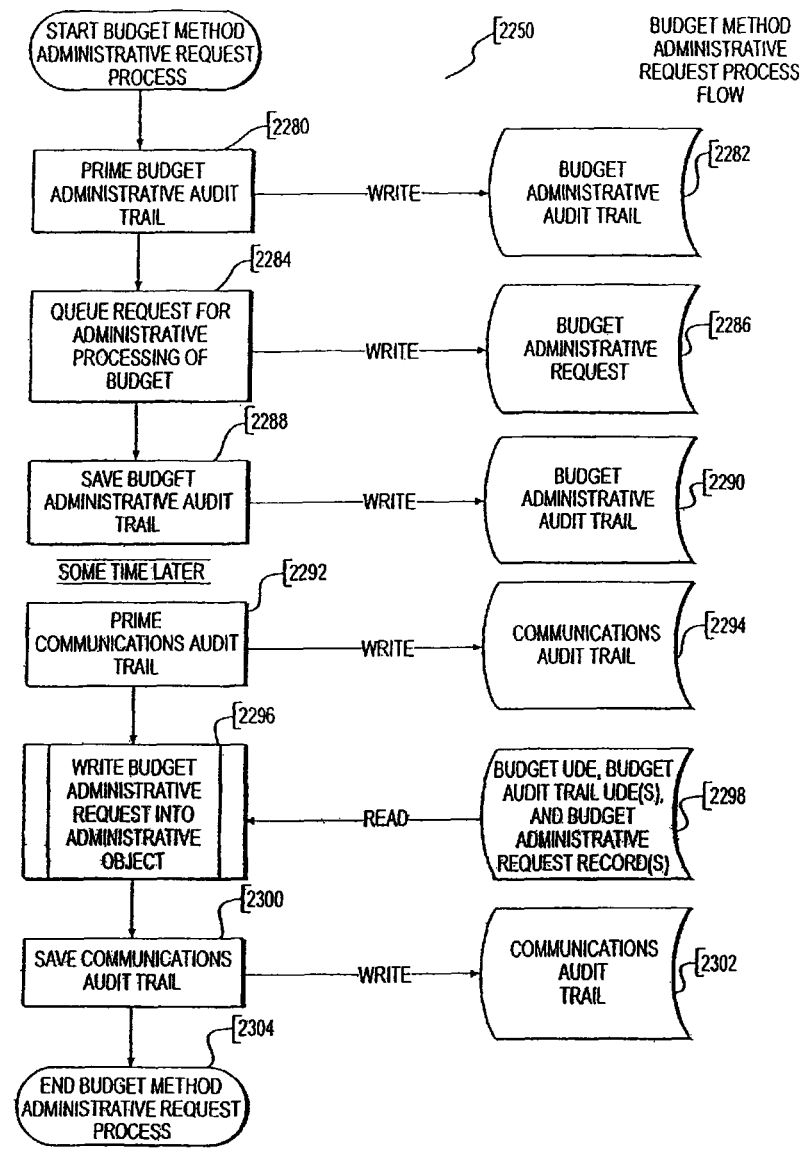
Figure 42C:
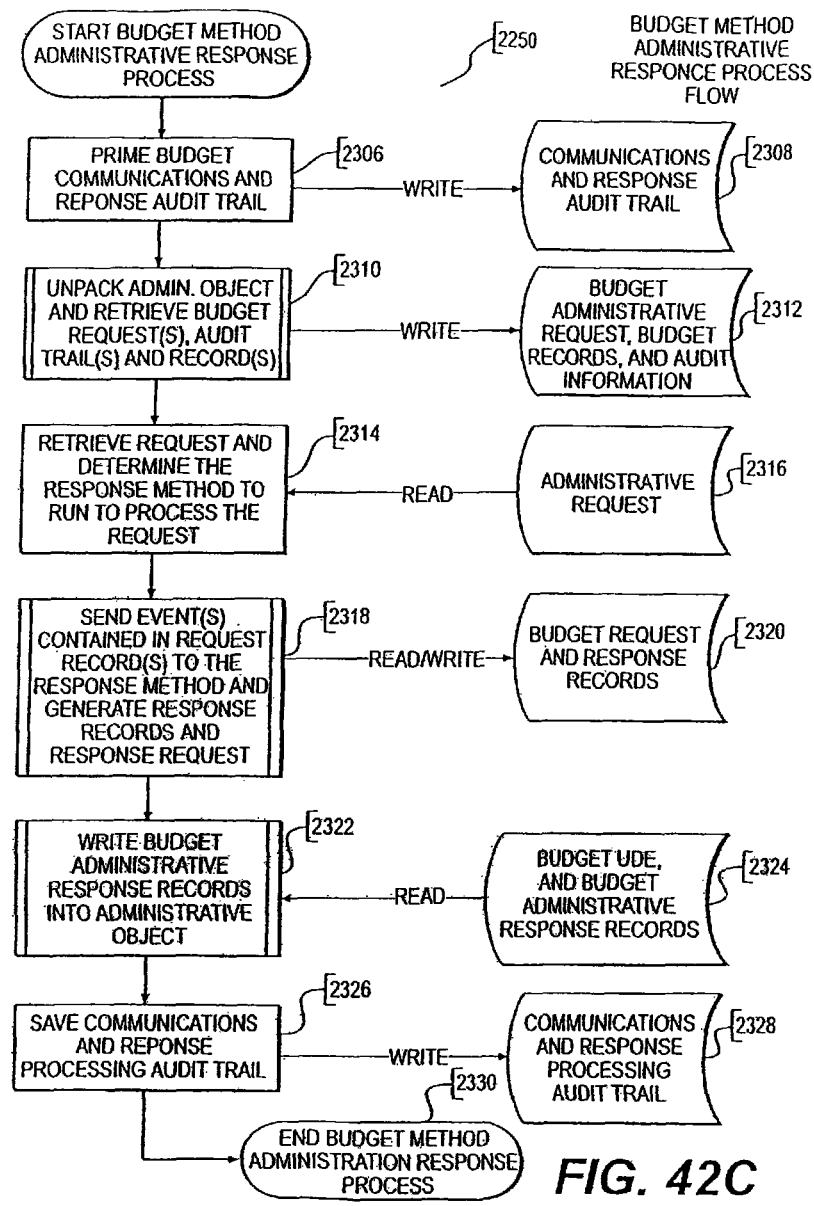
Figure 42D:
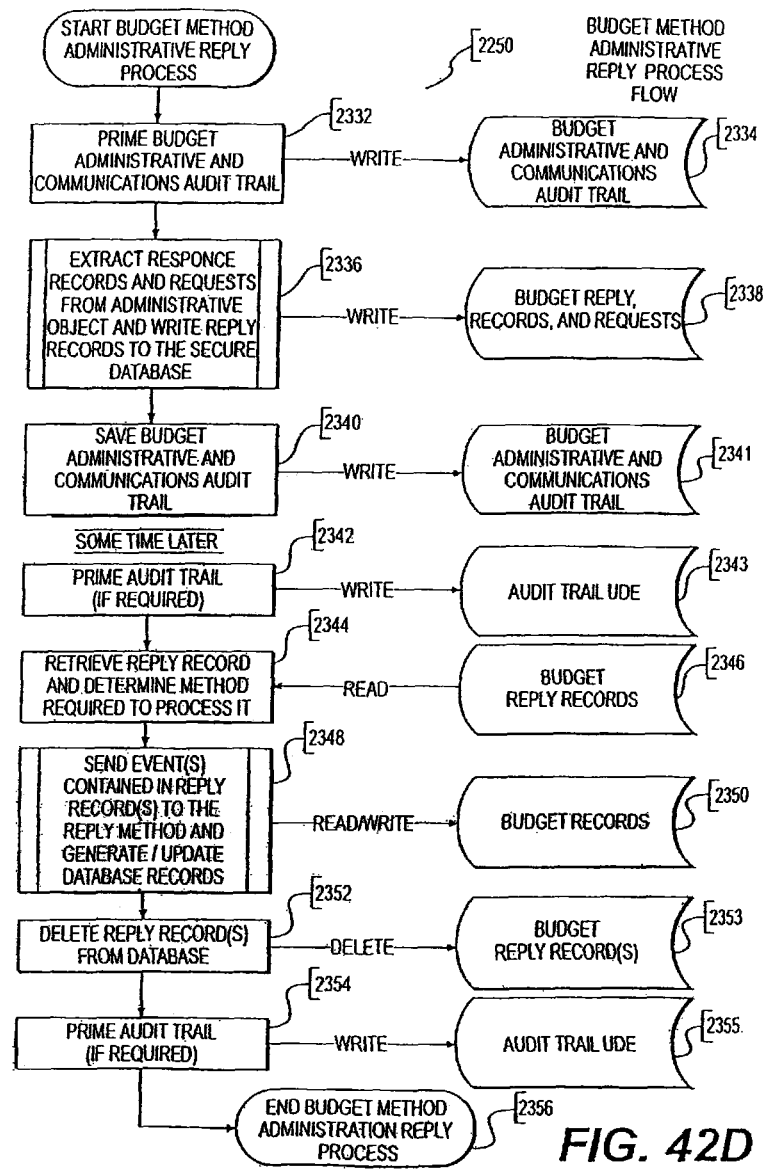
Figure 43A:
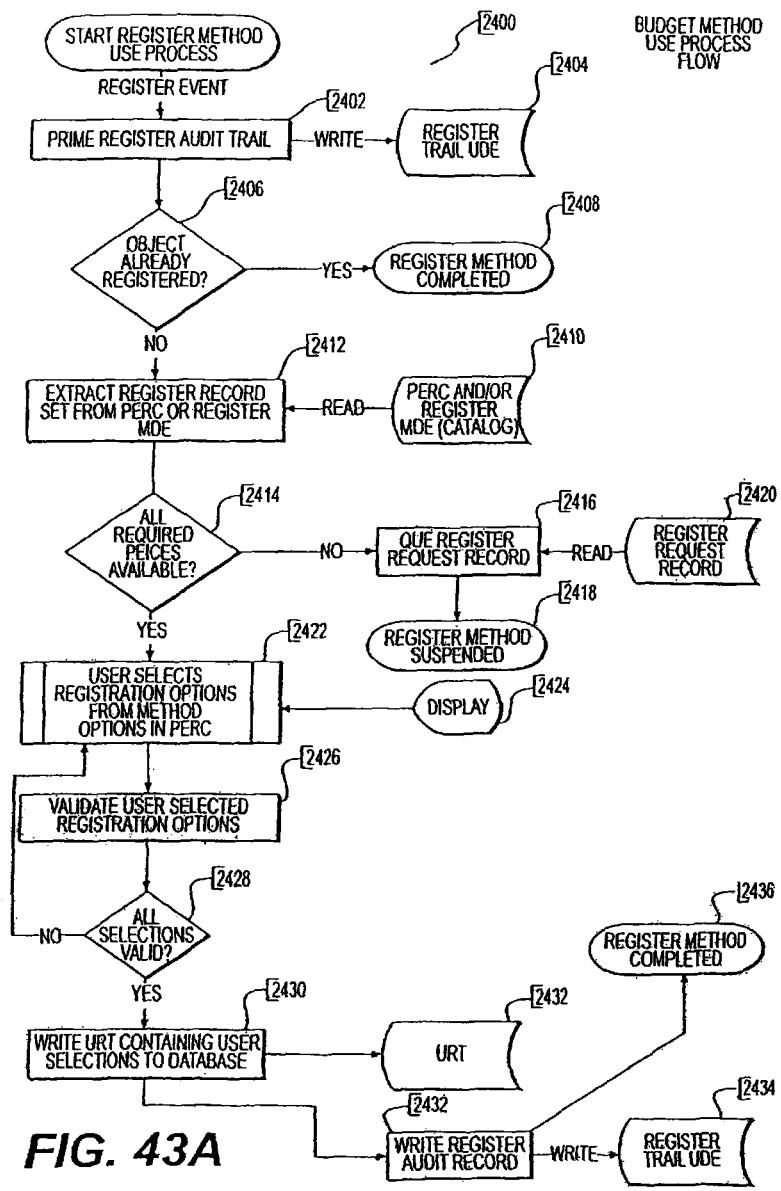
Figure 43B:
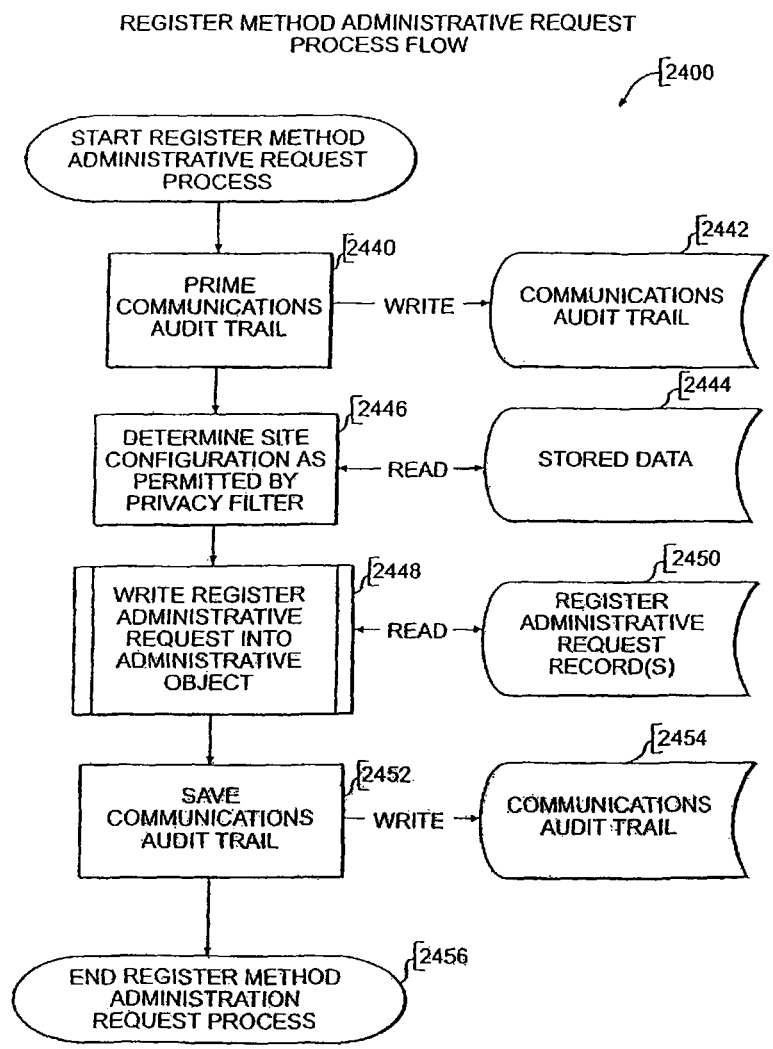
Figure 43D:
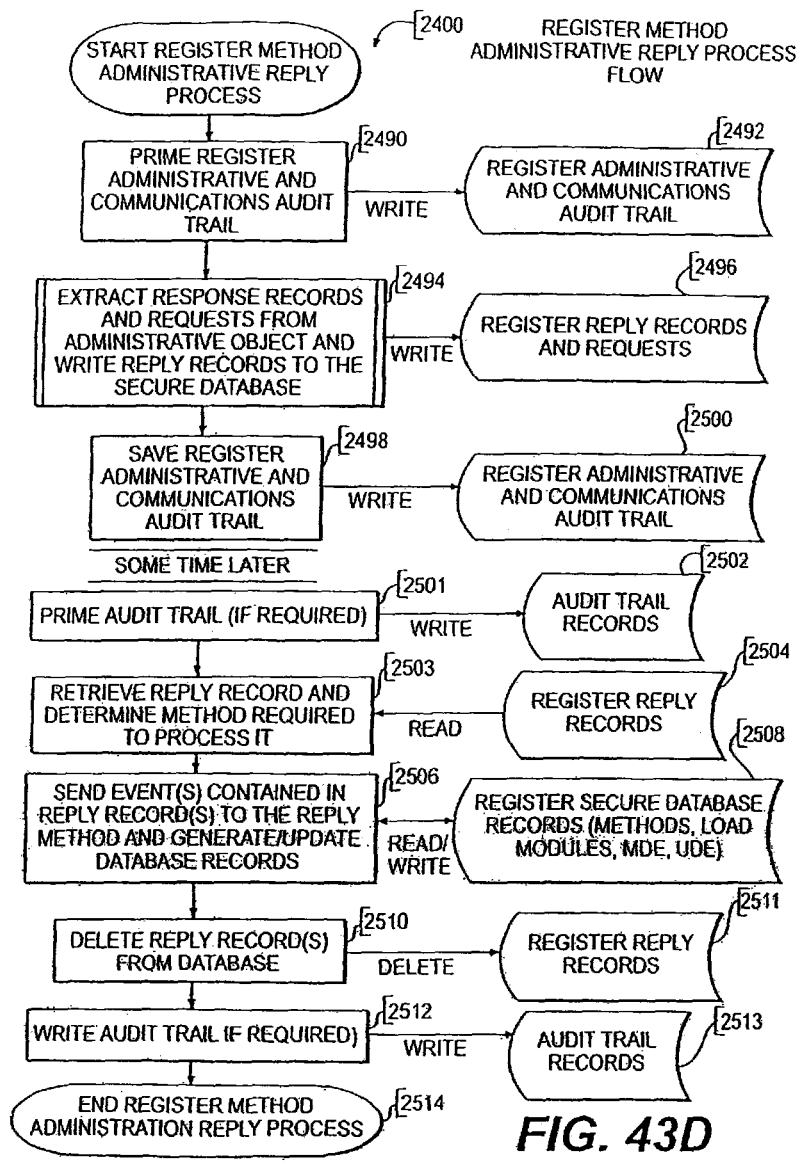
Figure 44A:
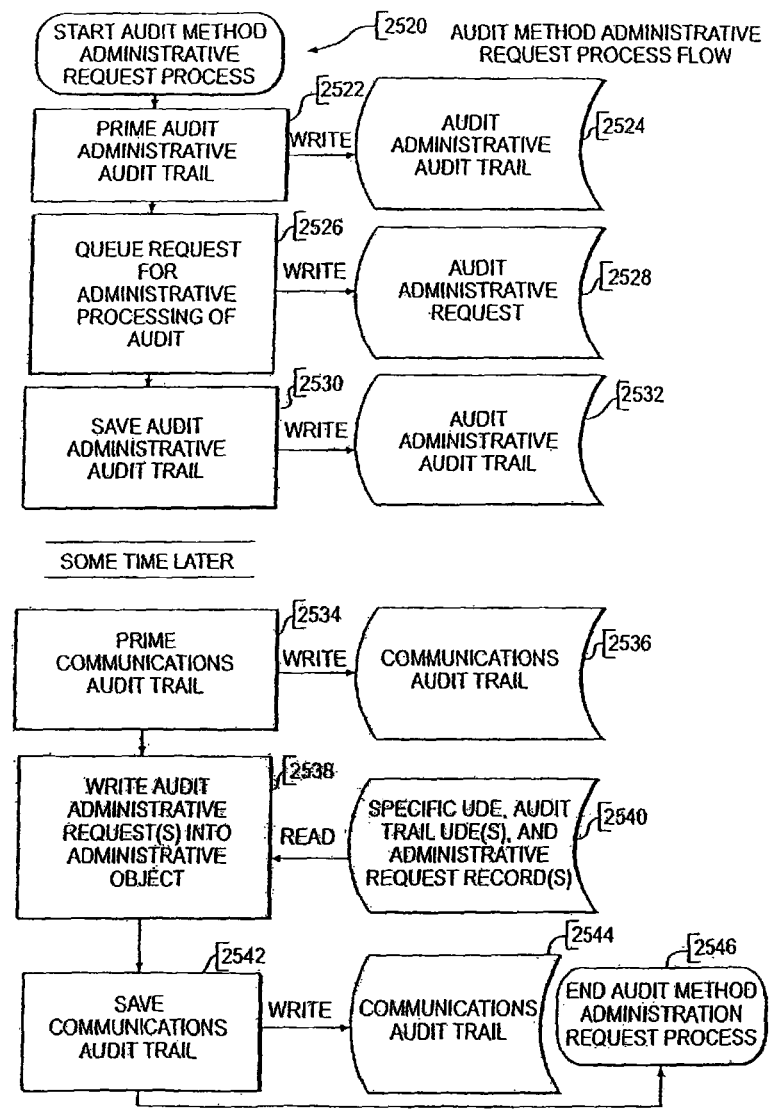
FIGS. 44A-44C show an example of a "reciprocal" AUDIT method.
Figure 44B:
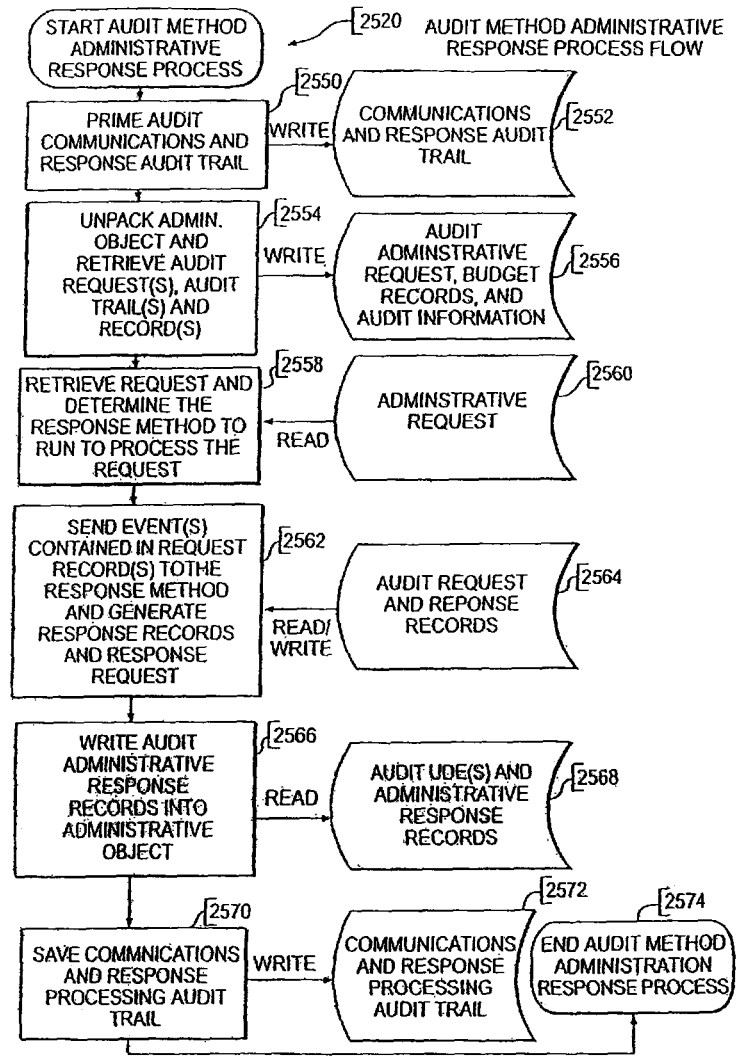
Figure 44C:
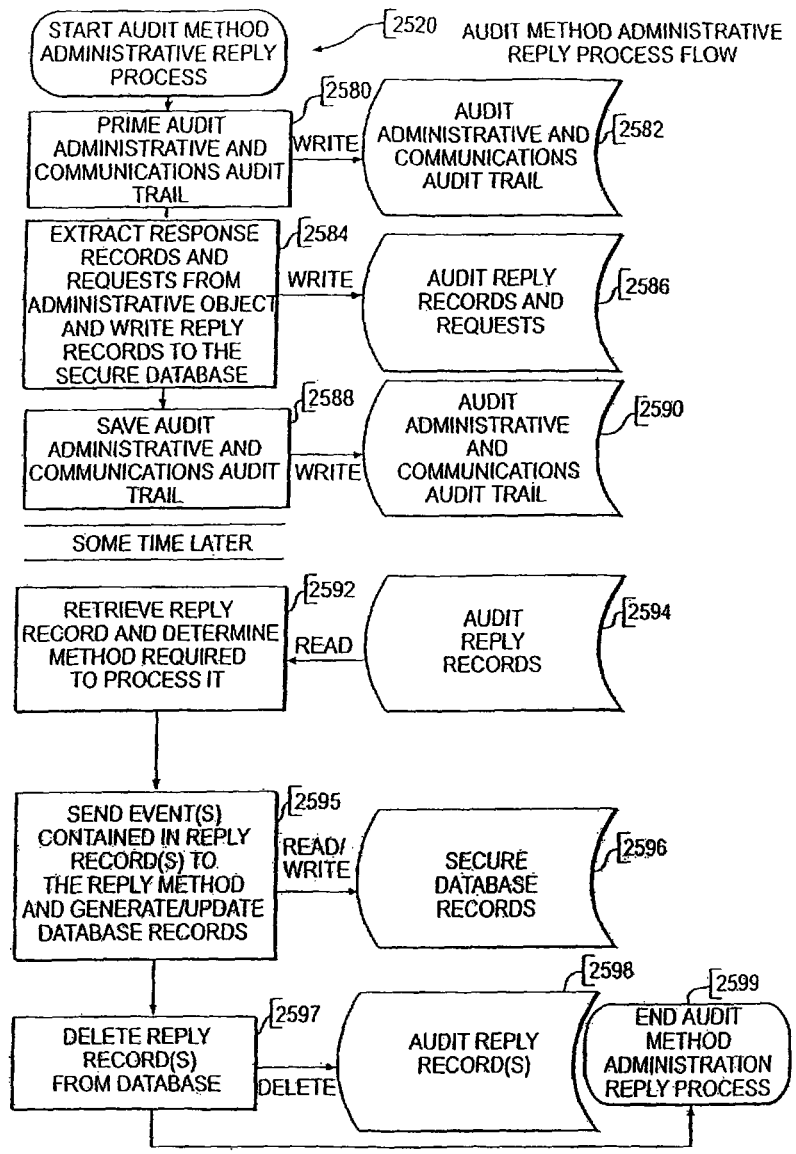
Figure 45:
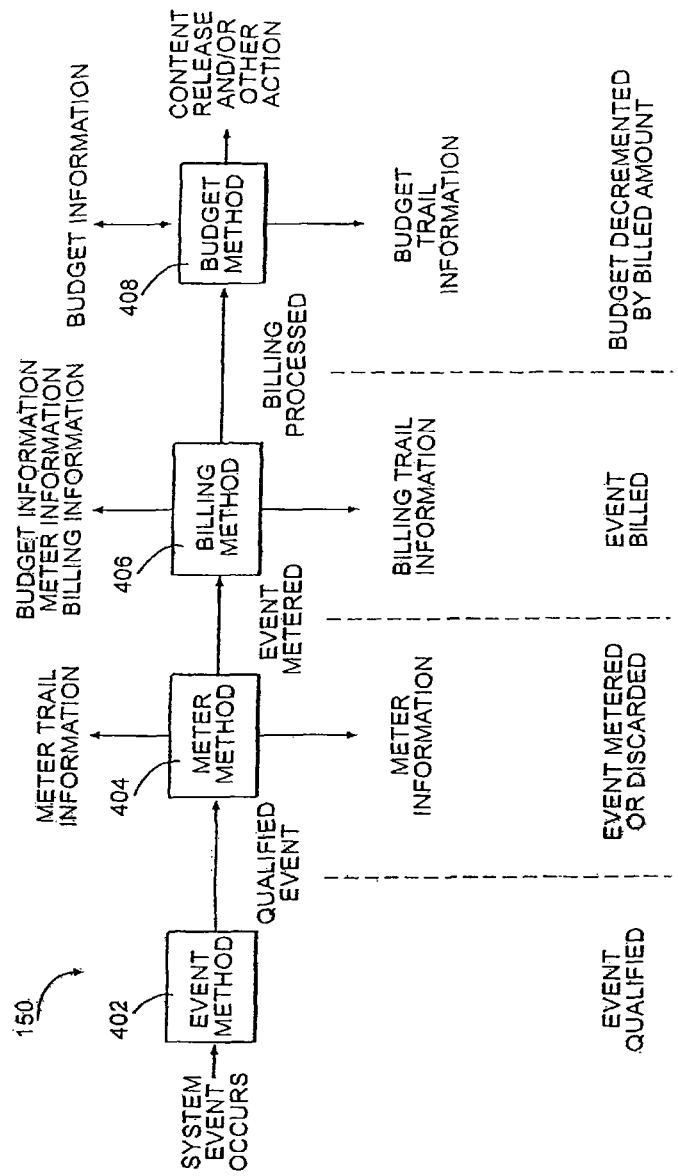
FIGS. 45-48 show examples of several methods being used together to control release of content or other information.
Figure 46:
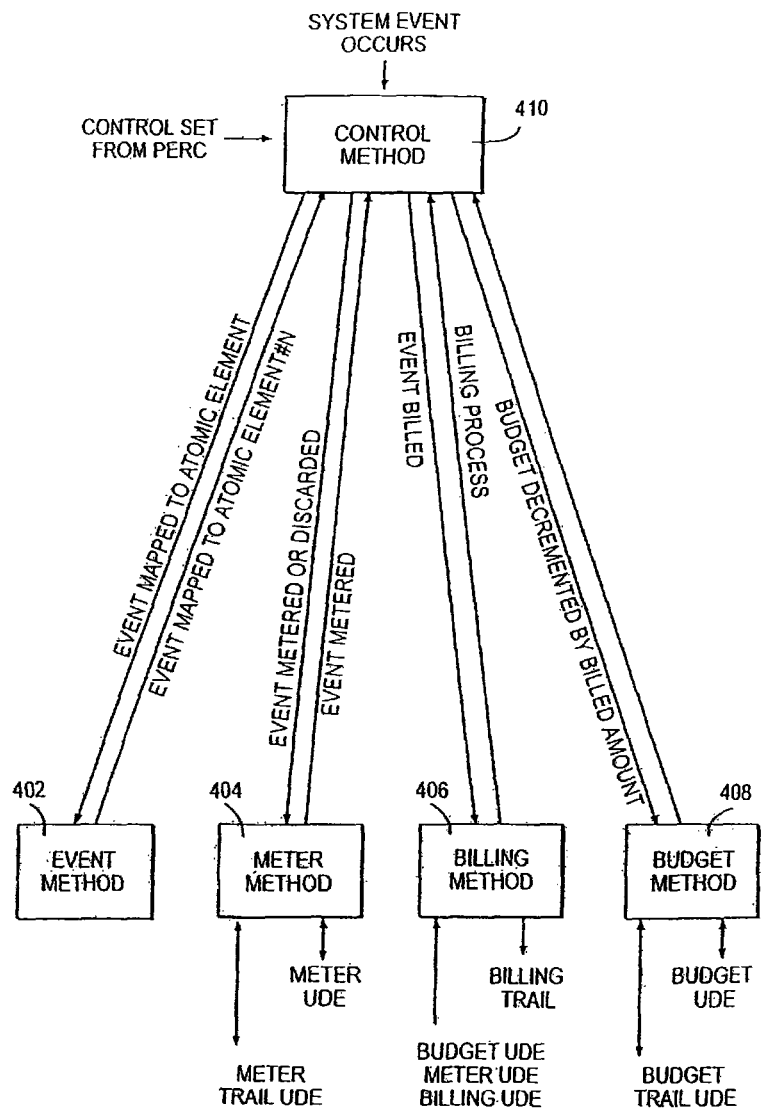
Figure 47:
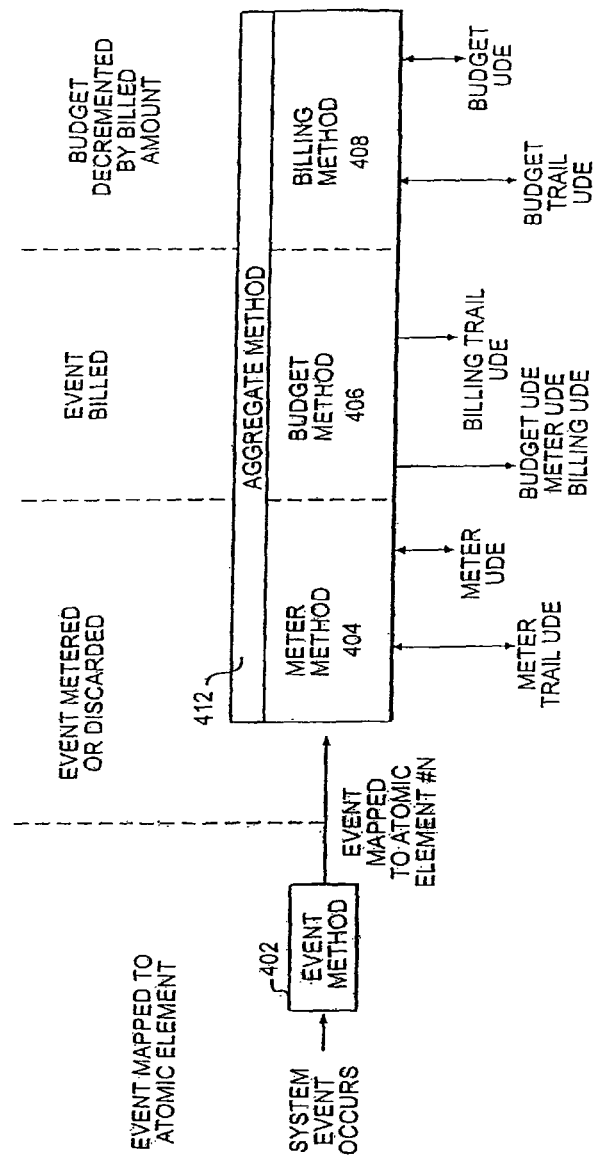
Figure 48:
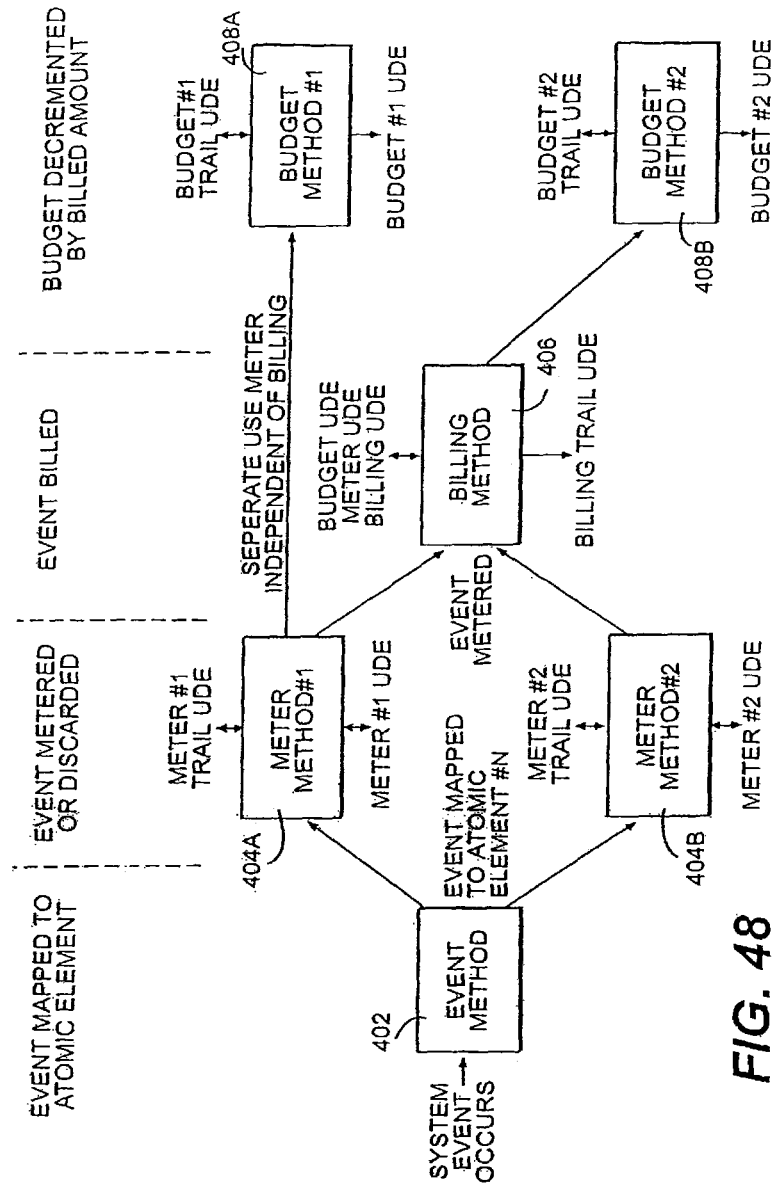
Figure 72C:
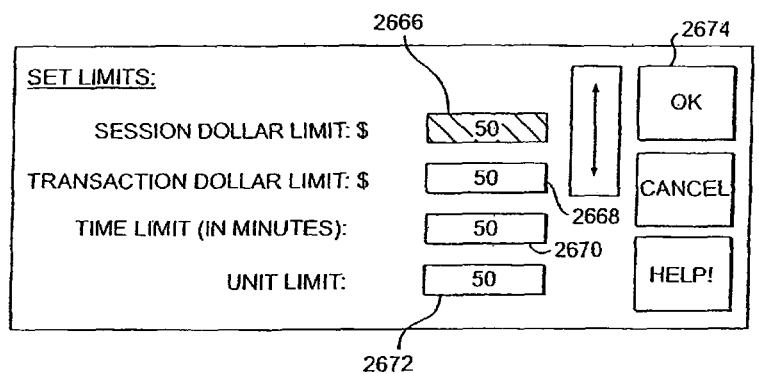
Figure 76A:
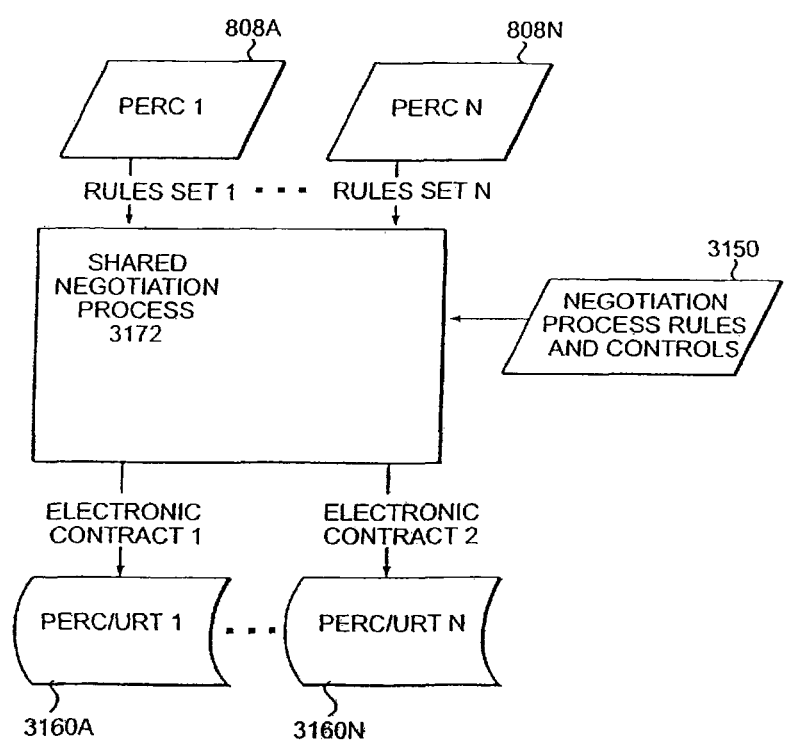
FIGS. 76A-76B show examples of electronic negotiation processes.
Figure 76B:
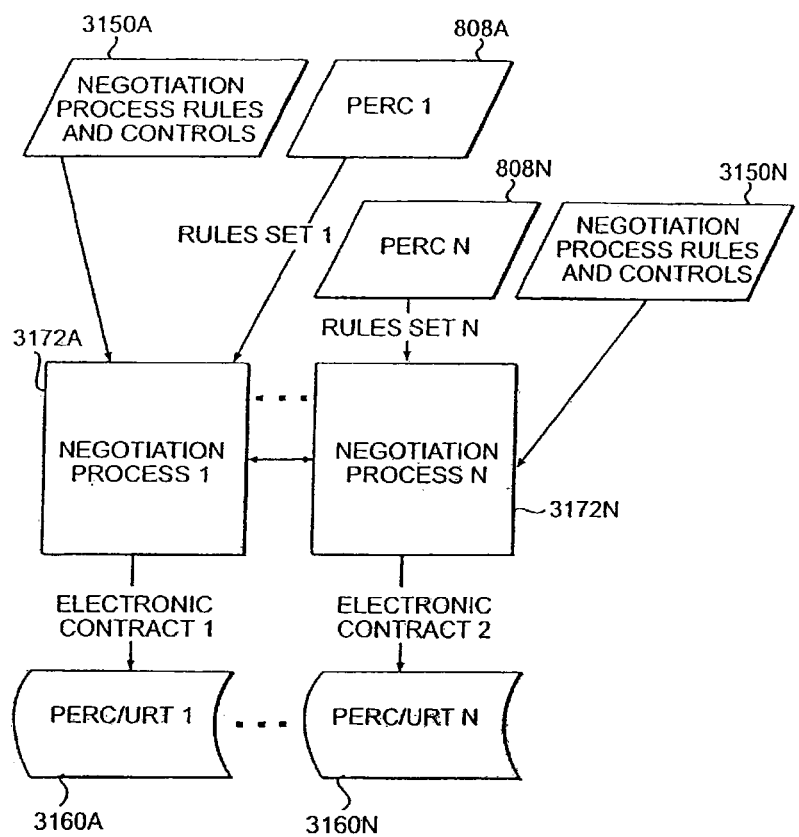
Figure 77:
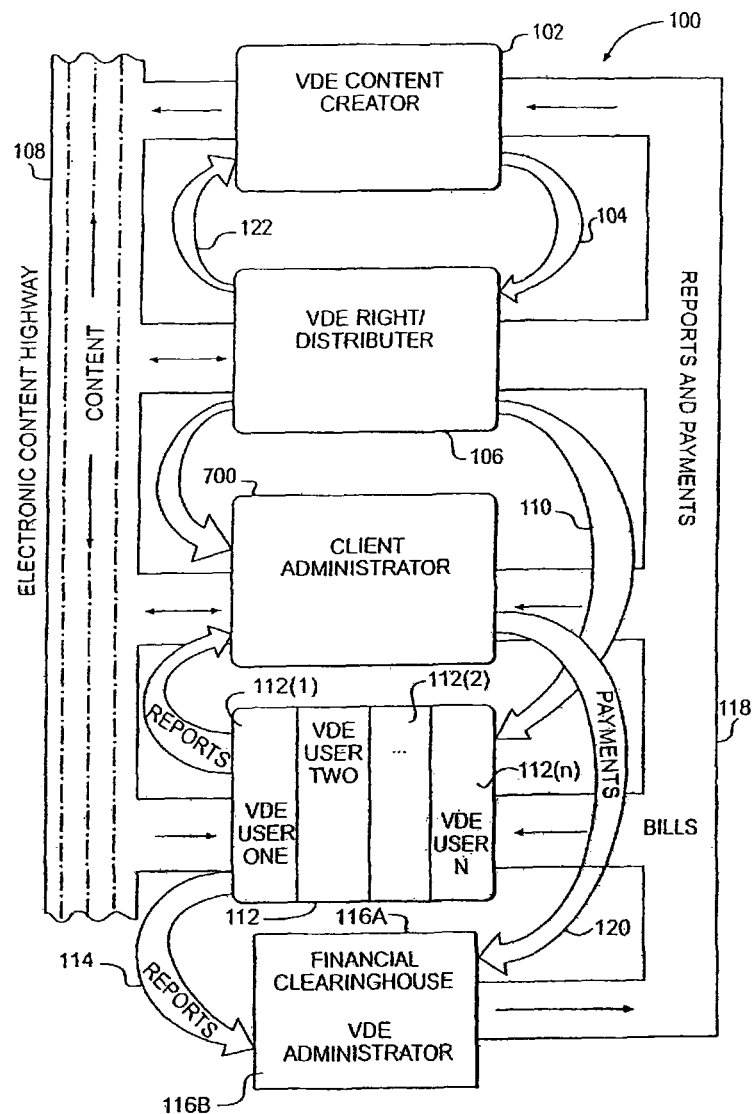
FIG. 77 shows a further example of a chain of handling and control.
Figure 78:
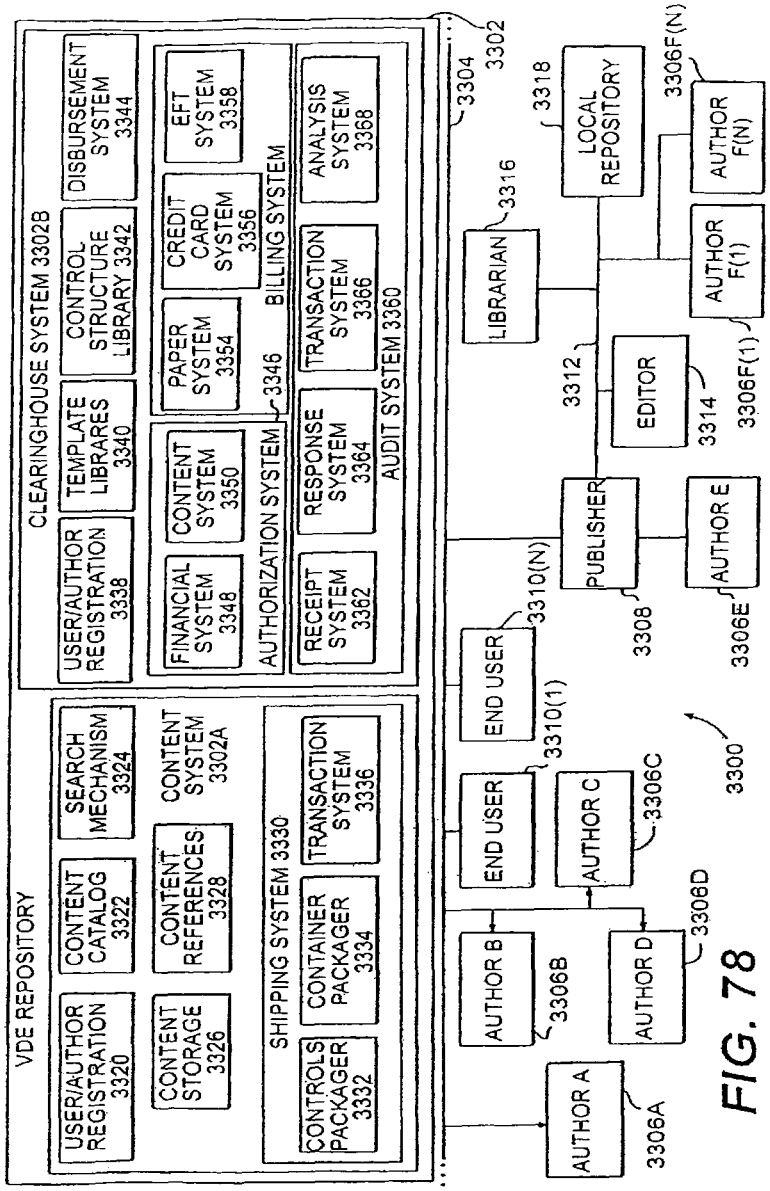
FIG. 78 shows an example of a VDE "repository"
Figure 79:
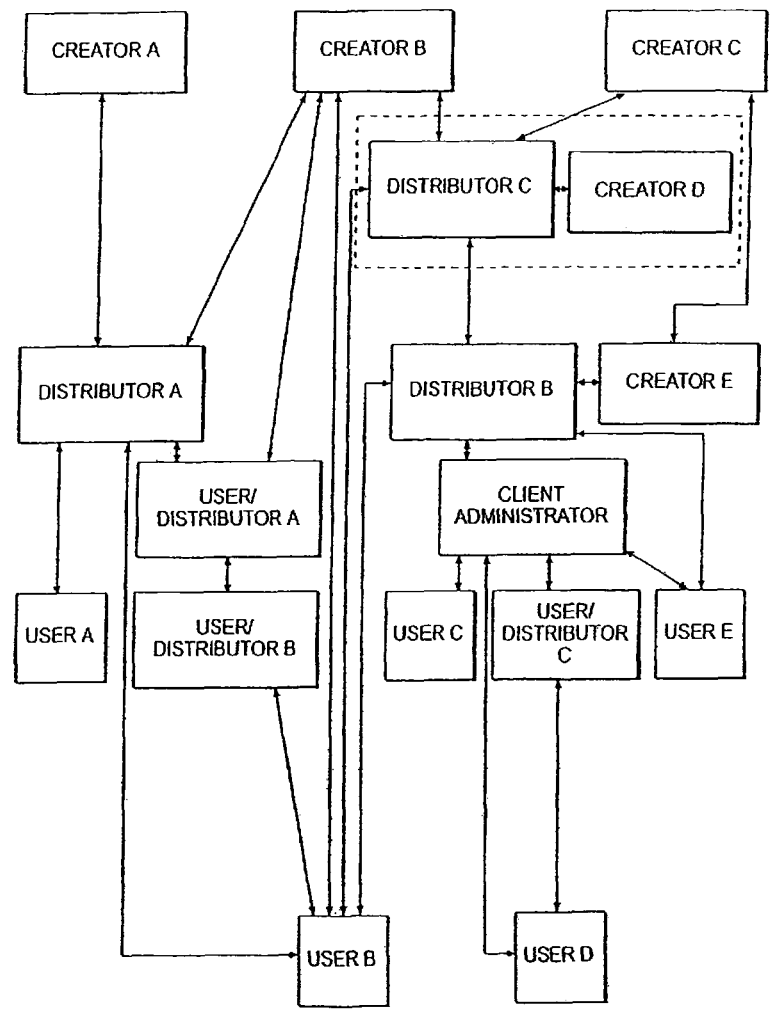
FIGS. 79-83 show an example illustrating a chain of handling and control to evolve and transform VDE managed content and control information.
Figure 80:
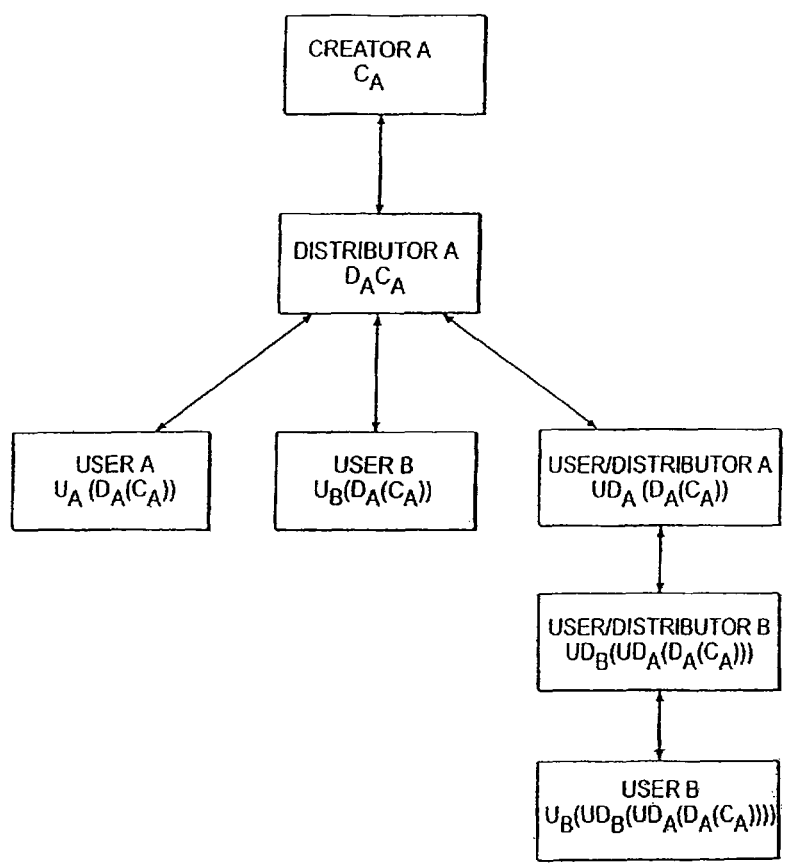
Figure 81:
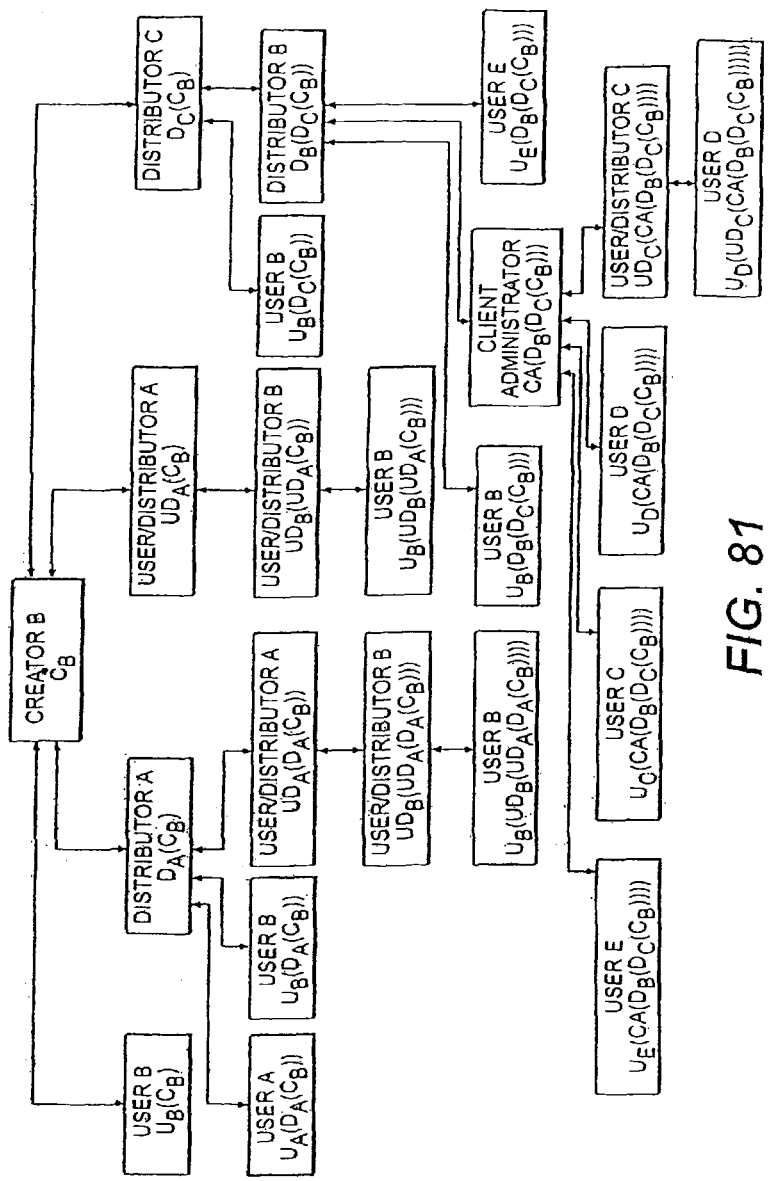
Figure 82:
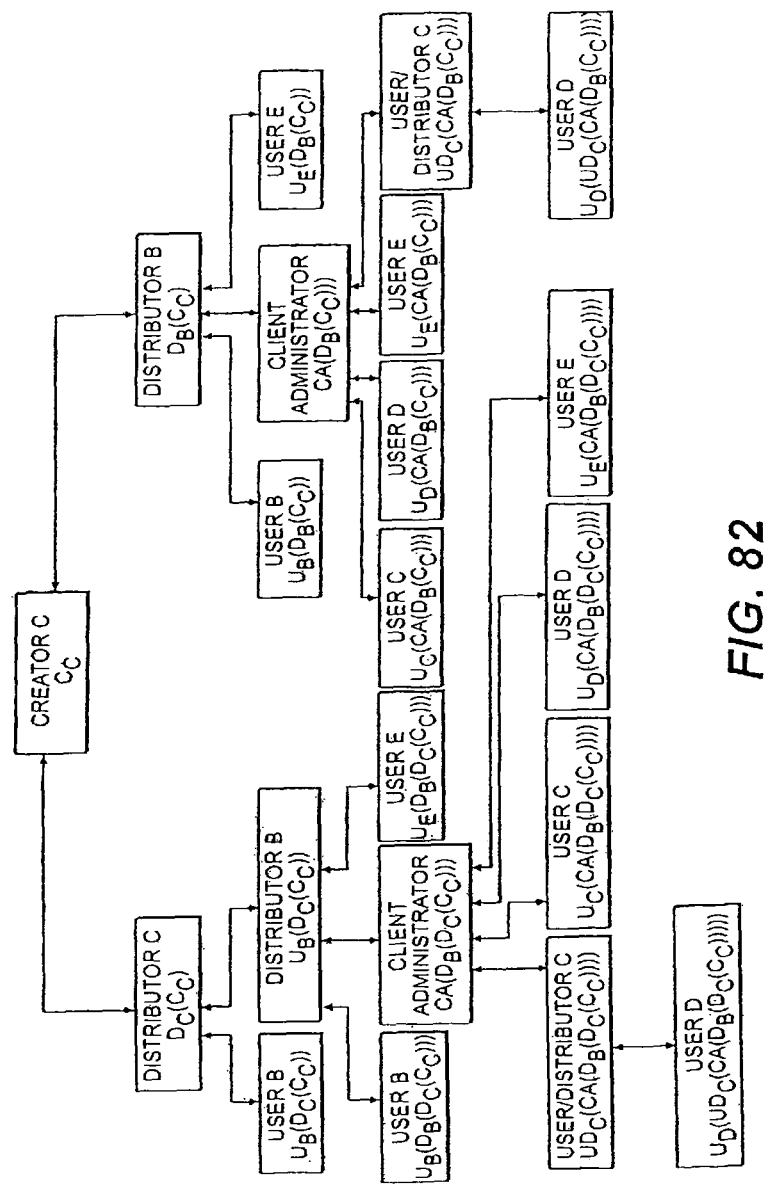
Figure 83:
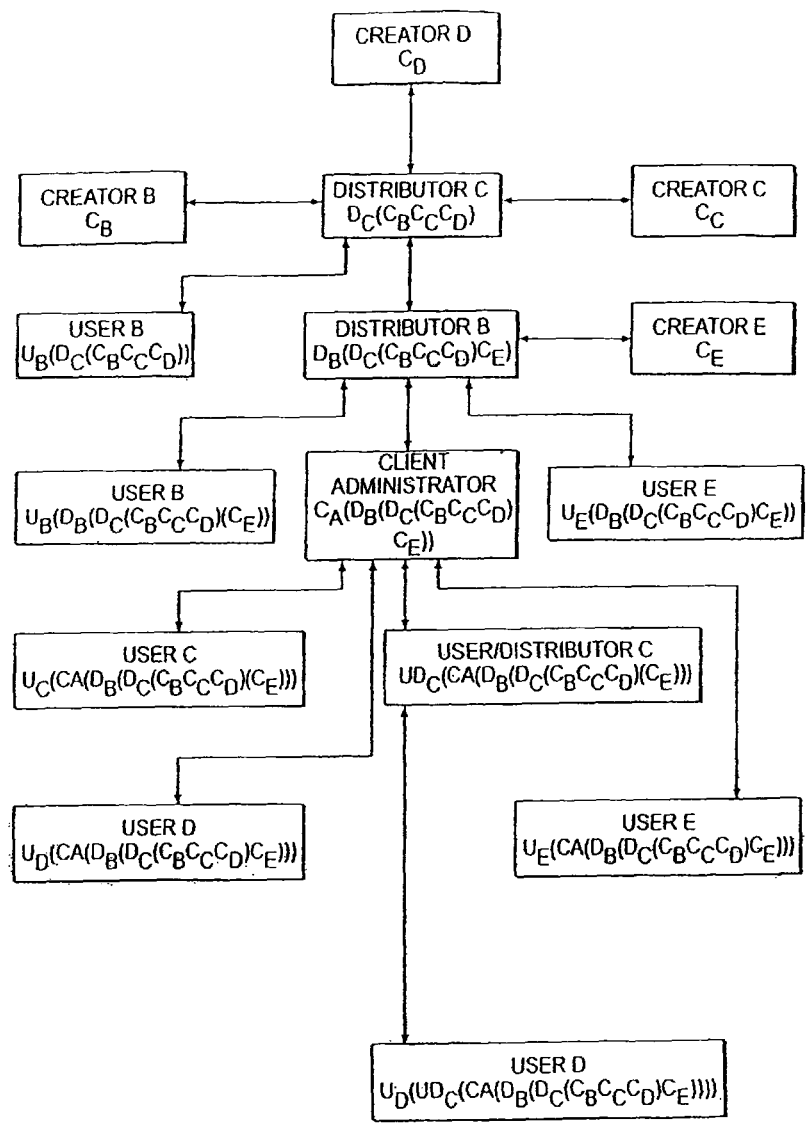
Figure 84:
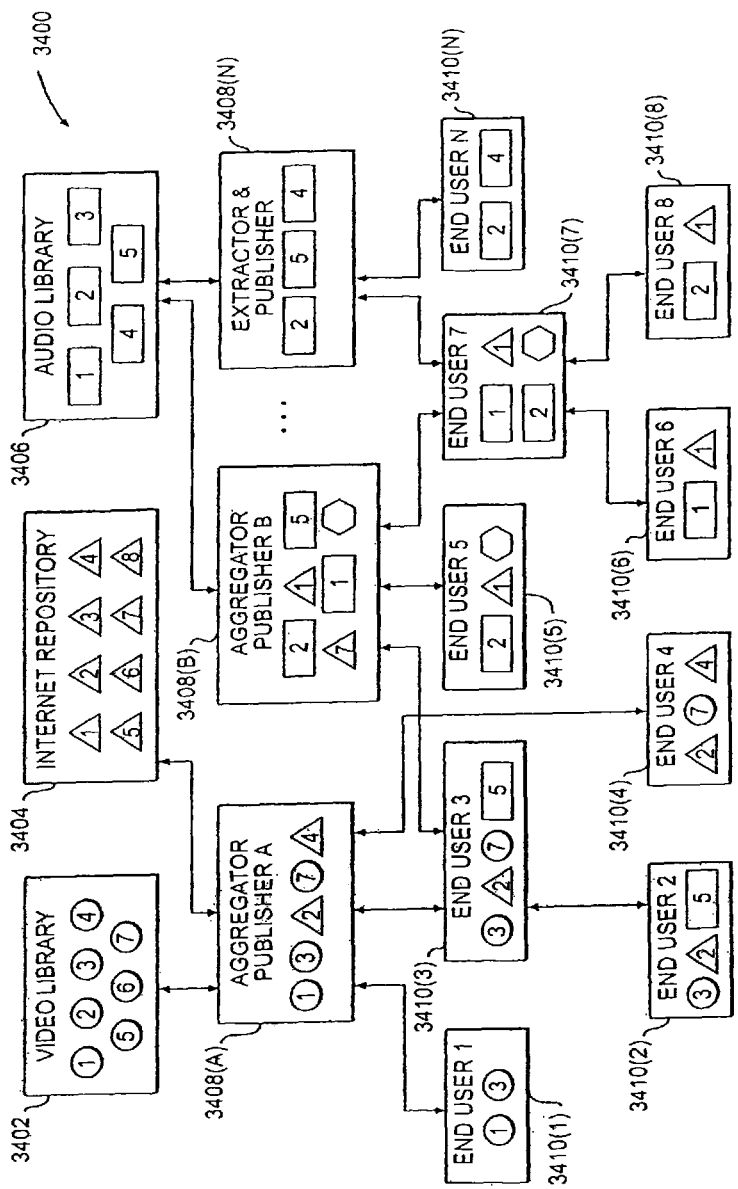
FIG. 84 shows a further example of a chain of handling and control involving several categories of VDE participants.
Figure 85:
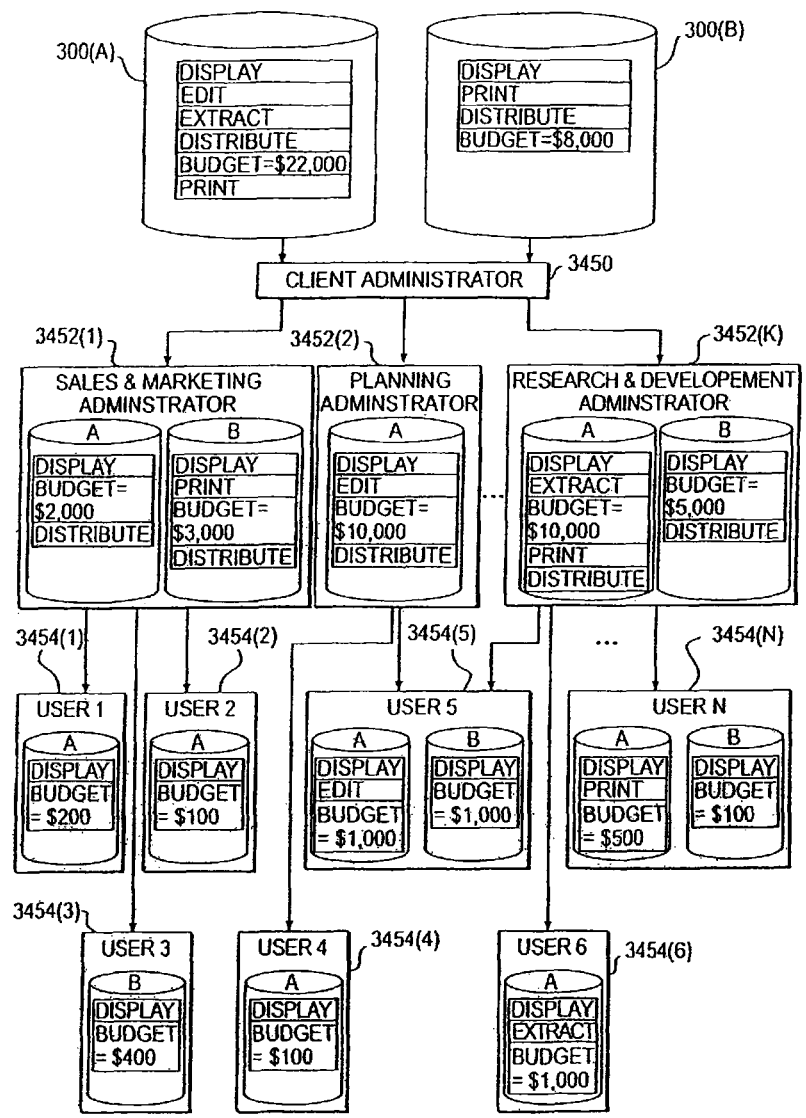
FIG. 85 shows a further example of a chain of distribution and handling within an organization.
Figure 86:
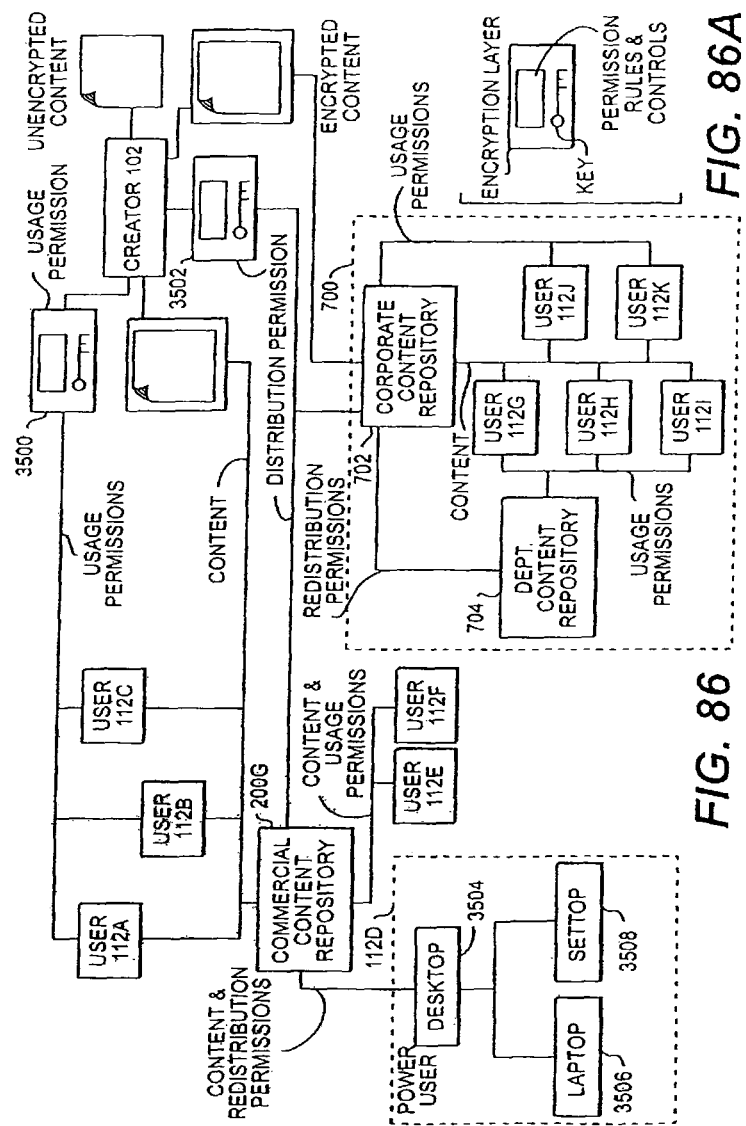

Trusted delivery mechanism 4060 may send messages such as offers 4054A and acceptances 4054B between the two electronic appliances 600A, 600B. These messages may be packaged within secure electronic containers 302. Some of these may be human readable, others may be automated as in FIGS. 76A and 76B. If they are human readable and operator managed during negotiation, they may represent a user interface aspect of control structures (e.g., see load module DTD description in connection with FIG. 23, and pop up user interface usage in connection with FIG. 72C).

Once the parties 4070A, 4070B agree on the terms of the contract, they may securely indicate their agreement and system 4050 can generate an electronic and/or paper contract document 4068 that evidences and memorializes the agreement. As will be discussed below, contract document 4068 may have special attributes such as seals 4200, hand-written signatures 4300 and/or visual or hidden "electronic fingerprint" information 4400. Such seals 4200, signatures 4300 and electronic fingerprints 4400 can be used to establish the authenticity of the document (for example, preventing a signatory from repudiating it and to allowing it to be admitted as evidence in a court of law).

Figure 98:
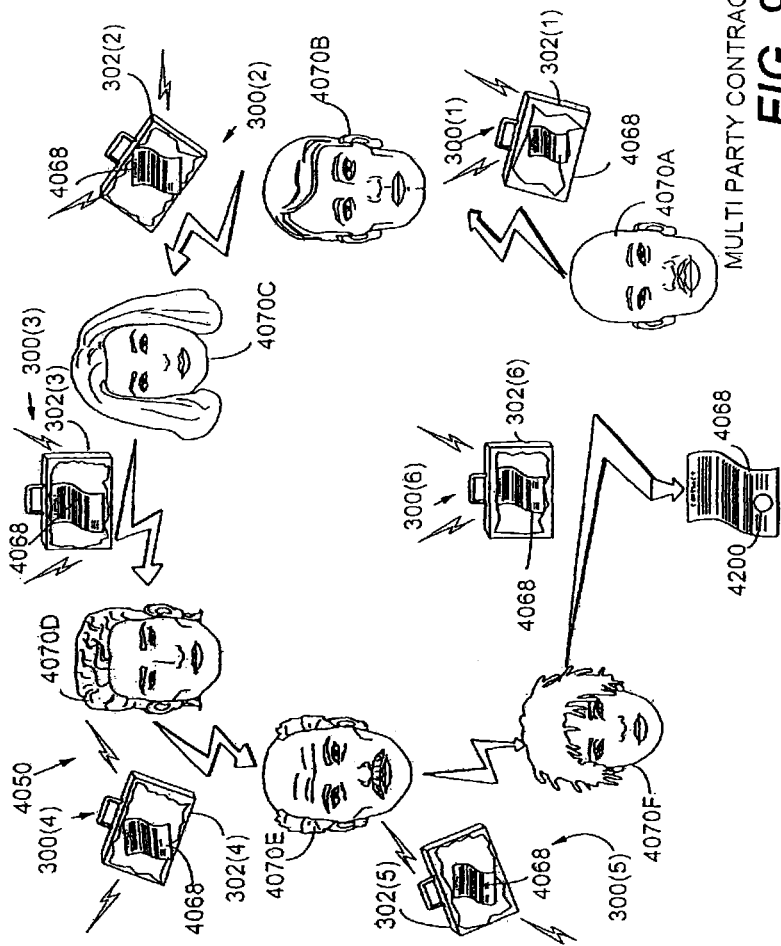
FIG. 98 shows an example multi-party electronic document execution.

FIG. 98 shows that system 4050 can be used to electronically form contract 4068 between any number of different parties. Electronic network 4058 might, for example, be a world-wide electronic highway 108 or other network such as the Internet, with the various parties being located in many different locations around the world. Alternatively, electronic network 4058 might be a private data network within an organization—or it might be a mixture of the two. Different contracting parties 4070 may use different kinds of electronic appliances 600 such as, for example, personal computers, intelligent walk-up kiosks, home television sets, or any other type of electronic appliance capable of securely receiving and providing information about contract 4068.

System 4050 can electronically pass contract 4068 along a "chain" from one party 4070 to the next ("Round Robin"), collecting signatures as it travels along. System 4050 can also allow each party 4070A-4070F to communicate with any other party. One copy of contract 4068 could be passed along from party to party and iteratively signed at the respective signers' locations. The last signer could then broadcast final, signed copies of contract 4068 to all parties. The electronic containers 302 can specify who the next recipient of contract is—forming a trusted chain of handling and control for contract 4068.

In one example, all of the parties 4070 may be required to hit an "I Agree" button (e.g., by placing a finger onto a biometric sender 4124 shown in FIG. 97, "clicking" on a displayed "I agree" icon, etc.) before this transaction is actually carried out. Then, barring a system failure, the execution is effectively simultaneous, since it isn't initiated until everyone has indicated their approval, and won't be completed unless each system performs correctly.

Trusted Electronic Go-Between

Figure 99:
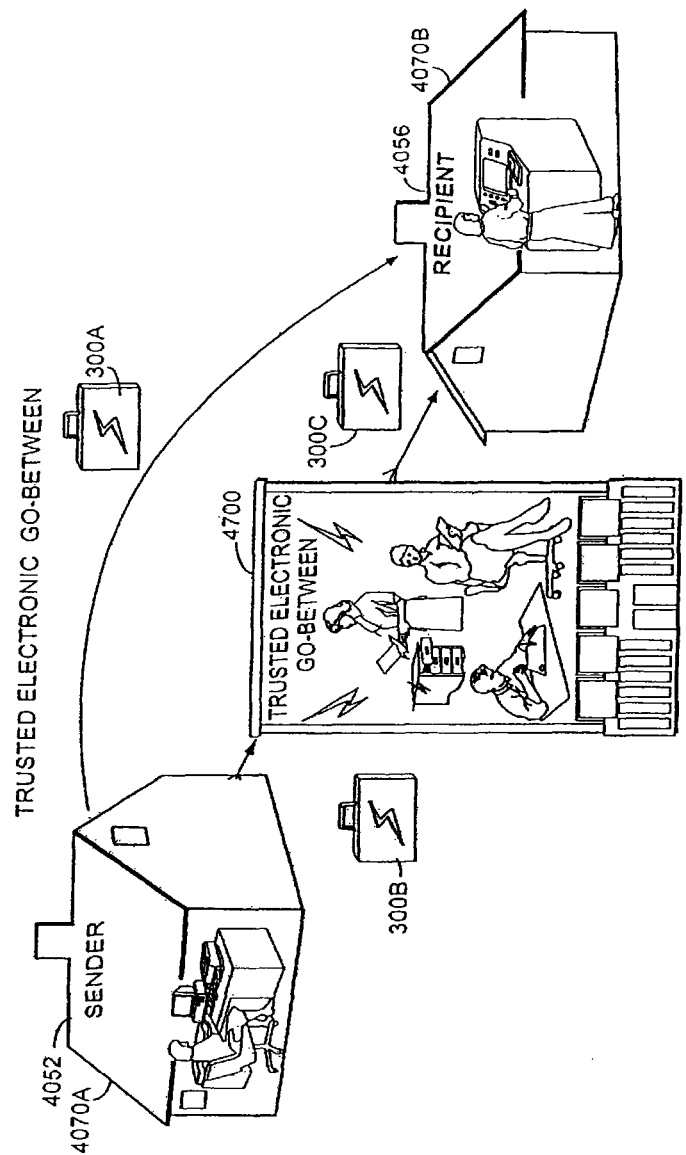

FIG. 99 shows that system 4050 may introduce a trusted electronic "go-between" or intermediary 4700 between the sender 4052 and recipient 4056 (and/or between two or more contracting parties 4070). Trusted go-between 4700 acts as an impartial overseer who can document a transaction, and may also become actively involved in directing the transaction to see to it that it is completed properly. Trusted electronic go-between 4700 may provide valuable third party services such as, for example:

maintaining a secure archive of data, receipts and other information about transmissions senders 4052 sends to recipients 4056;

managing the transaction for example, so that not all parties need to participate simultaneously or to ensure that all prerequisites or preconditions have been satisfied);

making certain certifications about information sent via system 4050 such as acting as a digital witness by notarizing documents and transmissions.

The drawings show the trusted go-between 4700 as a person for purposes of illustration only. In the preferred example, trusted go-between 4700 may be a computer that performs its functions electronically in a highly automatic and efficient way. In one example, the computer's capabilities may be augmented by human participation.

Figure 100:
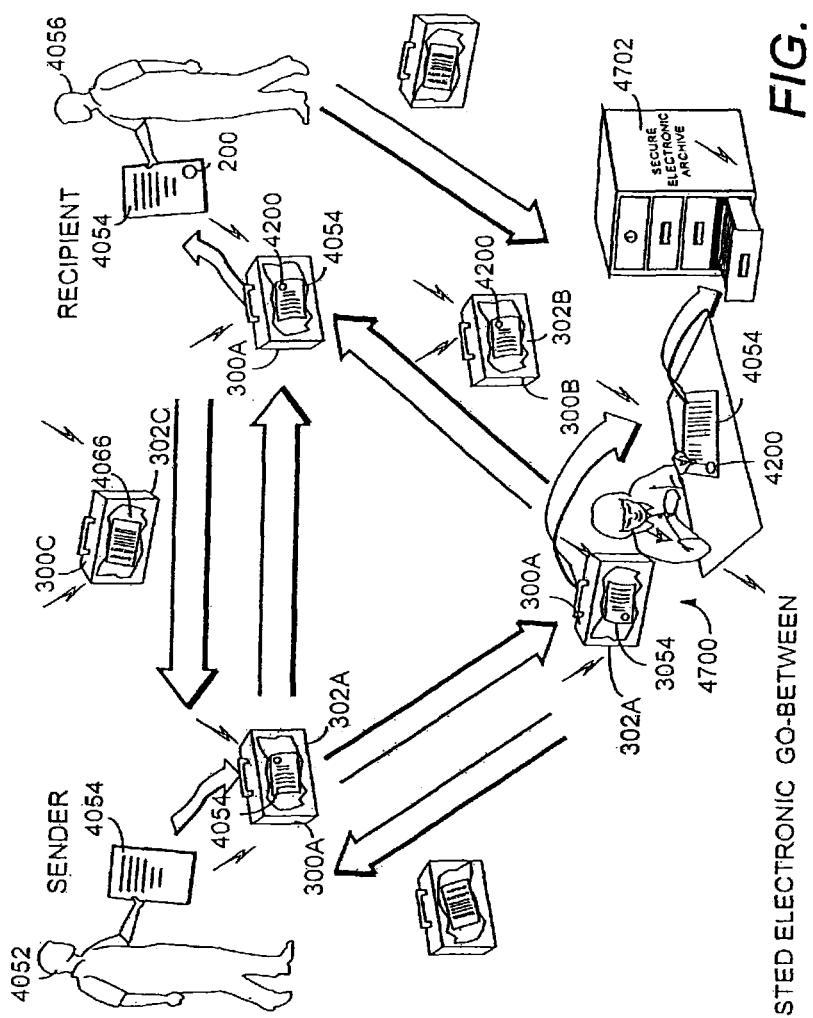
FIG. 100 shows an example use of the trusted electronic go-between for notarizing and/or archiving.

FIG. 100 shows one example use of a trusted electronic go-between 4700 to assist in delivering an item such as document 4054 from sender 4052 to recipient 4056. In this example, sender 4052 may send the item 4054 directly to recipient 4056 within one or more secure electronic containers 302. Alternatively, sender 4052 can send item 4054 (or a copy of it) to trusted electronic go-between 4700 within a secure electronic container 302A. When the trusted electronic go-between 4700 receives container 302A, she may be authorized to open the container, remove item 4054 and affix her seal 4200 to the document. Seal 4200 may certify, notarize and/or "date stamp" the item 4054 as having been received and seen by trusted electronic go-between 4700 on a certain day at a certain time. Trusted electronic go-between 4700 may keep a copy of item 4054 within a secure electronic library or archive $4702_{[BW1]}$. In addition, if desired, trusted electronic go-between 4700 may deliver a copy of item 4054 with the affixed seal 4200 to recipient 4056. When recipient 4056 opens the secure electronic container 302B, he will notice the seal 4200 and have confidence that it is the same item 4054 that was seen and archived by the trusted electronic go-between 4700. In this example, recipient 4056 may directly provide a return receipt 4066 within an additional secure electronic container 302C—or trusted electronic go-between 4700 can provide such a return receipt to sender 4052 based on audit information provided by recipient 4056 and/or originated by the trusted go-between.

The Trusted Electronic Go-Between can Help with Contracts

Figure 101A:
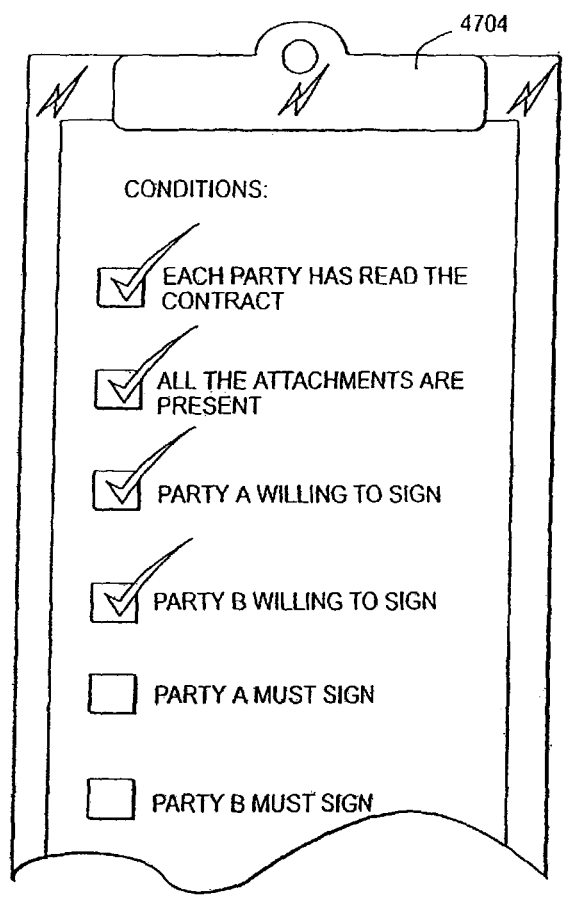
FIG. 101A shows an example electronic requirements list.

FIG. 101 shows how trusted electronic go-between 4700 can make it easier for parties 4070 to execute a legal contract 4068. In this example, the trusted electronic go-between 4700 can maintain a requirements list 4704. This requirements list 4704 (an example of which is shown in FIG. 101A) may specify all of the steps that must be completed and all of the conditions that must be satisfied in order to execute legal contract 4068. Trusted electronic go-between 4700 can monitor the electronic communications between the contractual parties 4070A, 4070B, and notify them of additional requirements that need to be met before the contract 4068 can be signed.

In one example, trusted electronic go-between 4700 can also act as a mediator to resolve disputes between the contracting parties 4070A, 4070B, and can help negotiate the contract. At the conclusion of the contracting process, trusted electronic go-between 4700 may affix its own seal 4200A to the executed contract document 4068. This seal 4200A may provide a guarantee or assurance that all of the steps required by trusted electronic go-between 4700 were fulfilled before the contract 4068 was executed and that the contracting parties 4070A, 4070B are who they say they are and had authorization to execute the contract.

Figure 17:
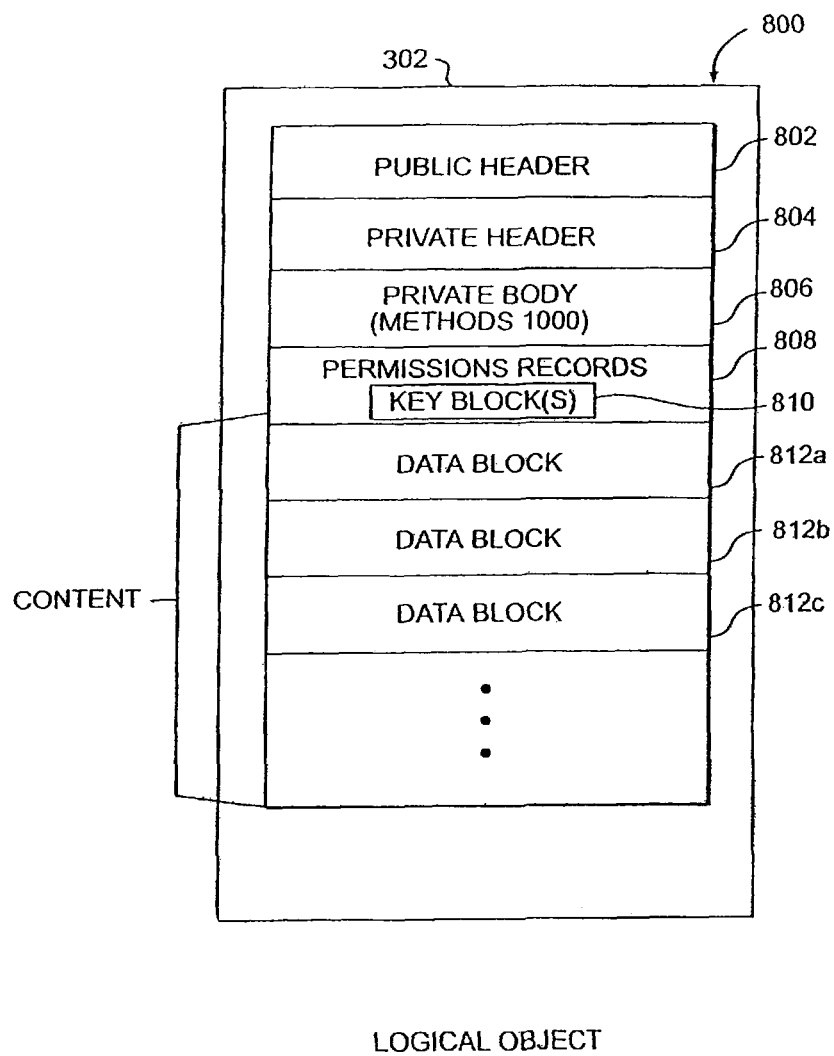
FIG. 17 is an illustration of an example of a logical object structure.
Figure 18:
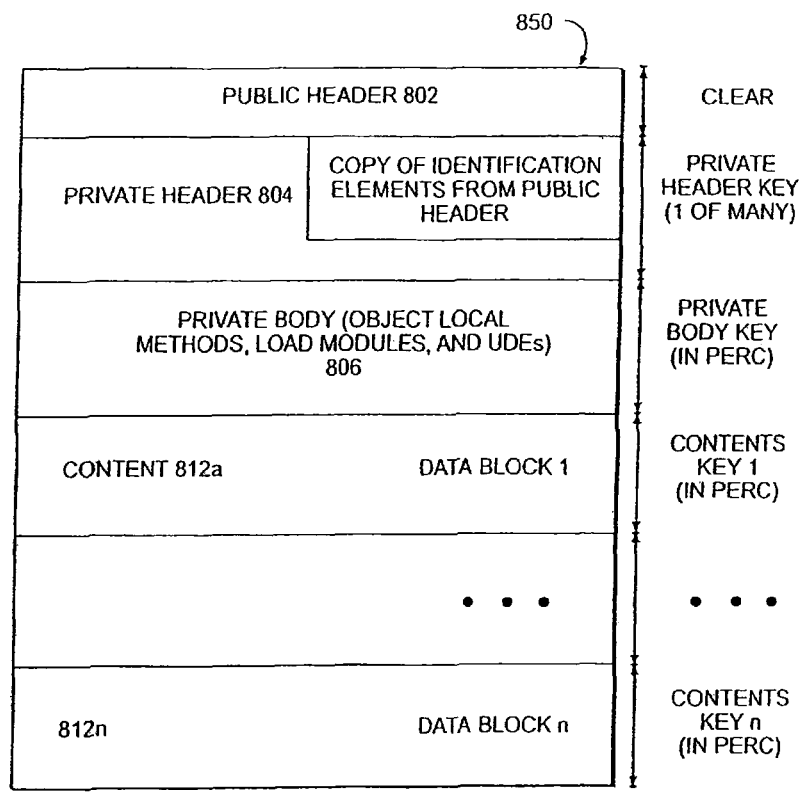
FIG. 18 shows an example of a stationary object structure.
Figure 19:
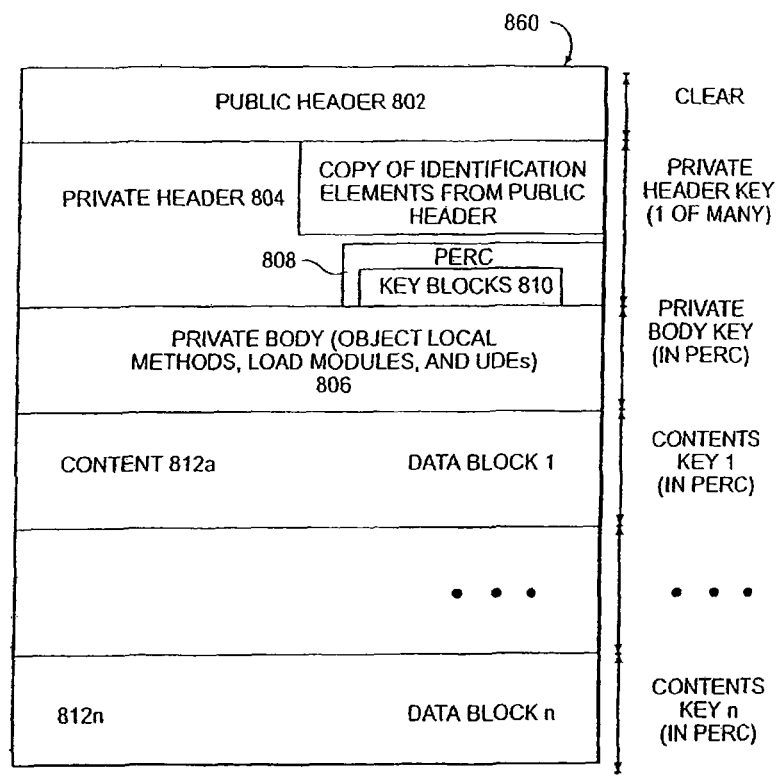
FIG. 19 shows an example of a traveling object structure.
Figure 20:
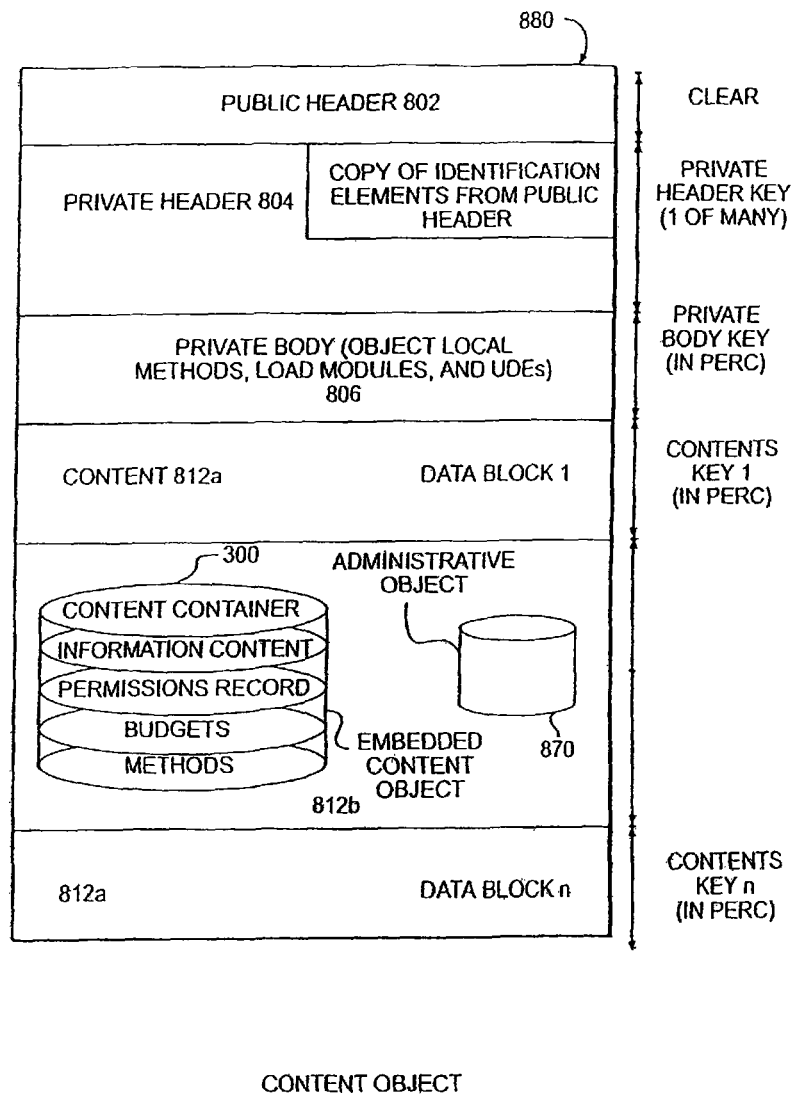
FIG. 20 shows an example of a content object structure.
Figure 21:
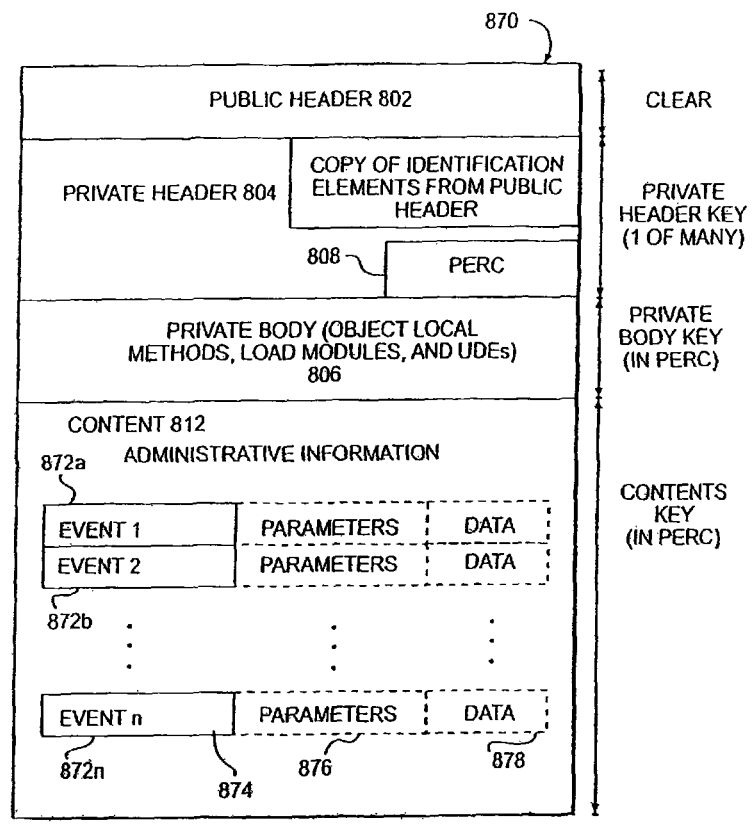
FIG. 21 shows an example of an administrative object structure.
Figure 22:
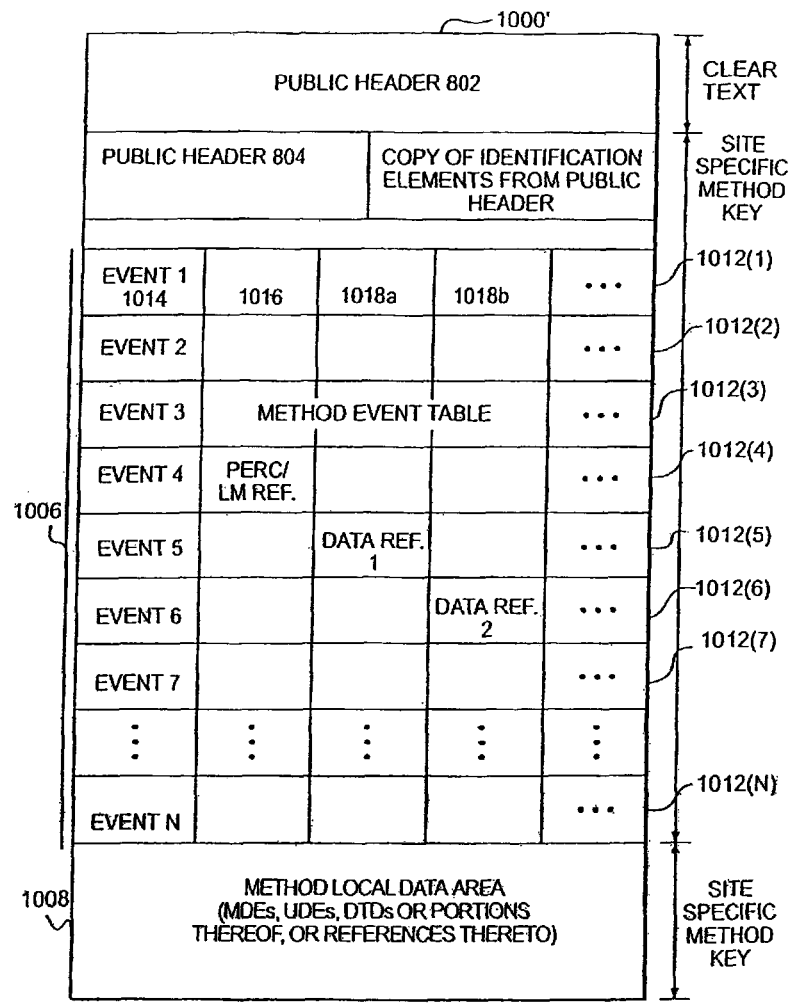
FIG. 22 shows an example of a method core structure.

FIG. 101B shows how the trusted electronic go-between 4700 could be the focal point for a contractual relationship between a number of different contracting parties. In this example, trusted electronic go-between 4700 might communicate directly with each of the various contracting parties 4070 via electronic digital messages, and create the resulting executed contract based on these communications. In one example, go-between 4700 doesn't tell any participant 4070 who has already agreed and who hasn't. The SPU's 500 (PPEs) of each party's appliance 600 can receive administrative objects (see FIG. 21) with the information about each approval, yet this information does not need to be released outside the SPU (PPE). In this model, the rules associated with affixing electronic signatures (digital and/or an image of a physical signature) can be established at the beginning of the negotiation to indicate the list of parties 4070 that must agree. Then, as each party 4070 agrees, their electronic appliance SPU 500 (PPE) will send administrative objects to each of the other participants containing one or more events and data associated with those events that can be processed by the controls associated with use of their signature. If the administrative objects omit the creator identity public header 804 information (see FIG. 17), and the information is transmitted via a remailer (or other intermediary) when network addresses could be used to identify a sender, there will be no way to determine the identity of the sender outside the SPU (PPE) 500. As soon as all of the conditions for use of the signature have been fulfilled, and an event is presented to sign the document, the rest of the transaction can go forward.

It is extremely useful to have trusted go-between 4700 monitoring this activity to order the application of signatures (if required), and to allow a roll back if the system fails before applying all of the signatures. The role of go-between 4700 may, in some circumstances, be played by one of the participant's SPU's 500 (PPEs), since SPU (PPE) behavior is not under the user's control, but rather can be under the control of rules and controls provided by one or more other parties other than the user (although in many instances the user can contribute his or her own controls to operate in combination with controls contributed by other parties). In another example, the go-between role 4700 may comprise a "virtual go-between" comprised of a one, a combination of plural, or all, nodes of participants in a collective or other group. Governance can be shared through the interaction of rules and controls of the various node PPEs producing a go-between control role. Upon the completion of a go-between managed transaction, transaction audit information for archive, billing, security, and/or administrative purposes may be securely transmitted, directly, or through one or more other participating in the virtual go-between.

The Secure Electronic Go-Between can be used With and Between Organizations

Figure 102:
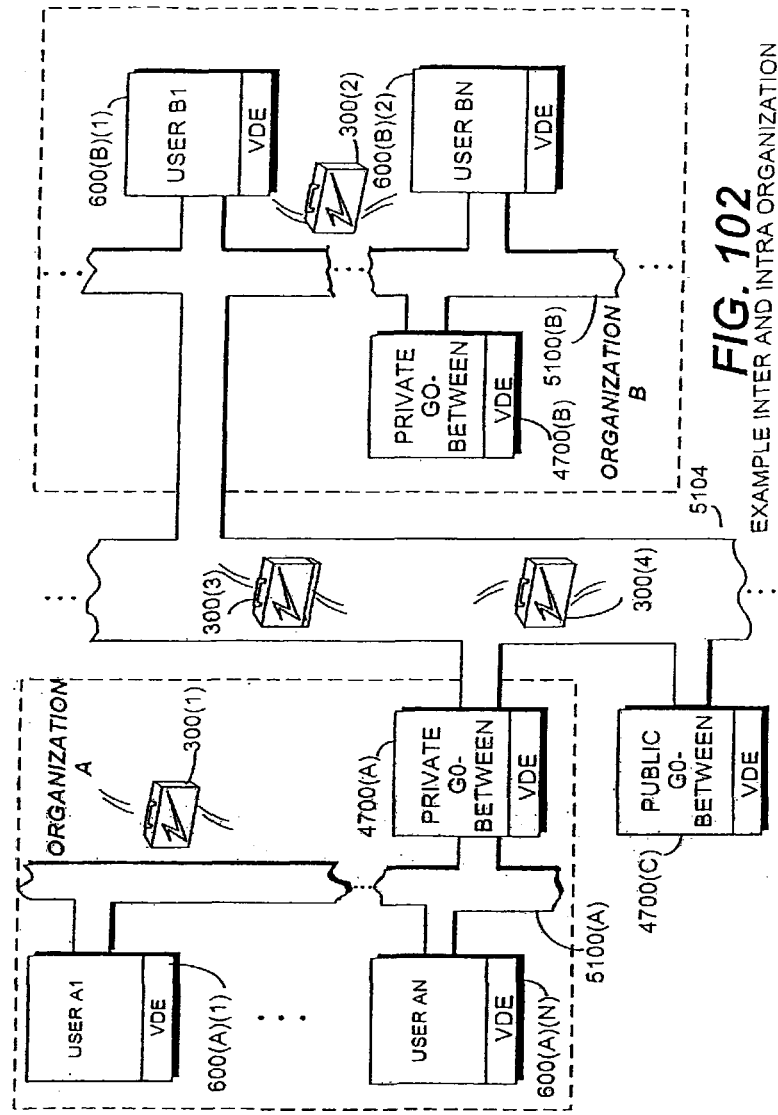
FIG. 102 shows example use of trusted electronic go-betweens within and outside of organizations.

FIG. 102 shows an example use of system 4050 for inter- and intra-organizational communications. FIG. 102 shows an organization A (left-hand side of the drawing) as having an "Intranet" (a private data network within a particular organization) 5100(A). Intranet 5100(A) may be a local and/or wide area network for example. User nodes 600(A)(1), . . . , 600(A)(N) (for example, employees of organization A) may communicate with one another over Intranet 5100(A).

FIG. 102 also shows another organization B that may have its own Intranet 5100(B), user nodes 600(B)(1), . . . , 600(B)(N), and private trusted go-between 4700(B). In addition, FIG. 102 shows a public data network 5104 (such as the Internet for example) and a public trusted go-between 4700 (C). FIG. 102 shows that in this example, organizations A and B communicate with the outside world through trusted go-between 4700(A), 4700(B) (which may, if desired, also include "gateways", "firewalls" and other associated secure communications components). In other examples, trusted go-between 4700(A), 4700(B) need not be the actual "gateway" and "firewall" to/from Internet 5104, but could instead operate wholly internally to the respective organizations A, B while potentially generating electronic containers 302 for transmission over Internet 5104.

In this example, organization A user nodes 600(A)(1), . . . , 600(A)(N) each have an instance of a virtual distribution environment protected processing environment, and can communicate with one another over Intranet 5100(A) via secure electronic containers 302. Similarly, organization A user nodes 600(B)(1), . . . , 600(B)(N) each have an instance of a virtual distribution environment protected processing environment, and can communicate with one another over Intranet 5100(B) via secure electronic containers 302. In addition, organization A and organization B can communicate with one another over Internet 5104 via secure electronic containers 302.

Organization A's private trusted go-between 4700(A) may be used for facilitating organization A's internal communications and processes. Private trusted go-between 4700(A) might be used, for example, to carefully track documents and other items sent from one user to another within organization A. The public go-between 4700(C), meanwhile, can be used to coordinate between organization A and organization B without, for example, revealing confidential information of either organization to the other organization. Below are more detailed examples of how the FIG. 102 arrangement might be advantageously used to conduct business transactions.

More about the Secure Electronic Container

Figure 103:
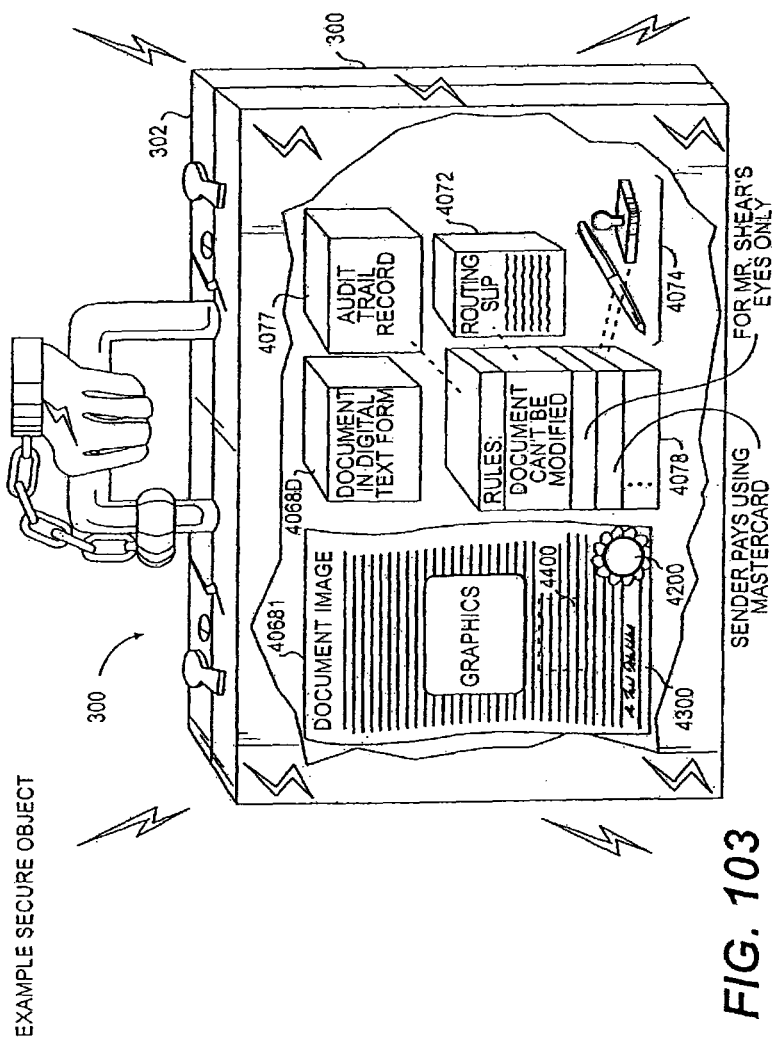
FIG. 103 illustrates an example secure object.

FIG. 103 shows an example secure electronic object 300 and its contents. Once again, although object 300 is shown as a locked attaché case for illustration purposes, the object and its associated container 302 is typically electronic rather than physical and may provide security, trustedness and confidentiality through use of strong cryptographic techniques as shown in FIGS. 5A, 5B and 17-26B.

In this example, secure container 302 may contain a digital image 4068I of a document or other item 4054 to be delivered from one party to another. This image may include one or more seals 4200, one or more hand-written signatures 4300, and one or more electronic fingerprints 4400. The item 4054 may be multiple pages long or it may be a single page. The item 4054 may contain text, pictures or graphical information, computer instructions, audio data, computer data, or any combination of these, for example. Image 4068I may be represented in a so-called "universal" format to allow it to be created and displayed and/or printed by any standard software application capable of processing items in the appropriate "universal" format. If desired, image 4068I may include cover sheets, virtual "stick on" notes, and/or the like. Secure container 302 may contain any number of different 4054.

Container 302 may also contain another, data version 4068D of the item 4054. This data version 4068D might, for example, comprise one or more "word processing" files corresponding to a text document, for example.

The container 302 may also contain one or more tools 4074 for using image 4068I and/or data 4068D. Tools 4074 might be used to allow the intended recipient 4056 to manipulate or view the image 4068I and/or the data 4068D. Tools 4074 might be computer programs in one example (as mentioned above, item 4054 can also be a computer program such as a program being sold to the recipient).

Figure 15:
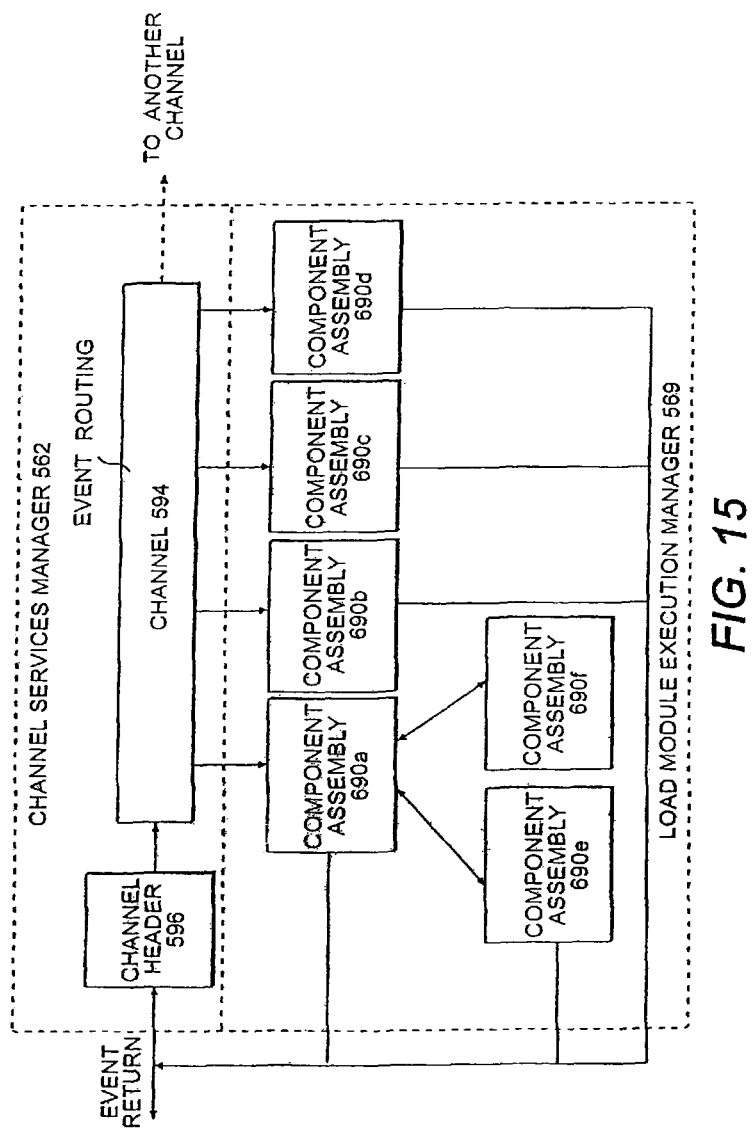
FIG. 15 illustrates an example of how the channel services manager and load module execution manager of FIG. 13 can support a channel.
Figure 15A:
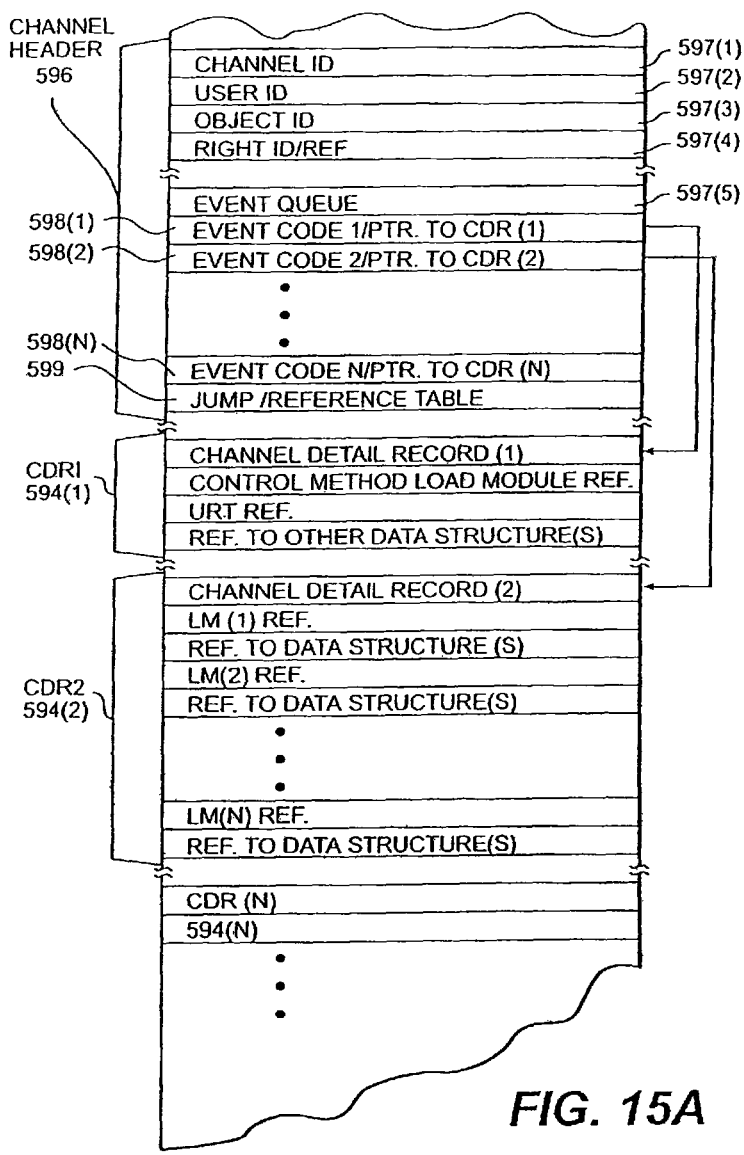
FIG. 15A is an example of a channel header and channel detail records shown in FIG. 15.
Figure 15B:
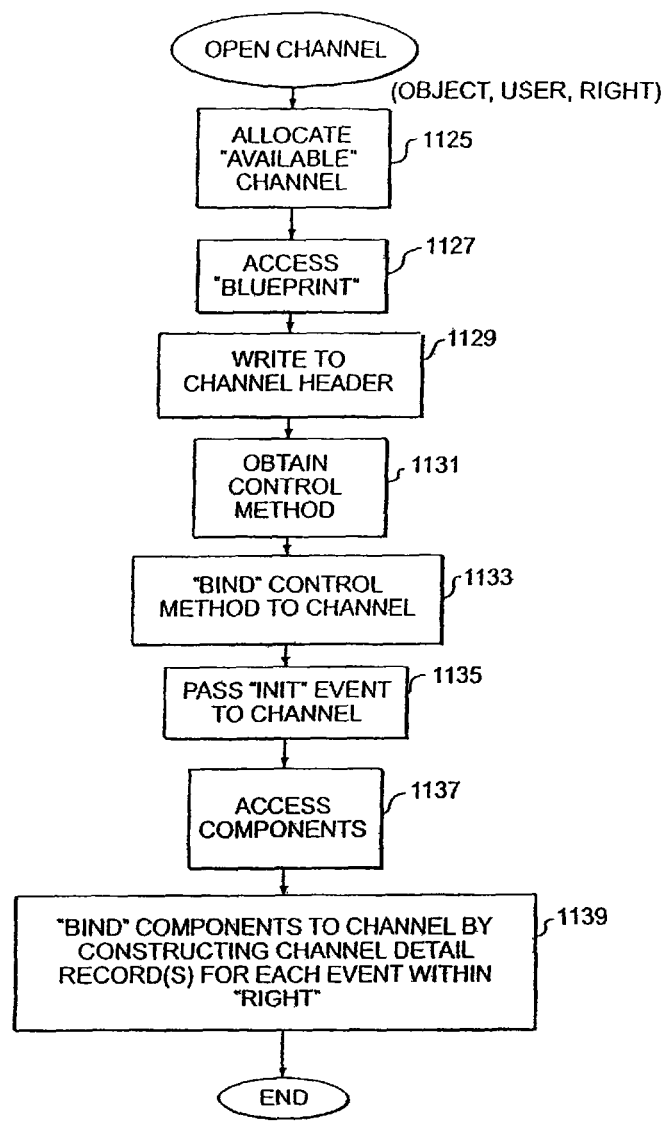
FIG. 15B is a flowchart of an example of program control steps that may be performed by the FIG. 13 protected processing environment to create a channel.

Secure container 302 may also contain an electronic, digital control structure 4078. This control structure 4078 (which could also be delivered independently in another container 302 different from the one carrying the image 4068I and/or the data 4068D) may contain important information controlling use of container 302. For example, controls 4078 may specify who can open container 302 and under what conditions the container can be opened. Controls 4078 might also specify who, if anyone, object 300 can be passed on to. As another example, controls 4078 might specify restrictions on how the image 4068I and/or data 4068D can be used (e.g., to allow the recipient to view but not change the image and/or data as one example). The detailed nature of control structure 4078 is described in connection, for example, with FIGS. 11D-11J; FIG. 15; FIGS. 17-26B; and FIGS. 41A-61.

Figure 92A:

Secure container 302 may also include one or more routing slips 4072 and one or more audit trails 4077. Routing slip 4072 and audit trail 4076 are data structures defined by and/or associated with electronic controls 4078, and may be integrated as part of these electronic controls (see FIGS. 22-26B for example). Routing slip 4072 might be used to electronically route the object 300 to the intended recipient(s) 4056 and to specify other information associated with how the object 300 is to be delivered and/or handled. Audit trail records 4077 may be used to gather and recover all sorts of information about what has happened to object 300 and its contents (e.g., where container 302 has been, how image 4068I has been used, etc.). Audit trail 4077 may be used, for example, to generate a return receipt as shown in FIG. 92A. Routing slip 4072 and/or audit trail records 4077 (and associated controls 4078) don't have to be delivered within the same container 302 that contains the image 4068I and/or the data 4077—they can be delivered independently in another container 302 if desired.

Document Signatures

Figure 104:
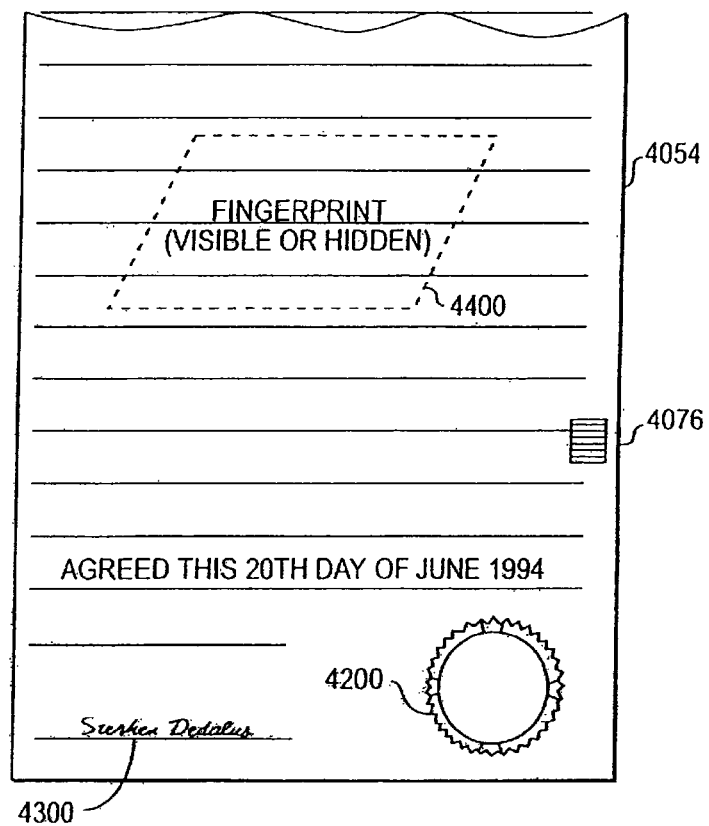
FIG. 104 shows example electronically-generated signatures, seals and electronic fingerprints.

FIG. 104 shows some examples of how system 4050 can "sign" printed item 4054. In most modern societies, a person indicates his or her assent to a legal document by affixing his or her hand-written signature and/or seal. In the United States, for example, the act of hand writing one's signature on a document may legally bind the signer to the terms and conditions set forth in the document. In other countries (notably Japan), a person indicates assent and agreement to be legally bound by imprinting the document with a special stamp unique to that person. A corporation may emboss legal documents with its corporate seal to indicate the corporation's assent to the document contents. Governmental authorities in many countries use official seals to certify that the document is an official one.

System 4050 in this example can accommodate any or all of these conventions by imprinting various graphics and/or symbols on printed item 4054. In the FIG. 104 example, item 4054 bears a "hand-written" signature 4300, a seal 4200, and a electronic fingerprint 4400 (that in one example may comprise a "hidden signature").

Hand-written signature 4300 may be a graphical image of the signer's own hand-written signature. System 4050 can obtain this hand-written signature image 4300 in a number of ways. For example, system 4050 may require the signer to sign his or her signature at the time item 4054 is created. In this example, once the document is finalized, sender 4052 or contracting party 4070 can sign his or her signature using a magnetic or pressure-sensitive signature capture device, for example. Such conventional signature capture devices electronically capture the image of a person's signature and store it in a memory. System 4050 can then—once it securely obtains the authorization of the signer with a very high degree of trustedness and sureness (e.g., by requesting a password, biometric test, etc.)—place hand-written signature 4300 onto an appropriate part of item 4054.

Alternatively, the signer may carry his or her hand-written signature on a portable storage medium such as, for example, a magnetic, smart or memory card. The portable storage unit may employ rules and controls for budgeting the number of times and/or class and/or other circumstances of a transaction that a signature can be employed, or before the device needs to re-connect to a remote authority as disclosed in the above-referenced Shear et al. patent. The signer can present this storage medium to system 4050 as a source for the signature image 4300 shown in FIG. 104. Once system runs certain checks to ensure that the signer is in fact the one who has presented the signature card, the system can securely read the signer's hand-written signature from the medium and place it on to item 4054.

In still another example, system 4050 may securely maintain hand-written signature files for a number of different users in a secure archive or "secure directory services" as disclosed in the above-referenced Shear et al. patent disclosure. At a user's request, system 4050 may call up the signature file pertaining to that user and impress the corresponding signature onto item 4054. If an image representation of a signature is stored on portable media or in a directory service, the image may be stored in an electronic container 302. Such a container 302 permits the owner of the signature to specify control information that governs how the signature image may be used. In addition, or alternatively, the signature image may be stored in or securely associated with a field of a digital certificate (that may, for example, also incorporate other identifying information).

Figure 105A:
FIG. 105A shows an example way of hiding information within line spacing.
Figure 105B:
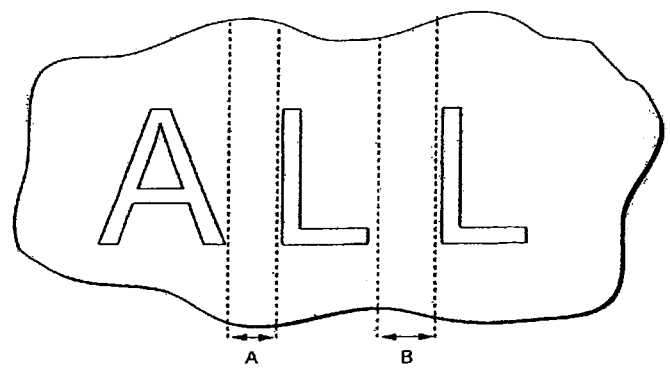
FIG. 105B shows an example way of hiding information within letter spacing.
Figure 105C:
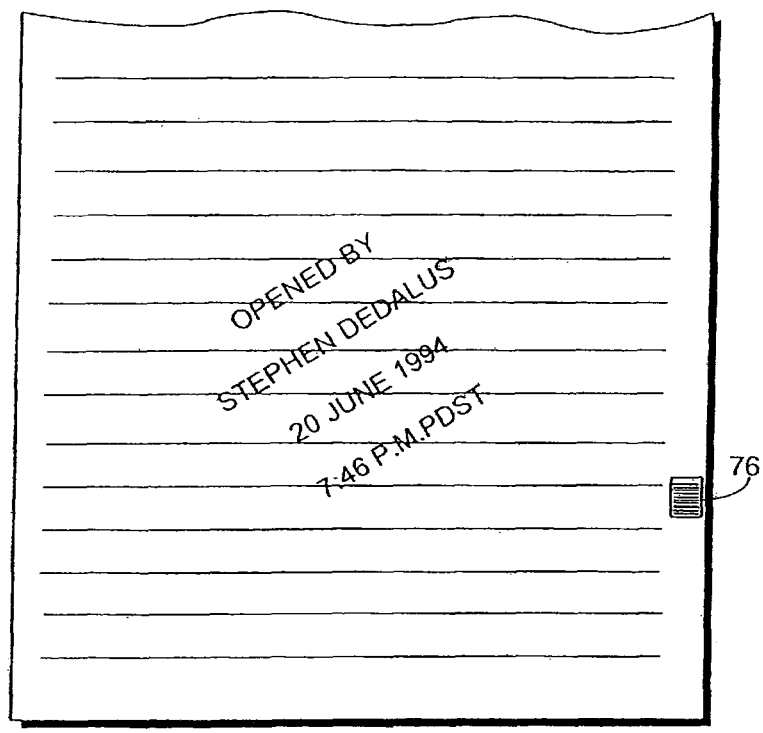
FIG. 105C shows an example electronic fingerprint.

FIG. 104 also shows a "electronic fingerprint" 4400. Electronic fingerprint 4400 may be used to indicate the signer's name and other information (such as, for example, the date and time of the transaction, the signer's public key, etc.) within the item 4054 contents in the way that makes it difficult to remove the information. A term derived from Greek roots, "steganography" which means "hidden writing"—applies to such techniques that can be used to hide such information within a document while allowing it to be recovered later. Example techniques for hiding information from within text include, for example, varying the spacing between lines of text by an almost imperceptible amount to encode information (see FIG. 105A), varying by very slight amounts the spacings ("kerning") between words or characters (see FIG. 105B). System 4050 can use such "steganography" techniques to hide information within an item 4054 (e.g., by slightly permuting the gray scale or color frequencies across a document) so it can be later recovered and used to authenticate and/or identify the document—and/or it can use visible electronic fingerprinting or watermarking techniques to provide visible indications of such information (see FIG. 105C).

System 4050 also is capable of imprinting special seals 4200 onto item 4054. FIGS. 106A-106C show example seals 4200. Seal 4200A shown in FIG. 106A may be the type of seal one expects from a Governmental document bearing an official seal. While it is possible for system 4050 to provide an embosser creating a raised seal 4200A, in a preferred embodiment system 4050 prints seals 4200A using a conventional monochrome or color printer at high resolution so that the seal image is flat. FIG. 106B shows an example rectangular seal 4200B in the center of the left margin of an item 4054, and another circular seal 4200C (for example, of the type that might be used in Japan) in the lower left hand corner of the document. FIG. 106C shows an item 4054 bearing two circular seals: one seal 4200D in the lower left hand corner of the page, and another circular seal 4200E in the lower right hand corner. FIGS. 106A-106C are merely illustrative examples—any desired quantity, shape or configuration of seals or other visual, machine-readable codes can be used depending upon the prevailing legal climate, the country and aesthetic considerations.

Figure 107:
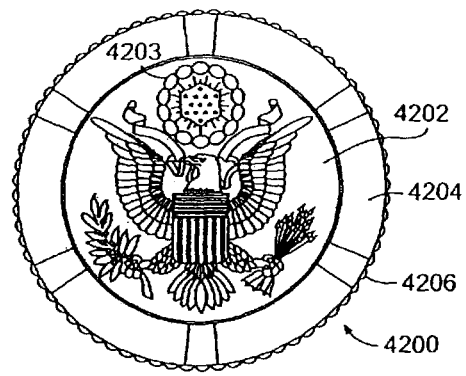
FIGS. 107A and 107B show detailed electronically generated seal examples.
Figure 107:
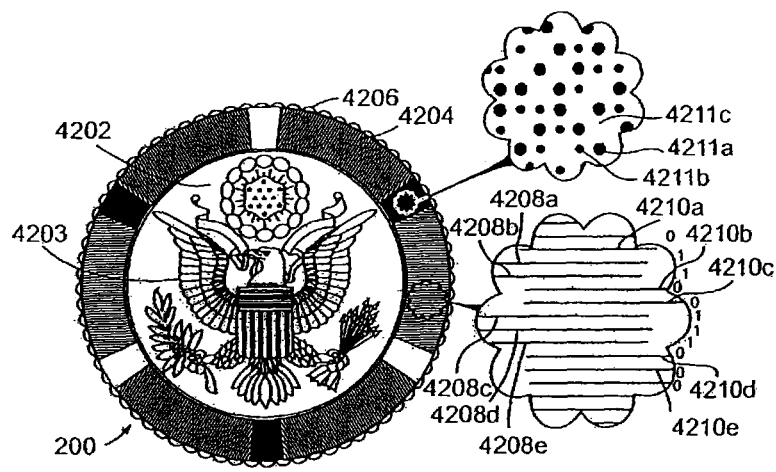

FIGS. 107A and 107B show one example configuration for seal 4200. In this example, seal 4200 may include a center portion 4202, an outer portion 4204 and a border 4206. Center portion 4202 may bear a distinctive image to make the seal immediately recognizable. In this example, center portion 4202 is the great seal of the United States—and would thus be appropriate for affixing on U.S. Government official documents. Other appropriate images for seals might include, for example, a family coat of arms, a printed or holographic photograph image of the signer, a predetermined complicated pattern, or the like. Besides being distinctive, the image 4203 within center portion 4202 should preferable be complex and difficult to copy—making seal 4200 less prone to counterfeiting. Similarly, border 4206 may be an ornate pattern that might show discontinuities if printed or copied using inferior equipment.

In this example, outer portion 4204 is used for encoding digital information. FIG. 107A shows an example "template" seal before this additional encoding information is added. FIG. 107B shows an example of a completed seal in which many small lines have been added to at least portions of the outer ring 4204 of the seal 4200. Appliance 600 could "complete" the FIG. 107A template seal to create a completed seal shown in FIG. 107B based on one or more electronic controls 4078. FIG. 107B also shows a close-up view illustrating that the line pattern can have variations that encode digital "bits" of information. In this particular example, lines 4208 radiating outwardly from center portion 4202 may encode a digital "1" value, while lines 4210 radiating inwardly from border 4206 may encode a digital "0" value. As another example, the selective use of large dots 4211a, small dots 4211b and no dots 4211c could encode digital values. Any kind of information (e.g., numerical, text, graphics, sound, or any combination of these) may be encoded into the image of seal 4200 using this technique. The particular line images shown in FIG. 102B are illustrative only—other visual patterns (and/or steganographic techniques) may be used to encode digital information into the seal's image.

System 4050 can recover the encoded information by scanning and analyzing an image of item 4054 in either digital or printed form. In one embodiment, system 4050 can create electronic controls 4078 based at least in part on this information it obtains from seal 4200.

Figure 108:
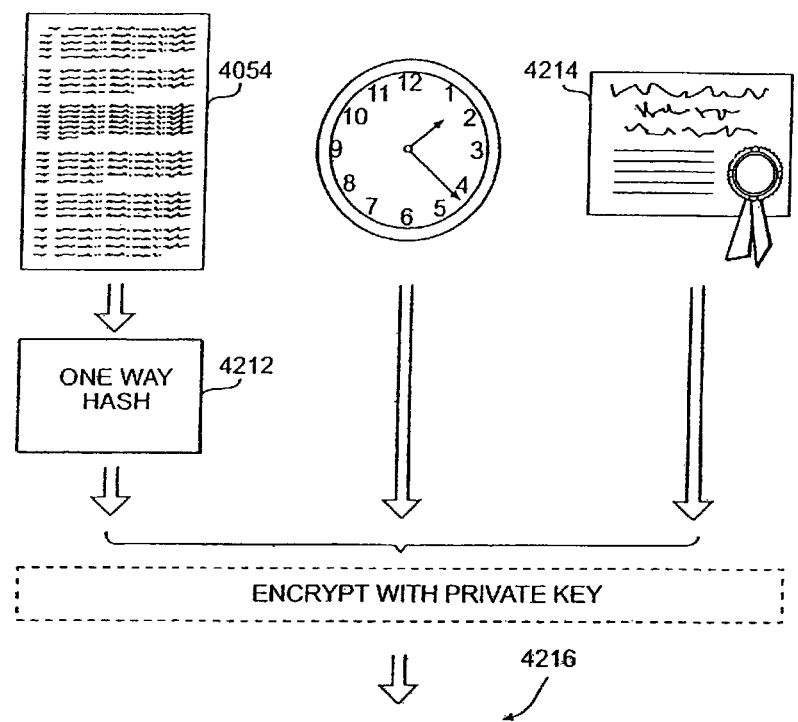
FIG. 108 shows an example process for creating digital information for encoding into an item or item seal.

FIG. 108 shows one example of the type of "digital signature" information that might be encoded into the seal 4200's image. In this particular example, the text and/or graphics contents of item 4054 can be transformed into a compact value using a special cryptographic function called a "one-way hash" 4212. The resulting number may be "concatenated" (i.e., put end to end) with other information such as, for example, a time value and a certificate value or number obtained from a "digital certificate" 4214. The time value may be obtained from a real time clock 528 incorporated in secure processing unit (SPU) 500 shown in FIG. 9. The resulting string of digital information may then be encrypted with the private cryptographic key of sender 4052, the contracting party 4070 and/or system 4050. The resulting digital signature value 4216 may be used to encode some or all of the seal 4200's pattern.

The hash function may operate on a document in its image form, or its text equivalent (producing two different hash values). In addition, the text version of a document may be pre-processed before operation of the hash function to simplify verification of a document if it must be rekeyed into a verification system (e.g., in the case where all electronic copies of a document have been lost). Since cryptographically strong hash functions are extremely sensitive to the slightest change in data (yielding different values if, for example, a tab character is keyed as a series of spaces) this pre-processing may normalize the document by, for example, discarding all font and formatting information and/or reducing each occurrence of "whitespace" (e.g., spaces, tabs, carriage returns, etc.) into a single space. If the same pre-processing is applied to a retyped version of the document before the hash function is applied, it will have a much higher likelihood of yielding the same hash value if the documents are substantively the same.

System 4050 may later recover this information by digitally and/or optically scanning the image of item 4054 and analyzing the pattern of seal 4200 to recover digital signature 4216. System 4050 may then apply the public key corresponding to the private key used to encrypt the information—thereby recovering the hash, time and digital certificate, while at the same time authenticating the information as having been encrypted with the relevant private key(s). In this example, System 4050 also has the original document image 4054 available to it, and may therefore duplicate the one-way hash process 4212 and compare the hash value it gets with the hash value encoded within seal 4200. Mismatches indicate that the seal 4200 may have been copied from another document and does not apply to the document currently being analyzed.

Other types of digital identifying information that system 4050 might affix to the document include, for example:

digital information generated by algorithms (such as error correcting algorithms for example) including certain kinds of unique transmittal information or certain unique pseudo-randomly generated codes that might be combined with transmittal information and/or information representing transmittal content, such that representation of such a collection of relevant transmittal related information may uniquely and reliably confirm that a given document (or other information) sent by sender 4052 is actually the exact document sent; or Reed-Solomon codes or other error correcting or other algorithms relying on formalisms within abstract algebra for establishing a correct sequence of bits; or MD4 or other message digest algorithms employing, for example, one-way hash algorithms that attempt to uniquely identify a sequence of bits that is highly sensitive to content and ordering of bits in a sequence.

Example Electronic Appliance

Figure 109:
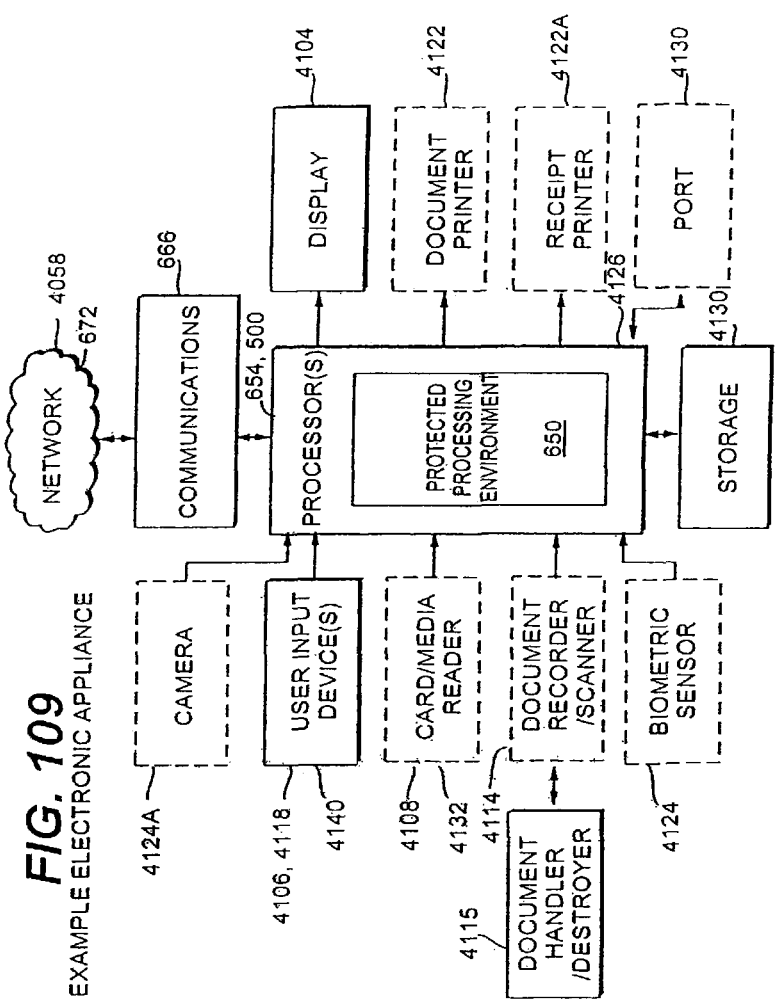
FIG. 109 shows an example electronic appliance.

FIG. 109 shows an example detailed architecture for electronic appliance 600. In this example, appliance 600 may include one or more processors 4126 providing or supporting one or more "protected processing environments" (PPE) 650 (e.g., SPEs 503 and/or HPEs 544) shown in FIGS. 6-12 and 62-72). Protected processing environment 650 may, for example, be implemented using a secure processing unit (SPU) 500 of the type shown in FIG. 9 and/or may be based on software tamper-resistance techniques or a combination of software and hardware. As described above in detail, protected processing environment 650 provides a secure, trusted environment for storing, manipulating, executing, modifying and otherwise processing secure information such as that provided in secure electronic containers 302. In this particular example, secure containers 302 may not be opened except within a protected processing environment 650. Protected processing environment 650 is provided with the cryptographic and other information it needs to open and manipulate secure containers 302, and is tamper resistant so that an attacker cannot easily obtain and use this necessary information.

Electronic appliance 600 may be any type of electronic device such as a personal computer, intelligent kiosk, set top box, or dedicated stand-alone communications appliance—just to name a few examples. Processor 4126 is connected to

- one or more user input devices 4106, 4118, 4140;
- card/media reader 4108, 4132;
- document reader/scanner 4114;
- biometric sensor(s) 4124;
- display 4104;
- document printer 4122; and,
- optionally, a receipt printer 4122A for printing receipts of the type shown in FIG. 92A.

A document handler/destroyer 4115 may be provided to feed multi-page documents into document reader/scanner 4114 and—in one embodiment—to destroy documents to ensure that only one "original" exists at a time. Such controlled document destruction might, for example, be useful in allowing sender 4052 to deliver an original stock certificate to a transfer agent. The sender 4052 could insert the original certificate into appliance 600—which may scan the original to convert it to digital information (e.g., through use of OCR technology), confirm delivery, and then destroy the original paper version. Secure controls 4078 could be used to ensure that only a single original ever exists on paper.

Figure 7:
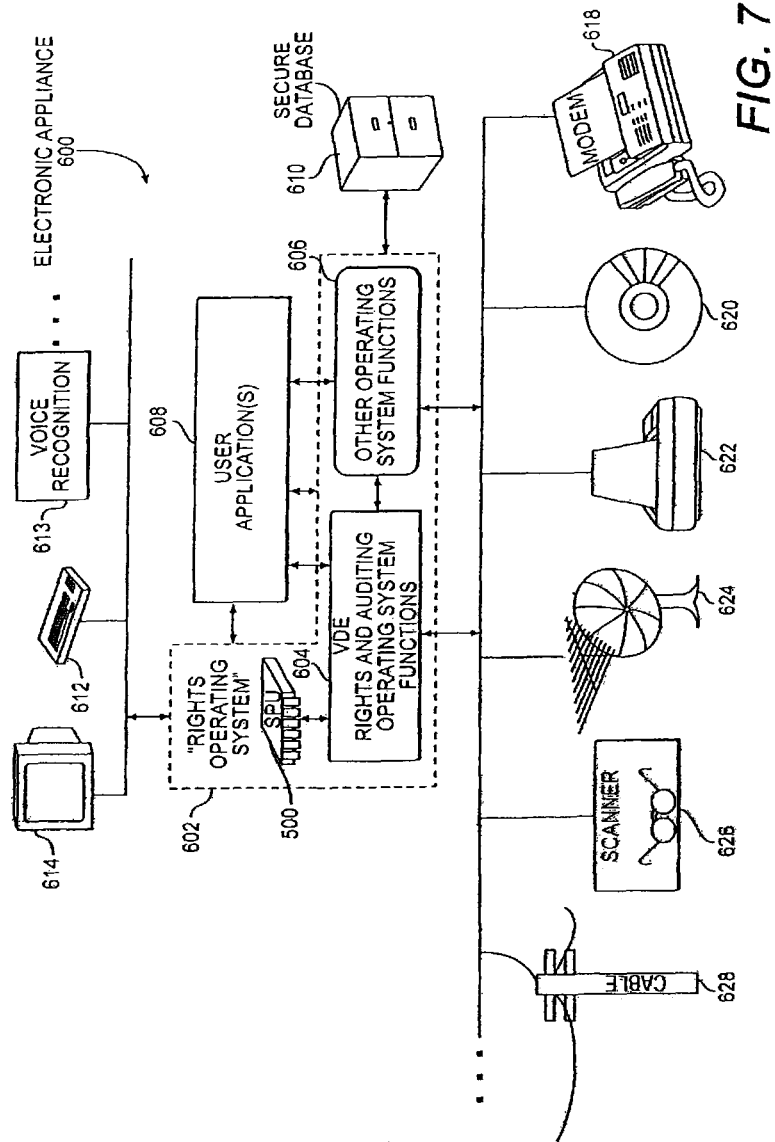
FIG. 7 shows an example of an electronic appliance.
Figure 8:
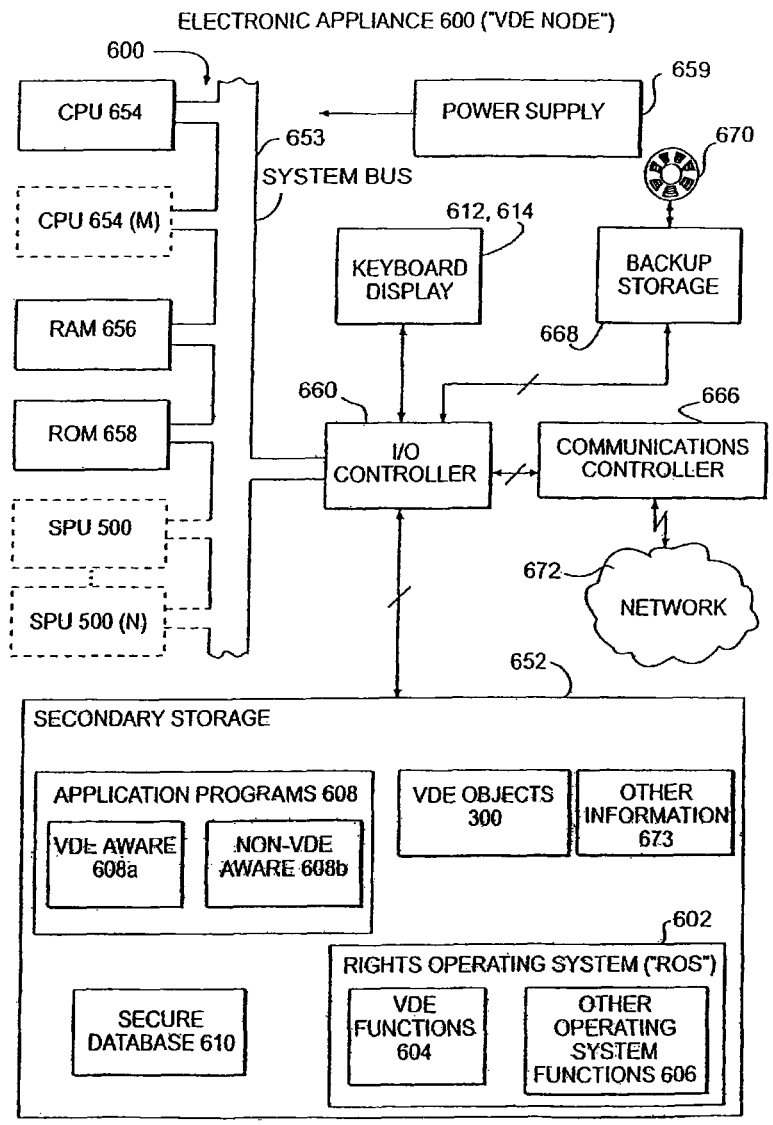
FIG. 8 is a more detailed block diagram of an example of the electronic appliance shown in FIG. 7.

Processor 4126 is also connected to secure and/or insecure digital or other storage 4130 (such as, for example, magnetic disks, random access memory, optical disks, etc.), and to a communications device 666 permitting the processor to communicate electronically with other processors or devices via an electronic network 4058 (672). In one example, appliance 600 may be provided with additional and/or different components such as shown in FIGS. 7 and 8.

Example Process to Send an Item

Figure 110:
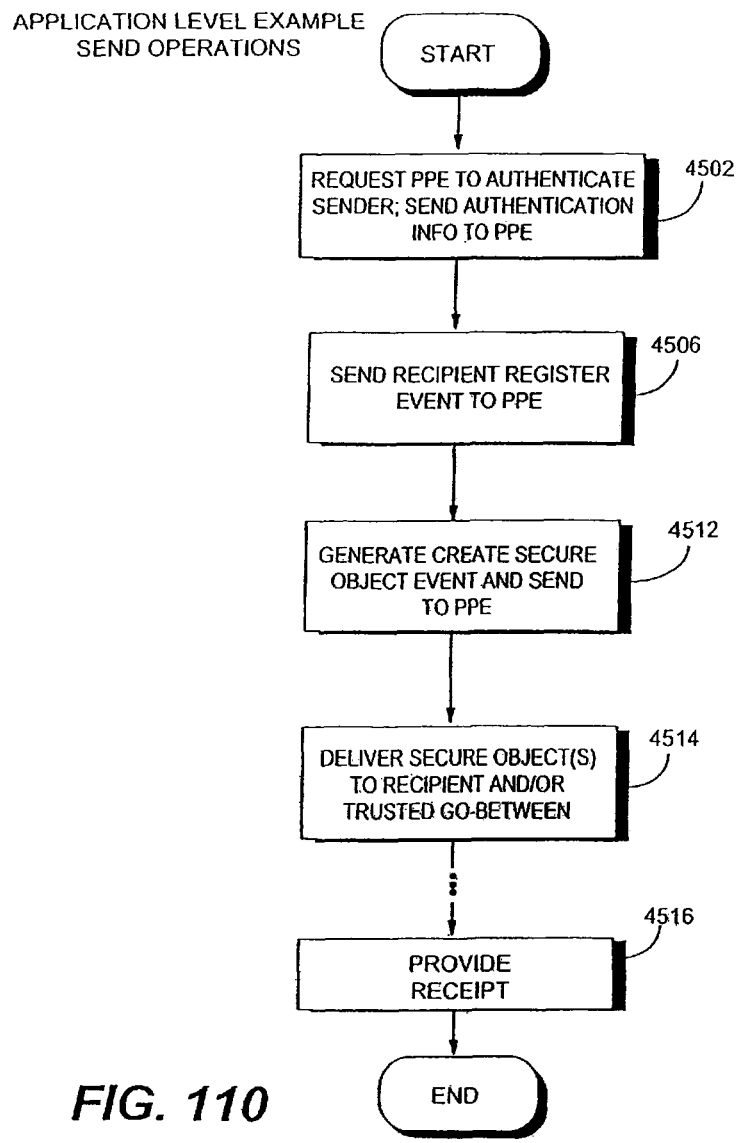
FIGS. 110-113 show example processes for securely sending an item.

FIG. 110 shows example steps electronic appliance 600 may perform to send an item such as item 4054. Initially, electronic appliance 600 must be created or established at the user site (or the user must go to electronic appliance as shown in FIG. 88). This establishing process may include, for example:

- node initialization (FIGS. 64, 68, and 69), and updates (FIG. 65),
- locally registering any rules and controls associated with the user's rights,
- locally registering any rules and controls associated with any class-based rights, including, for example, any provision for integration of the item sending process into a user application (e.g., to be listed as a "printer" under a print set up in a Windows or other personal computer software application); and
- the establishment of any necessary certified user identities, which may include, for example, the use of a wider purpose certified identity and/or the certified use of a non-certified identity (such as some network name service identifications) or certified delegation of use of a certified identity.

Once the appliance 600 has been properly initialized, the first step in a send process 4500 may be to authenticate the identity of sender 4052 (FIG. 110, block 4502). This authentication step 4502 may be performed in a variety of ways such as, for example:

- use of biometric sensor 4124 to provide a retinal, iris, fingerprint, thumbprint, or other scanning/matching;
- the use of a voice print for identity verification;
- hand-written signature capture and biometric analysis;
- requiring the user to present an identification card 4109 (which may be a smart card, magnetic card, or other storage information) that contains information about the sender's identity;
- capture and pattern recognition of a photographic image of the sender's face;
- requiring the sender to respond orally and/or via other user input devices 4106, 4118, such as keyboards or the like to provide "secret" information such as Mother's maiden name, special passwords or code words, or other information uniquely known to the sender;
- any combination or subcombination of these various techniques.

In this particular example, the authentication step 4502 may involve an application program executing on appliance 600 requesting authentication support from protected processing environment 650—for example, sending to the protected processing environment an authentication "event" requesting the protected processing environment to authenticate the sender and providing authentication information to the protected processing environment (FIG. 110, block 4502) as a basis for the authentication.

Figure 111:
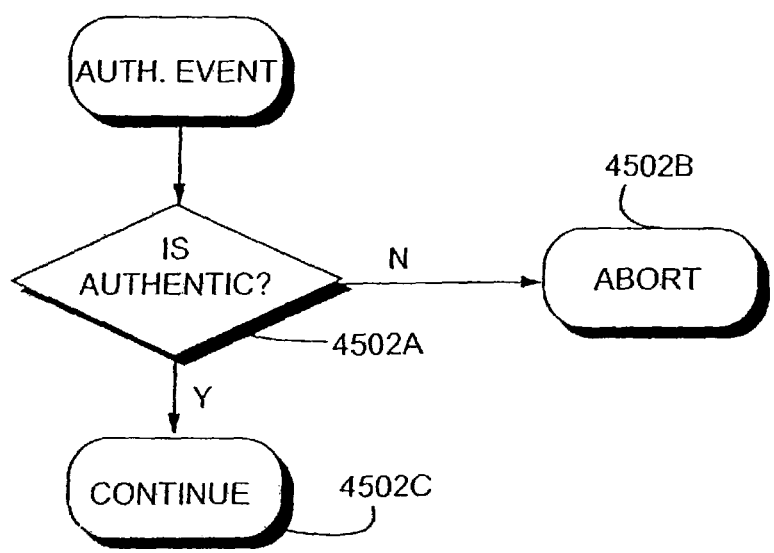

FIG. 111 shows example steps that protected processing environment 650 may perform in response to receipt of an authentication event. The example steps shown in FIG. 111 are control set dependent—that is, that are typically based on one or more electronic control sets previously delivered to the protected processing environment 650 during the registration process described above.

In this particular example, the protected processing environment 650 may examine the authentication information provided to it (e.g., the output of biometric sensors, password information, information read from an identity card, etc.) and determine (based on methods provided in one or more electronic control sets) whether it has sufficient basis to conclude with a requisite, specified degree of assurance that the sender is who she says she is (FIG. 111, decision block 4502A). Processes identified within the control sets operating within the PPE650 may perform these functions using resources provided by the PPE—providing an important degree of programmable, general purpose behavior.

The nature and characteristics of this sender authentication test performed by PPE 650 may vary depending on the particular electronic control set being used—as dictated by particular applications. As discussed above, in situations that have legal significance in which non-repudiation is very important, PPE 650 may impose a relatively stringent authentication test. Other, more routine situations may use control sets that impose less stringent authenticity checks.

The PPE 650 may abort the process if it decides there is insufficient information to form a trusted belief of authenticity and/or if it determines that the sender is not who she says she is (FIG. 111, block 4502B). PPE 650 may indicate/authorize that the process may continue if the authenticity check is successful (FIG. 111, "Y" exit to decision block 4502).

Figure 112:
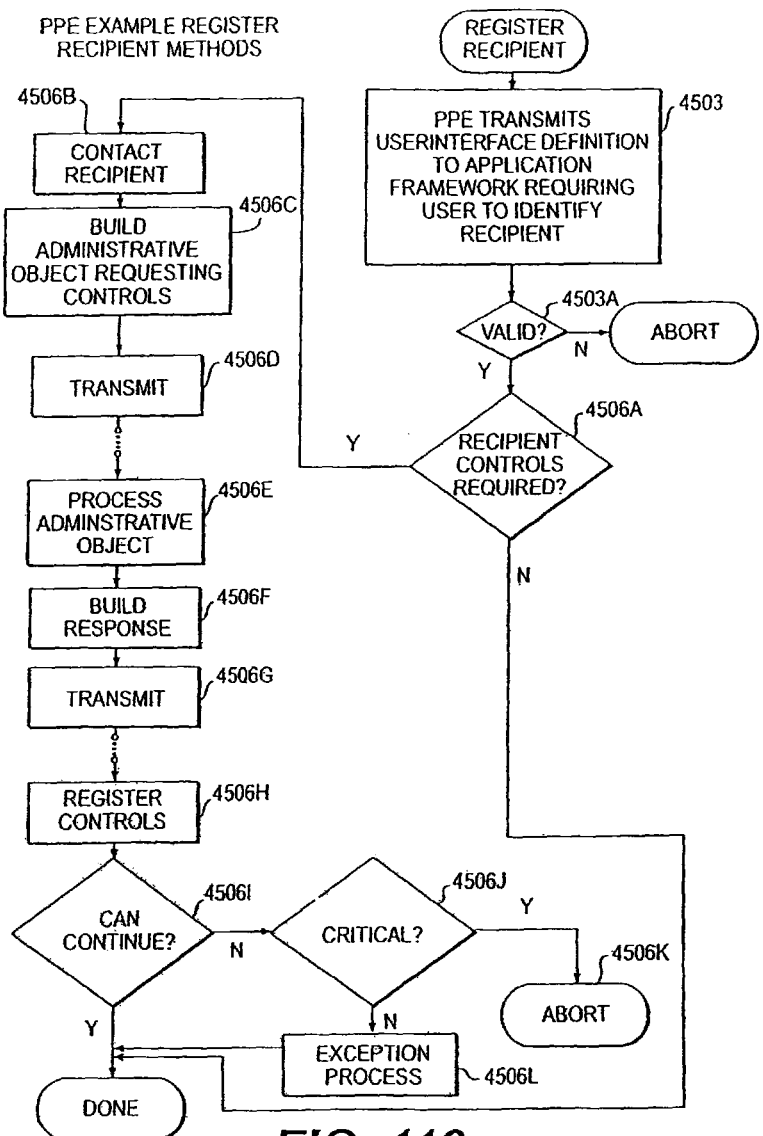

The sender's appliance 600 may next need to identify or "register" the intended recipient(s) 4056 (FIG. 110, block 4506). In this particular example, the step of registering the intended recipient(s) involves generating a "register recipient" event and sending this event to protected processing environment 650. Upon receiving this "register recipient" event, protected processing environment 650 may—based on one or more methods within a corresponding electronic control set—perform certain steps required to coordinate its activities with the intended recipient's electronic appliance 600—including, for example, contacting the intended recipient. Example steps are shown in FIG. 112.

Why might the sender's PPE 650 need to contact the recipient before sending the item? The answer is that it may be necessary or desirable for the sender 4052 and the recipient 4056 to negotiate and/or agree as to the appropriate electronic controls that should apply. In an item transmission scenario, for example, such an "agreement" might work out who is going to pay for the delivery service, which recipient appliance (home or office) the document is to be delivered to, what kind of return receipt is acceptable to both parties, etc.

The PPE 650's "register recipient" event processing may, for example, allow the proposed recipient to deliver a set of controls to the sender's system that defines the parameters of receipt. Some general purpose systems may use the default settings in the kiosk or other transmission station. The address itself may provide an indication to the transmitting station as to whether it may or must request a set of control information from the recipient prior to transmission.

More complicated scenarios may require further coordination. For example, an option to destroy the original item at the send end and recreate it at the recipient's end (e.g., in the case of the stock certificate mentioned earlier) is both a send option and a receipt option. Similarly, options pertaining to procedures for electronic contract execution typically will require pre-agreement from both the sender and the recipient (i.e., from all parties to the contract). In these cases, there should be some menu options that are driven by the address of the proposed recipient—and there may be an electronic (or humanly-driven) negotiation to resolve conflicts.

The PPE 650's "register recipient" processing may also require input or other interaction from the user. FIGS. 90A and 90B show a relatively straightforward menu-based user interface that may be used to elicit information from sender 4052. In a more advanced example, DTDs 1108 (see FIG. 23 and following) associated with one or more load modules 1100 may be used to control user interfaces (e.g., the "pop up" as shown in FIGS. 72A-72D)). In this model, the user interface does not contain any specific visual elements (e.g., menus, buttons, data entry fields, etc.). Instead, the pop up contains application "framework" code. The framework code in this style of user interface uses a structured input stream (DTD 1108) from the PPE 650 to create the visual elements of the interface, and optionally the allowed values of certain fields. This structured data stream may (like other control structure DTDs 1108) be based on SGML, for example.

This dynamic user interface approach allows control structures to be more "self describing" in the sense that application programs do not need to know ahead of time (i.e. when they are written) all of the fields, values, etc. for the structures. This gives structure designers more freedom in how their controls are designed. Given a rich enough grammar in the DTD 1108, designers needn't concern themselves with whether application programs will have the ability to manage the interaction with a user regarding their structures. This capability can also be used to create controls that support the electronic negotiation process shown for example in FIGS. 76A-76B.

FIG. 112 shows example steps that may be performed by protected processing environment 650, based on one or more electronic control sets, in response to receipt of a "register recipient" event. In this example, PPE 650 first uses the dynamic user interaction discussed above to have the sender identify the proposed recipient(s) (FIG. 112, block 4503). For example, PPE 650 may request sender 4052 to provide various types of identification information corresponding to intended recipient(s) 4056 such as, for example, name; physical address; electronic address; public key; and the like. PPE 650 may check this user input for validity (decision block 4503A), and may abort the process (or perform some other exception handling routine) if the input is not valid (e.g., it falls outside of the permissible scope as defined by associated electronic controls). PPE 650 may also, at this time—with or without input from sender 4052 as may be necessary—identify any other information required for identifying recipients, such as for example, any preset template(s), class identification requirements, and/or other automation factors and/or workflow assignments, redistribution, and/or content interaction parameters.

The PPE 650 then may determine whether it needs to request and obtain a control set from the recipient to proceed (FIG. 112, decision block 4506A). The PPE 650 may have obtained the required control set(s) during a previous transaction, the sender may supply the required control set, or the PPE may in some cases be able to use a "default" control set it already has so that no additional control set might be required ("N" exit to decision block 4506A, FIG. 112)—and send processing may proceed to the next step.

Figure 12:
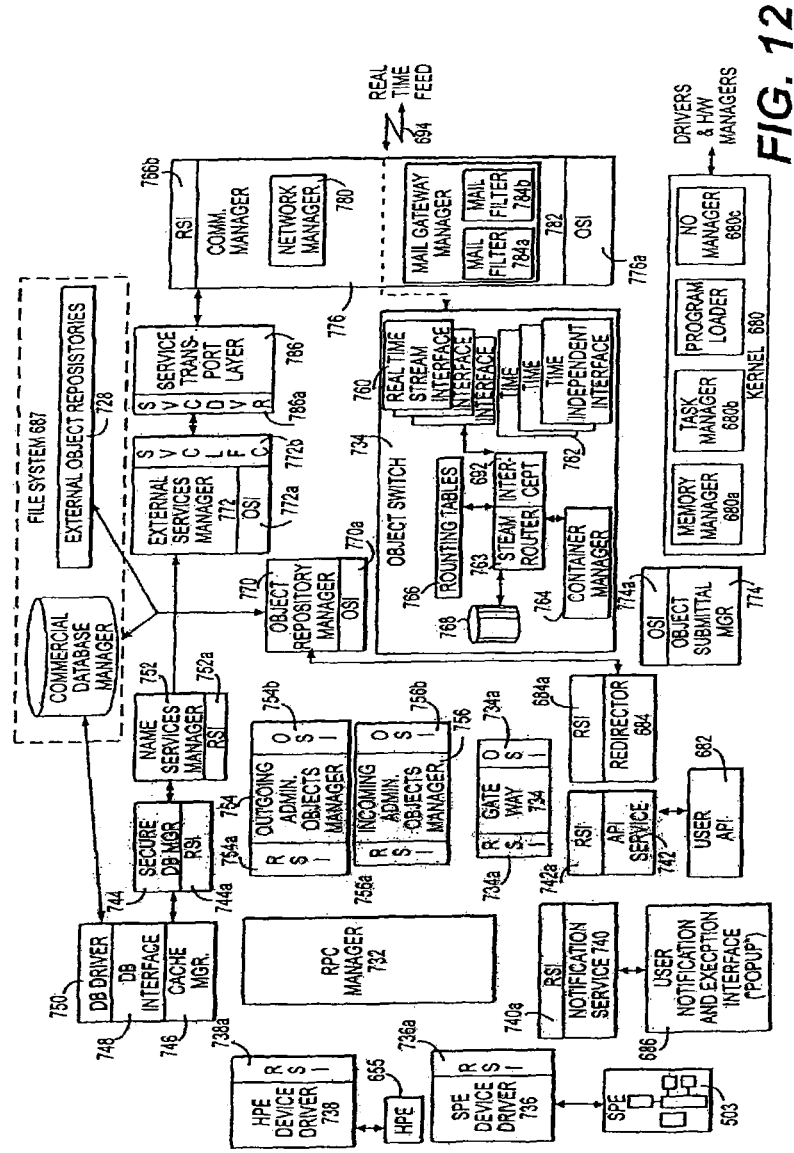
FIG. 12 is a more detailed diagram of an example of the Rights Operating System shown in FIG. 10.
Figure 12A:
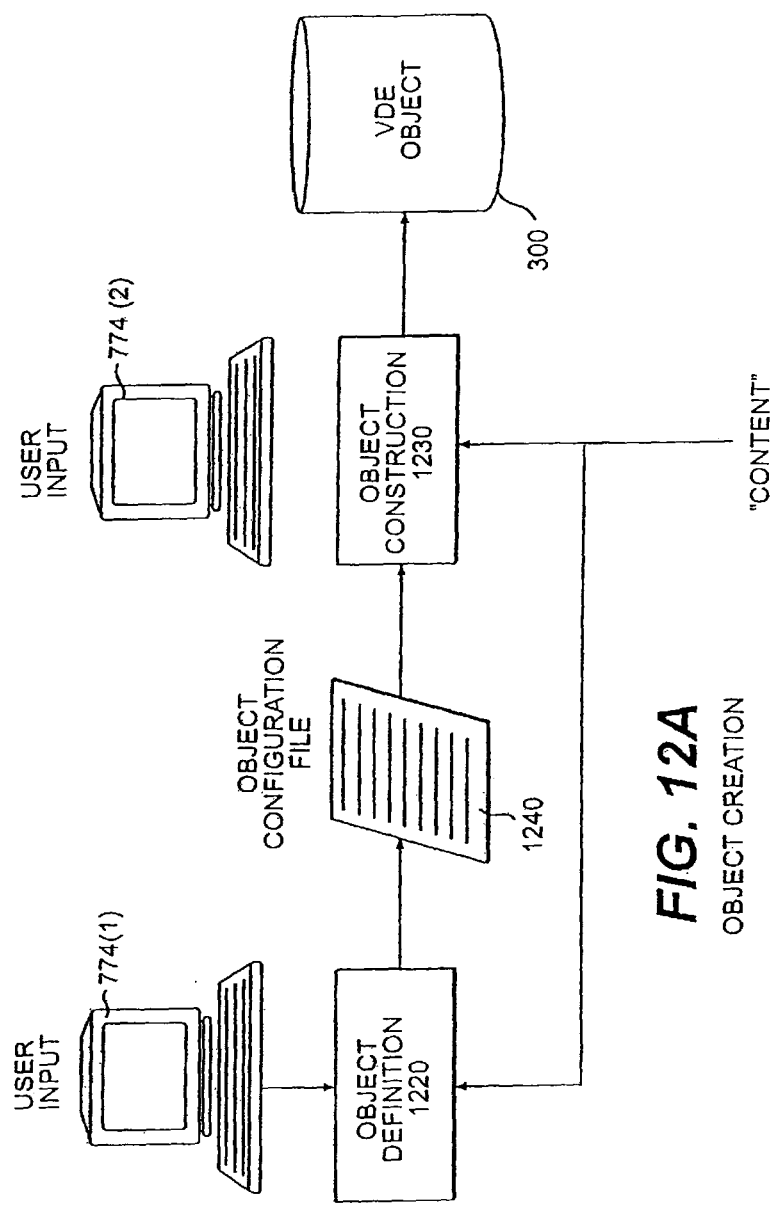
FIG. 12A shows an example of how "objects" can be created.
Figure 13:
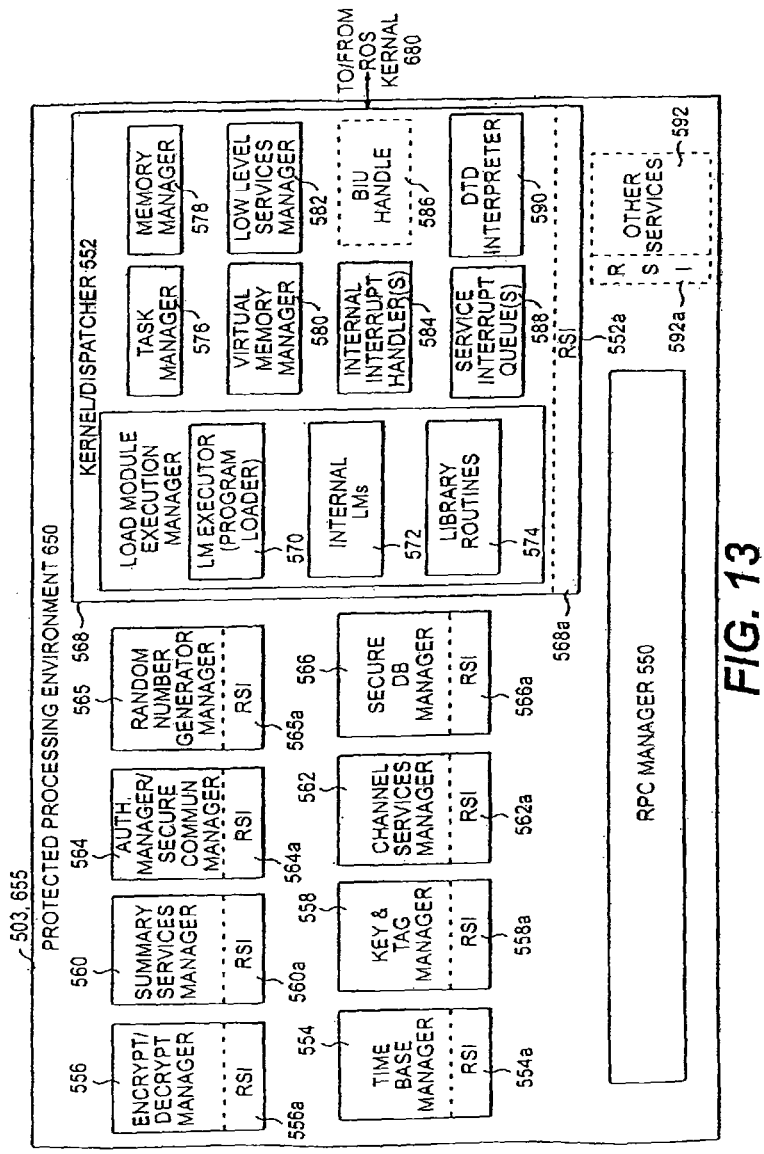
FIG. 13 is a detailed block diagram of an example the software architecture for a "protected processing environment" shown in FIG. 12.
Figure 14B:
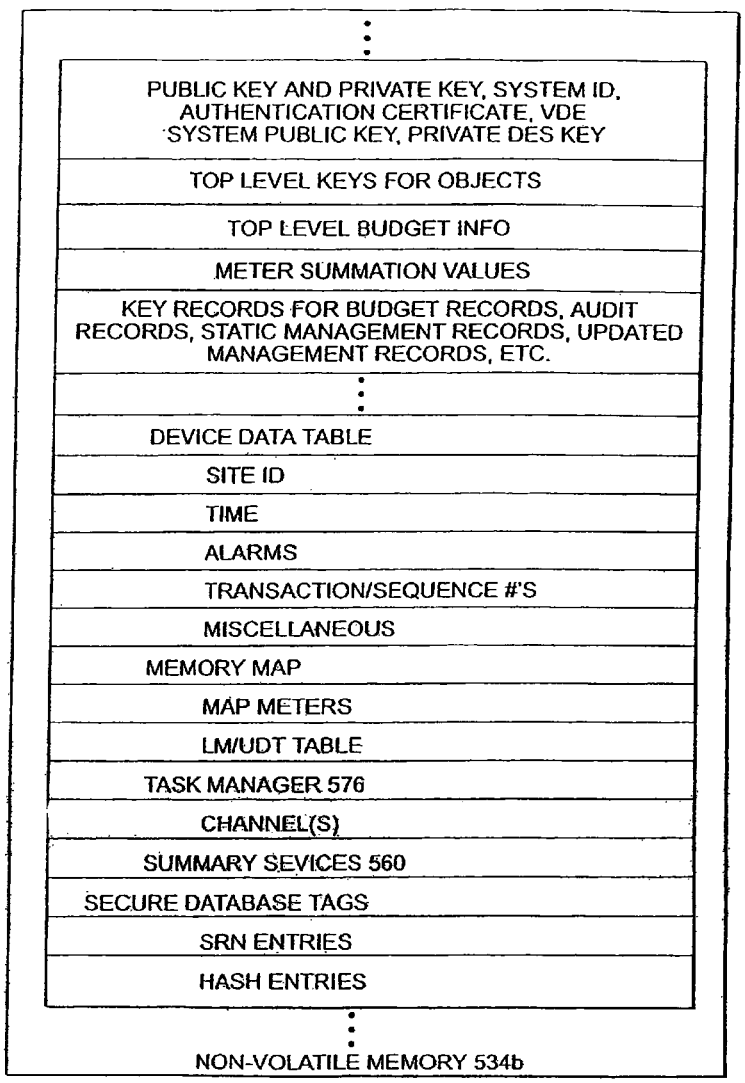
Figure 14C:
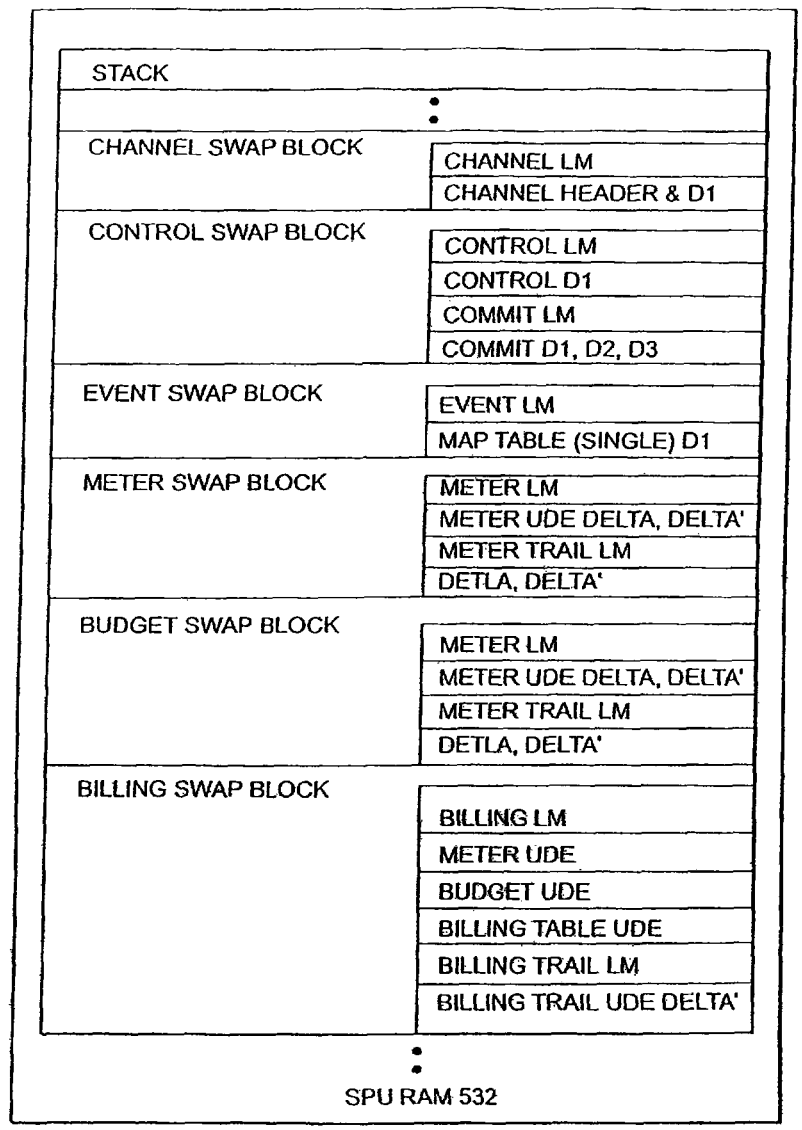

On the other hand, if PPE 650 must get a recipient's control set (FIG. 112, "Y" exit to decision block 4506A), the PPE 650 may contact the intended recipient's electronic appliance 600 and/or a control set archive (FIG. 112, block 4506B) over network 672 for example. PPE 650 may employ secure directory/name services as shown in FIG. 12 (and/or as described in the above-reference Shear et al. patent disclosure) to obtain sufficient information for sending and addressing the item to the intended recipient(s) 4056.

Once PPE 650 determines how to contact the recipient, it may construct an administrative object 870 (see FIG. 21) requesting the appropriate recipient controls (FIG. 112, block 4506C), and send the administrative object to the recipient's PPE 650 or other appropriate VDE node that can supply the information (FIG. 112, block 4506D).

The PPE 650 within the recipient's electronic appliance 600 or other responding VDE node may process administrative object 870 upon receiving it (FIG. 112 block 4506E)—constructing a response (e.g., a responsive administrative object containing the requested or require control sets) (FIG. 112 block 4506G) and sending it to the sender's PPE 650.

The sender's PPE 650 may register the received controls (FIG. 112, block 4506H) upon receiving them from the recipient's PPE 650. The sender's PPE 650 may then determine, based on the received controls, whether it can continue (FIG. 112, decision block 4506I). If there is a problem with the controls (e.g., they are for some reason unacceptable to the sender, they are not valid, etc.), the sender's PPE 650 determines whether the problem is critical (FIG. 112, decision block 4506J). If the problem is critical, PPE 650 aborts the whole process ("Y" exit to FIG. 112 decision block 4506J).

Figure 113:
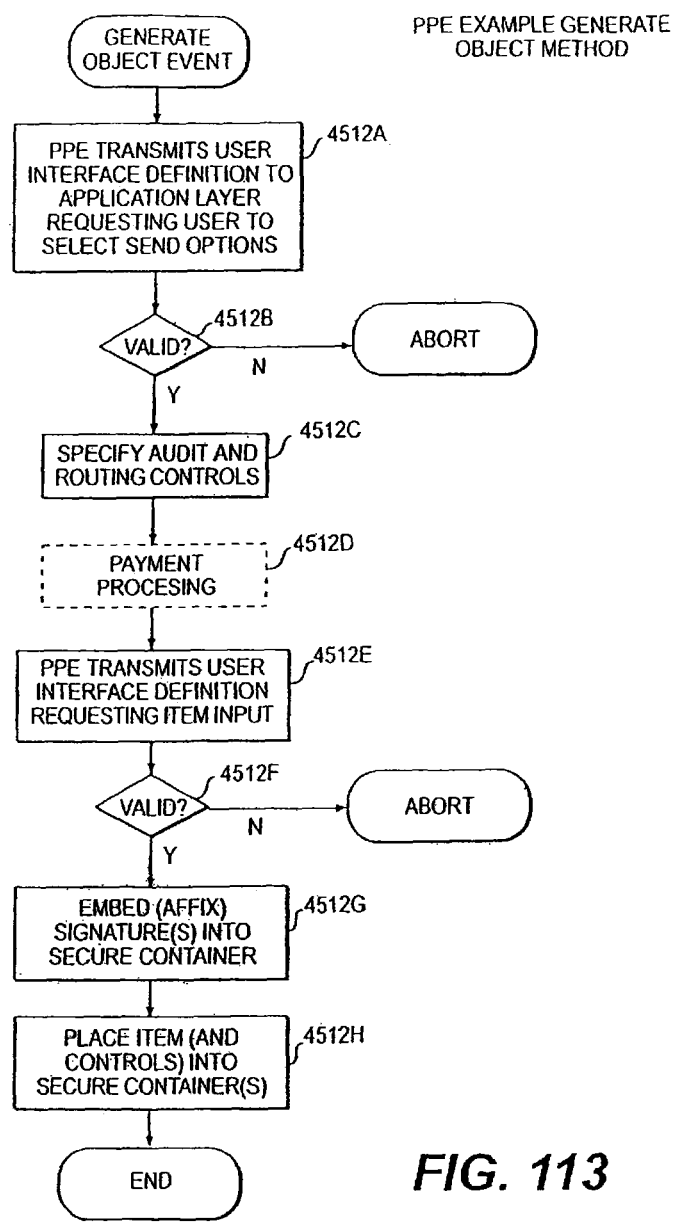

If the problem is not critical ("N" exit to FIG. 112 decision block 4506J), PPE 650 performs an exception process (FIG. 112, decision block 4506L) to handle the problem and then waits for the next event—which in this particular example may be a "generate secure object" event (see FIG. 110, block 4512). FIG. 113 shows example steps the PPE 650 may perform in response to this "create secure object" event based on the control sets registered in accordance with step 4506, for example.

Referring to FIG. 113, the PPE 650 may use the dynamic user interaction techniques described above to request sender 4052 to select between send options and to otherwise specify the type and level of service he or she desires (FIG. 113 block 4512A; see FIG. 91A block 4090A). Generally, sender 4052 may be required to select between various options; each option may carry with it a certain price. The following are example options the sender 4052 may select from:

Document Options
Signature Options
  a. digital
  b. visual
  c. both
Seal options
  a. visual
  b. hidden (steganographic)
  c. both
Seal options
  a. Insert third party seal
  b. Complete sender seal
  c. Provide handwritten signature
  d. Provide steganographic electronic fingerprint
  e. Provide visual electronic fingerprint
Privacy/Use Options
  a. modify/no modify
  b. partial disclosure
Item Destruction Option
  a) destroy paper original
  b) destroy digital "original"
Delivery Options
Receipt Options
  a) receipt to send
  b) receipt to sender and trusted go-between
  c) receipt to trusted go-between
  d) no receipt requested
Integrity Guarantee Options
  a) no modifications permitted (final version, for example)
  b) no modifications other than signing permitted
  c) no cut, paste, excerpting permitted
  d) other document (item) controls
Privacy Options
  a) public transaction
  b) authorization list
  c) direct parties to transaction (sender, receiver, etc.)
  d) direct parties plus transaction authorities (see Shear et al.)
Authentication Options
  a) type and/or "strength" of recipient authentications (e.g., biometric, password, other)
  b) strength requirement
Delivery Type
  a) direct delivery
  b) store and forward
  c) permit proxy delivery (registered or certified)
Contract Execution Options
send offer
  a) single recipient
  b) multiple recipients
send acceptance
propose modification
add comments
negotiate (with our without saving negotiation history)
execute contract
degree/type of non-repudiation evidence required
Teleconferencing Options
Name of party
Address of party (if known)
Secure directory lookup (if address unknown)
Quality (speed) of connection
Payment methods (if different for teleconference)
Advanced options
Teleconference protocol
Teleconference network carrier
Trusted Go-Between Options
Contract settlement options
Audit options
Archival options
  a) archive digital "original"
  b) archive "sent" audit record
  c) archive "received" audit record
  d) archive negotiation history audit record(s)
Notary options
  a) notarize digital "original"
  b) notarize sub-sections of digital "original"
  c) notarize "sent" audit record
  d) notarize "received" audit record
  e) notarize negotiation history audit record(s)
Negotiations
  a) Automated negotiations enabled (yes/no)
  b) Specific human go-between (if yes, who)
Length of time to store records (days, months, years, forever)
Contents inaccessible to trusted-go-between (automated service only)
Payment methods
  a) Mastercard
  b) Visa
  c) American Express
  d) ACH
  e) EDI X.12
  f) other In the dynamic user interface model, for example, the user options associated with a contract offer (which are used to create electronic controls associated with the electronic transaction) might relate to a suggested addition, modification, deletion, etc. to an existing item 4054. If the VDE-aware applications used by the participants included word processing capabilities (given that the negotiation has a text based portion), for example, the VDE protected content in the offer could be represented as a "redline" or "revision marking." The controls could further include aspects that manage modification of content in a controlled way (e.g., see FIG. 51, and FIGS. 51*a-f*). A more complex example might include several of these modifications, insertions, deletions, etc. in a single offer to represent a "horse trading" offer indicating a willingness to make a series of changes at once, for example, a willingness to pay more money in exchange for removing a restrictive clause.

The options (and associated controls) associated with a contractual offer may also permit the offerer and/or the recipient to add comments to the offer before it is sent and/or accepted. These comments and/or some or all of the negotiation history may be recorded and managed using the audit capabilities of VDE and/or one or more repositories for VDE objects.

In this example, the PPE 650 checks the user input for validity (FIG. 113, decision block 4512B) based on applicable controls, and may abort the process (or provide other suitable exception handling) if the input is not valid.

PPE 650 may next specify any audit and routing controls based on the user input it has received and/or the recipient controls it has registered (FIG. 113, block 4512C). As mentioned above, object 300 may include one or more control sets 4073 (contained in one or more PERCs 306 for example) that specify the type of routing and auditing to be performed in connection with sending an item 4054 (and also providing one or more control methods for use in auditing and/or routing. Step 4512C typically also involve creating electronic controls specifying permissions and/or restrictions relating to the use of item 4054. In fact, the electronic control set(s) 4078 created by block 4512C may, for example, specify a variety of different document delivery or other characteristics such as, for example:

document delivery options selected by sender 4052;
authentication requirements applicable to intended recipient(s) 4056;
what use, if any, is to be made of a third part electronic go-between 4700 and what the third party electronic go-between is authorized to do and is restricted from doing;
other document flow requirements such as direct, pass through or round robin (interactive);
applicable payment methods;
restrictions concerning use of the document (e.g., whether or not the document can be modified, whether or not the document can be passed along to another party, other restrictions concerning document use and/or privacy); and
other item chain of handling and/or control restrictions.

Control set 4078 can be used to enforce a secure chain of handling and control on document container 302 and/or its contents. This secure chain of handling and control may be used, for example, to specify delivery, routing, auditing or other parameters as discussed above.

Figure 113A:
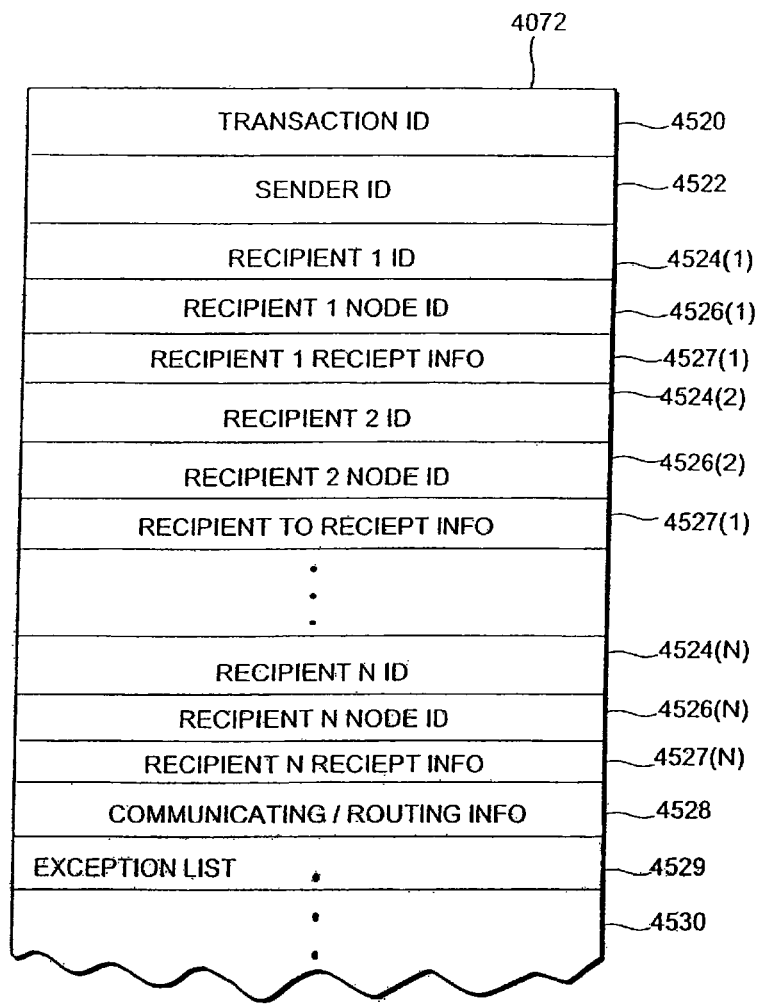
FIG. 113A shows an example routing slip data structure.

In performing step 4512, appliance 600 may also create routing slip 4072 (see FIG. 103) and a template for return receipt(s) 4066. In one example, items 4066, 4072, may be embodied within electronic control set 4078 and expressed by the various elements within the electronic control set. FIG. 113A shows an example of a routing slip 4072 data structure that may be maintained within secure electronic container 302 (e.g., as one or more DTDs 1108 in connection with one or more load modules 1100—see FIG. 23). This routing slip data structure 4072 may include, for example:

a transaction ID field 4520;
a sender ID field 4522;
a recipient 1 ID and node ID field 4524 (1), 4526 (1), respectively, and a corresponding recipient receipt information field 4527(1);
a recipient 2 ID and node ID field 4524 (2), 4526 (2), respectively, and a corresponding recipient receipt information field 4527(2);
a recipient N ID and node ID field 4524 (N), 4526 (N), respectively, and a corresponding recipient receipt information field 4527(N);
communication/routing information 4528;
exception list 4529; and/or
other information 4530.

Exception list 4529 may indicate "named exceptions" (e.g., communications failure, line busy, refused receipt, refused payment request, etc.) paired with a list of responses (e.g., try again, cancel entire transaction, send report, invoke event in PPE) and data parameterizing the responses (e.g., number of retries, list of recipients of cancellation notices, report recipients, control information identifier and additional parameters for control use and/or invocation; respectively).

Recipient receipt information field 4527 for each recipient may indicate, for example, the nature of the receipt required, and the recipients of that receipt. A receipt "template" may be included in the container, may be referenced in an archive, or may be named out of a set of default templates stored in each appliance.

The routing slip 4072 (see FIG. 103) associated with the document(s) in the container may be integrated with control information 4078 reflecting chain of handling and control relationships among recipients. For example, the control information 4078 associated with the item(s) 4054 may be correlated with fields of the routing slip 4072. Successful completion of a receipt may qualify a specific user to become eligible to use a subset of the control information 4078 that permits them to make changes in a portion of the item, and describe their own control information for the changes, so long as this control information does not provide further recipients with the right to modify the new material. The control information 4078 may further specify that no changes may be made to an item 4054 until one or more specified recipients has read the item, and (through use of reciprocal controls as show in FIGS. 41a-41d for example) indicated their approval of further changes.

In another example, an entire class of users may be permitted to access the documents (through the presence of a certificate indicating their membership in a class, for example), and the routing slip 4072 may be used to record who has handled a particular version of the document. Through use of chain of handling and control techniques, the presence of certain users on the routing slip may permit further control information to be specified by a user. For example, after an analyst's research report has been reviewed by three other analysts, a manager may be permitted to modify the control information associated with the report to permit transmission to "public" users.

Electronic controls 4077 may also include one or more control methods specifying the type of audit information that is to be maintained in connection with the electronic transaction. This audit information may be used for constructing a receipt 4066, to provide evidence preventing repudiation, and for a variety of other functions. Such audit information may be maintained exclusively within the sender's appliance 600, it might be maintained exclusively within the recipient's appliance secure database, it might be maintained exclusively within the trusted go-between 4700's appliance 600 secure database, or it might be maintained in a combination of any or all of these. Additionally, the audit information may or may not be delivered with item 4054 depending on the particular objectives. A usage clearinghouse 200c as described above in connection with FIG. 1A and/or as disclosed in the Shear et al. patent disclosure may be used to track the audit information based on event-driven or periodic reporting, for example. Audit records could be transmitted to a usage clearinghouse (or to a trusted go-between 4700) by an automatic call forwarding transmission, by a supplemental call during transmission, by period update of audit information, by the maintenance of a constant communication line or open network pathway, etc.

Figure 113B:
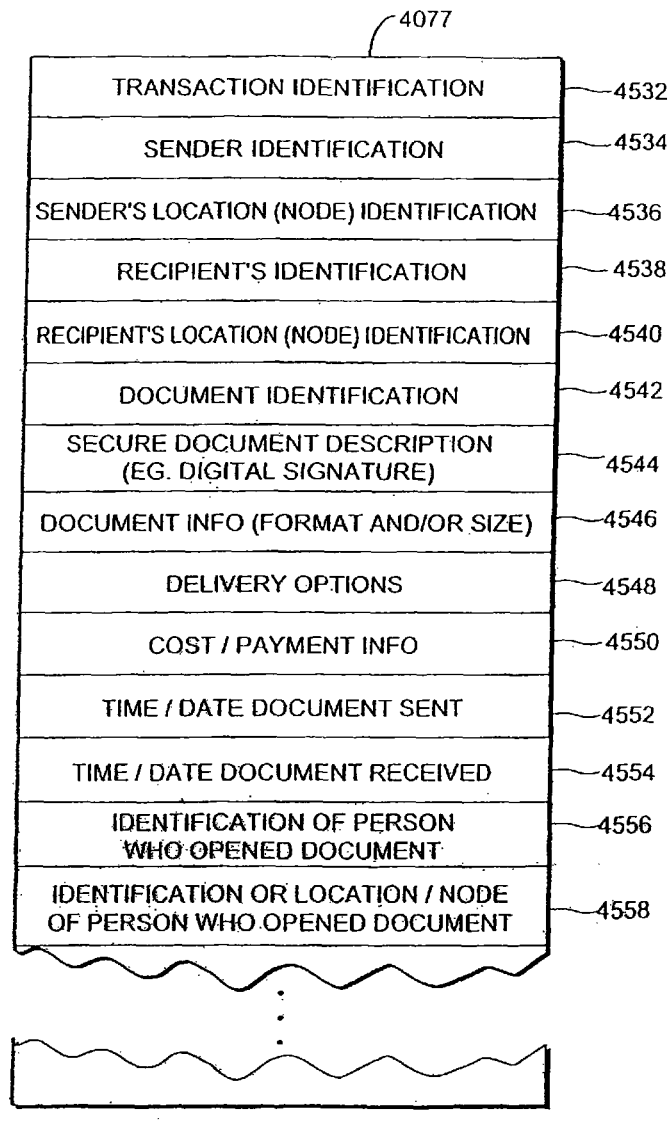

FIG. 113B shows an example of secure audit information 4077 that may be maintained under the control of one example set of electronic controls 4078. This audit information may include, for example:

a transaction identifier 4532;
sender identifier 4534 identifying sender 4052;
an identifier 4536 identifying the location (e.g., node) of sender 4052;
an identifier 4538 of recipient 4056;
an identifier 4540 specifying the location (e.g., node ID) of the intended recipient 4056;
an identifier 4542 of the document or other item being sent;
a secure document descriptor (e.g., a one-way hash value produced from the document's contents);
other document information 4546 (e.g., format and/or size);
document delivery options 4548;
cost/payment information 4550;
time/date the item the item was sent (field 4552);

time/date stamp 4554 of document receipt;

identification of who opened the document (field 4556);

a time stamp identifying the location/node date and time of document opening (4558); and other information 4560.

As mentioned above, audit information 4077 associated with use of a document may be transmitted to many different parties. Audit information 4077 may also be treated as part of the signaling methodology described for reciprocal methods (see FIGS. 41*a*-41*d*) to provide receipts. For example, copies of receipts may be delivered to the sender, as described above, as well as to the sender's manager in a corporate setting, or to the sender's legal counsel or other professional advisors (such as tax advisers, accountants, physicians, etc.) Some items 4054 which are delivered to, or used by, recipients to gather information (such as tax forms, purchase orders, sales reports, and insurance claims) may require delivery of receipts to several parties other than the sender. Some transactions may require the delivery of such receipts before completion. For example, a sales report requesting delivery of products from a company's inventory may require that a receipt from the reading of a document delivered to the sales organization be received by the accounting department for audit purposes before permitting receipt of the document by the sales organization.

Figure 49:
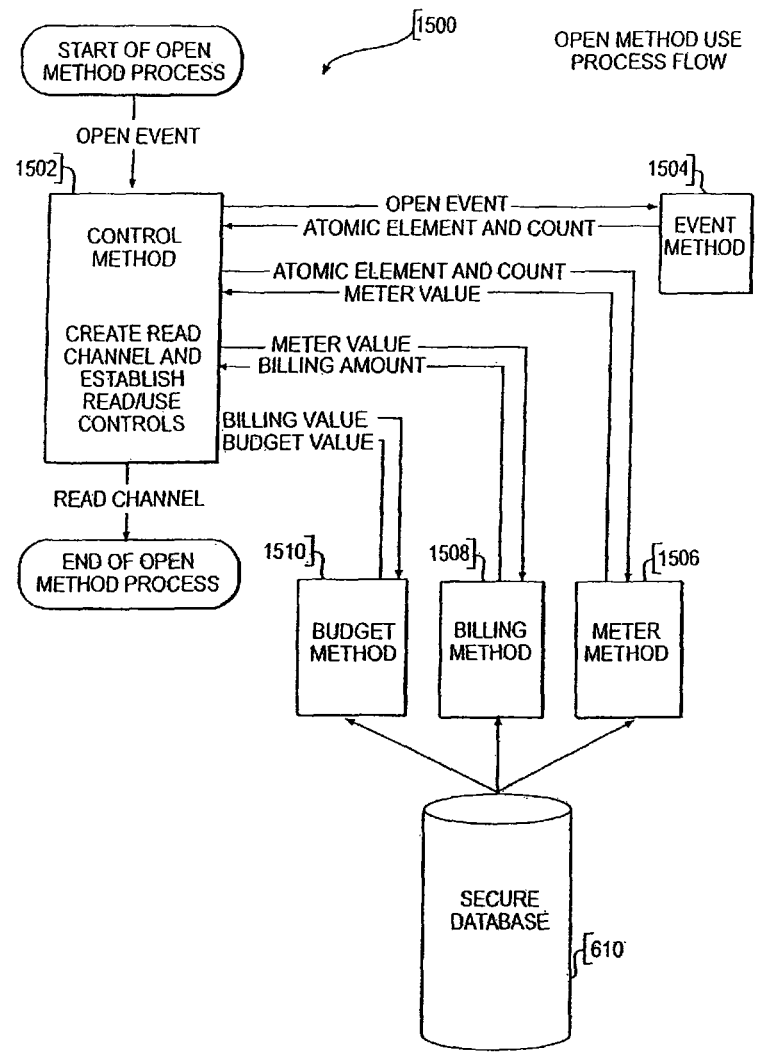
FIGS. 49, 49A-49F show an example OPEN method.
Figure 49A:
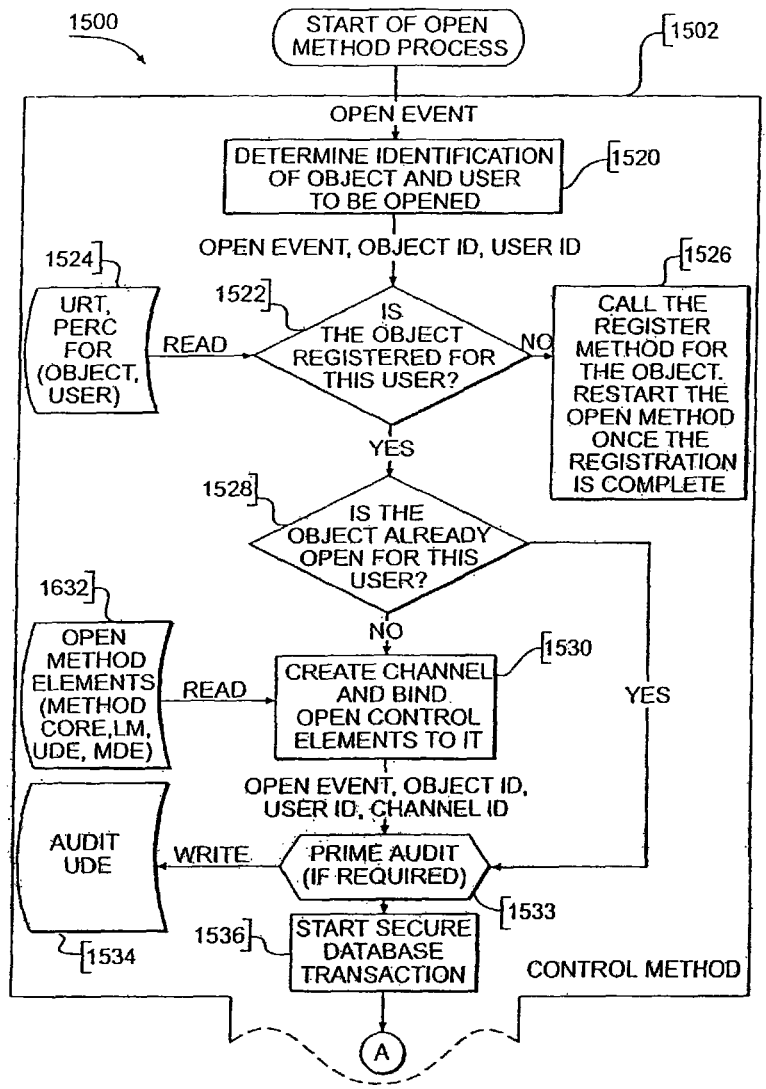
Figure 49B:
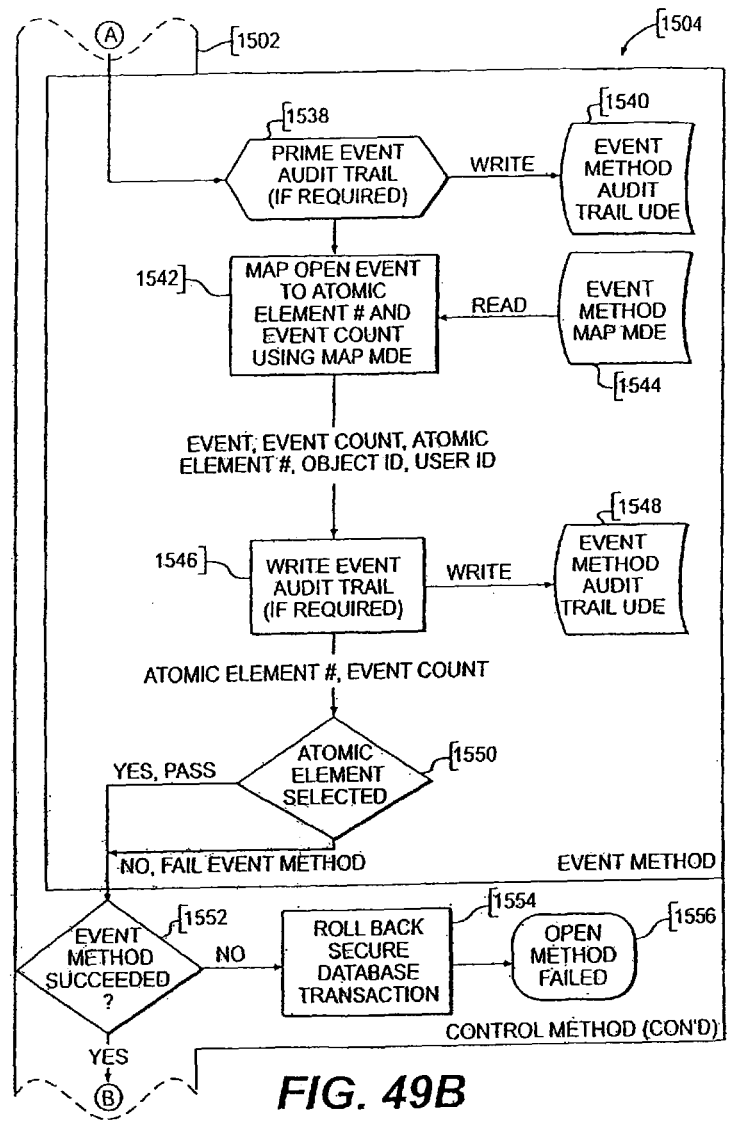
Figure 49C:
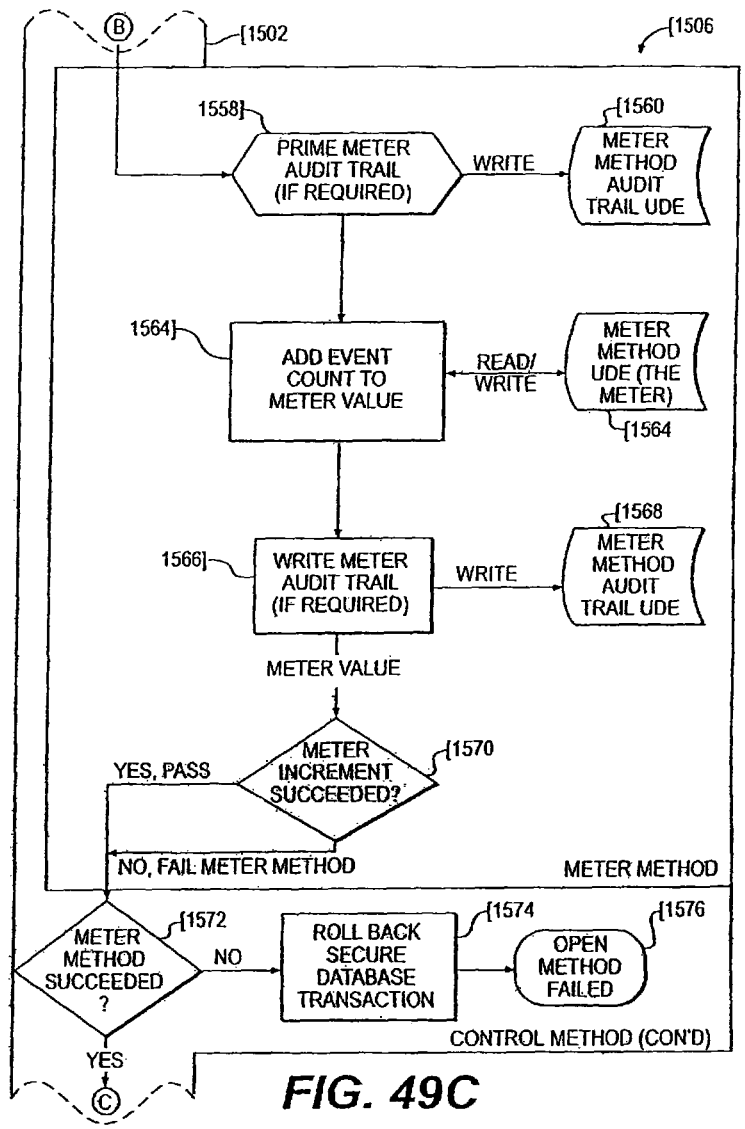
Figure 49D:
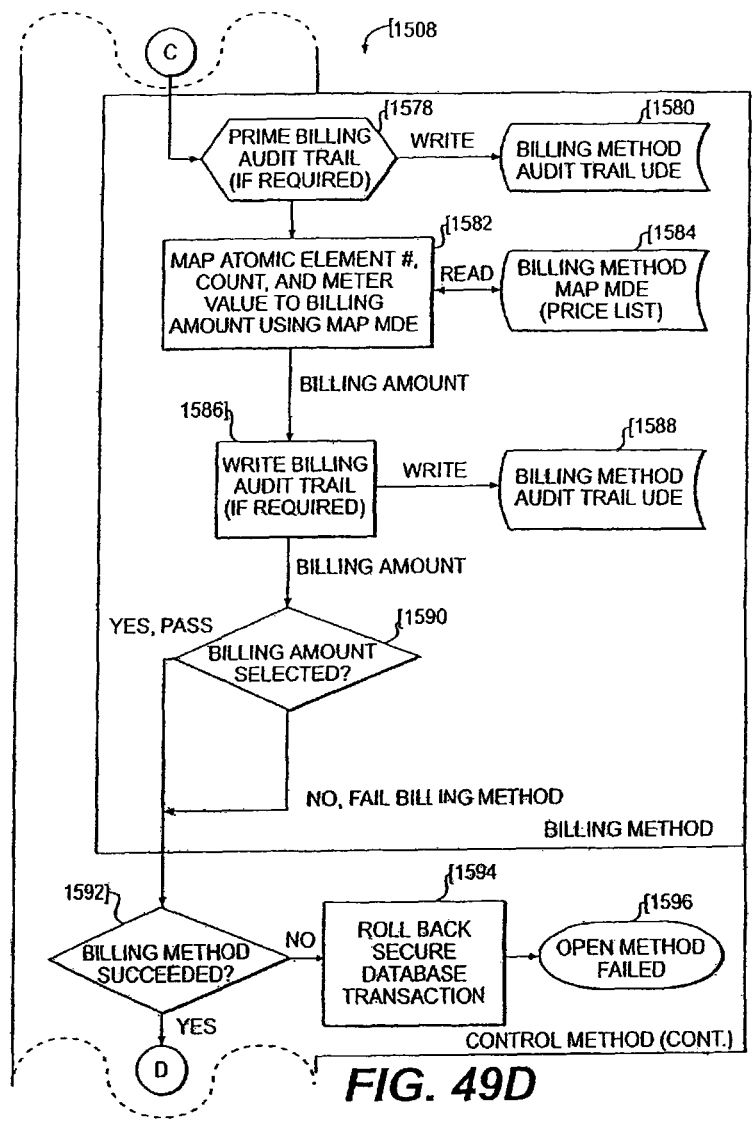
Figure 49E:
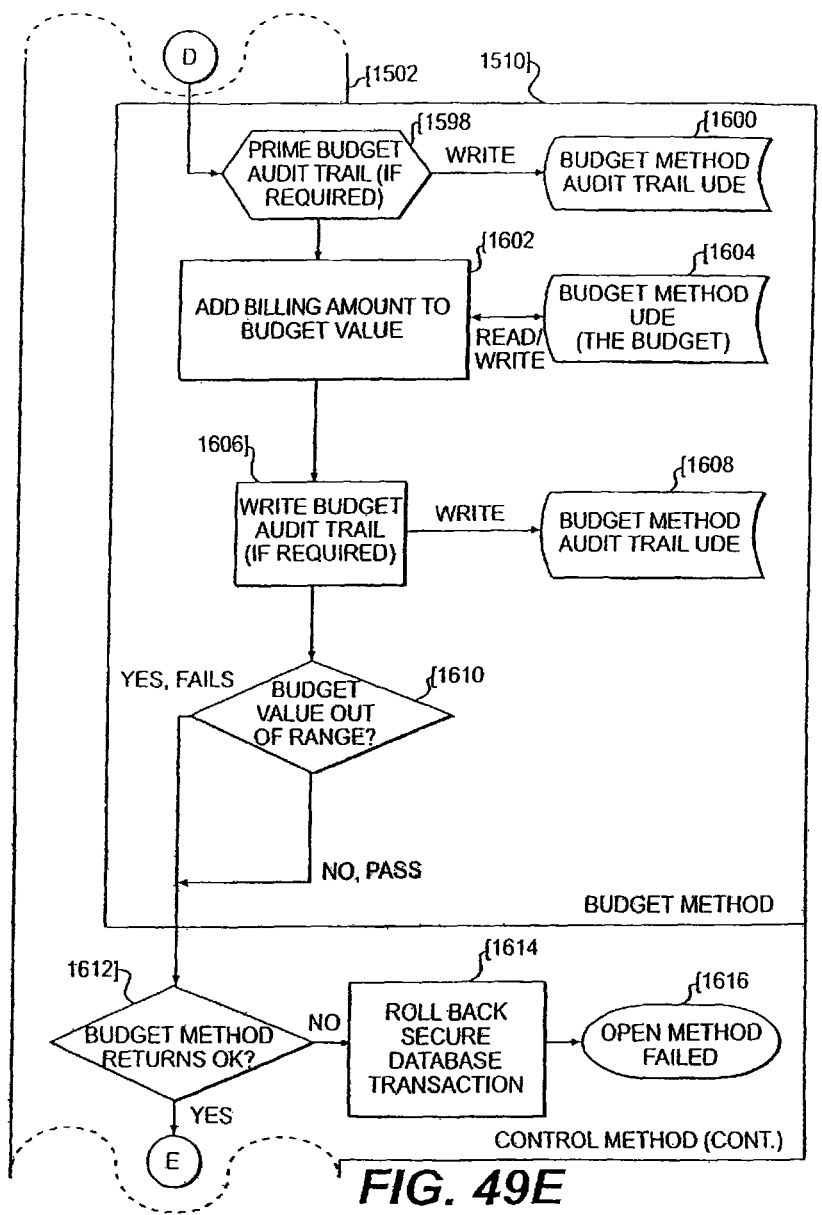
Figure 49F:
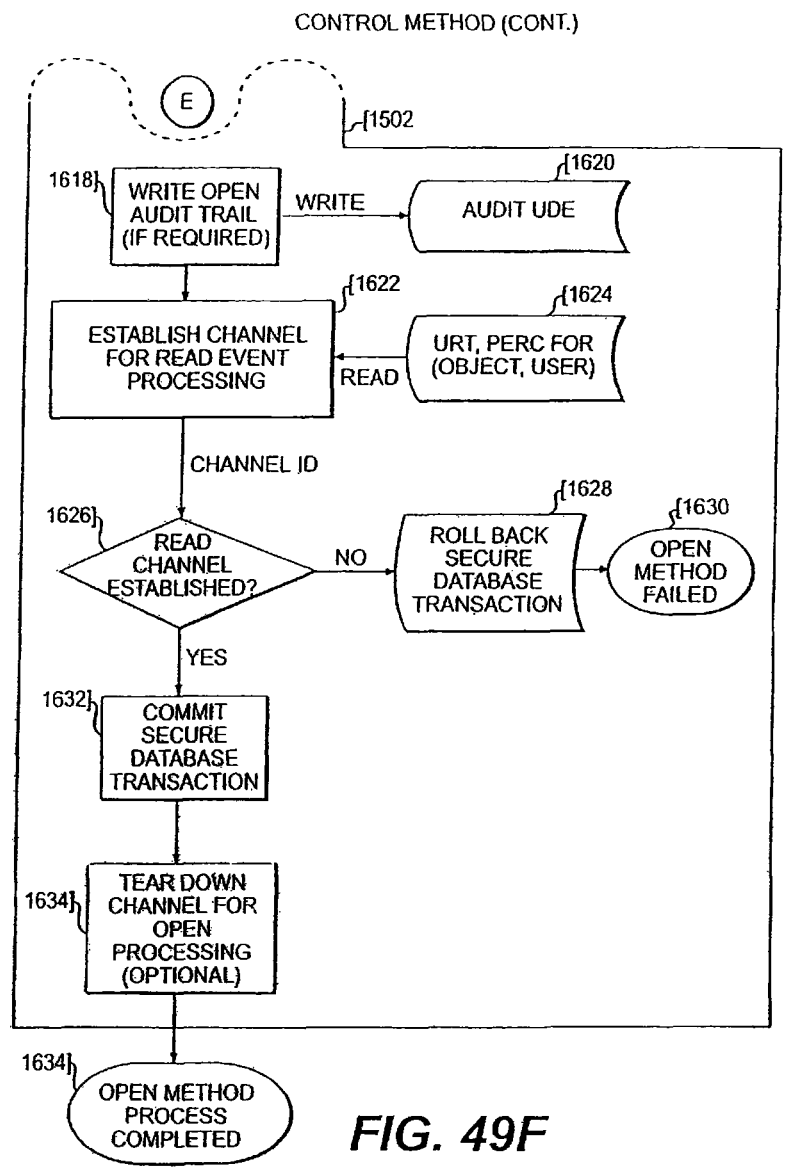
Figure 50:
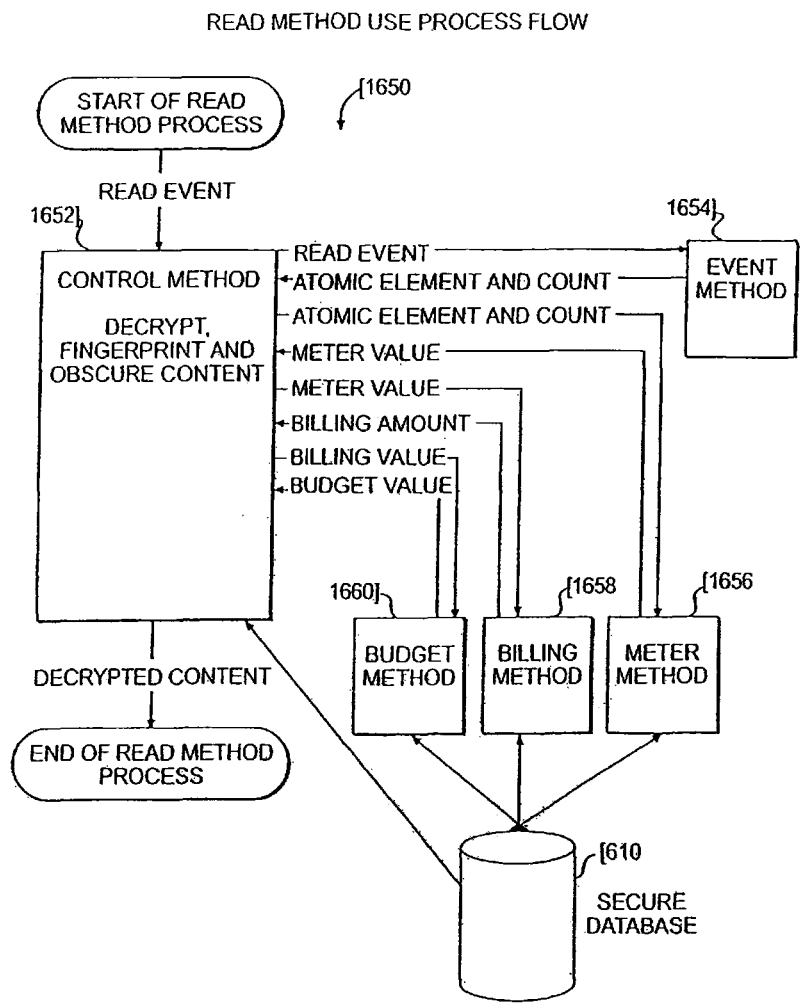
FIGS. 50, 50A-50F show an example of a READ method.
Figure 50A:
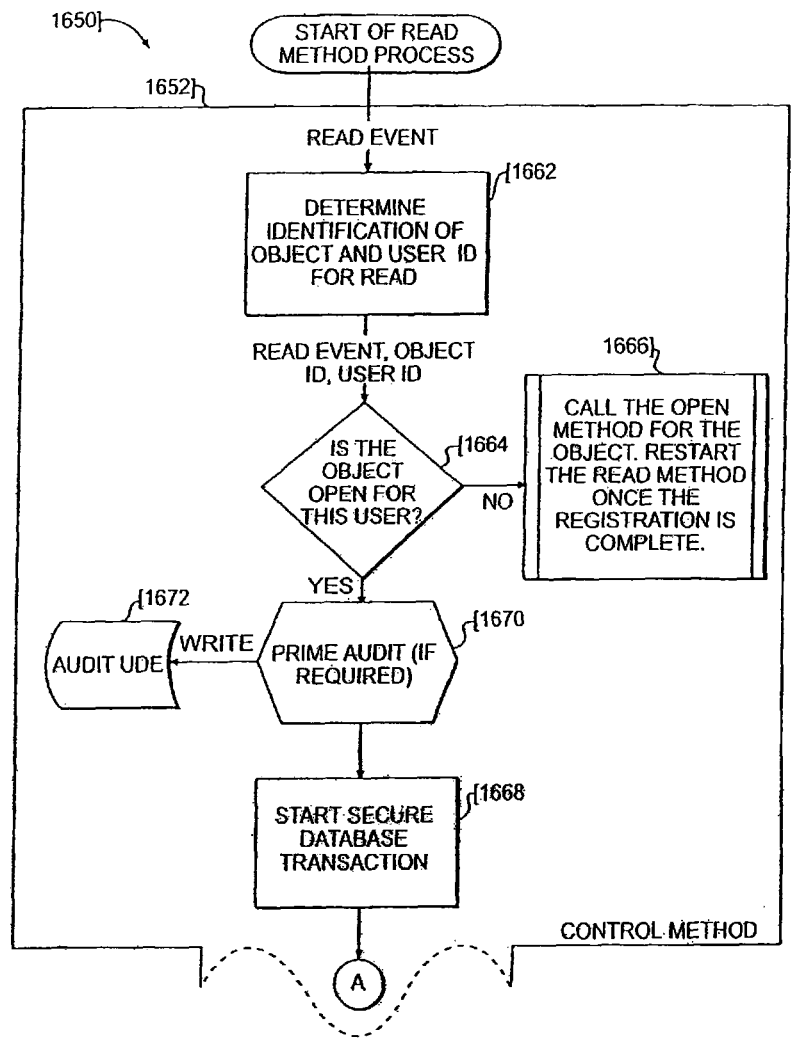
Figure 50B:
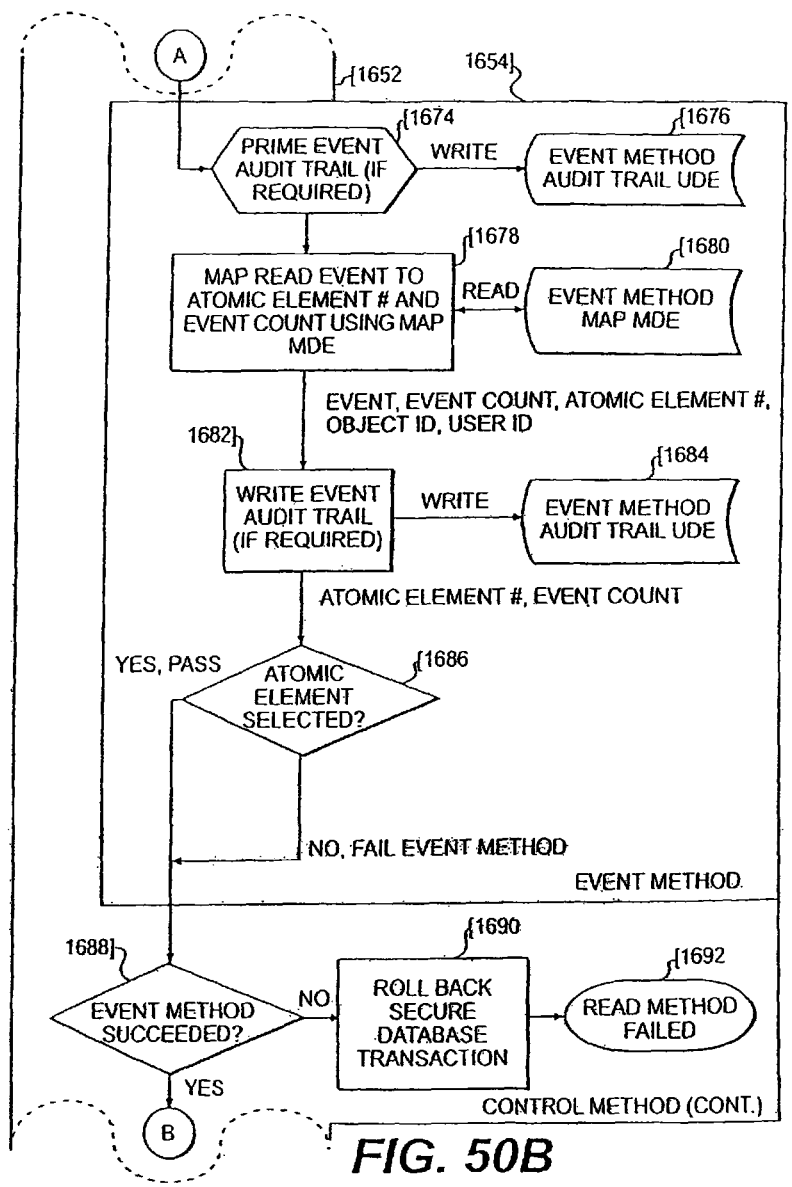
Figure 50C:
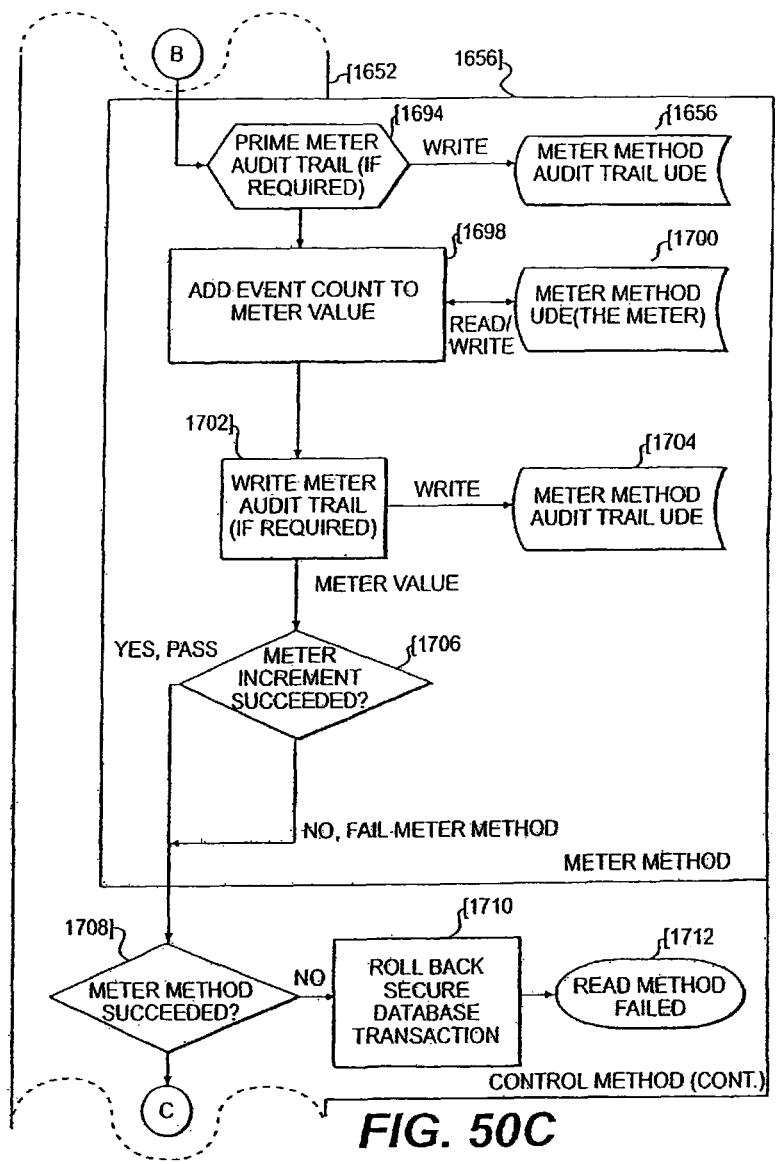
Figure 50D:
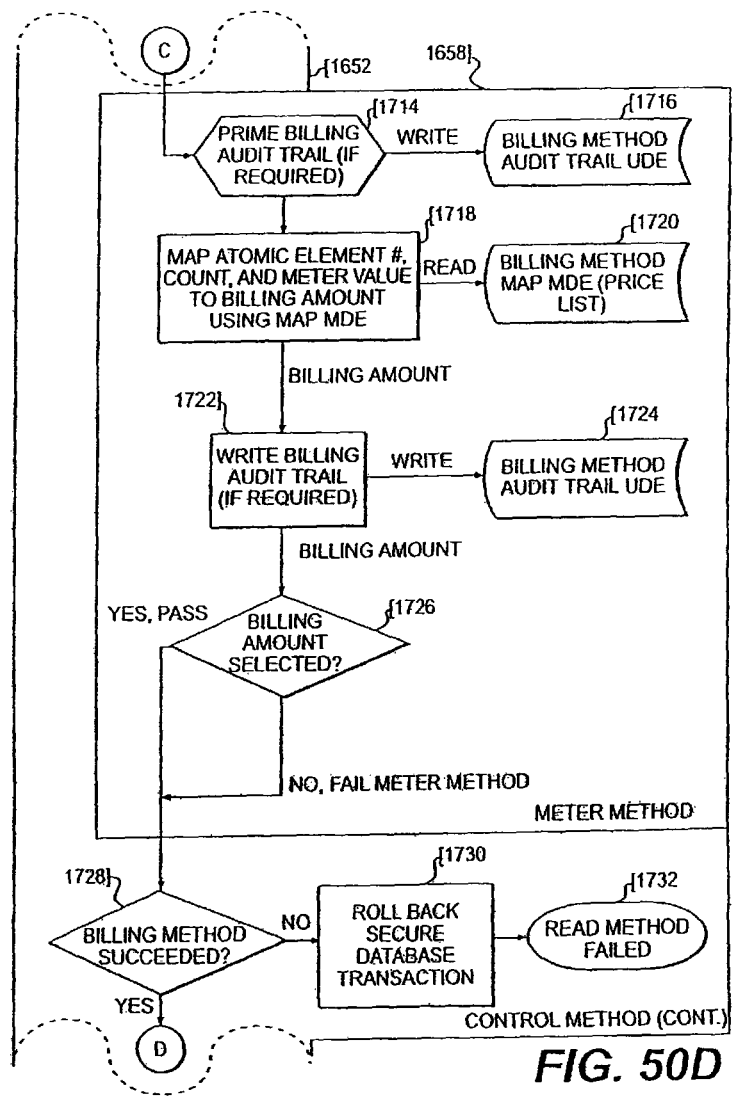
Figure 50E:
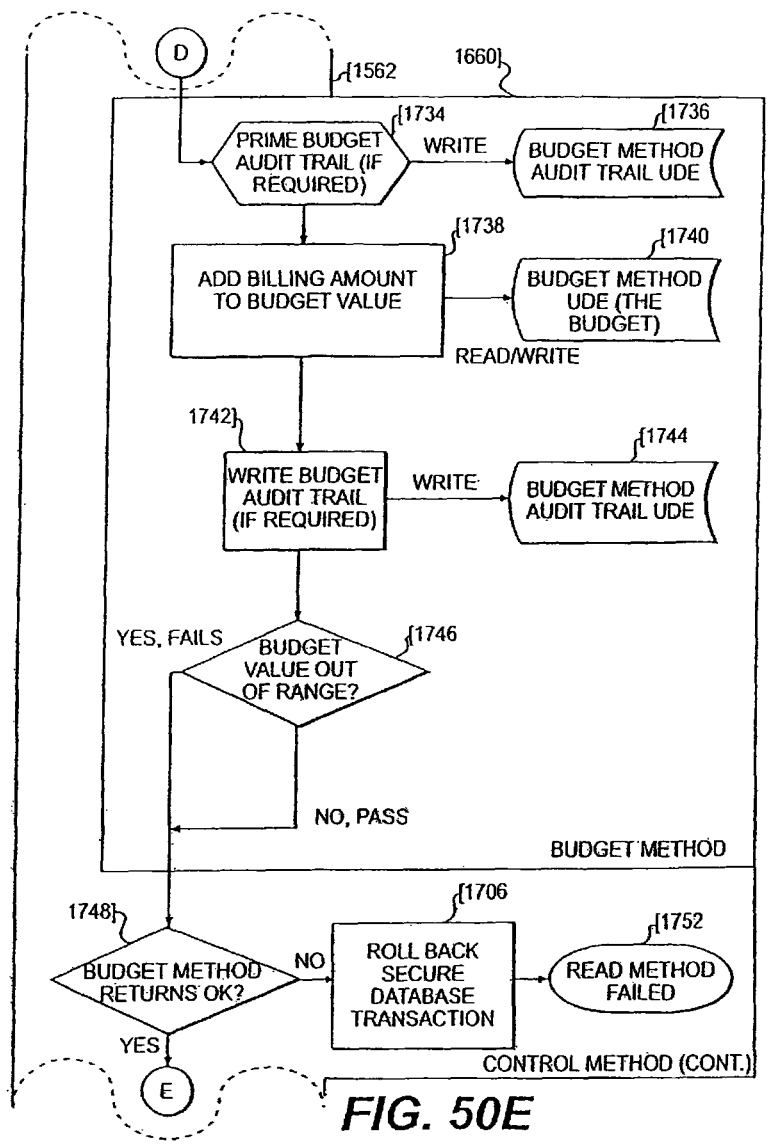
Figure 50F:
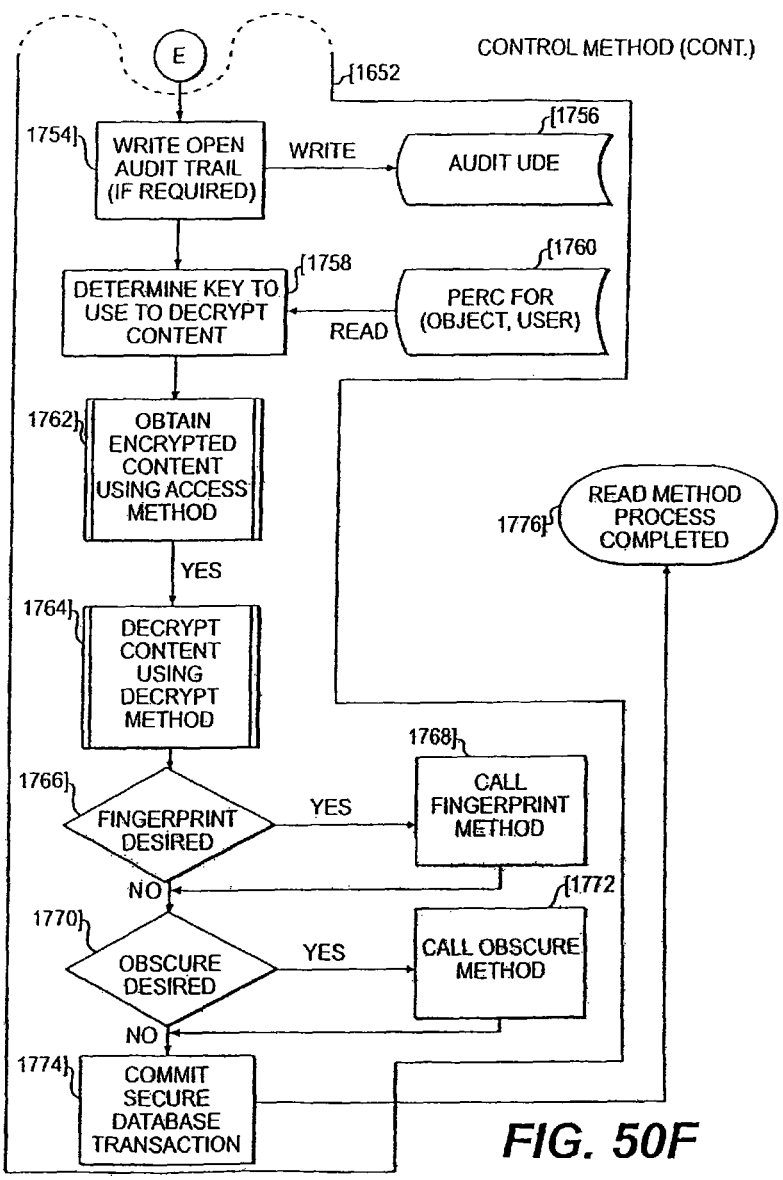
Figure 51:
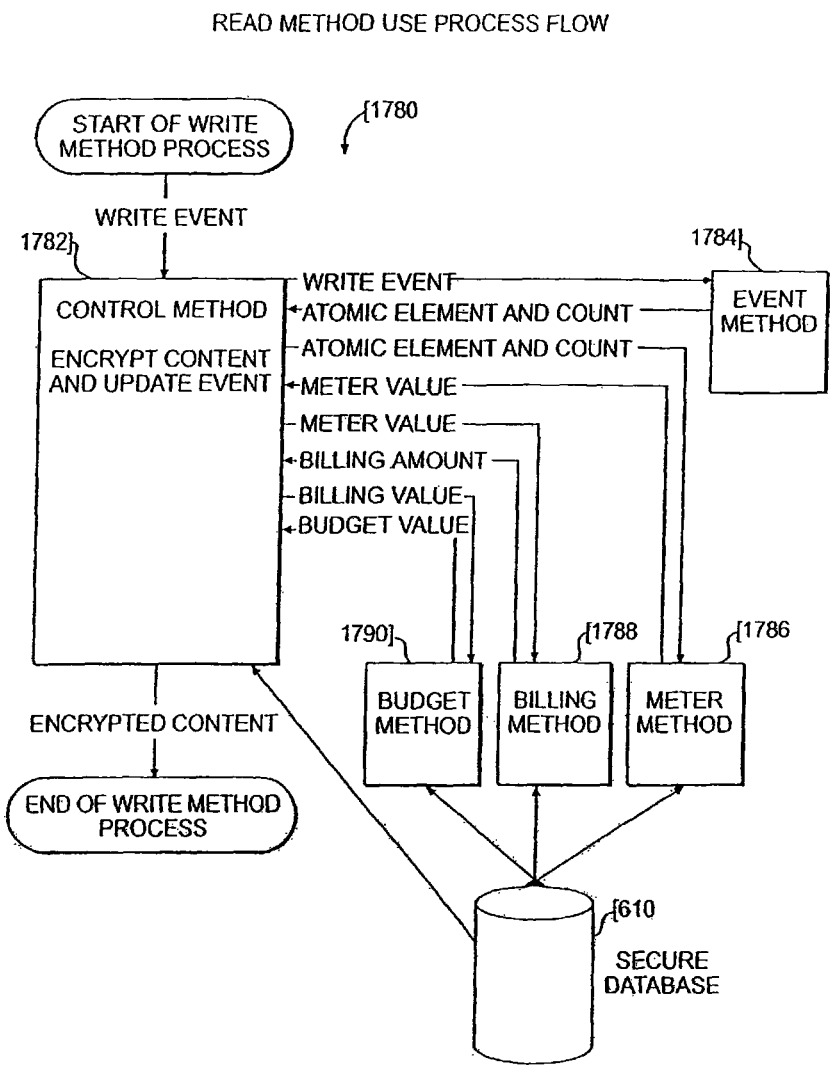
FIGS. 51, 51A-51F show an example of a WRITE method.
Figure 51A:
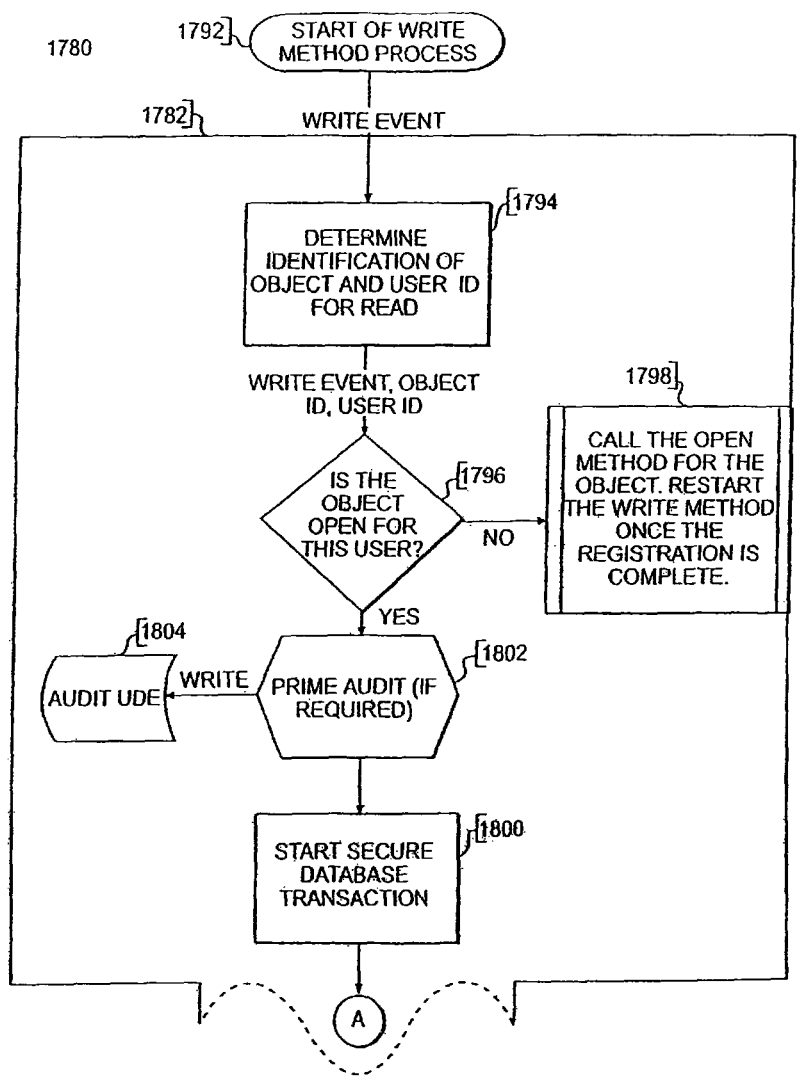
Figure 51B:
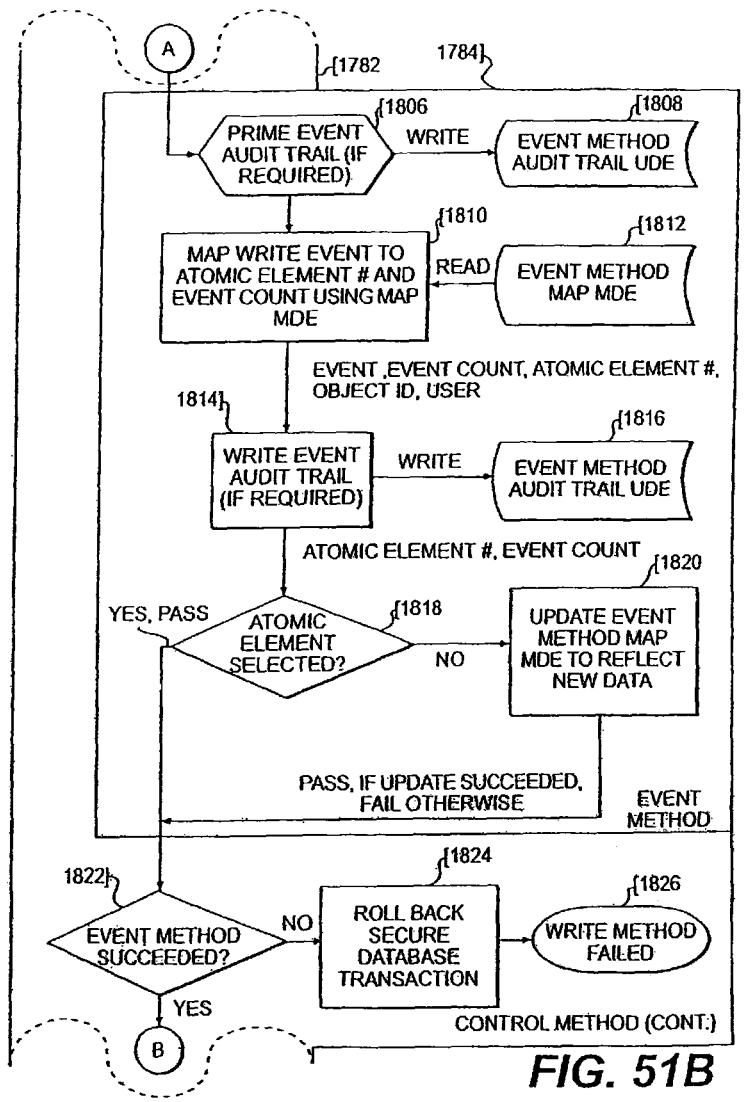
Figure 51C:
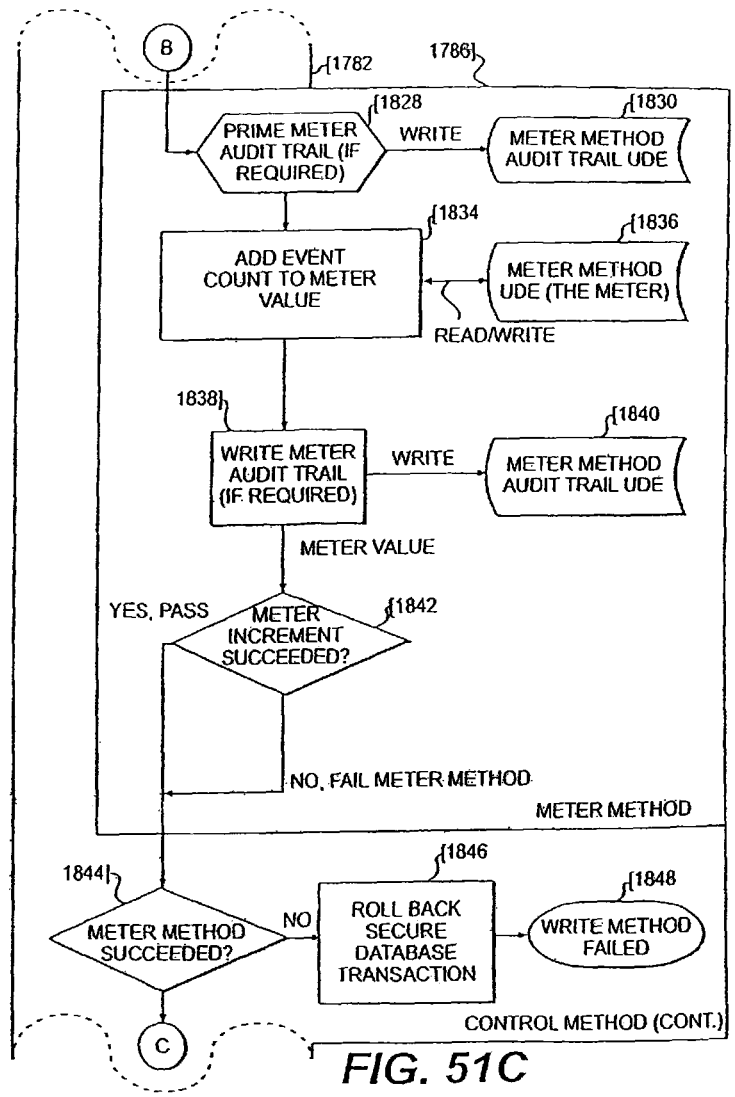
Figure 51D:
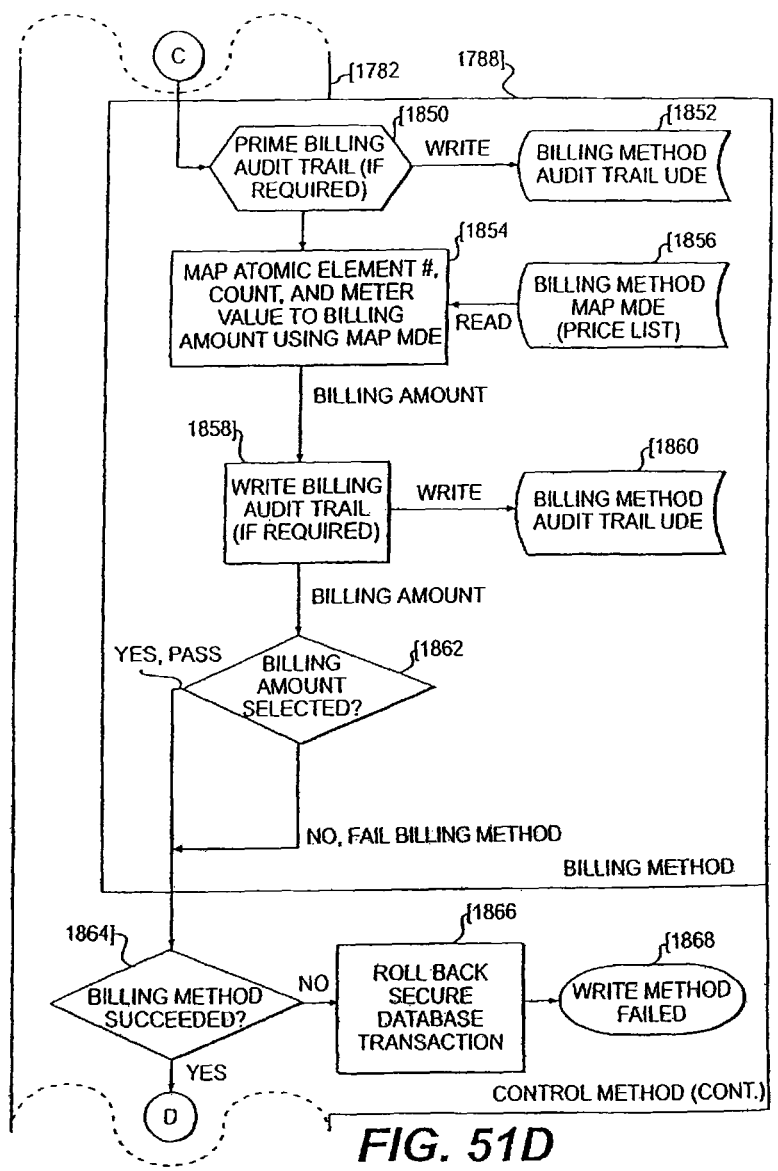
Figure 51E:
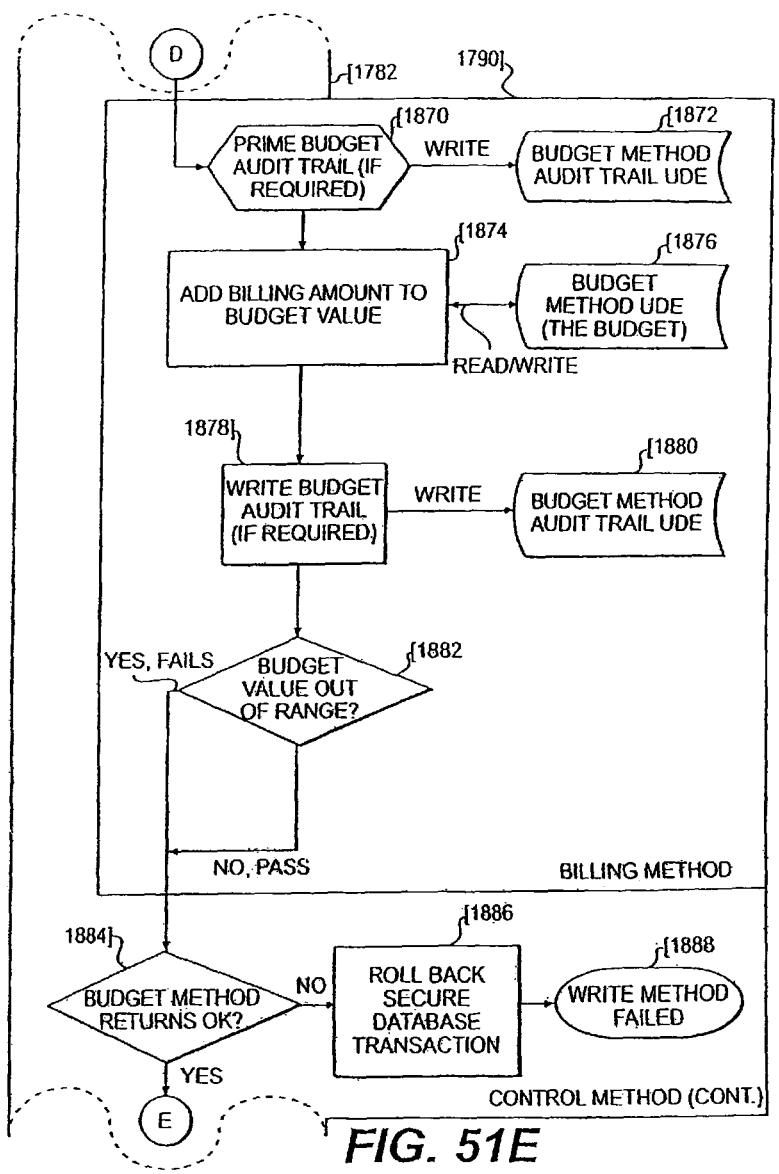
Figure 51F:
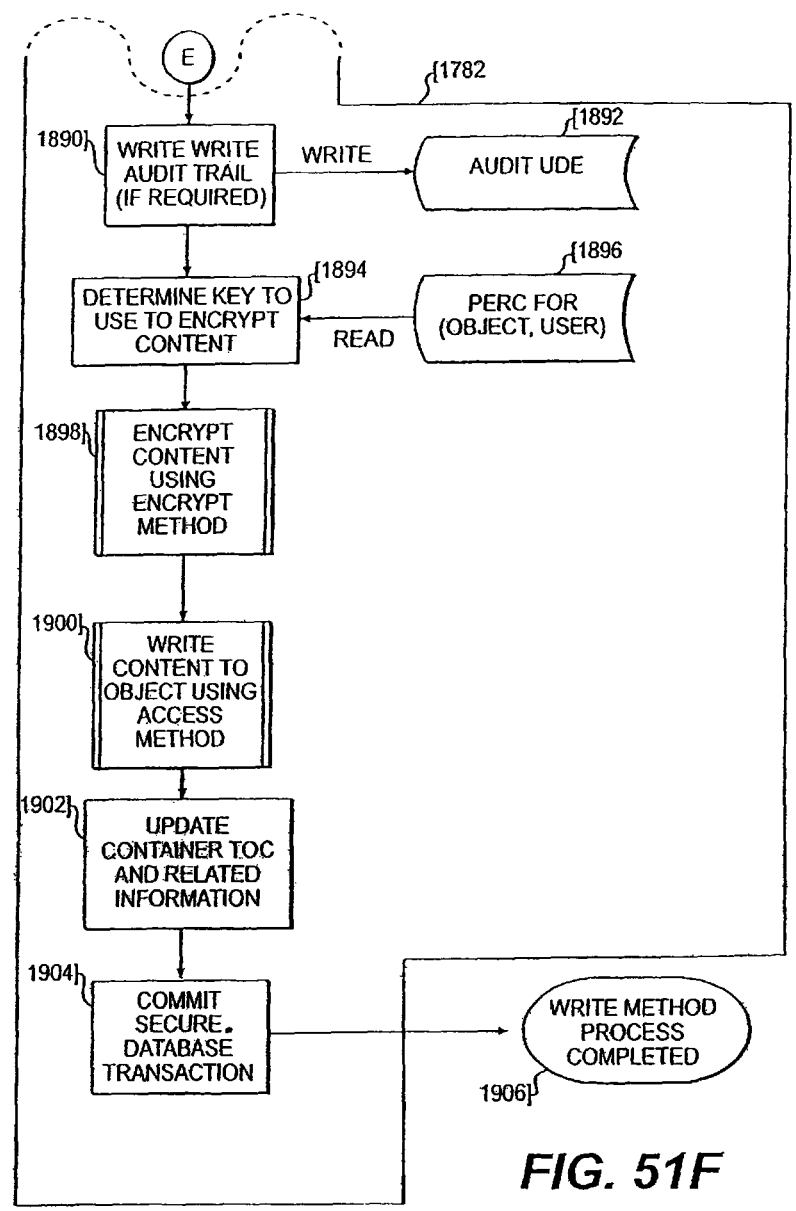
Figure 52:
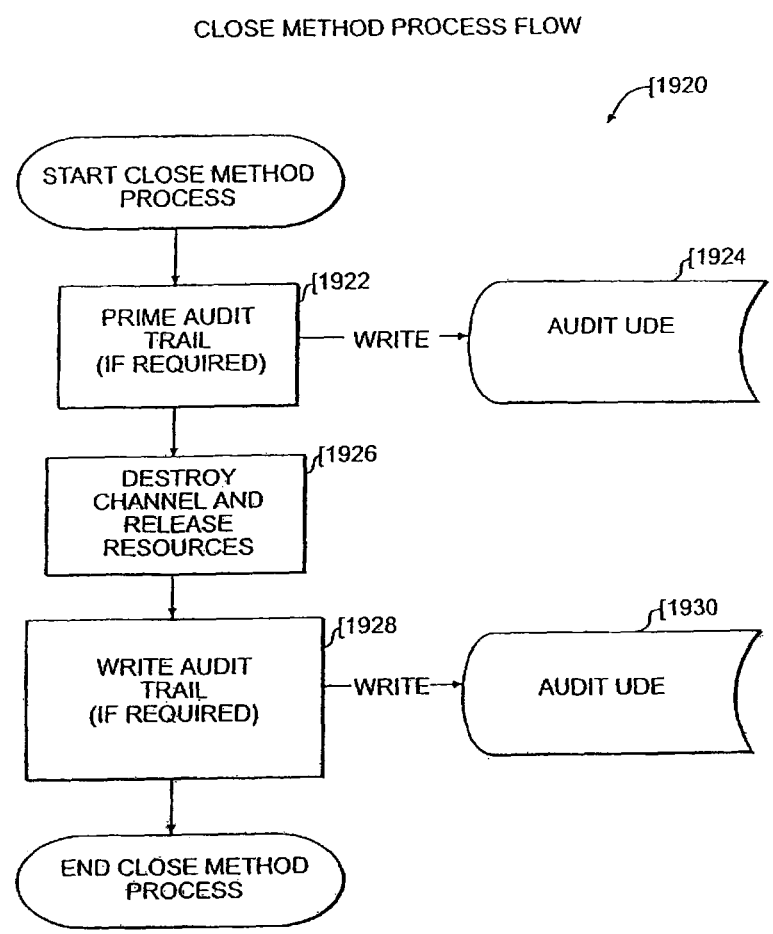
FIG. 52 shows an example of a CLOSE method.
Figure 53A:
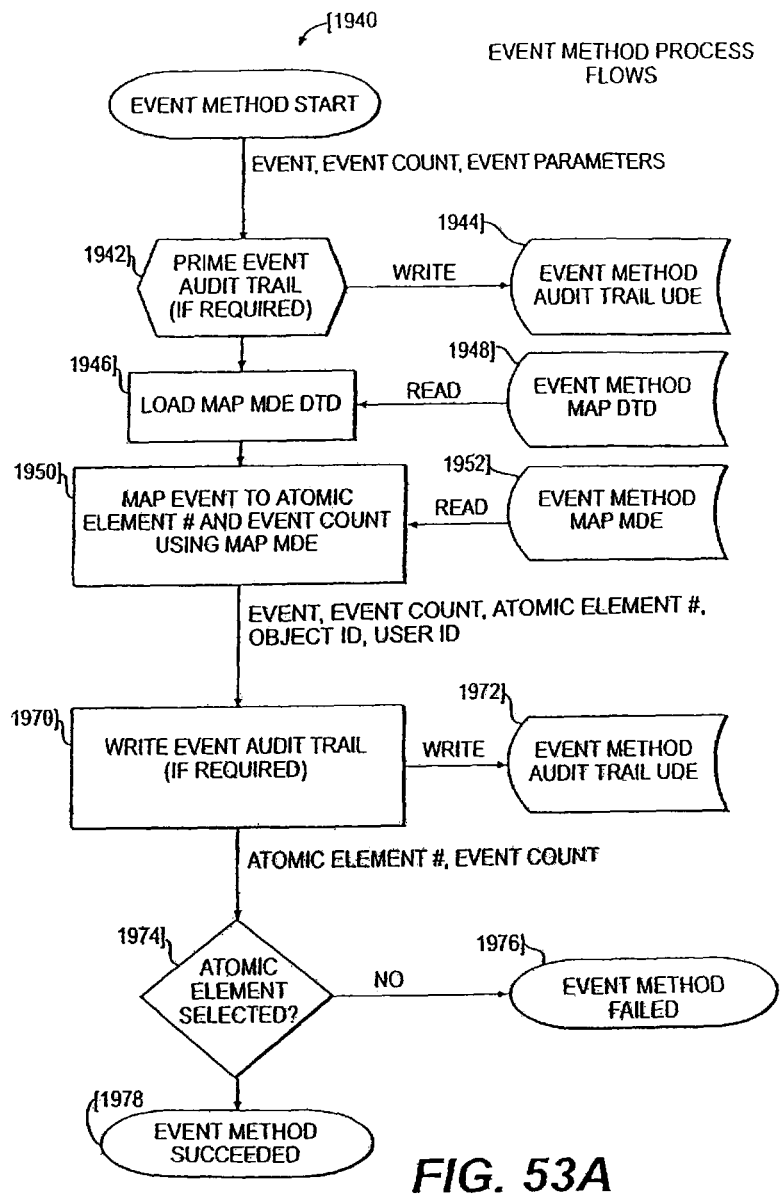
FIGS. 53A-53B show an example of an EVENT method.
Figure 53B:
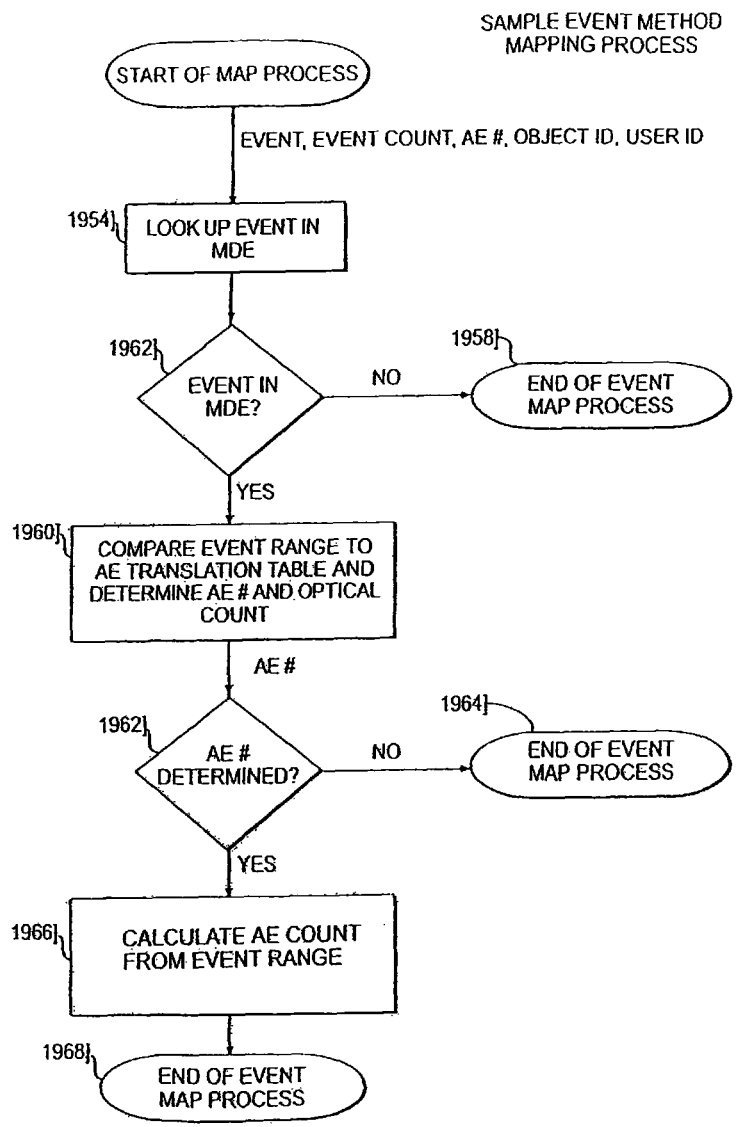
Figure 53C:
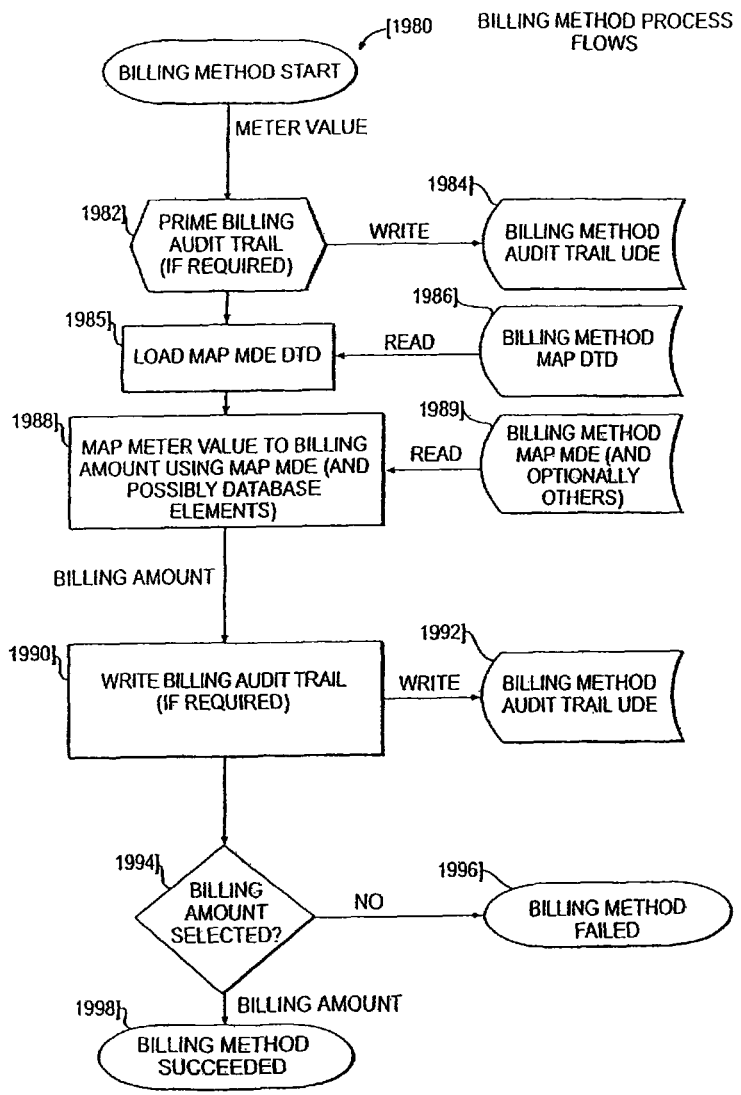
FIG. 53C shows an example of a BILLING method.
Figure 54:
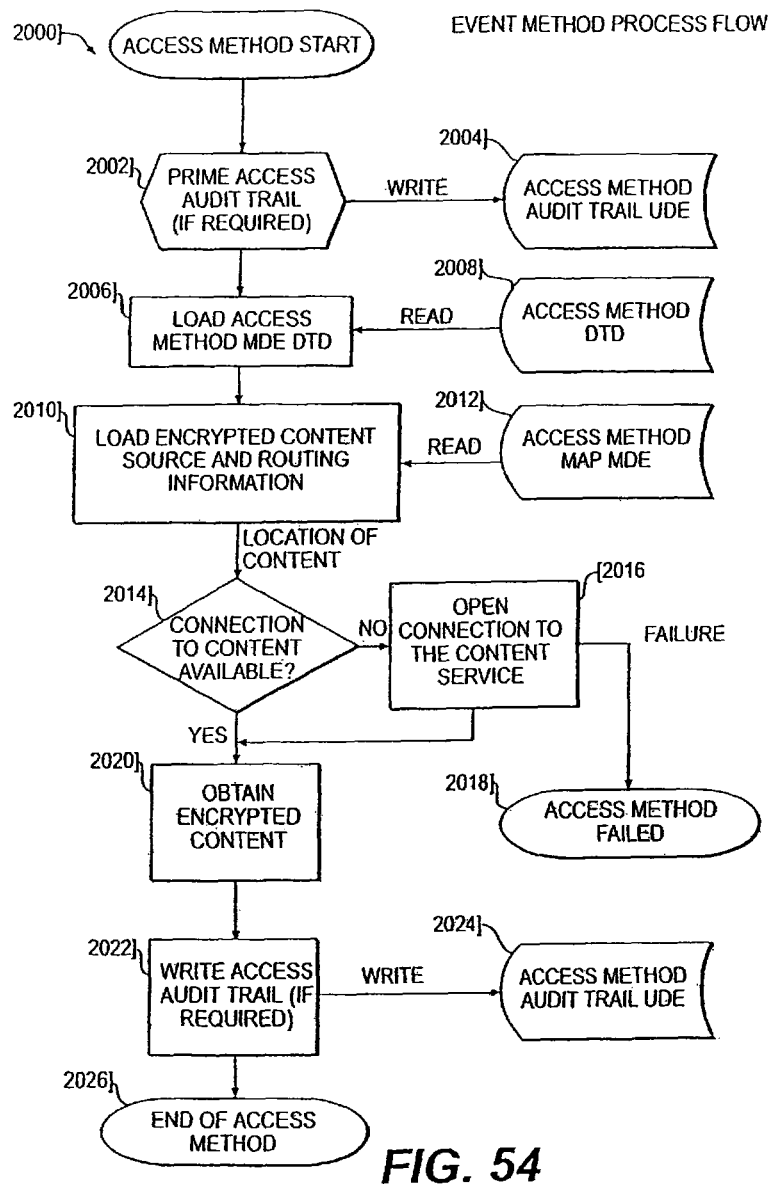
FIG. 54 shows an example of an ACCESS method.

Referring once again to FIG. 113, electronic appliance 600 may next request authority from sender 4052 to obtain payment for delivery of the item (FIG. 110, block 4505; FIG. 113, block 4512D). Payment may be by any convenient mechanism, and may be made by the sender, the recipient and/or by a third party. This payment processing in this example is handled by PPE 650 in accordance, for example, with one or more billing methods as shown in FIG. 49D for example.

The appliance 600 is then ready to accept item 4054 (such as a document) to be sent if the item hasn't already been inputted (FIG. 110, block 4507; FIG. 113 block 4512E). PPE 650 may (based on control sets specifying this) use the dynamic user interaction technique described above to interact with the sender 4052 and obtain the requested item for transmission. As mentioned above, for physical documents, appliance 600 can optically scan the document into electronically readable form employing document reader/scanner 4114 using page reader technology and/or optical character recognition, for example. For electronic documents or other items such as those created by a personal computer 4116 (see FIG. 95), this "inputting" step may be a matter of having sender 4054 select or create the item using standard document or file creation applications, or physically picking such document using icons or other menu-driven techniques. In one particular example, sender 4052 may "select" a document or item to send by commanding a word processing or other application to "print" or otherwise write the item to a particular virtual printer or other output device which is mapped into the overall secure electronic delivery process.

Appliance 600 may store the item in any of multiple representations. For example, it could store it in Adobe Acrobat (PDF) or other text based page description. Storing the document in CCIT Group III Facsimile format is an example of a "universal" image format for black and white images. Group V is an example of a color format. TIFF is another example that incorporates many image types, as well as different compression formats and descriptive metadata.

PPE 650 may perform various tests on the inputted item and/or other results of the user interaction provided by block 4512E in accordance with one or more user controls. For example, if the sender has specified that he is sending a 6 page letter but only inputs five pages, PPE 650 may notice this discrepancy and notify the sender (FIG. 113, decision block 4512F). PPE 650 may abort the process or perform other suitable exception handling ("N" exit to decision block 4512F) if the results of the test are not satisfactory.

PPE 650 may embed any seals 4200, signatures 4300 or hidden signatures 4400 into the item if needed (FIG. 105, block 4510). This process may involve, for example, identifying signature insertion locations and embedding signatures upon directed or other controlled circumstances. "Intelligent" optical character recognition (OCR) may be used to identify signature locations. The display might also show an image of the page and allow the operator to identify the signature locations, for themselves, or more importantly, for other parties. The PDF (or other document description format) expressions could be extended to include a code that would allow indication of signature insertion points.

Depending upon the particular electronic controls being used, placement of the sender's signature or seal on the document may be based on the PPE 650's authentication of the sender as shown in FIG. 111—and may require an additional indication of assent from the sender—for example, pressing a "Yes" button, providing additional biometric or other identification information (e.g., "place your finger on the sensor if you want to sign this letter" or "Provide your mother's maiden name to sign this letter"). Such authentication is important for non-repudiation and to prevent fraud. The sender might actually sign his signature on a pressure-sensitive or magnetic-sensing signature capture and/or verification pad, provide a bit-map image of his signature by presenting a "smart card" storing it (plus using appropriate authentication techniques to assure that the bitmap image is being presented by the true signature owner), or provide enough information through user interaction as described above that the PPE 650 can access an electronic signature file containing the signature (e.g., stored locally within appliance 600 or accessible over network 672 from an archive).

In the multi-party execution example shown in FIGS. 97 & 98, appliance 600 could simultaneously embed two or more signatures into the same document or other item 4054—but only upon securely receiving indications that all signatories assent to the document's terms.

Appliance 600 may next place the item and associated electronic controls into one or more secure containers 302 (FIG. 113, block 4512H). Referring to FIG. 103 once again, step 4512 normally involves placing the image 40681 of item 4054 (including any seals, signatures and other information) into the secure container 302. It may also involve placing a data (e.g., text) version of the item 4068D into the same or different container 302, along with possibly adding tools 4074 for using the item in either or both forms. The PPE 650 may then send the completed object 300 to an object switch 734 (see FIG. 12) for transmission to the recipient.

Referring to FIG. 110, appliance 600 may then deliver the secure container(s) 302 to the intended recipient 4056 and/or to trusted electronic go-between 4700 based upon the instructions of sender 4052 as now reflected in the electronic controls 4078 associated with the object 300 (FIG. 110, block 4514). Such delivery is preferably by way of electronic network 4058 (672), but may be performed by any convenient electronic means such as, for example, Internet, Electronic Mail or Electronic Mail Attachment, WEB Page Direct, Telephone, floppy disks, bar codes in a fax transmission, filled ovals on a form delivered through physical mail, or any other electronic means to provide contact with the intended recipient(s).

Appliance 600 may, through further interaction with PPE 650, immediately and/or later provide a receipt such as shown in FIG. 89A (FIG. 110, block 4516). Appliance 600 can immediately issue a receipt indicating that the object 300 has been sent. If rapid electronic communications means are being used, appliance 600 may also receive audit trail information from the recipient's appliance 600 while the sender waits, and issue a receipt indicating some or all of the kind of recipient interaction information shown in the FIG. 92A example receipt. This receipt providing step may, for example, be based on PPE 650 receiving one or more administrative or other objects 300 containing audit information (see FIG. 113B).

Figure 16:
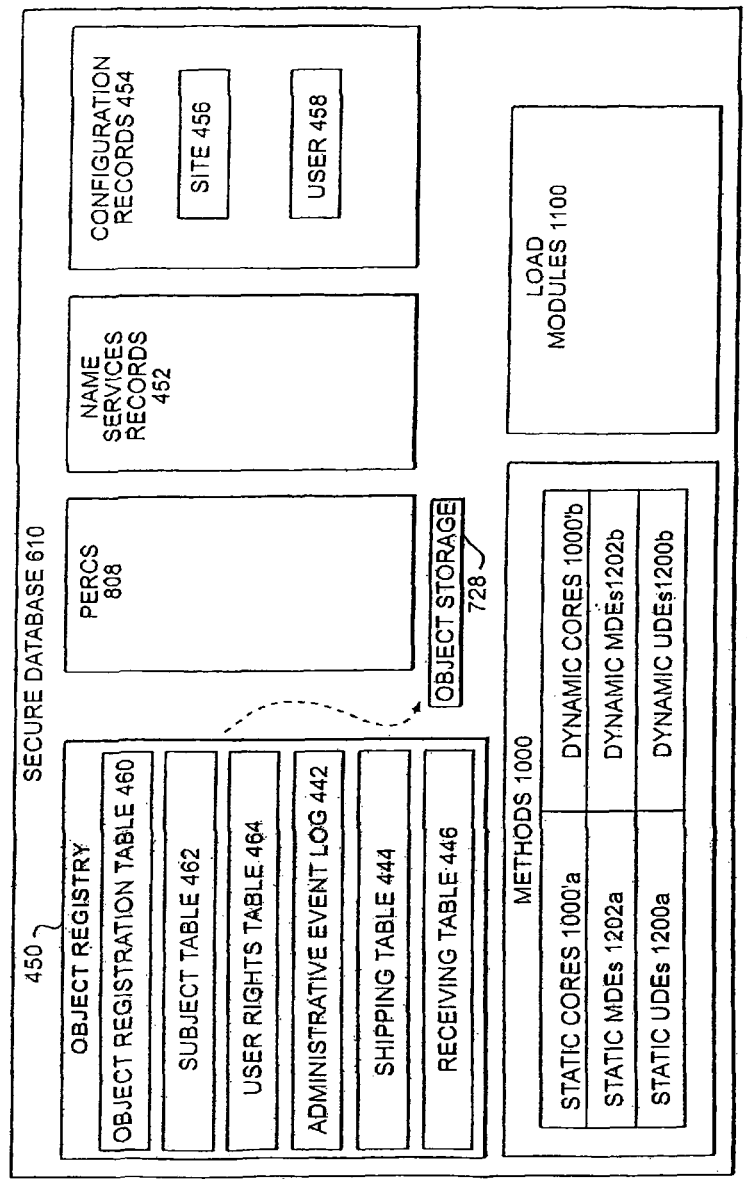
FIG. 16 is a block diagram of an example of a secure data base structure.

For purposes of security and trustedness, PPE 650 may actually "issue" the receipt—although it may use various other portions of appliance 600 (e.g., receipt printer 4112A, display 4104, card/media reader 4108, 4132, etc.) to output the receipt to the sender 4052. PPE 650 may also or alternatively maintain a copy of the receipt information (and/or the audit information 4077 on which it is based) within its secure database 610 (see FIG. 16). The trusted go-between 4700 similarly may maintain a copy of the receipt information (and/or the audit information 4077 on which it is based) within a secure electronic archive 4702.

Example Receive Process

Figure 114A:
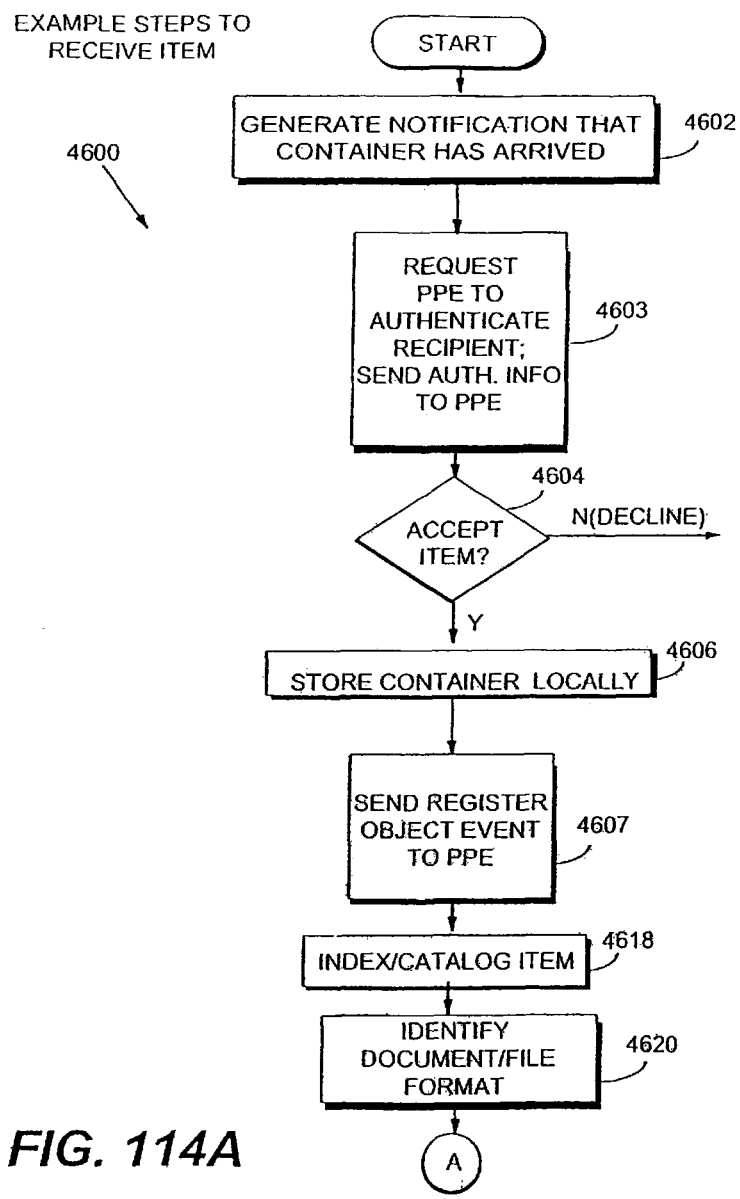
Figure 114B:
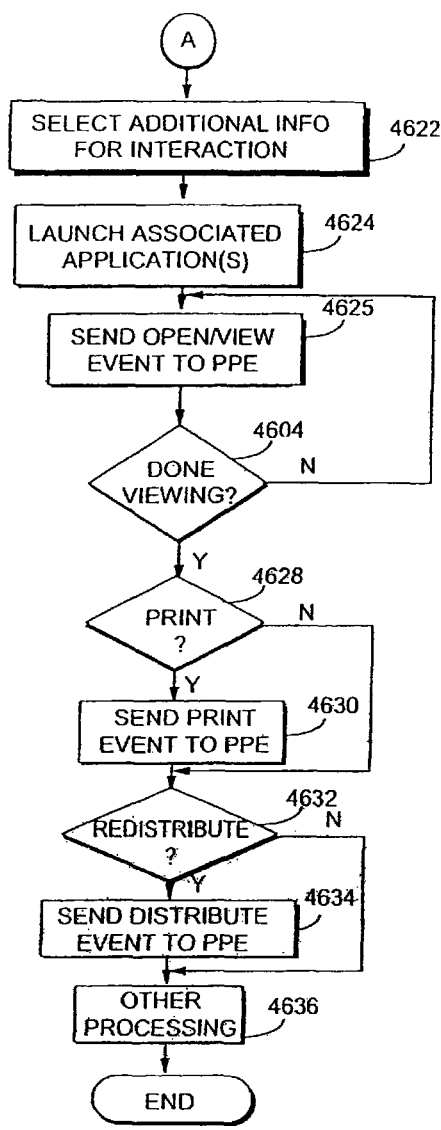

FIGS. 114A and 114B show an example process 4600 for receiving an item. In this example, electronic appliance 600 that has received an electronic object 300 may first generate a notification to PPE 650 that the container has arrived (FIG. 114A, block 4602). PPE 650 may, in response, use the dynamic user interaction techniques discussed above to interact with and authenticate the recipient in accordance with the electronic controls 4078 within the received object 300 (FIG. 114A block 4603; authentication routine shown in FIG. 111).

Intended recipient 4056 may be given an option of accepting or declining delivery of the object (FIG. 114A, block 4604). If intended recipient 4056 accepts the item, appliance may store the container 302 locally (FIG. 114A, block 4606) and then generate a "register object" event for processing by PPE 650.

Figure 115:
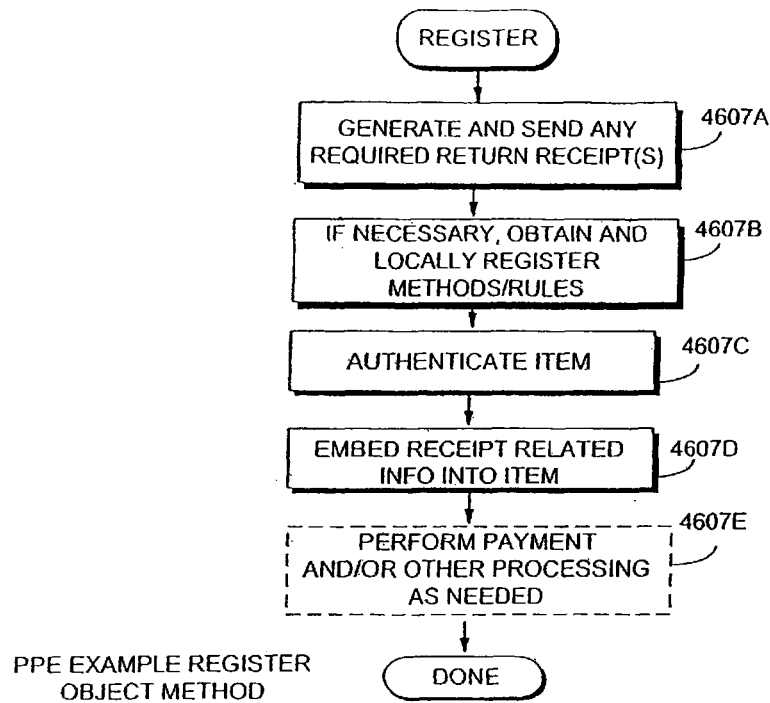

FIG. 115 shows example steps that PPE 650 may perform in response to a "register object" event. In this particular example, PPE 650 may generate and send any return receipt to sender 4052, trusted electronic go-between 4700, or other parties as required by the control set 4078 within container 302 (FIG. 115, block 4607A)—by for example recording audit records 4077 and transmitting them within an administrative object(s) 870 to the required appliances 600. Appliance 600 may next, if necessary, obtain and locally register any methods, controls or other information required to manipulate object 300 or its contents (FIG. 115, block 4607B; see registration method shown in FIGS. 43a-d). For example, item 4054 may be delivered independently of an associated control set 4078, where the control set may only be partial, such that appliance 600 may require additional controls from permissioning agent 200f (see FIG. 1A and "rights and permissions clearing house" description in the copending Shear et al. patent disclosure) or other archive in order to use the item.

PPE 650 may next securely authenticate the received item to ensure that it is not a counterfeit (FIG. 115, block 4607C). For example, appliance 600 may check one or more digital signatures 4076 within container 302 to ensure that they are authentic, or perform other authentication tests as described in detail above. PPE 650 may perform critical and/or non-critical exception processing (not shown) if the received object 300 and its contents are not authentic.

PPE 600 may analyze any seal or other secure information that is part of the item 4054. For example, although the item image may be captured and cropped by untrusted processes, the analysis of the image data is preferably done inside the PPE 650. Once the seal option of the image is identified, an analysis process will be run to recover the digital information stored in the seal (or steganographically encoded in the document). The next step is to determine what the expected values should be. To do this, the PPE 650 may make requests of an application program running locally to determine a user's expectations, may use a digital representation of a receipt or other audit data, and/or may contact a trusted go-between or other trusted third party to obtain the appropriate expected values. To facilitate this process, there may be some unencrypted information in the seal that can be used to establish a correlation with other information (e.g., a receipt, a transaction number, etc.). If such information is not available, a local store or a trusted third party might compare the entirety of the recovered digital information with stored records to determine such a correlation. In other cases, the expected values may be determined from context (e.g. a default set of expected values; or by examining the seal information itself, in either encrypted or decrypted form, for "tags" or other schema or semantic information).

Once the expectation values of the information is determined, any encrypted portion must be decrypted using the public key corresponding to the private key used above to make the seal. This key can be obtained using the mechanisms discussed in Ginter et al.

Once decrypted, the expected values may be compared with the actual values to determine correlation. Information about the correlation may be reported to a user and/or a third party, as appropriate. In addition, some or all of the seal information may be included in such report.

Once PPE 650 is satisfied that the received item is authentic, it may embed receipt related information into the item if the electronic controls 4078 associated with the item require it (FIG. 115, block 4607D). In one example, the "electronic fingerprinting" techniques described above in connection with FIGS. 58B and 58C may be used for encoding various types of information onto item 4054—for example, to show where the document has been. PPE 650 may embed seals 4200 and/or hidden information 4400 onto the item image 40681 at this time if desired. Electronic fingerprinting, sealing and embedding hidden information may also be performed by the PPE 650 at the sender's 4052 site—but, it may be advantageous to delay this process until the item arrives at the recipient's site because more things have happened to the item by then. For example, it may be desirable to encode, into seal 4200, hidden information 4400 and/or hidden or unhidden electronic fingerprinting and/or watermarking information, the time stamp of when the recipient actually opened the container 302. In some arrangements, one seal, hidden signature or hidden or unhidden electronic fingerprint could be added at the end of sender 4052, and an additional seal, piece of hidden information and/or hidden or visible electronic fingerprint could be added at the end of recipient 4056. Any or all of these various techniques may be used depending upon business requirements, convenience, logistics and aesthetics.

PPE 650 may next perform any required payment and/or other processing as needed (FIG. 115, block 4607E). For example, PPE 650 may charge the recipient 4056 for receiving the document (e.g., "collect on delivery") or it may perform other processing such as debiting, crediting, initiating a local audit, round robin pass along, or the like—all as specified for example by electronic controls 4078.

Referring again to FIG. 114A, appliance 600 may next index or otherwise catalog item 4054 for later access and reference (FIG. 114A, block 4618), and may automatically identify document/file format for storage or presentation to recipient 4056 (FIG. 114A, block 4620). Appliance 600 may then select any additional information necessary to allow the recipient 4056 to interact with the document (e.g., conduct any associated database searches or the like) (FIG. 114B, block 4622), and then initiate any associated application(s) and any carrier application required to interact with the document/file (FIG. 114B, block 4624). Appliance 600 may then generate a "send" or "open" event to PPE 650 requesting the PPE to open container 302 and allow the user to access its contents.

Figure 116:
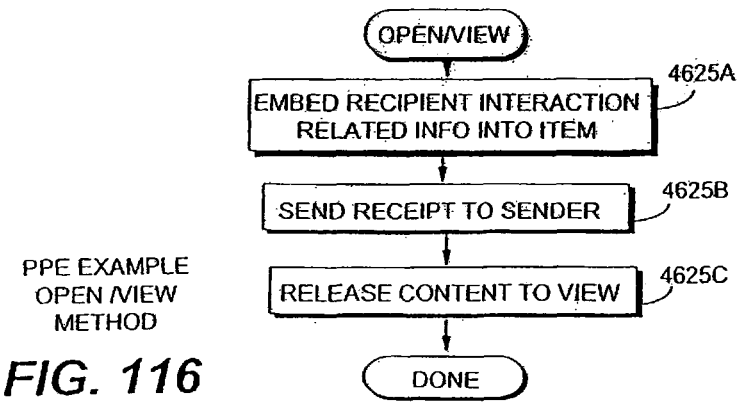

FIG. 116 shows example steps that may be performed by PPE 650 in response to an "open" or "view" event. In this example, PPE 650 may—upon allowing recipient 4056 to actually interact with the item 4054—embed additional recipient interaction related information into the document such as, for example, the time the recipient actually looked at the document (FIG. 115, block 4625A). PPE 650 can at this time also send additional audit and/or return receipt information to the sender 4052 indicating this event (FIG. 116, block 4625B) if the associated electronic controls 4078 require it. PPE 650 may then release the image 4068I and/or the data 4068D to the application running on electronic appliance 600—electronic fingerprinting or watermarking the released content if appropriate (FIG. 116, block 4625C).

Figure 117:
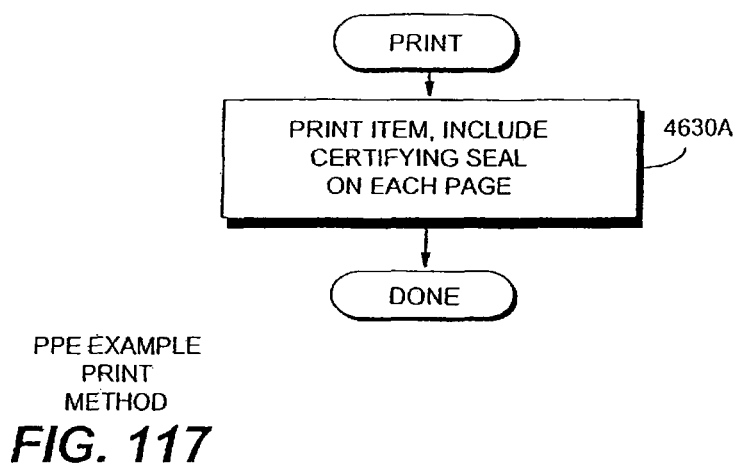

Referring again to FIG. 114B, appliance 600 may then wait for further instructions from the recipient 4056. If the recipient wishes (and is permitted by controls 4078) to print the item 4054 (FIG. 114B, decision block 4628), appliance 600 may send a "print" event to PPE 650. FIG. 117 shows example steps PPE 650 may perform in response to such a "print" event. In this example, the PPE 650 may print the item using a suitable printer 4122, including (if necessary or desirable) a certifying seal 4200 and/or other markings on each page of the document (FIG. 117, block 4630A).

Figure 118:
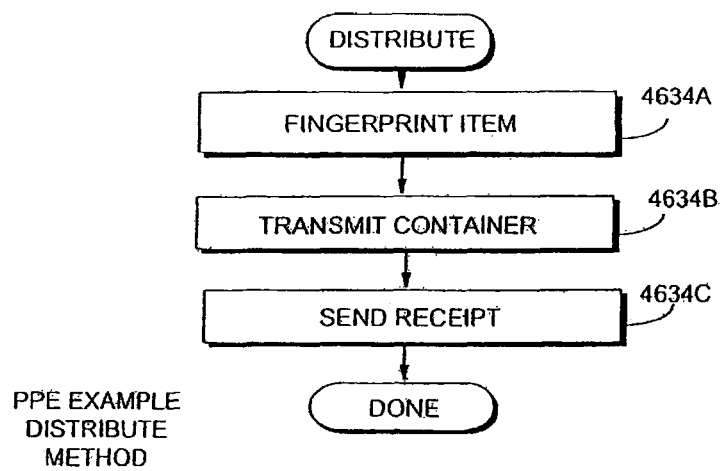

If recipient 4056 wants to redistribute the item to another person (FIG. 114B, decision block 4632), appliance 600 may generate a "distribute" event to PPE 650. FIG. 118 shows example steps PPE 650 may perform in response to such as "distribute" event. If the electronic control set 4078 associated with the item 4054 permits redistribution, PPE 650 and appliance 600 may redistribute the item within a secure container(s) 302 based on the conditions set forth in the applicable control set. For example, the control set may specify that item 4054 is to be "electronic fingerprinted" to indicate that recipient 4056 has received and looked at it (FIG. 118, block 4634A). Other information that may be embedded into the document at this time could include, for example, information related to the retransmittal such as, for example, name of sender(s), name of recipient(s), location of sender(s), location of recipient(s), employer(s) of sender(s) and/or recipient(s), and/or any other identifying information. PPE 650 may then package all required information within the same or different electronic container 302 and release the completed object(s) 300 to appliance 600 for transport using electronic or other communications means (FIG. 118, block 4634B). PPE 650 may, if required by controls 4078, also send an administrative object 870 providing additional audit and/or receipt information to the sender 4052 indicating that the item has been passed on to the next intended recipient(s) (FIG. 118, block 4634C).

Example Trusted Electronic Go-Between Detailed Architecture and Operation

Figure 73:
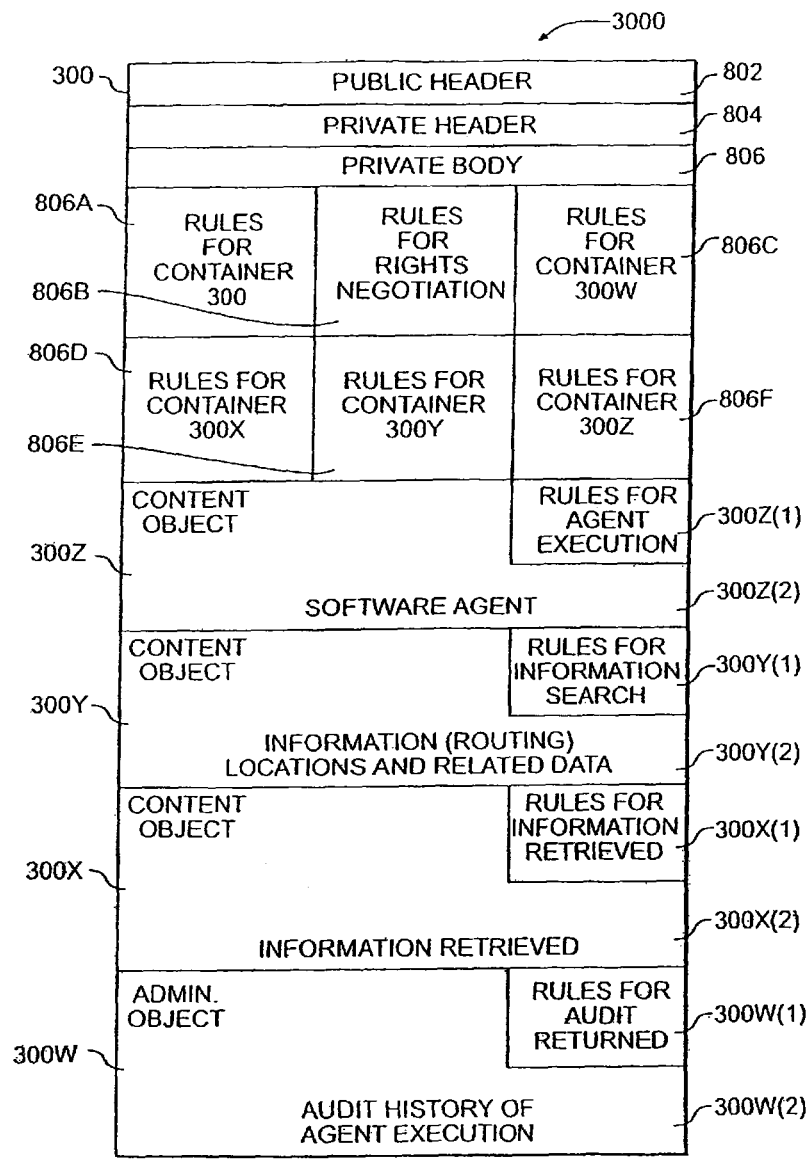
FIG. 73 shows an example of a "smart object"
Figure 74:
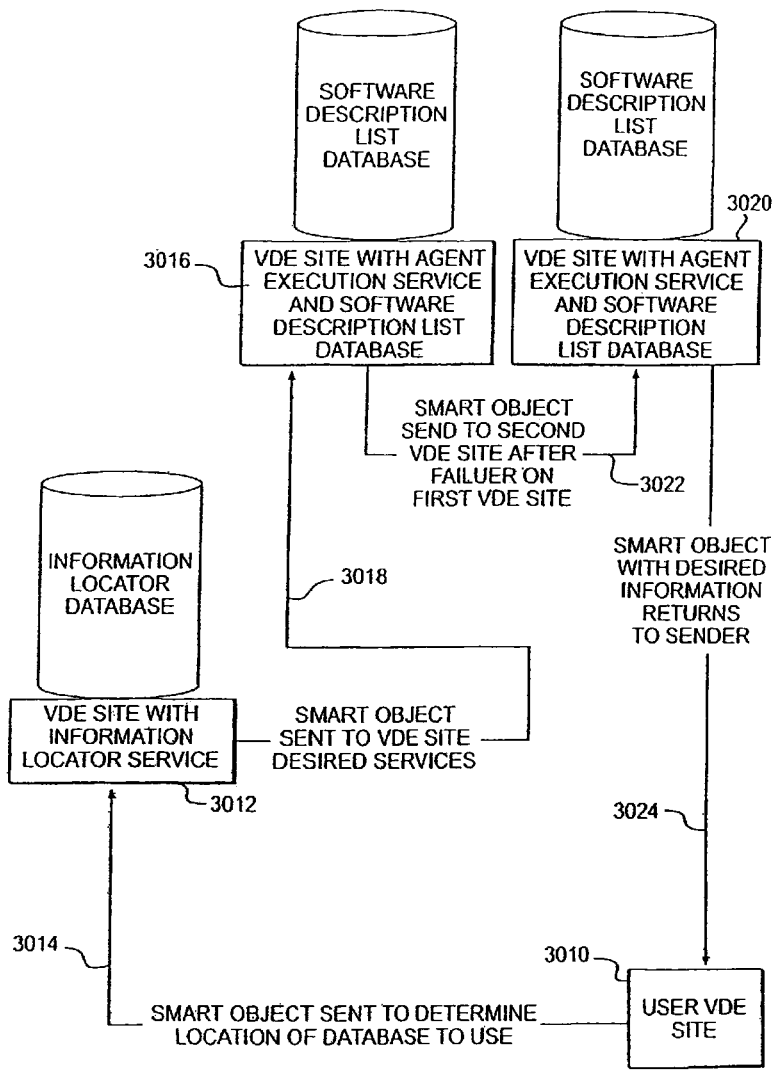
FIG. 74 shows an example of a process using "smart objects"
Figure 75A:
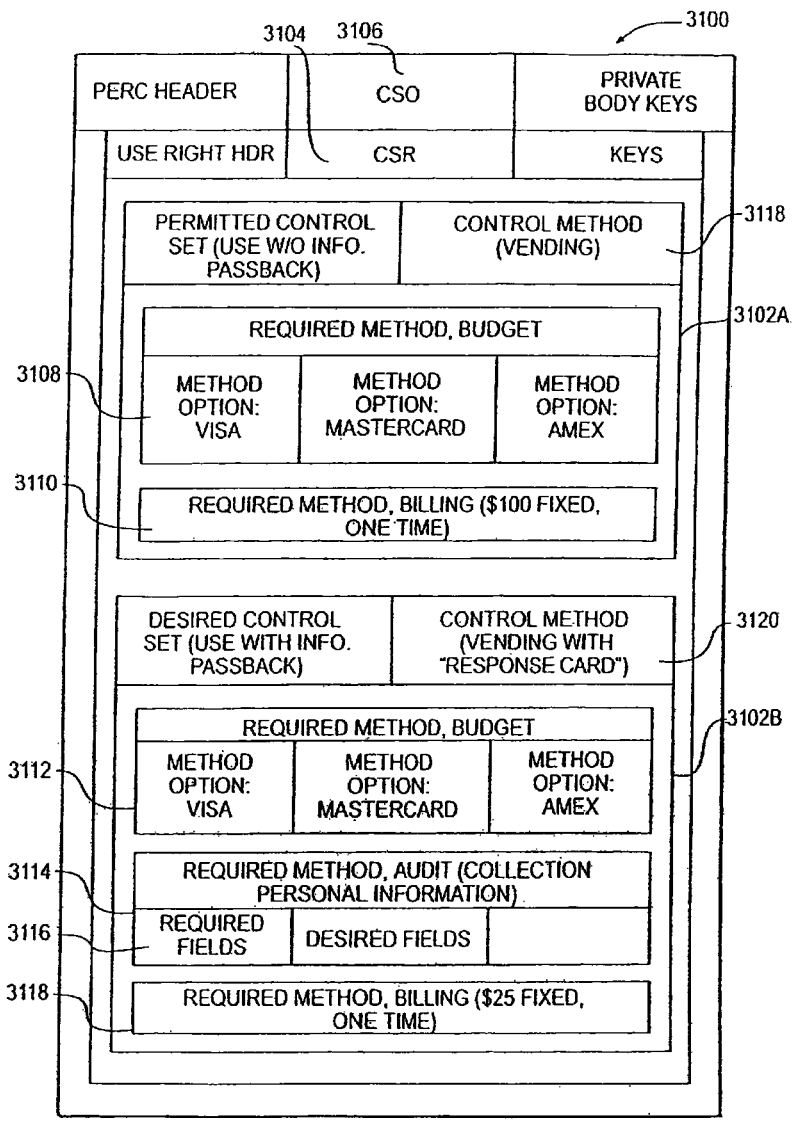
FIGS. 75A-75D show examples of data structures used for electronic negotiation.
Figure 75B:
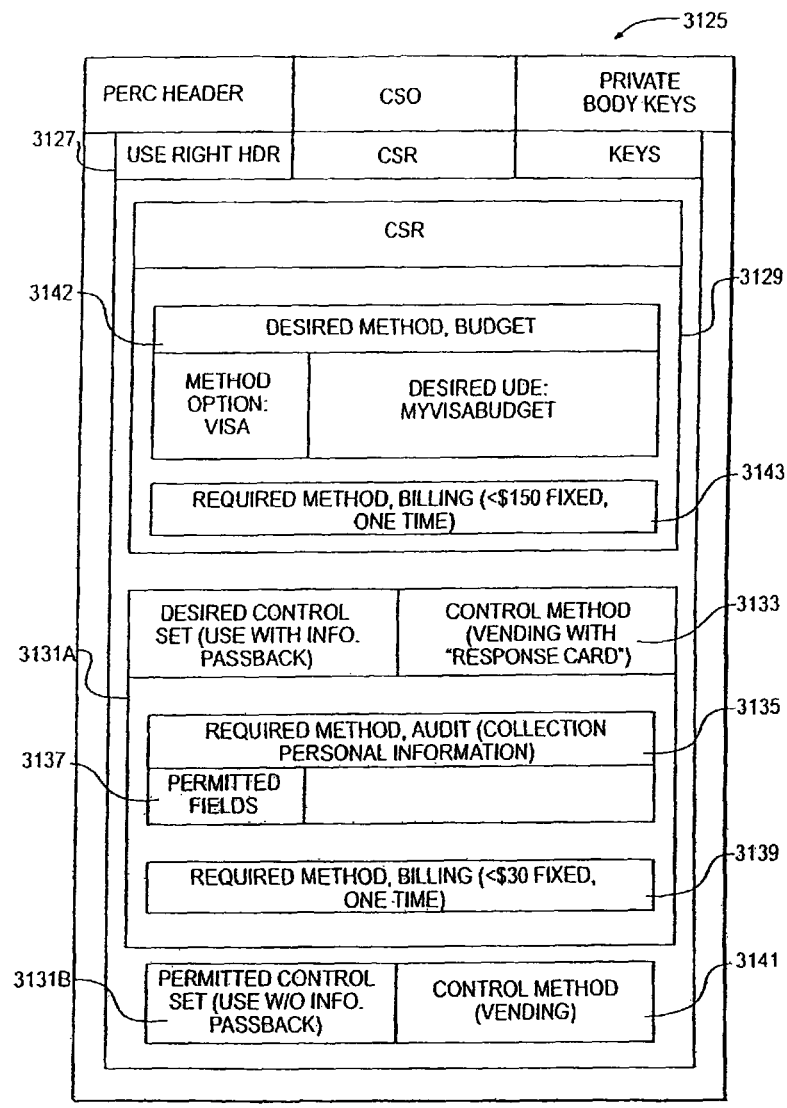
Figure 75C:
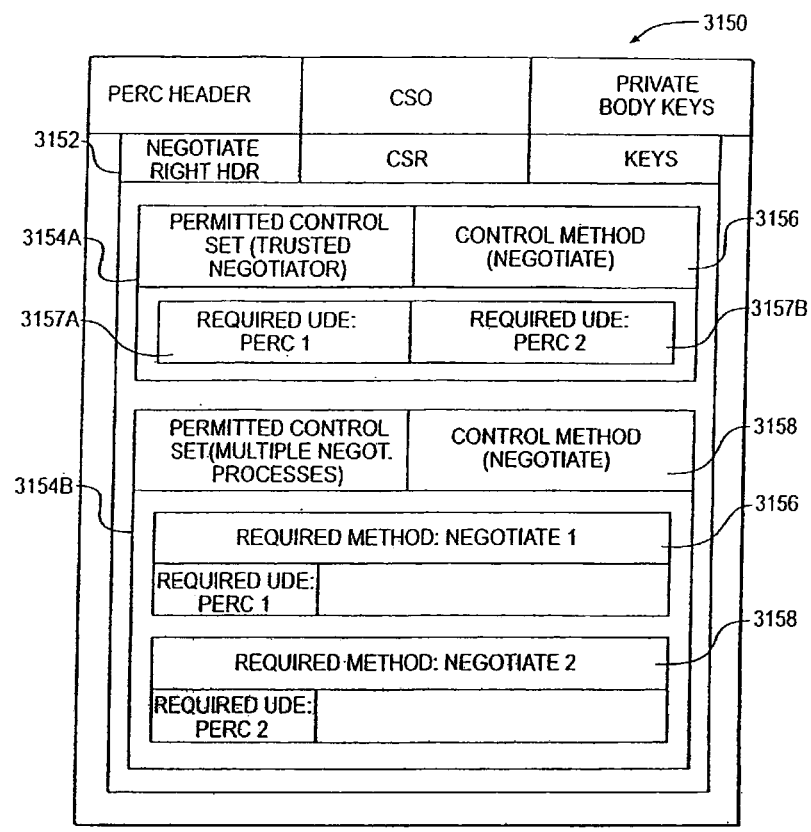
Figure 75D:
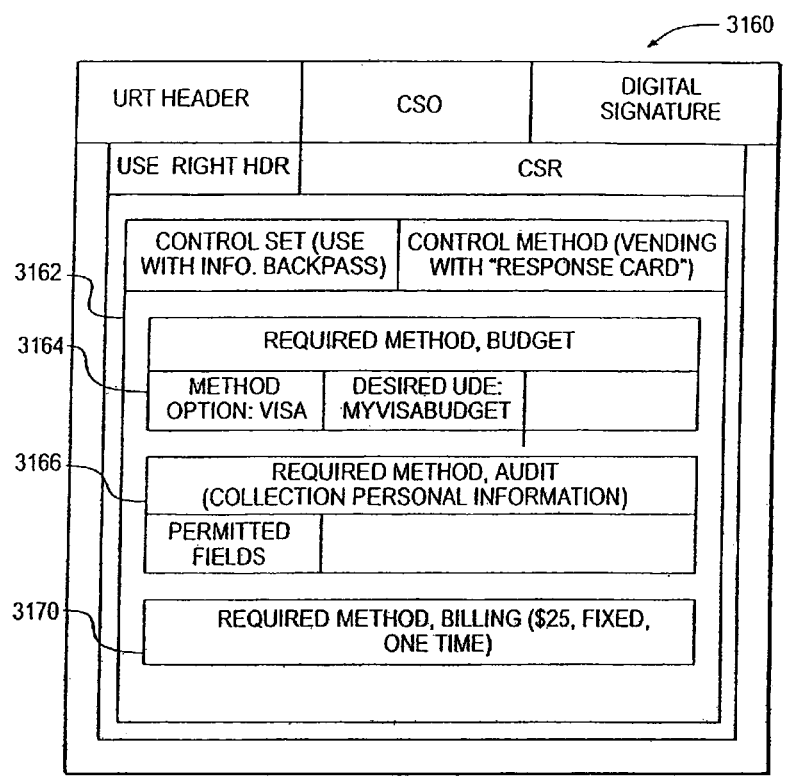
Figure 75E:
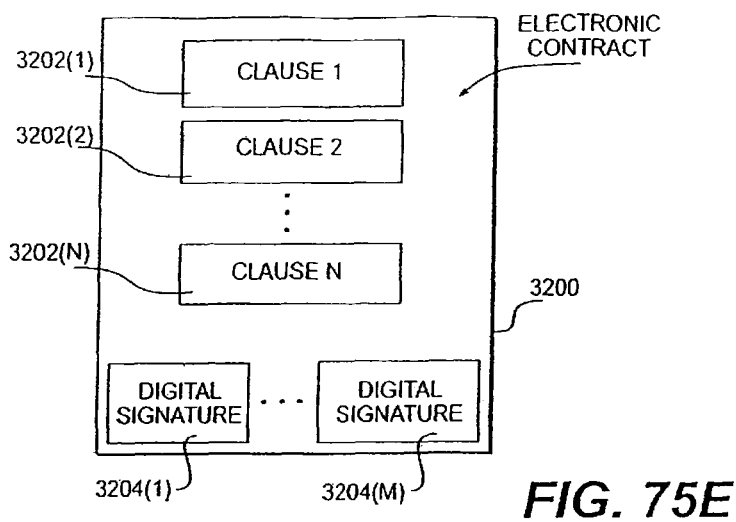
FIGS. 75E-75F show example structures relating to an electronic agreement.
Figure 75F:
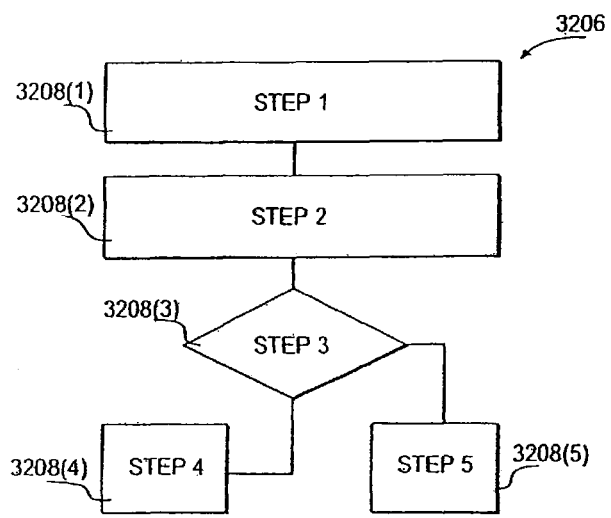

In addition to the secure archive, witnessing and transaction management functions discussed above, trusted electronic go-between 4700 may perform additional services, such as, for example:

notary services;
provide an electronic trading environment allowing multiple parties to electronically auction goods or services;
"clearing" transaction details, such as, payments, audit information and the like;
acting as a "certifying authority" (see Shear et al. patent disclosure) by issuing digital certificates 4064;
provide any or all of the various support and administrative services described in the Shear et al. patent disclosure;
act as a trusted registry for electronic control sets;
provide electronic or human arbitration, mediation or negotiation services to facilitate formation of agreements or electronic contracts;
provide legal, accounting, architectural, design or other professional services;
provide document assembly services;
provide document disassembly and component distribution services;
provide real estate, commercial or other closing or settlement services;
provide court document docketing, filing or other services to assist a judiciary;
provide document registry certification, witnessing and other services to assist a judge in ruling on the admissibility of evidence in a court of law;
provide tax filing services including income tax form preparation, payment handling and the like;
assist in communications between co-counsel, inside and outside corporate counsel, and/or opposing counsel;
deliver highly confidential information critical to national security interests;
international commerce and management of complicated international commercial transactions;
stock and bond trading and/or brokerage;
managing and/or coordinating internal organizational functions (e.g., corporate, government);
provide currency conversion and arbitrage services;
provide arbitrage services related to equity, bonds, options, and other financial instruments
provide equity, bond, currency, options and other financial instruments trading, authentication, non-repudiation, transfer agent, and related administrative and/or support services;
creation, execution, interface with, and use of "smart agents" as described in the co-pending Ginter et al., application (see FIG. 73).

Figure 55A:
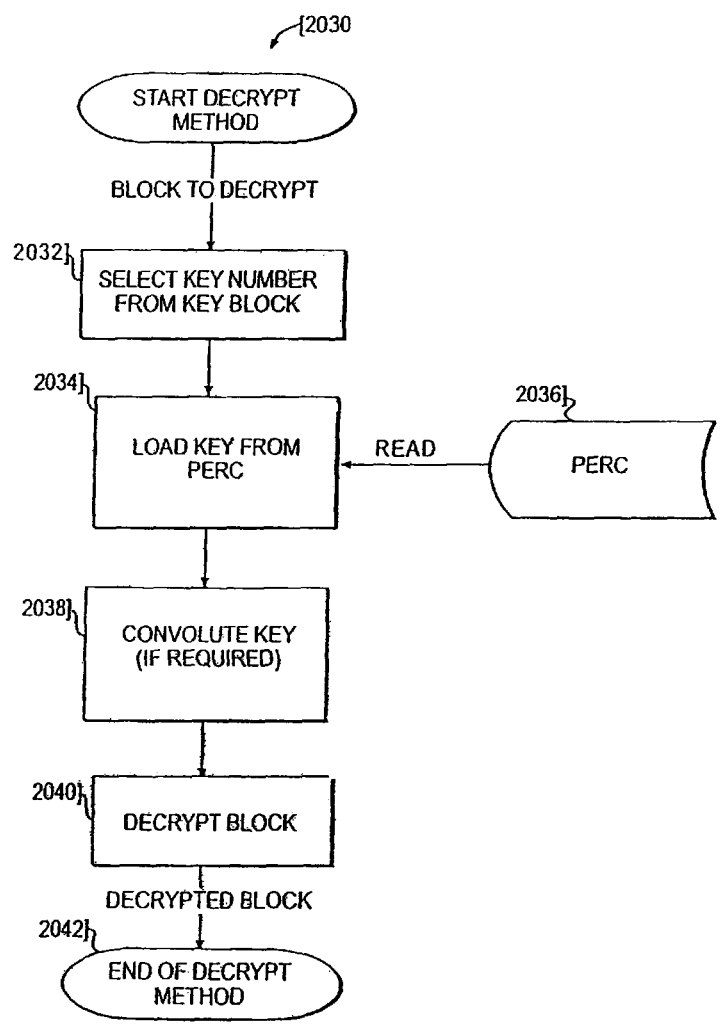
FIGS. 55A-55B show examples of DECRYPT and ENCRYPT methods.
Figure 55B:
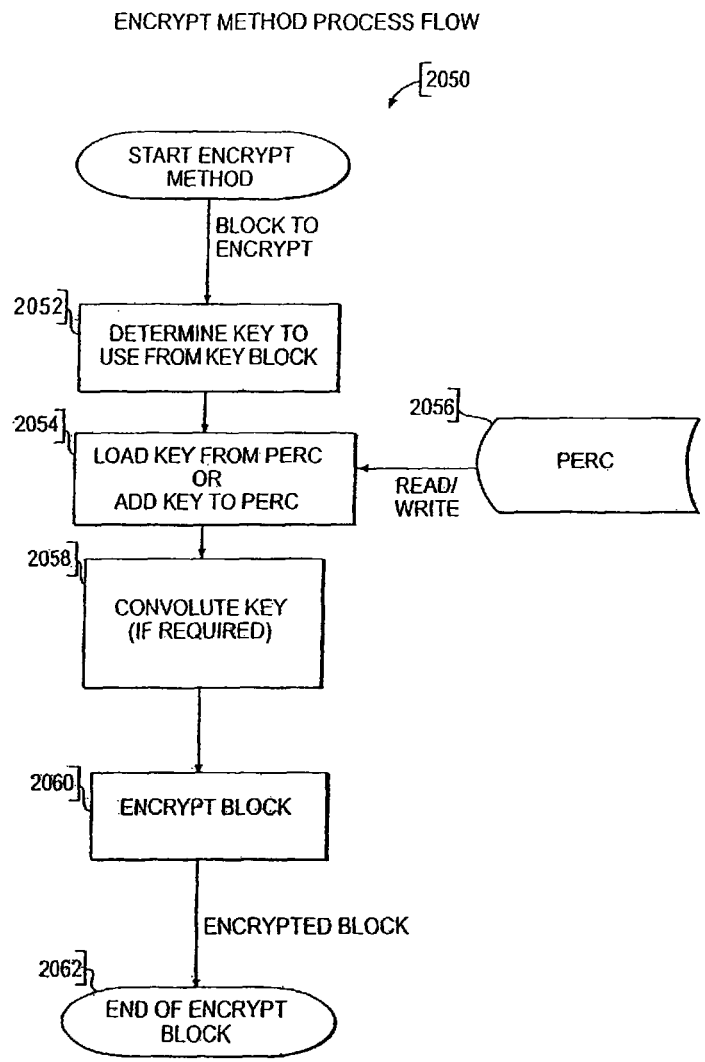
Figure 56:
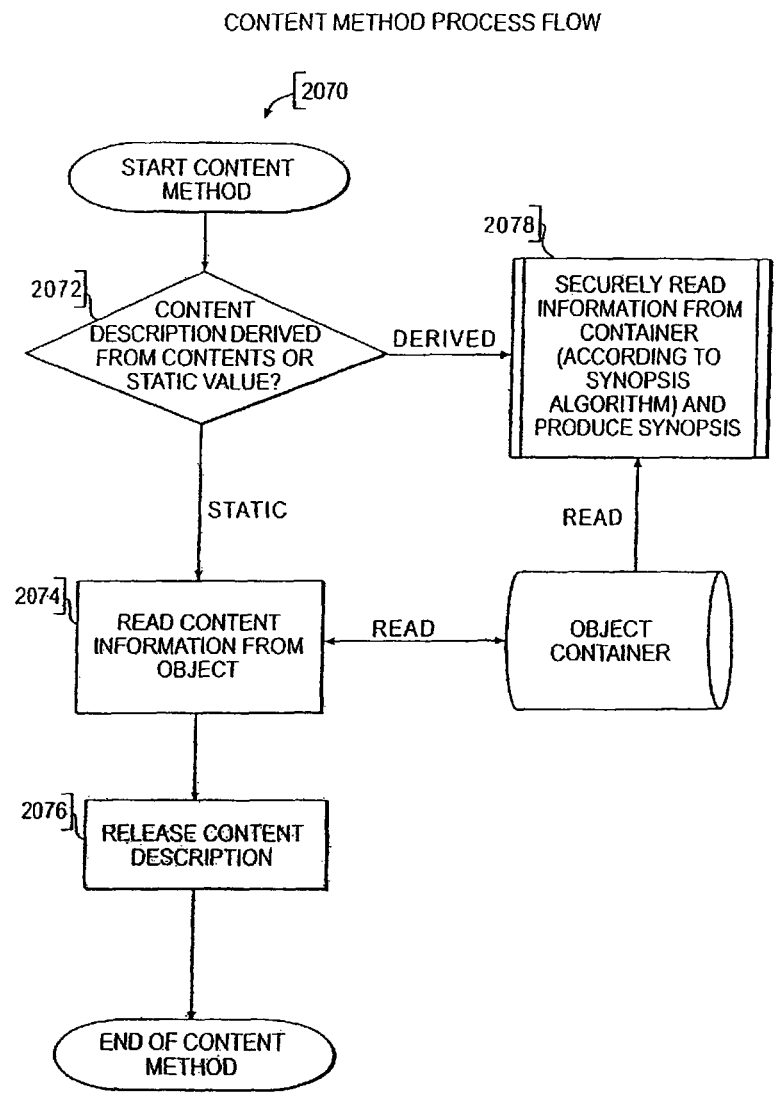
FIG. 56 shows an example of a CONTENT method.
Figure 57A:
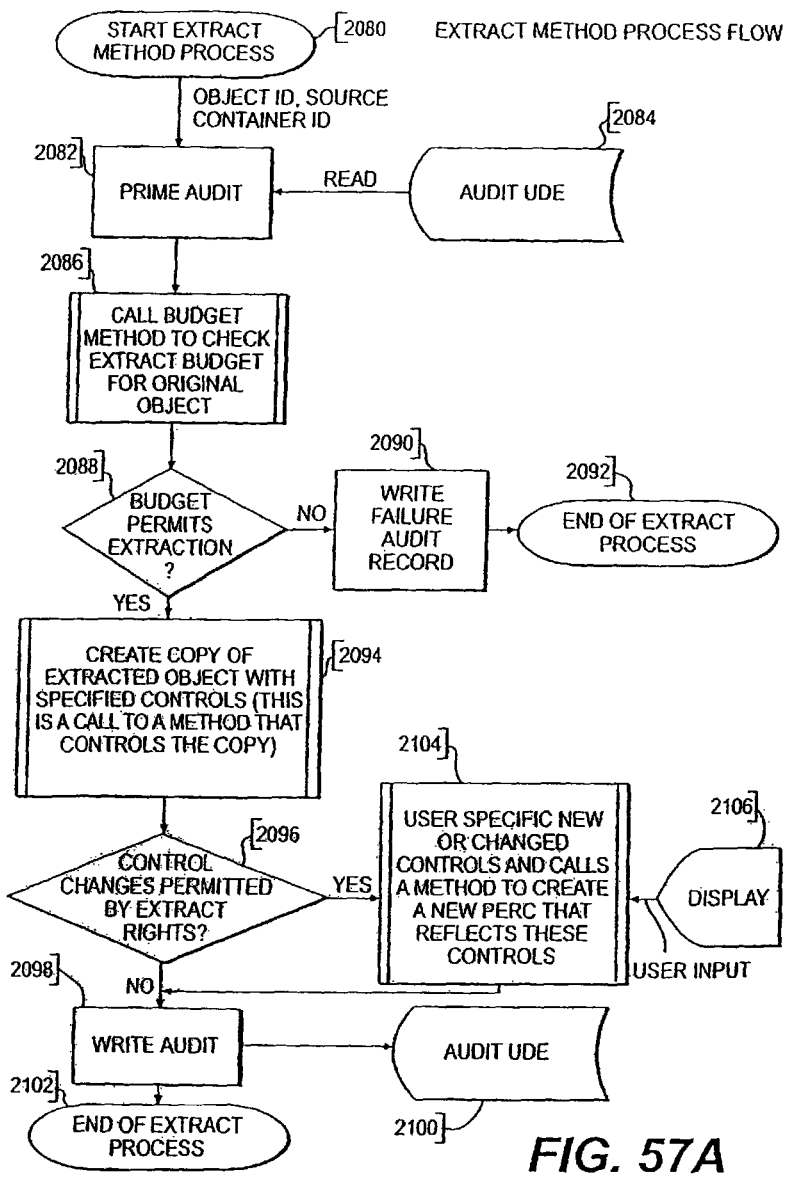
FIGS. 57A and 57B show examples of EXTRACT and EMBED methods.
Figure 57B:
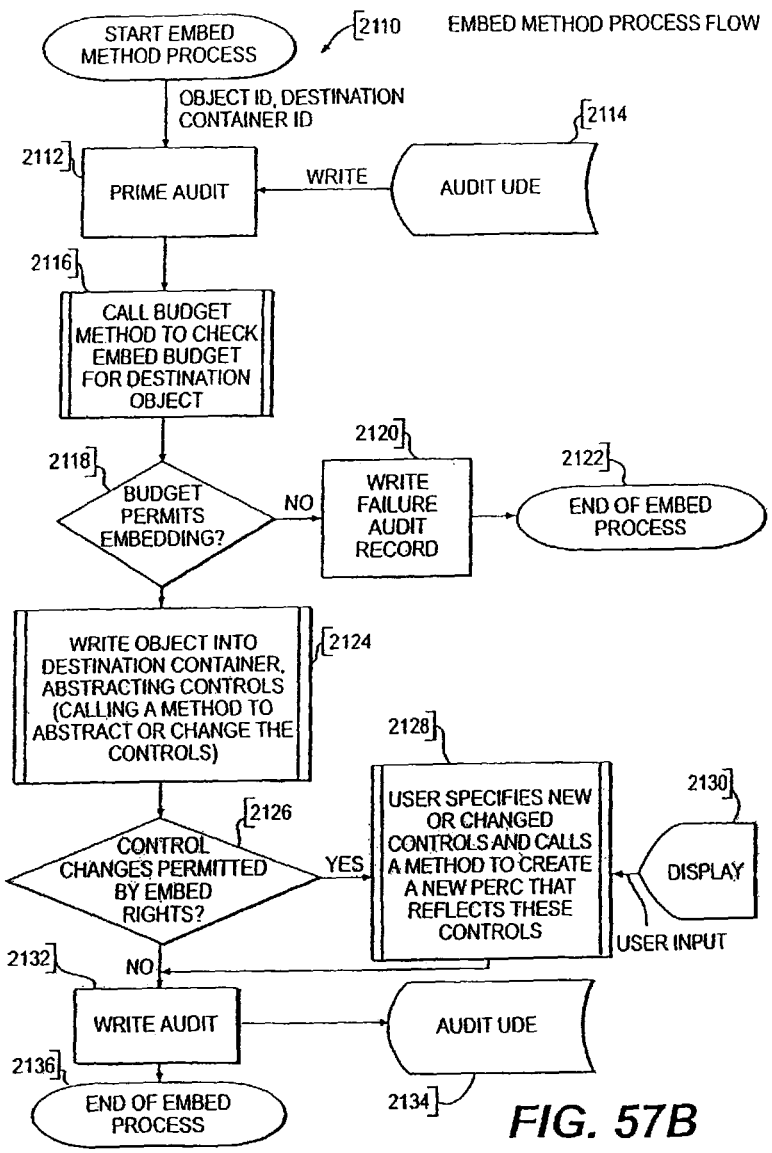
Figure 58A:
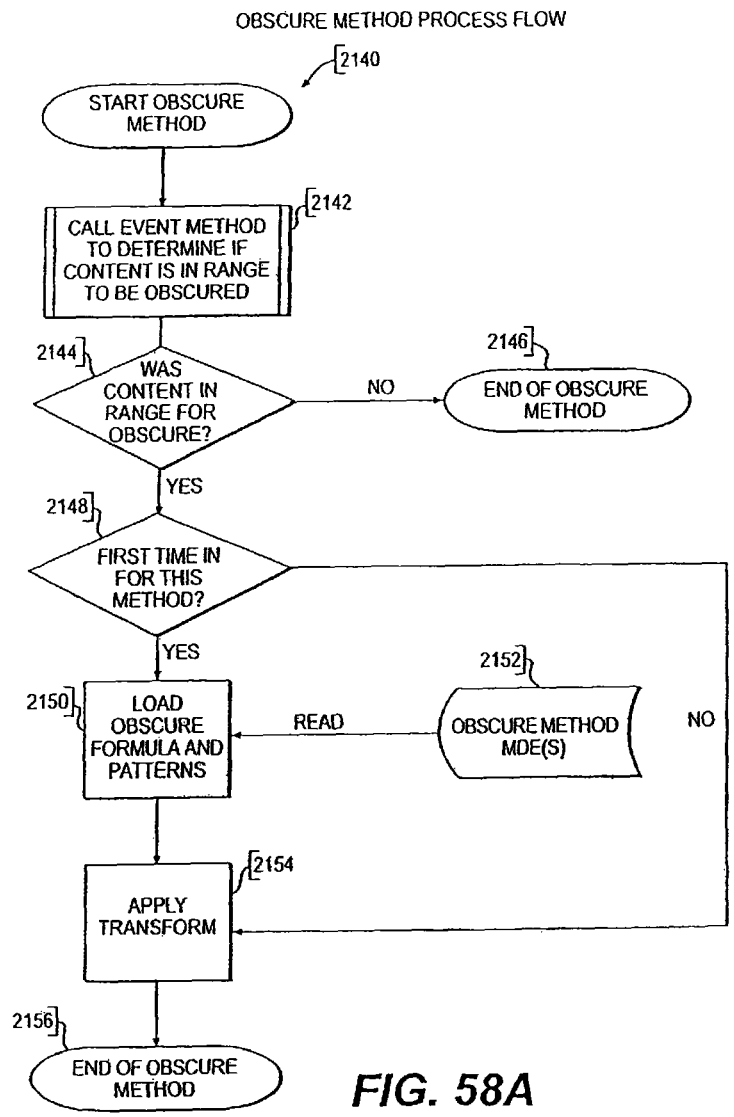
FIG. 58A shows an example of an OBSCURE method.
Figure 58B:
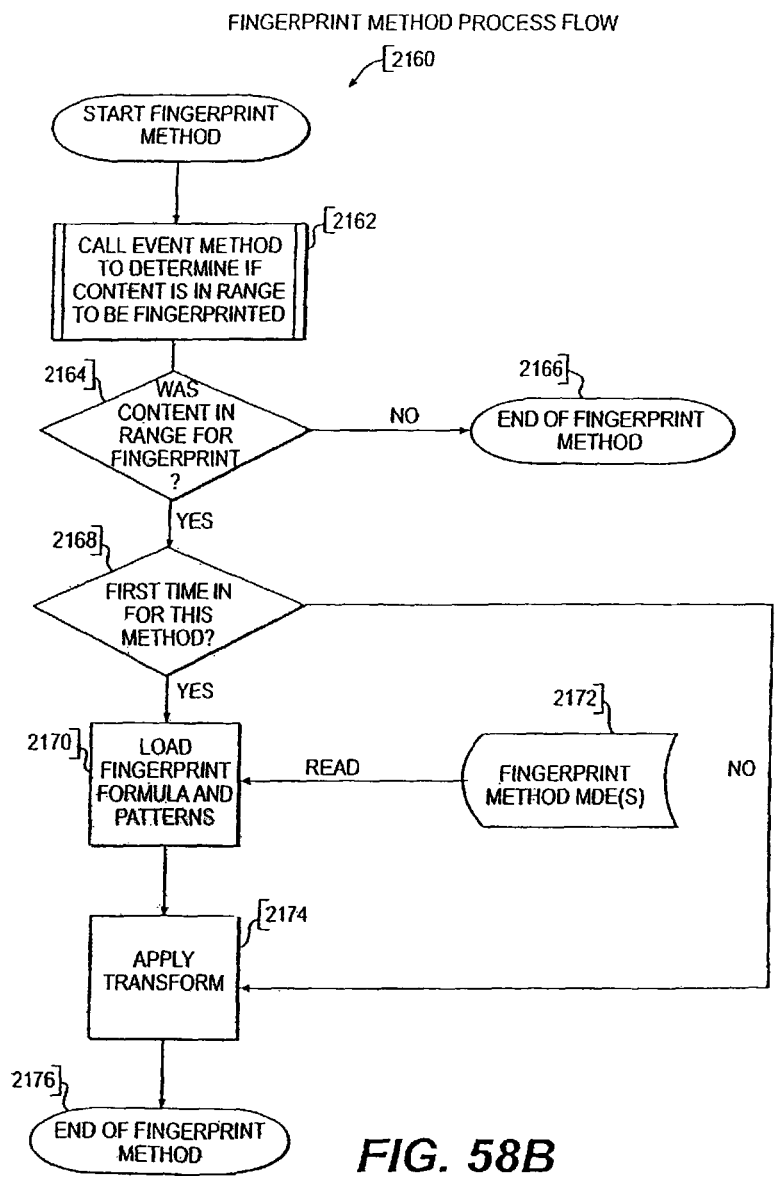
FIGS. 58B, 58C show examples of a ELECTRONIC FINGERPRINT method.
Figure 58C:
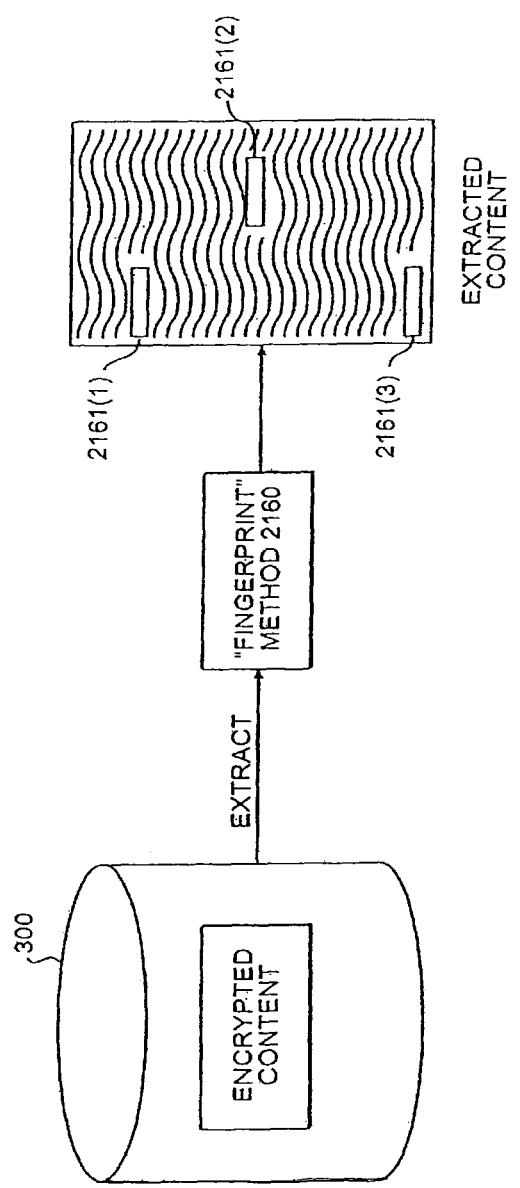
Figure 59:
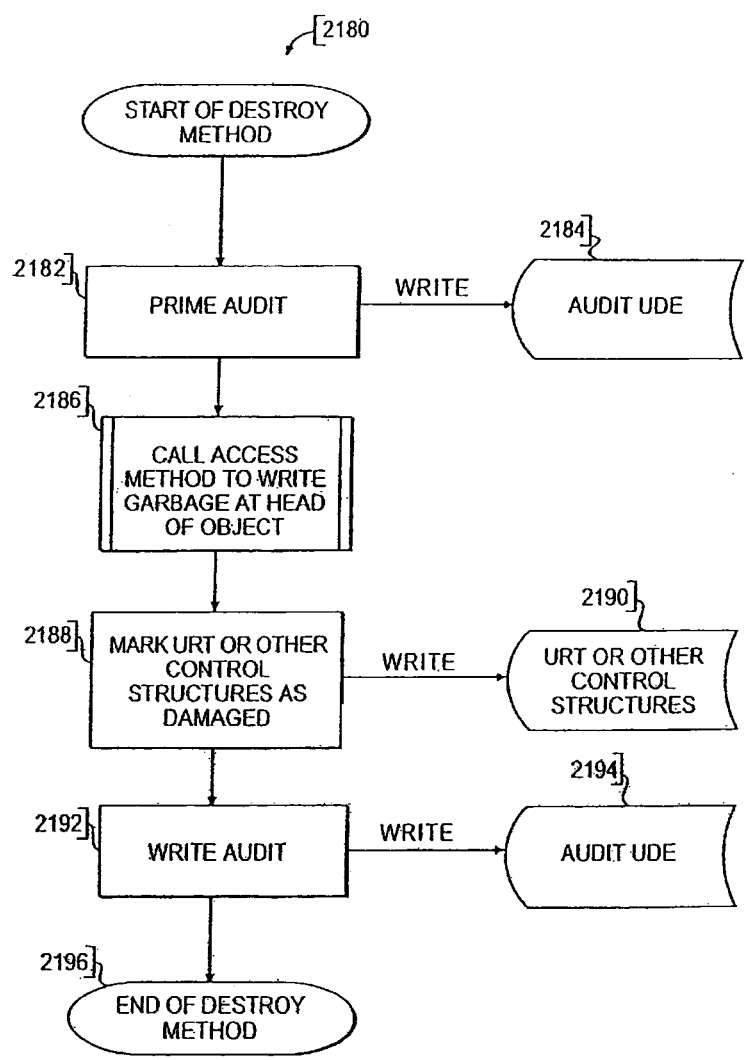
FIG. 59 shows an example of a DESTROY method.
Figure 60:
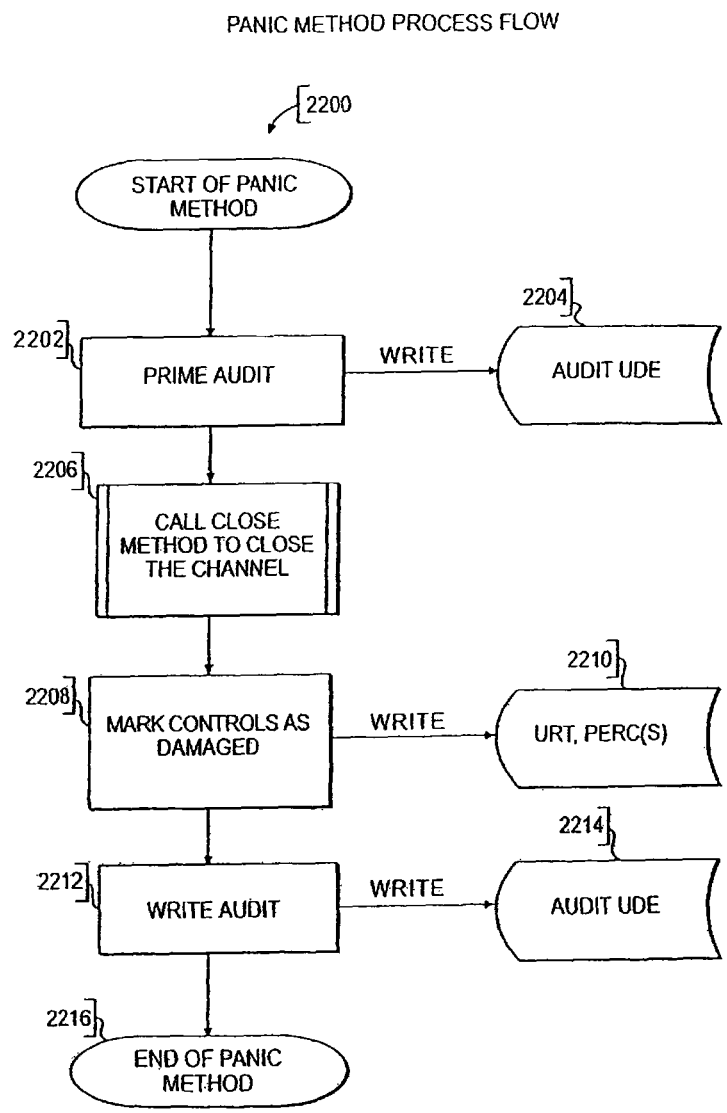
FIG. 60 shows an example of a PANIC method.
Figure 61:
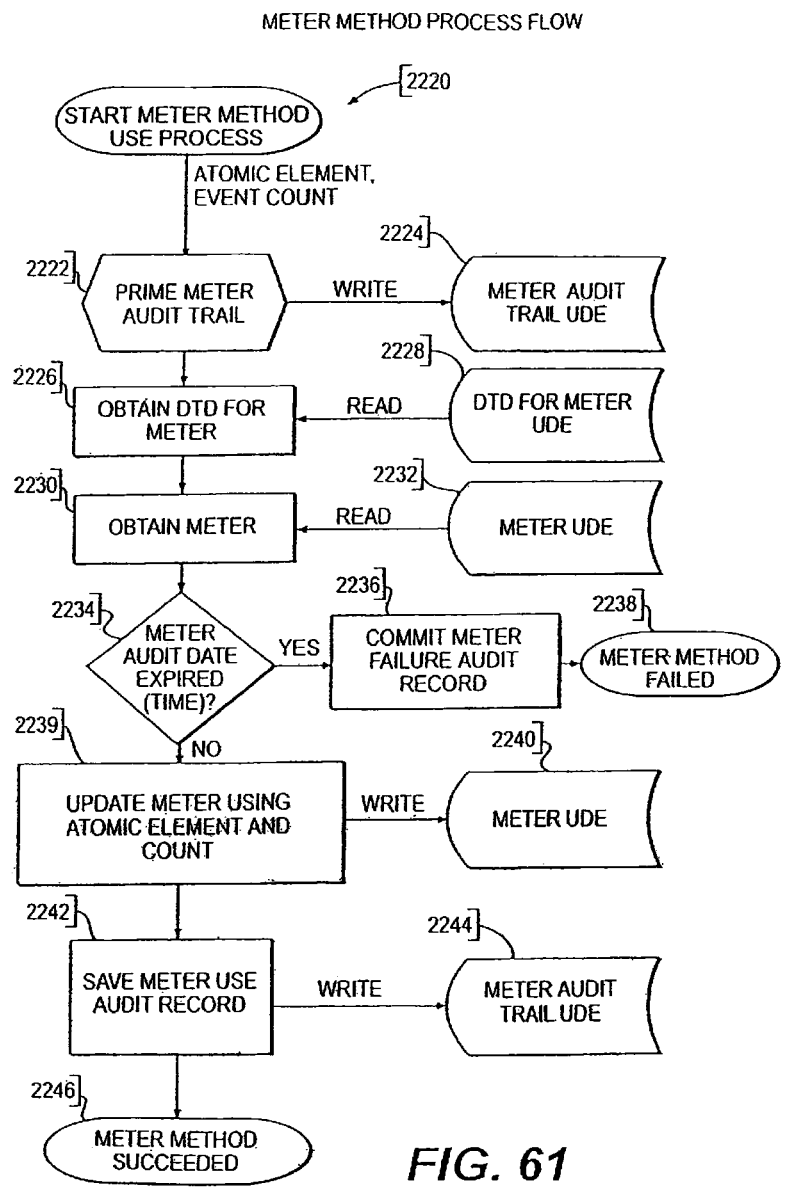
FIG. 61 shows an example of a METER method.
Figure 62:
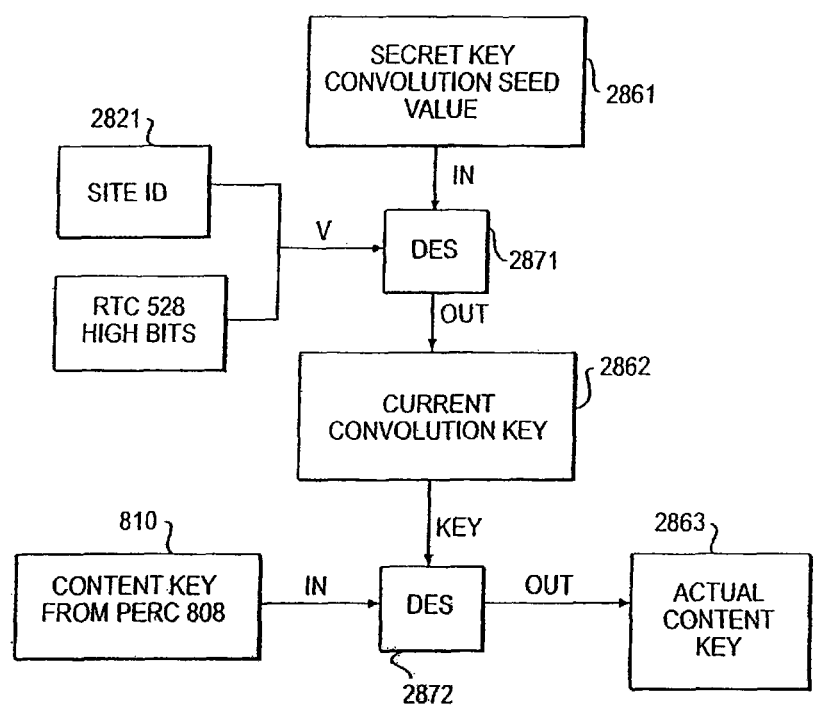
FIG. 62 shows an example of a key "convolution" process.
Figure 63:
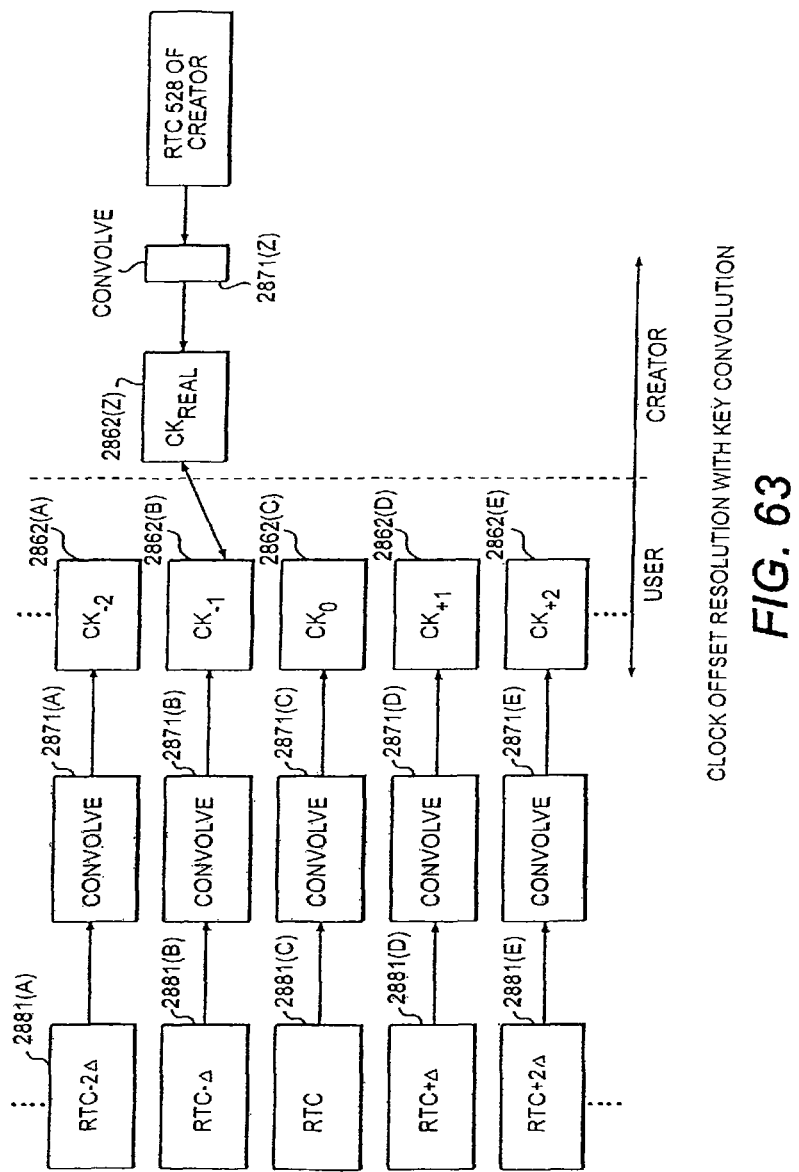
FIG. 63 shows an example of how different keys may be generated using a key convolution process to determine a "true" key.
Figure 64:
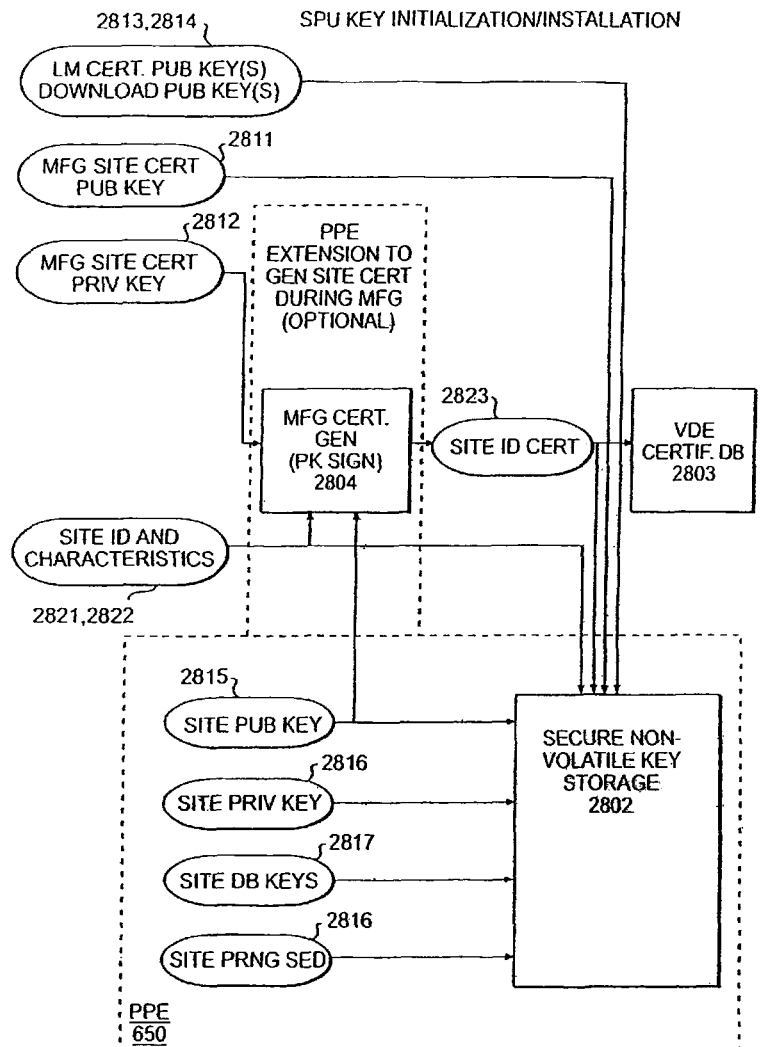
FIGS. 64 and 65 show an example of how protected processing environment keys may be initialized.
Figure 65:
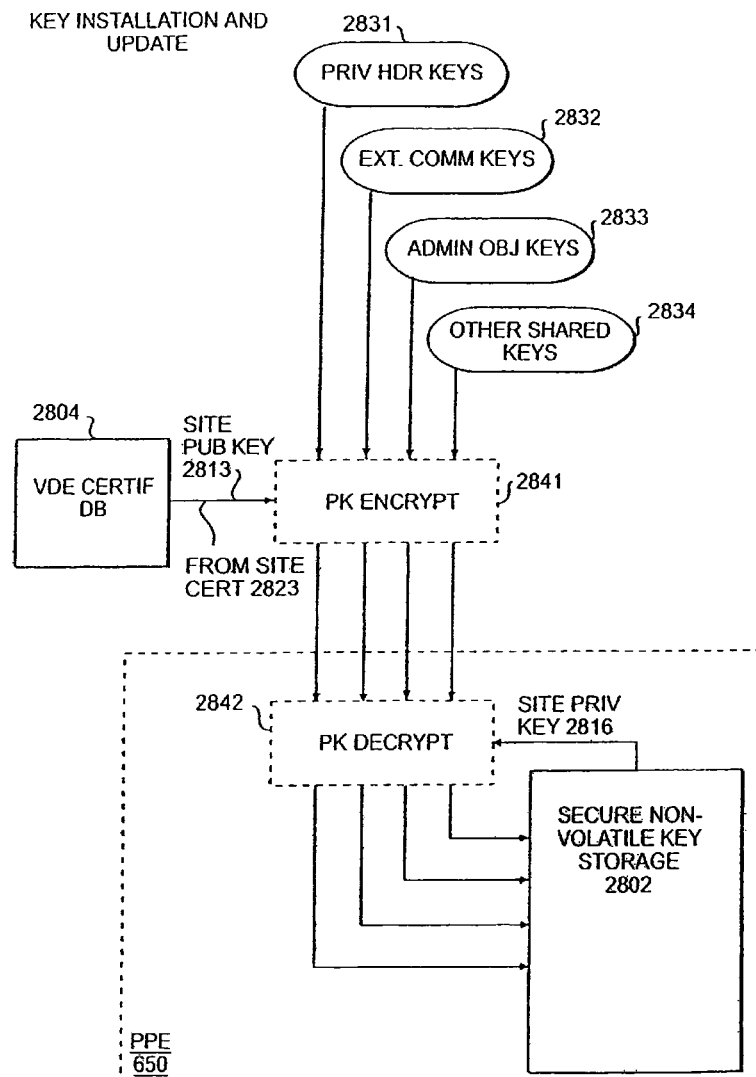
Figure 66:
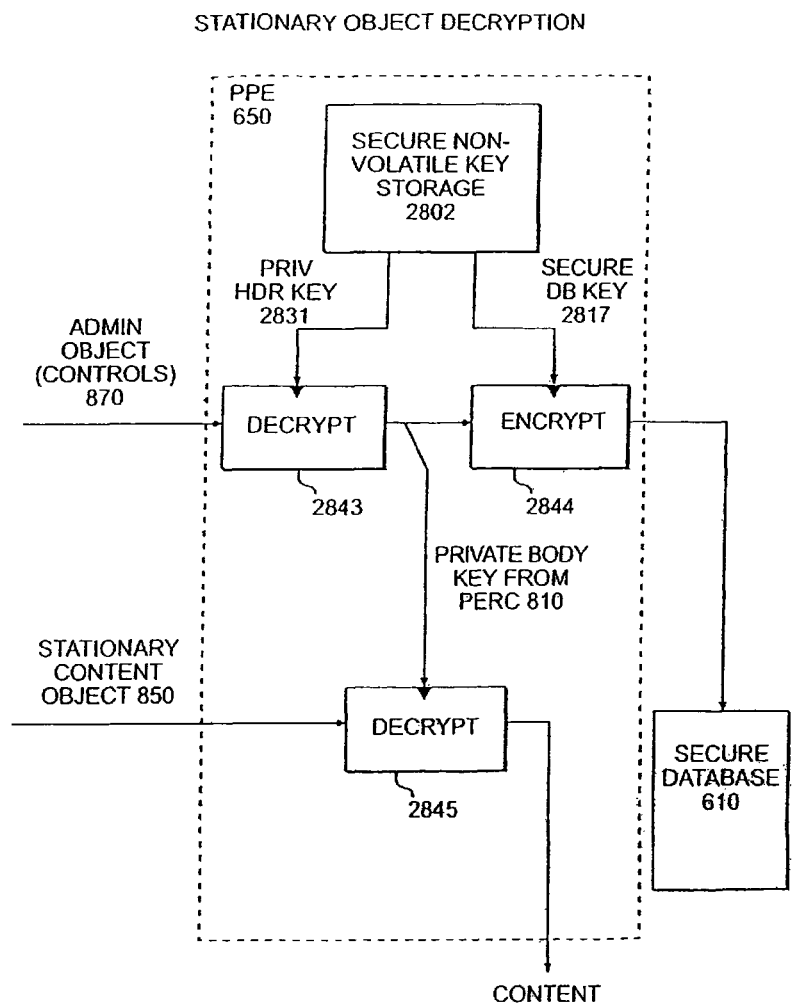
FIGS. 66 and 67 show example processes for decrypting information contained within stationary and traveling objects, respectively.
Figure 67:
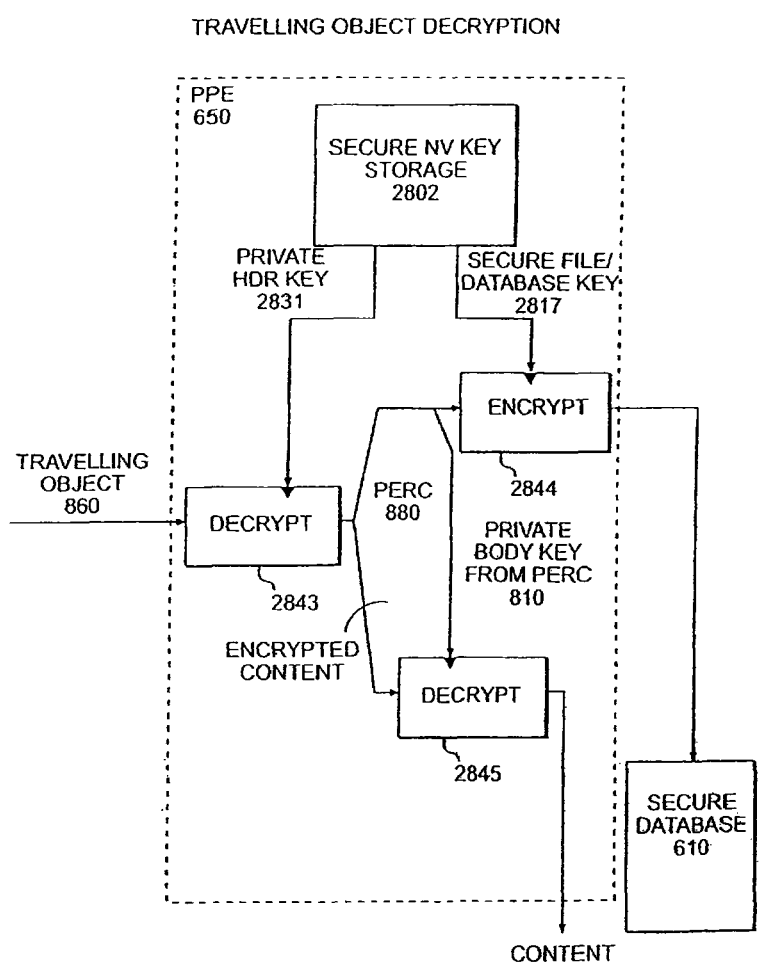
Figure 68:
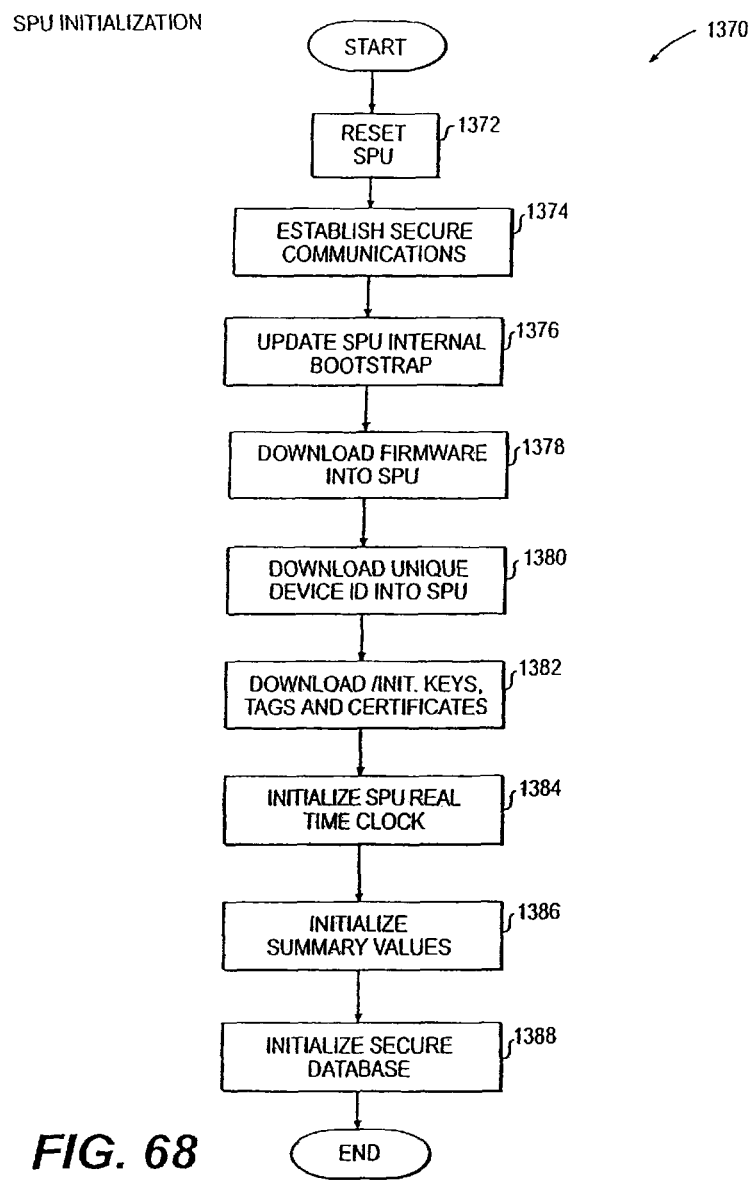
FIG. 68 shows an example of how a protected processing environment may be initialized.
Figure 69:
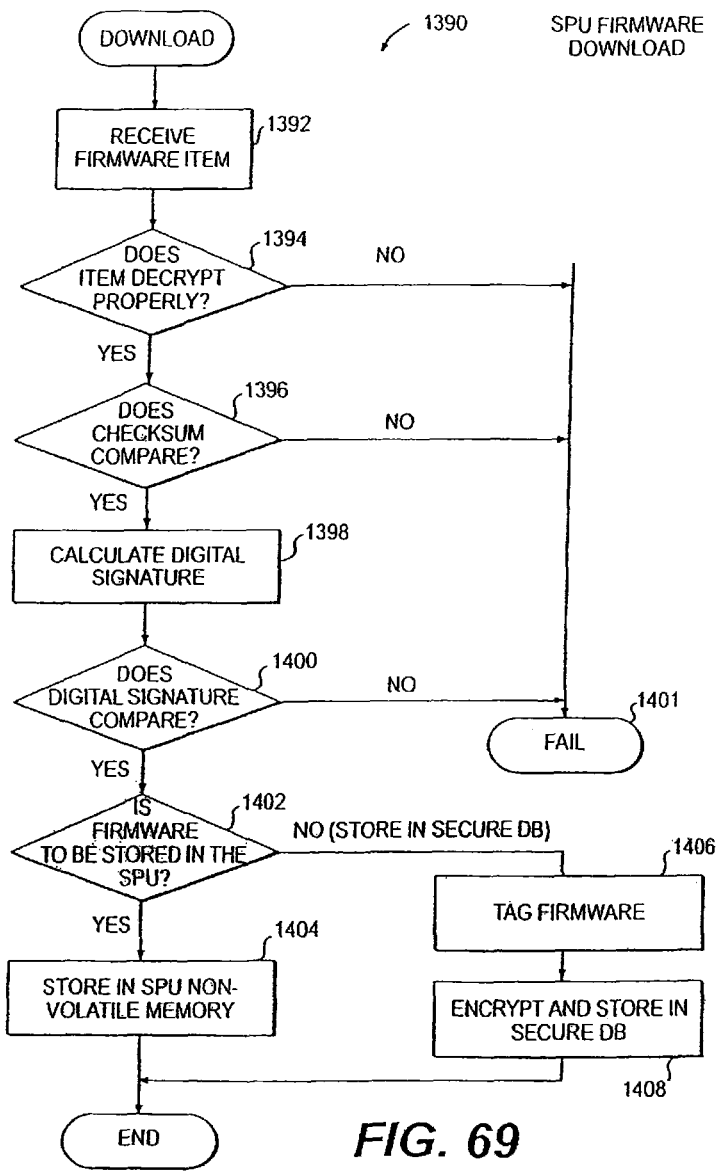
FIG. 69 shows an example of how firmware may be downloaded into a protected processing environment.
Figure 70:
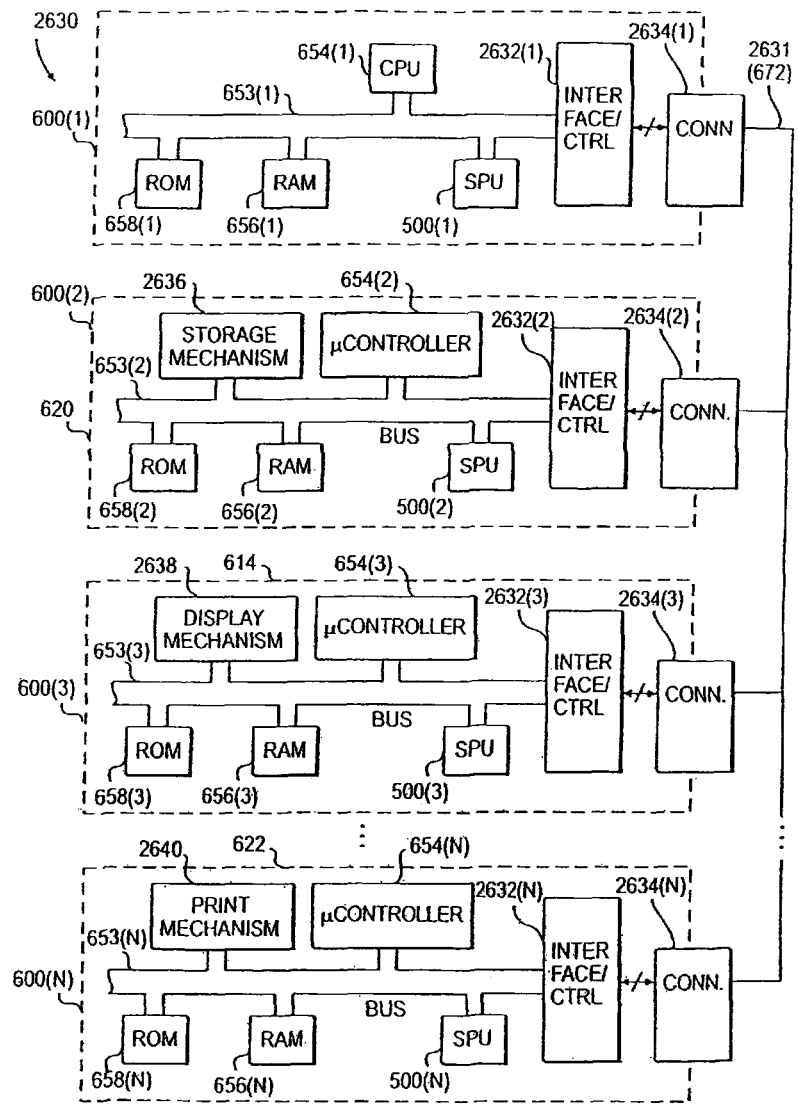
FIG. 70 shows an example of multiple VDE electronic appliances connected together with a network or other communications means.
Figure 71:
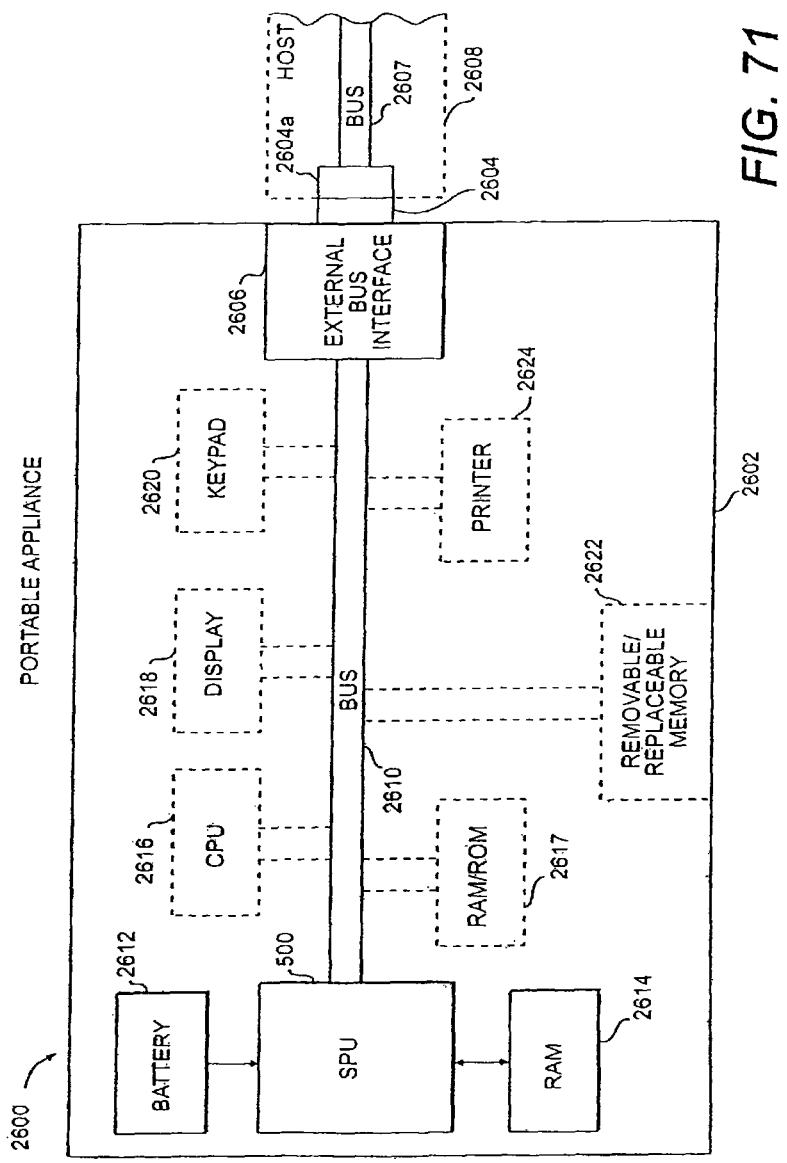
FIG. 71 shows an example of a portable VDE electronic appliance.

The trusted electronic go-between 4700 may comprise or include a "transaction authority" as disclosed in the above-referenced Shear et al. patent disclosure, and may have the same structure and architecture as shown in FIGS. 55 et seq. of that co-pending application.

The trusted electronic go-between 4700 may be one computer or many. It may be centralized or distributed. It may be public or private. It may be self-sufficient, or it may operate in conjunction with other go-betweens or other support services. It may be entirely automatic, or it may include functions and tasks that must be performed using human skills and expertise. It could be owned by a corporation or other organization, or it could be a cooperative. It could charge for its services, or it might offer its services free of charge.

Figure 119:
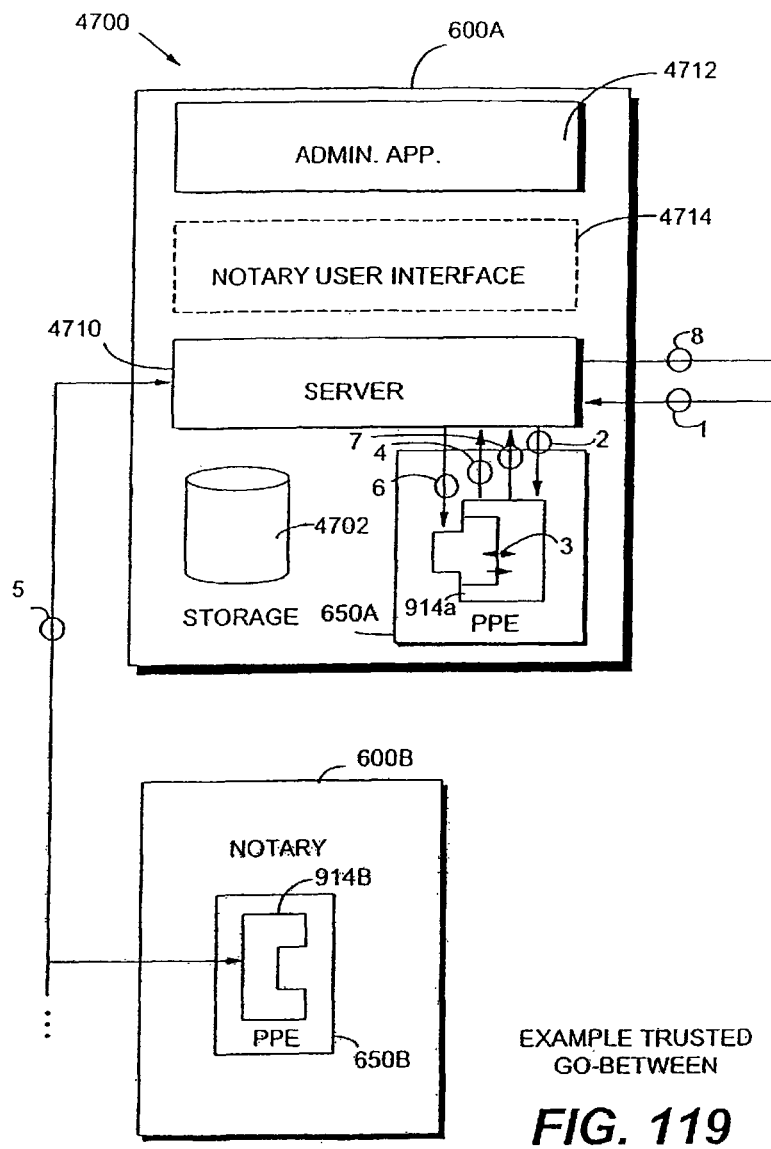
Figure 120A:
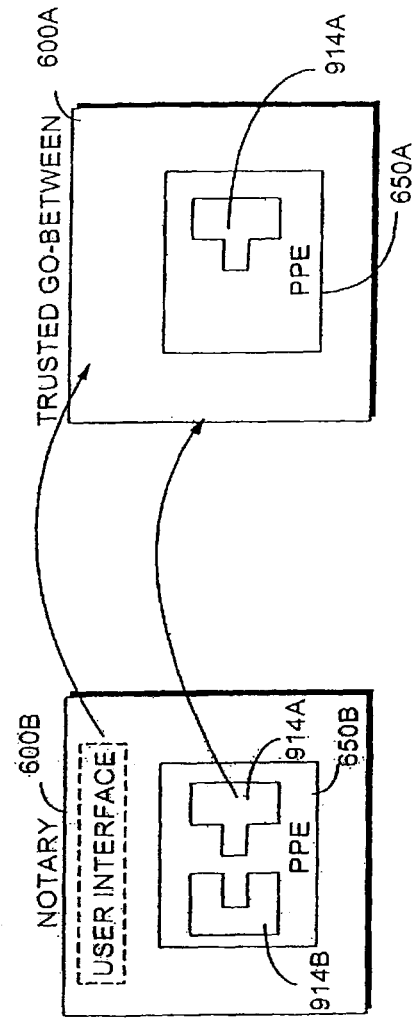
Figure 120B:
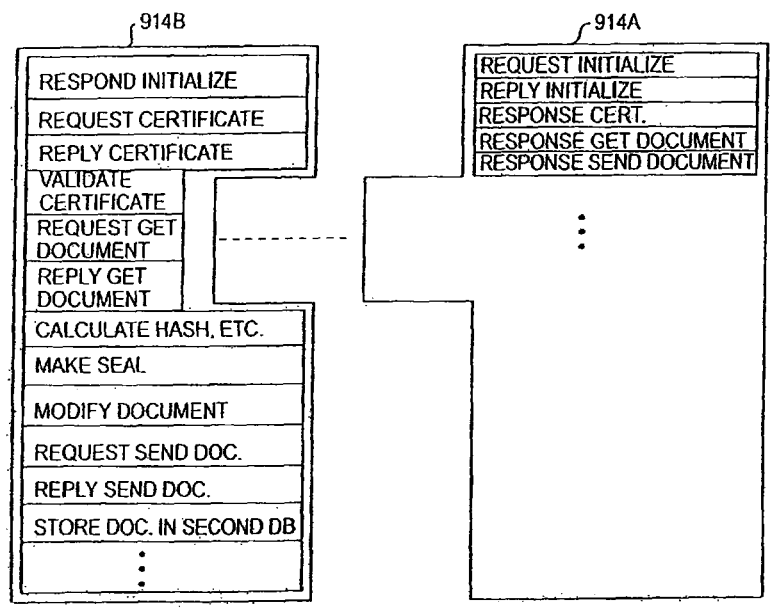

As illustrated in FIGS. 119-120B, the trusted go-between 4700 may use reciprocal methods and distributed processing (see FIG. 41a and following) to perform its tasks. For example, the trusted go-between 4700 could actually be a group of organizations (e.g., a "trusted go-between" and a notary public) that each provide an aspect of the overall function. For example, a certifying authority, a governmental regulator, and an arbitrator could provide the trusted go-between function with the arbitrator acting as the "front end" (i.e. appearing as "the" trusted go-between from the participants' point of view). Alternatively, all three of these parties may each play a role as independent trusted go-betweens (with the cost of more complex control structures, and all three parties requiring some level of coordination by one or more of the other participants to the extent their functions relate to the same subject matter).

In another trusted go-between topology, each of the participants could have one or more trusted intermediaries that interact with each other on behalf of the participants.

FIG. 119 shows an example architecture for a trusted go-between 4700 that provides notarization functions. In this example, trusted go-between 4700 may include an electronic appliance 600 providing one or more protected processing environments 650 and a secure electronic archive 4072. In this example, electronic appliance 600 may include a server 4710 that communicates with protected processing environment 650 and supports one or more administrative applications 4712. Server 4710 may, in turn, communicate with additional electronic appliances 600B including associated protected processing environments 650B.

In this specific example, additional electronic appliance 600B may be owned and/or operated by an entity having the legal authority to be an electronic notary public. The notary public protected processing environment 650B may execute a control set 914B relating to notary functions. Control set 914B in this example, has a reciprocal relationship between an overall control set 914A executed by a protected processing environment 650A of electronic appliance 600A. As shown in FIG. 120A, a notary protected processing environment 650B may originate both parts of reciprocal control sets, and deliver one half 914A for operation by appliance 600A—or electronic appliance 600A could originate both parts and deliver part 914B to the notary electronic appliance 600B.

The illustrated reciprocal control sets 914A, 914B may reciprocally interact as described above in connection with FIG. 41A-41D, for example. FIG. 120B shows example reciprocal methods 1000 that might be contained within an example pair of reciprocal control sets 914A, 914B. In this specific example, the control set 914B operated by the notary protected processing environment 650B may include, for example, the following methods 1000:
respond
initialize
request certificate
reply certificate
validate certificate
request "get document"
reply "get document"
calculate hash and other parameters
make seal
modify document
request "send document"
reply "send document"
store document into secure database 610.

Similarly, the reciprocal control set 914A operated by electronic appliance protected processing environment 650A may include methods 1000 responding to reciprocal events, such as, for example:
request initialize
reply initialize
response certificate
response "get document"
response "send document"
additional reciprocal methods The control sets 914B, 914A thus define and control the processing which go-between 4700 performs on documents and other items in order to notarize them. Human users may interact with this process if desired through optional user interfaces 4714, 4716. Such human intervention may be required under certain circumstances (for example, if a live human witness might be required to testify as to certain notarization facts, if the automatic processes determine that a fraud is being attempted, etc.). The dynamic interface technology described above can provide a mechanism for delivering a user interface through the system without direct intervention by the provider of the overall service with respect to user interface, and by the notary with respect to the customer relationship.

Example Trusted Go-Between Process Upon Item Receipt

Figure 121:
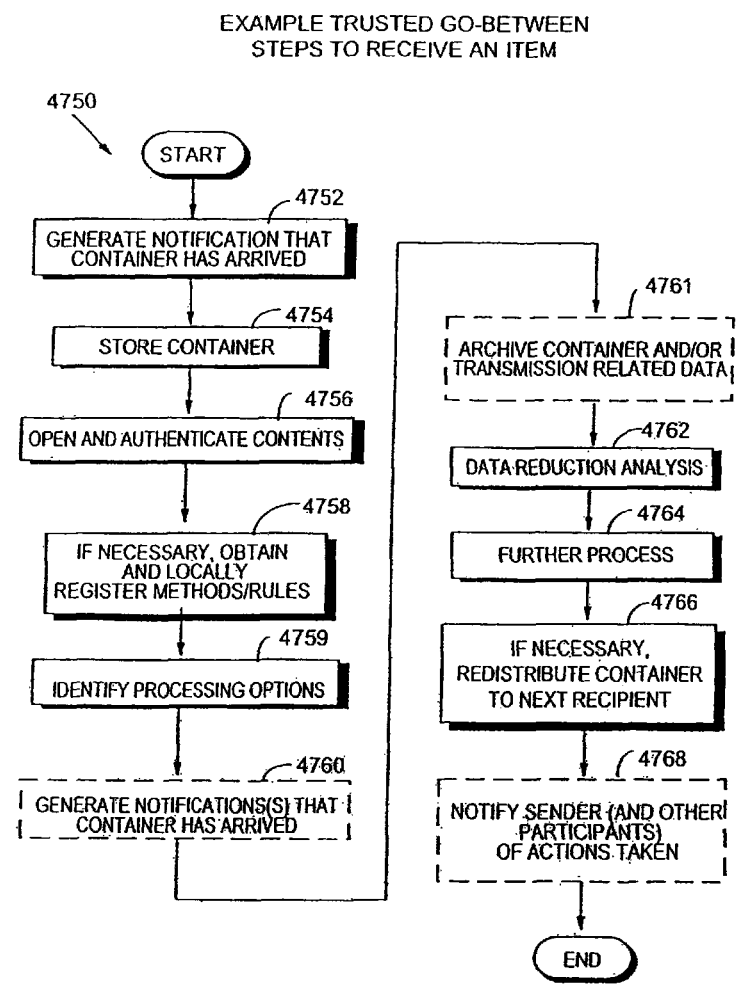

FIG. 121 shows an example process 4750 that may be performed by a trusted electronic go-between 4700 in the FIG. 100 scenario shown above. In this example, the trusted electronic go-between 4700 receives notification that the electronic container 302 has arrived (FIG. 121, block 4752), may store the container locally (FIG. 121, block 4754), and opens and authenticates the container and its contents (FIG. 121, block 4756). The trusted electronic go-between 4700 may then, if necessary, obtain and locally register any method/rules required to interact with secure container 302 (FIG. 121, block 4758). The trusted electronic go-between automatically accesses and identifies any controls indicating processing options (FIG. 121, block 4759), and may generate any audit trails or other notification(s) that the container has arrived (FIG. 121, block 4760). The trusted electronic go-between 4700 may then optionally archive the electronic container (and/or transmission related data) locally (FIG. 121, block 4761)—according to specific options chosen by the sender or other participant and/or the default processing options of the trusted go-between (in one example, all containers and their contents may be stored for five years unless processing options were chosen to the contrary). The trusted electronic go-between 4700 may perform further processes as required by associated electronic controls (FIG. 121, block 4764). The trusted electronic go-between 4700 may, if necessary, redistribute the container to the next recipient (FIG. 121, block 4766), and may then notify the sender 4052 or other parties of the actions taken (FIG. 121, block 4766).

Trusted electronic go-between 4700 may also archive transmission related data as determined by the electronic control set 4078 associated with the item 4054 being sent, the transaction type and/or sender and/or recipient information (FIG. 121, block 4760). For example, trusted electronic go-between 4700 might automatically determine archiving requirements based at least in part on certified class based identification information regarding sender 4052 and/or recipient 4056. In one example, trusted electronic go-between 4700 archives transmittal related information such as receipt data structure 4066 in an object oriented database employing secure containers 302. It may also perform data reduction analysis and/or authentication processes (FIG. 121, block 4762) to provide client specific, class and/or transaction type usage analysis.

Trusted electronic go-between 4700 may next further process the received item 4054 in accordance with requirements provided by electronic control set 4078 (FIG. 121, block 4764). For example, the trusted electronic go-between 4700 might perform an integrity check on the item, or it may notarize the item before archiving it. Other processes that might be performed by trusted electronic go-between 4700, depending on the particular scenario, include for example the following non-exhaustive list of functions and/or operations:

Applying signatures (digital, visual, or both)
Applying seals (visual, hidden, steganographic)
Inserting a third party seal
Completing a sender seal
Providing a handwritten signature
Providing a steganographic electronic fingerprint
Providing a visual electronic fingerprint
Determining Privacy/Use Controls (e.g., modify/no modify and/or partial disclosure, recording public transactions, permitting disclosure only to those on authorization lists)
Issuing receipts (e.g, to sender)
   Integrity Guarantees (e.g., no modifications permitted, no modifications other than signing permitted, no cut, paste, excerpting permitted)
Contract execution functions such as:
   send offer to single and/or multiple recipients,
   send acceptance
   propose modification
   add comments
   negotiate (with our without saving negotiation history)
   execute contract
   degree/type of non-repudiation evidence required
   Teleconferencing options such as use of secure directory lookup (if address unknown), quality (speed) of connection, payment handling, and advanced options
   Audit functions
   Contract Settlement functions
   Archival functions such as
     archive digital "original"
     archive "sent" audit record
     archive "received" audit record
     archive negotiation history audit record(s)
       Length of time to store records (days, months, years, forever)
       Contents inaccessible to trusted-go-between (automated service only)
Notary functions, for example:
   notarize digital "original"
   notarize sub-sections of digital "original"
   notarize "sent" audit record
   notarize "received" audit record
   notarize negotiation history audit record(s)
Electronic negotiation functions, for example:
   Automated negotiations enabled (yes/no)
   Specific human go-between (if yes, who)
Payment handling, for example:
   Mastercard
   Visa
   American Express
   ACH
   EDI X.12
   other As part of this processing, trusted electronic go-between 4700 may, if necessary, redistribute the electronic container 302 to the intended recipient 4056 (FIG. 121, block 4766).

Example Trusted Go-Between Process to Archive and Redistribute an Item

Figure 122:
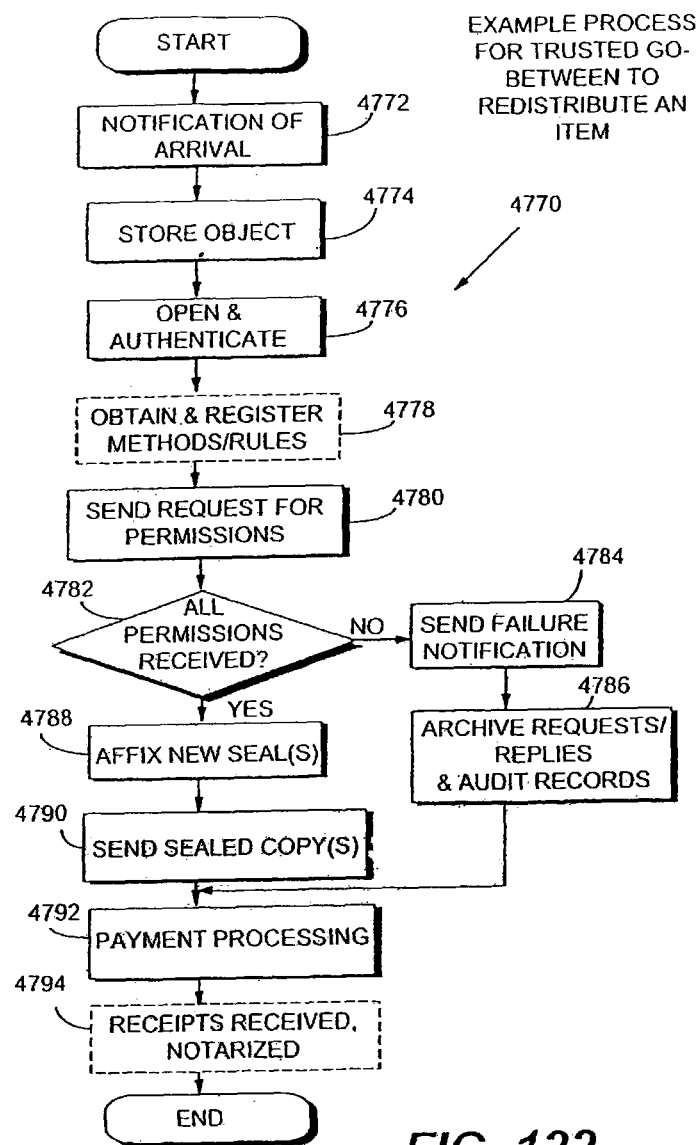

FIG. 122 shows an example process 4770 performed by trusted go-between 4700 to archive and redistribute an item 4054. In this example process 4770, the trusted go-between 4700 receives notification that an object 300 (e.g., a container 302 containing an item(s) 4054) has arrived (FIG. 122, block 4772). Trusted go-between 4700 may store the object 300 into its secure archive 4702 (FIG. 122, block 4774). It may then open the container 302 and authenticate its contents (FIG. 122 block 4776). If necessary, trusted go-between 4700 may obtain and register any methods, rules and/or controls it needs to use or manipulate the object 300 and/or its contents (FIG. 122 block 4778).

Unless it already has the required permission to redistribute the object 300 (e.g., based on controls within the object's container 302), trusted go-between 4700 may need to request permission to redistribute (FIG. 122, block 4780). Trusted go-between 4770 may test to determine whether it has the required permissions (FIG. 122, decision block 4782)—and request them from the appropriate party or parties if necessary.

If trusted go-between 4700 is unable to obtain the necessary additional permissions ("no" exit to decision block 4782, FIG. 122), the trusted go-between may send a failure notification (FIG. 122, block 4784) and may archive the requests, replies and audit records (FIG. 122, block 4786). If, on the other hand, trusted go-between 4700 has the necessary permission(s) to redistribute the received object 300 ("yes" exit to decision block 4782, FIG. 122), the trusted go-between may affix one or more new seals 4200 to the item(s) 4068 (FIG. 122, block 4788), and may then send the sealed copies within secure containers 302 to the appropriate recipient(s) (FIG. 122, block 4790).

Trusted go-between 4700 may perform appropriate payment processing (FIG. 122, block 4792), and may optionally provide appropriate return receipts as required by the controls associated with the object 300 (FIG. 122, block 4794).

Example Process for Trusted Go-Between to Provide an Item from Its Secure Archives In most instances, retrieving archived data requires a user to authenticate themselves, and present information identifying the container. Some containers may require more than one party to retrieve data (e.g., both the recipient and the sender), in most cases a user who is not party to the transaction cannot retrieve data (an exception could be a government authority, such as a court or tax auditor). In one interesting case, all electronic copies have been lost or were never stored (presumably, the archive only contains transaction information and a hash value).

Figure 123:
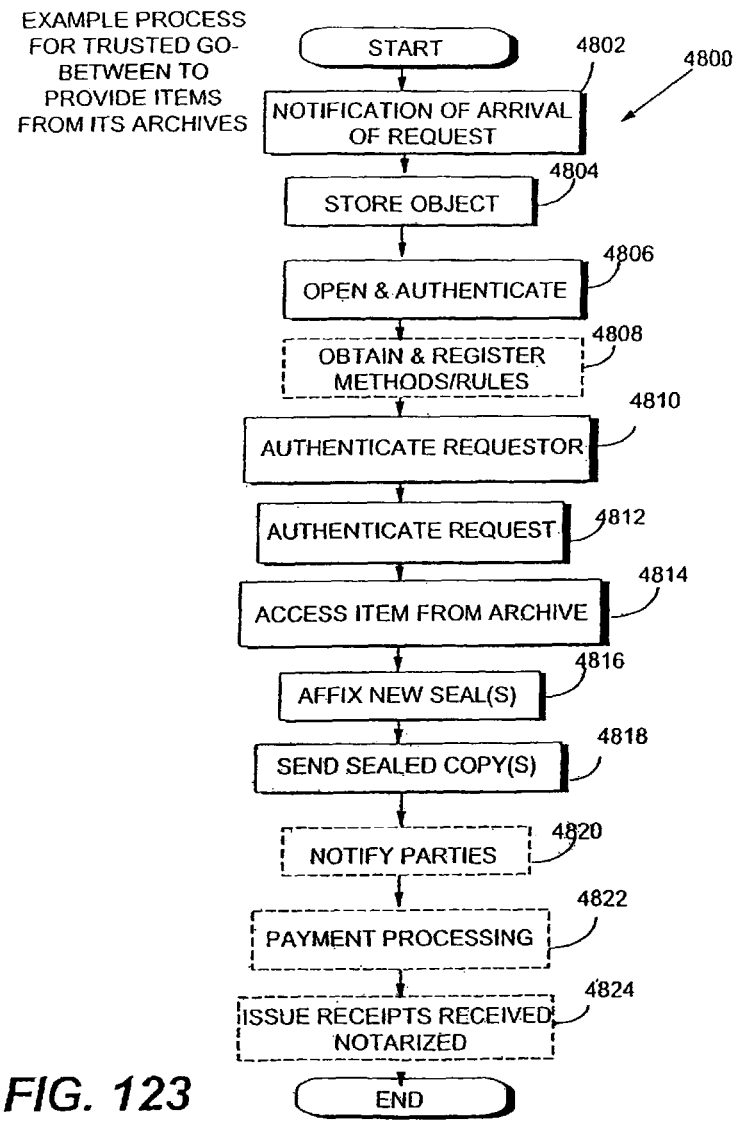

FIG. 123 shows an example process 4800 for trusted electronic go-between 4700 to provide items 4068 it has archived within secure archive 4702 to an appropriate authorized party (such as, for example, one of the owner(s) of the item or a court of law). In this example, trusted go-between 4700 may receive notification of the arrival of an object 300 requesting a particular item 4068 the trusted go-between previously archived within its secure archive 4702 (FIG. 123, block 4802). The trusted go-between 4700 may store the received object (block 4804, FIG. 123), and may open and authenticate the object (FIG. 123, block 4806). The trusted go-between 4700 may obtain and register any necessary controls it requires to fulfill the request (FIG. 123, block 4808).

In this example, the trusted go-between 4700 may authenticate the received request, and in the process may also satisfy itself that the requestor has authorization to make the request (FIG. 123, blocks 4810, 4812). This authentication process provides assurance that the request is authentic and has come from a party with authorization to obtain the requested information (for example, a court of competent jurisdiction).

Assuming the request and requester are both authentic, trusted go-between 4700 may access the requested item(s) from its secure archive 4702 (FIG. 123, block 4814). Trusted go-between 4700 may affix one or more appropriate seals 4200 to the item(s) (FIG. 123, block 4816), and then send the sealed copy(s) of the item(s) to the requester (FIG. 123, block 4818).

In this example, trusted go-between 4700 may optionally notify the owner(s) or other interested parties of item 4054 that it has provided a copy to the authorized requester (FIG. 123, block 4820). Trusted go-between 4700 may perform appropriate payment processing as may be required for this transaction (FIG. 123, block 4822), and may optionally issue appropriate receipts to appropriate parties (FIG. 123, block 4824).

Example Contract Execution Process

Figure 124A:
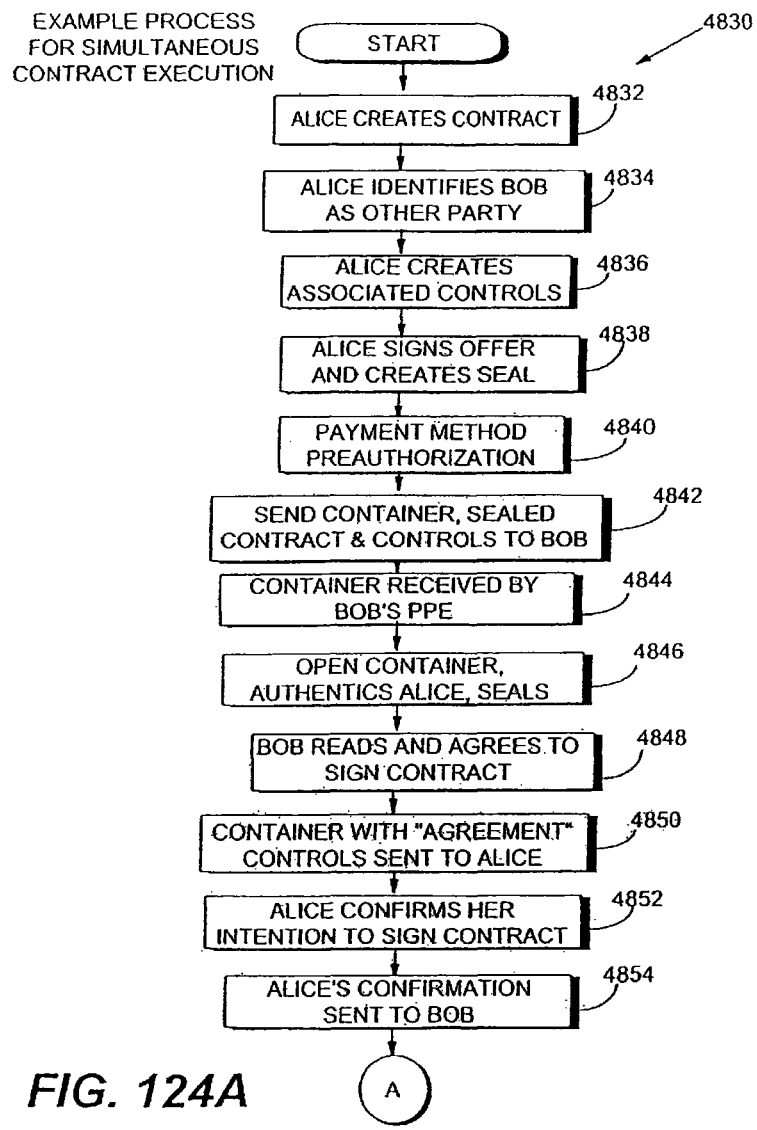
Figure 124B:
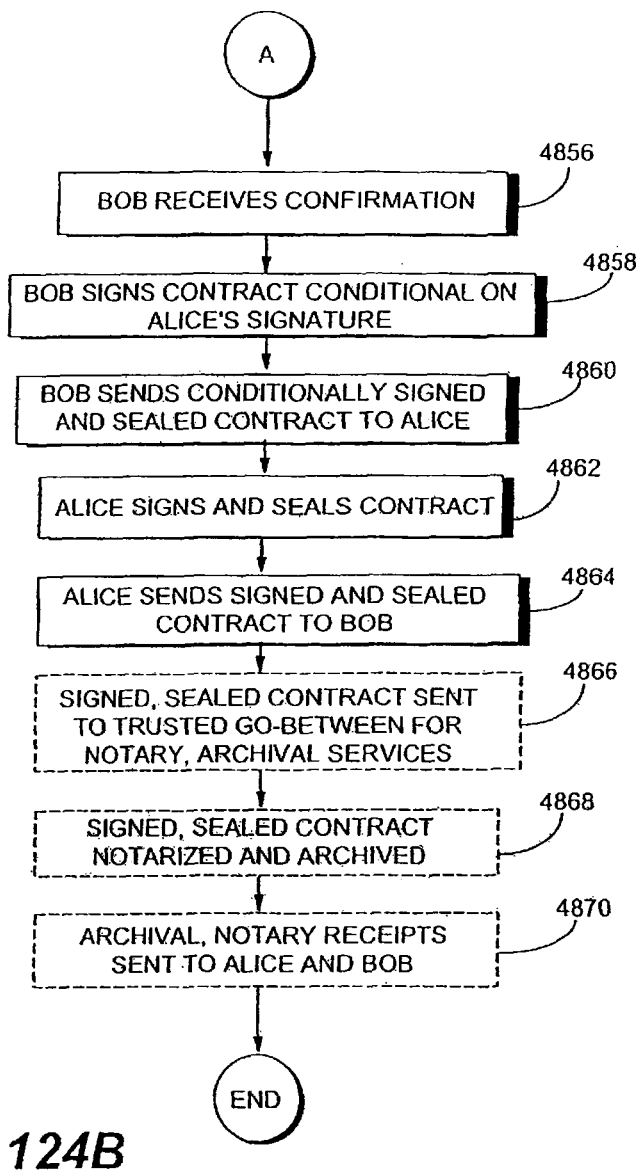

FIGS. 124A-124B are together a flow chart of an example process for contract execution such as shown in FIG. 97. In this example process 4830, Alice and Bob wish to enter into a contract. Alice creates the contract 4068 using a word processor or other appropriate mechanism (FIG. 124A, block 4832). Alice identifies Bob as the other party to the contract (FIG. 124A, block 4834). The protected processing environment 500 within Alice's electronic appliance 600 may create appropriate electronic controls (FIG. 124A, block 4836) specifying that Bob is the other party and other parameters (e.g., her offer is only good for thirty days, Bob's electronic appliance must use biometric sensing techniques of a certain type for execution, Bob may or may not change the contract).

Alice may indicate to protected processing environment 500 within her electronic appliance 600 that she wishes to sign the contract—thereby creating a legal "offer" (FIG. 124A, block 4838). She may do so by, for example, clicking on a "I agree" icon or button her PPE 500 causes to be displayed, by placing her finger on a biometric sensor, etc. The particular mechanism used is preferably sufficiently secure to make it difficult for Alice to later repudiate her decision to sign. The strength of the authentication should be indicated in the transmission, as well as some requirement for this strength. This is central to "commercial trustedness," and furthermore the level of assurance (e.g. location, tamper resistance, etc.) is directly tied to this. The level of trustedness is based on the strength of authentication which can never exceed the strength of the assurance level; both of which should be disclosed to all relevant parties in a transaction.

In this response to this action, Alice's protected processing environment 500 may affix Alice's signature 4300 and/or appropriate personal seals 4200 to the contract (see FIG. 97) (FIG. 124A, block 4838). The process 4830 may, at this point, perform an appropriate payment method pre-authorization (for example, to ensure that Alice will pay the compensation required under the contract) (FIG. 124A, block 4840). Alice's protected processing environment 500 may package the sealed, signed contract 4068 with appropriate controls provided by block 4836 within an electronic container 302 (FIG. 124A, block 4842). Alice's electronic appliance 600 may send the resulting object 300 to Bob's electronic appliance 600.

Upon receipt by Bob's electronic appliance (FIG. 124A, block 4844), Bob's protected processing environment 500 may open the container 302 and authenticate the received object 300, Alice's signature 4300 and/or her seal 4200 (FIG. 124A, block 4846). Bob's protected processing environment 500 may then cause Alice's signed contract to be displayed so that Bob can read and understand it (FIG. 124A, block 4848).

Assume that Bob reads the contract, and agrees to sign it (FIG. 124A, block 4848). In this case, Bob's protected processing environment may send an object 300 to Alice's protected processing environment containing "agreement" controls—electronic controls that provide PPE 500 with methods to perform when the parties have agreed to execute the contract (FIG. 124A, block 4850)). At this point, Alice may confirm her intention to sign the contract as now agreed to by Bob (e.g., Bob may have modified the contract before agreeing to sign it) (FIG. 124A, block 4852). This confirmation may, for example, be based on biometric or other non-repudiation assuring techniques as described above.

Alice's protected processing environment 500 may send notification of Alice's confirmation to Bob (FIG. 124A, block 4854). Upon receipt of Alice's confirmation (FIG. 124B, block 4856), Bob may also sign the contract conditional on Alice's signature (FIG. 124B, block 4858). Bob's protected processing environment 500 may send the conditionally signed and sealed contract to Alice's protected processing environment (FIG. 124B, block 4860). Alice may then sign and seal the contract (FIG. 124B, block 4862) and her protected processing environment 500 may send the signed and sealed contract to Bob—retaining a copy for Alice herself (FIG. 124B, block 4864)).

In this example, Alice's protected processing environment may also send a copy of the signed, sealed contract to a trusted go-between 4700 for notarization and/or archival purposes (see FIG. 101) (FIG. 124B, block 4866). The trusted go-between 4700 may notarize and/or archive the signed, sealed contract (FIG. 124B, block 4868), and may issue archival and/or notary receipts to both Alice and Bob (FIG. 124B, block 4870).

In one specific example, the delivered contract can be a non-disclosure agreement co-delivered with an item(s) 4054 subject to the non-disclosure provisions of the agreement. Associated electronic controls automatically enforce the non-disclosure provisions of the agreement with respect to the co-delivered item(s) 4054.

Example Contract Execution Mediated by a Trusted Go-Between

Figure 125A:
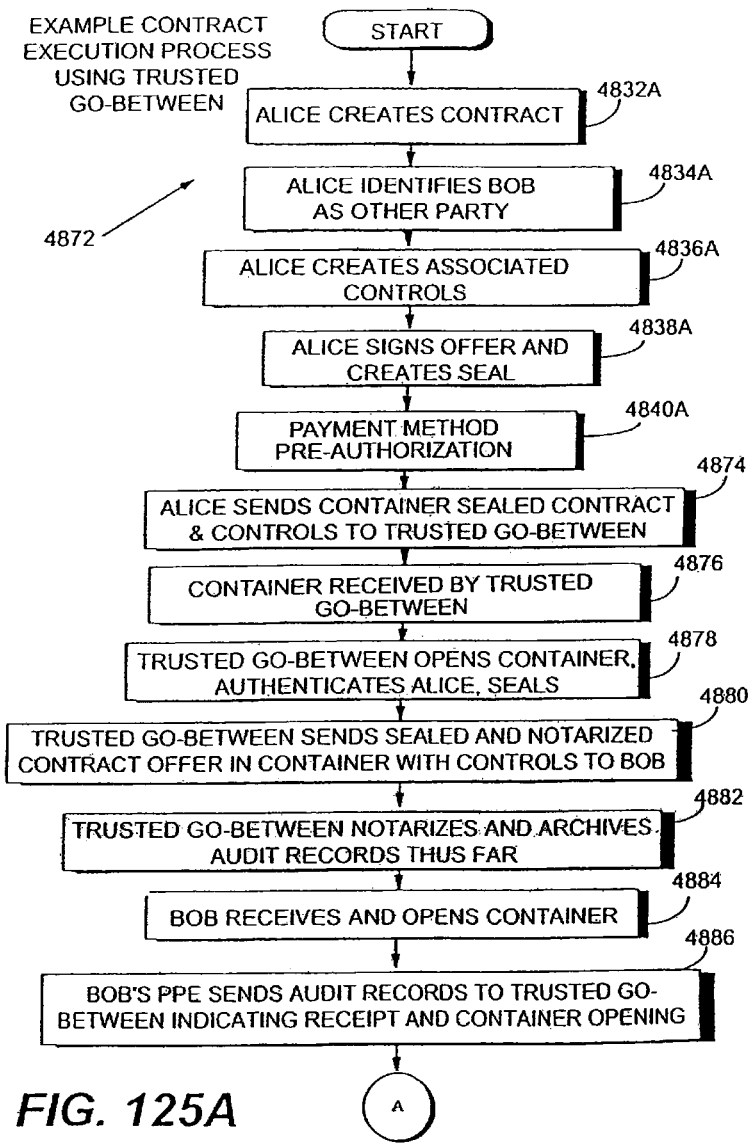
Figure 125B:
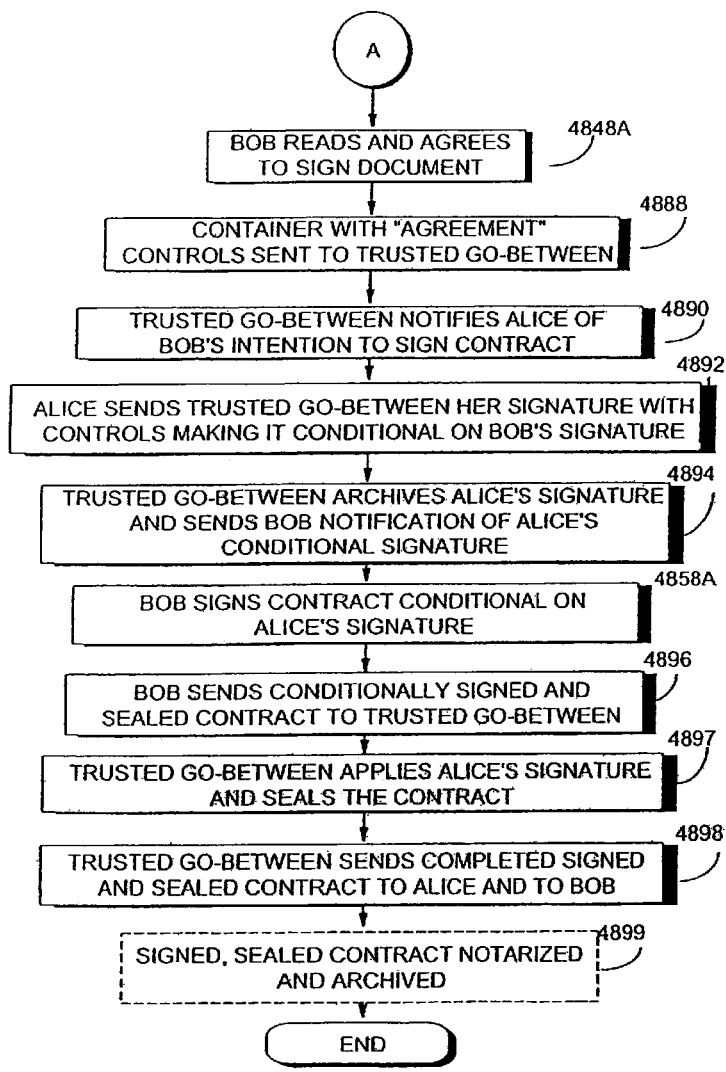

FIGS. 125A-125B show an example contract execution process in which the trusted electronic go-between 4700 is more directly involve as an intermediary in forming the contract (see FIGS. 101, 101A, 101B). In this example routine 4872, steps 4832A-4840A may be similar or identical to steps 4832-4840 shown in FIG. 124A. However, instead of Alice sending the completed "offer" object 300 directly to Bob's electronic appliance 600, Alice may send the object to trusted go-between 4700 (FIG. 125A, block 4874).

Upon receiving the object (FIG. 125A, block 4876), the trusted go-between 4700 may open the object and authenticate it (FIG. 125A, block 4878). The trusted go-between 4700 may then apply its own seal 4200, and send its sealed, notarized copy of the offer in an electronic container 302 with associated appropriated electronic controls to Bob (FIG. 125A, block 4880). Trusted go-between 4700 may notarize and archive the item and associated audit information so far created (FIG. 125A, block 4882) (e.g., to keep a secure record of the negotiation process).

Upon receipt of the object, Bob's protected processing environment 500 may open the container 302 (FIG. 125A, block 4884) and send audit records indicating receipt and opening of the object (FIG. 125A, block 4886). Assuming that Bob agrees to sign the document (e.g., after he has read it) (FIG. 125B, block 4848A), Bob may indicate his assent through biometric sensing or other techniques as described above—and his protected processing environment 500 may at that point send an object 300 with "agreement" controls to the trusted go-between 4700 (FIG. 125, block 4888).

The trusted go-between 4700 may notify Alice of Bob's intention to sign the contract (FIG. 125B, block 4890). Alice may then send the trusted go-between her signature with electronic controls making the signature conditional on Bob's signature (FIG. 125B, block 4892). The trusted go-between 4700 may archive Alice's signature, and send Bob notification of Alice's conditional signature (FIG. 125B, block 4894).

Bob may the sign the contract conditional on Alice's signature (FIG. 125B, block 4858A), and send the conditionally signed and sealed contract to the trusted go-between 4700 (FIG. 125B, block 4896). The trusted go-between 4700 may apply Alice's signature and/or seal to the contract based on the controls she sent to the trusted go-between at block 4892 (FIG. 125B, block 4897). The trusted go-between 4700 may deliver the completed, signed and sealed contract to both Alice and Bob (FIG. 125B, block 4898), and may optionally itself notarize and/or archive the signed, sealed contract (FIG. 125B, block 4899).

Additional Examples

The following are some non-exhaustive examples of how system 4050 provided by the present inventions can be used in a variety of different, illustrative contexts.

Example—Automobile Purchase

Figure 126:
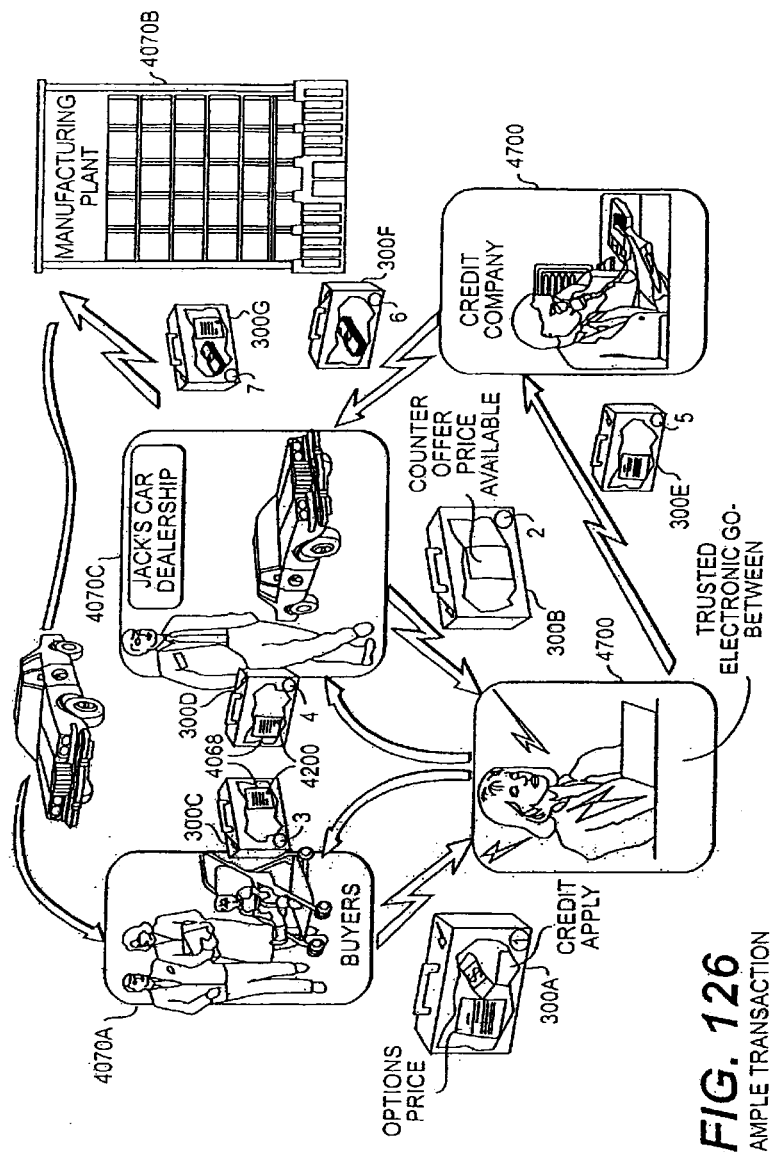

FIG. 126 shows an example of how trusted electronic go-between 4700 might help to coordinate and complete a complex contractual arrangement, such as the purchase of a car. Suppose buyers 4070A want to buy a car from manufacturer 4070B through car dealership 4070C. Buyers 4070A could use an electronic appliance 600 to specify the car model, options and price they are willing to pay. They could also fill out a credit application, provide a down payment, package all of this information into a secure electronic object 300A, and send the electronic container to trusted electronic go-between 4700. Trusted electronic go-between 4700 might then contact the car dealership 4070C, present the buyers' offer and receive (in another secure electronic object 300B) the car dealership's counter offer concerning price and availability. Trusted electronic go-between 4700 could negotiate or mediate between the two parties, and supervise the creation of a contract 68 finalizing the deal. Trusted electronic go-between 4700 could send a copy of the final contract 4068 to the buyers 4070A and to the car dealership 4070C, using secure electronic objects 300C and 300D to ensure secure electronic delivery of this information. Trusted electronic go-between 4700 could include the buyers' down payment within secure object 300D for receipt by car dealership 4070C. Trusted electronic go-between 4700 could also forward the buyers' credit application within yet another secure electronic object 300E to a credit company 4070D. The credit company could provide the proceeds of an automobile loan to car dealership 4070C to pay for the new car. Meanwhile, car dealership 4070C could send an order to the manufacturer 4070B who could manufacture and deliver the new car to the buyers 4070A either directly or through the car dealership 4070C.

Example—Document Notary

FIG. 127 shows an example of how system 4050 could be used to notarize a contract, statement or other document. In this example, Bob (4070*a*) and Ted (4070*b*) may enter into a contract using electronic or other means. They may sign the contract electronically by having their electronic appliances 600, 600' insert their handwritten and digital signatures (and if desired, also their own personal seals or other affirmations). They may then individually or jointly place the executed contract 4068 into one or more electronic containers 302(1) and transmit the contract to a trusted go-between 4700 for registration.

To prevent either party from later repudiating the contract 4068, trusted go-between 4700 may require certain secure indication(s) allowing the trusted go-between to verify that Bob and Ted are who they say they are. These indications required by trusted go-between 4700 should have sufficient reliability that they will later stand up in a court of law. One possibility is for trusted go-between 4700 to capture biometric information such as photographic images, fingerprints, handprints, retina patterns or the like. Another possibility is to rely on the digital signatures (and thus the security of the private keys) of Bob and Ted—possibly in conjunction with digital certificates and biometric sensing techniques as described above. In system 4050, Bob's private key and Ted's private key might never be exposed outside of their respective secure electronic appliances 600, 600'—preventing each of them from voluntarily exposing their private keys as a basis for repudiating the contract.

Trusted go-between 4700 may be completely electronic and automatic. It may receive container 302(1), and open the container to access the contract 4068 it contains. Trusted go-between 4700 may create a notarial seal 4200 on the document encoded with information encrypted using the trusted go-between's private key. This encrypted information might indicate the time and date the trusted go-between received the document; a digital certificate number that securely identifies the trusted go-between; and the "hash" value of the signed contract 4068 (see FIG. 103 above). Trusted go-between 4700 may include this resulting digital signature within its notarial seal 4200 and/or may place the digital signature elsewhere on the document 4068 to create a notarized version 4068'.

Trusted go-between 4700 may then store the notarized document 4068' within its secure electronic archive 4702. The trusted go-between 4700 may also, if desired, supply copies of the notarized document back to Bob (4070*a*) and Ted (4070*b*) within additional electronic containers so they each have record copies of the notarized contract 4068'.

Suppose a dispute arises between Bob and Ted. Bob wants to enforce the contract 4068 against Ted. Ted claims he never signed the contract. Trusted go-between 4700 supplies a copy of the notarized contract 4068' to a court of law 5016 or other dispute resolver. By electronically analyzing the executed contract 4068', the court 5016 can read the notarization assurance of trusted go-between 4700 that Ted did in fact execute contract 4068. So long as the trusted go-between 4700 required sufficient verification of Ted's identity before electronically notarizing the document 4068', the court 5016 should accept the notarization as conclusive evidence that Ted executed it.

Because of the extremely high degree of trustedness possible using system 4050, the FIG. 127 example could be used to communicate national security secrets or highly sensitive criminal investigation results (e.g., wiretaps) between authorized government agents. Trusted go-between 4700 might be authorized to register (but not open) the containers 302(1) it receives for later use as evidence in court 5016.

Example—Teleconferencing

FIG. 128 shows the variation on the FIG. 127 example including a teleconferencing capability. In this FIG. 128 above, intelligent kiosk appliances 600, 600' are each equipped with a video camera 4124 that allows sender 4052 and recipient 4056 to see and speak with one another in real time. Sender 4052 can see recipient 4056 on the sender's display, and recipient 4056 can see sender 4052 on the recipient's display. Similarly, the sender and recipient can each hear each other through microphones/speakers 4128 (and/or telephone handsets 4110) their intelligent kiosks are equipped with.

This teleconferencing capability can be useful, for example, to allow sender 4052 and recipient 4056 to verify they each are who they say they are, and to assist in negotiating contract 4068 or otherwise discussing the content of an item 4054. In order to further assure the authenticity of the communication, a secure communications link may be established using key exchange techniques (e.g., Diffie-Hellman) and encryption of the signal between the stations.

Secure containers 302 may be used to encapsulate the video and audio being exchanged between electronic kiosk appliances 600, 600' to maintain confidentiality and ensure a high degree of trustedness. Thus, in this example, each secure container 302(2) might contain some portion of or multiple video images and/or some portion of or multiple audio segments. Electronic appliances 600, 600' can exchange such secure container 302(2) back and forth in rapid succession to provide real time audio and video transmission In order to improve performance, the containers themselves may remain at the users' sites, and only the encrypted contents transmitted between the participants. This may allow one or two containers to protect the entire communications between the parties.

In still another variation, the teleconferencing shown in FIG. 128 does not need to be simultaneous. For example, sender 4052 could walk up to kiosk appliance 600 and operate the kiosk to record a brief video and audio recording of a message. Sender 4052 could use appliance 600 to review and approve the recording, and then send the recording to recipient 4056 in more or more secure containers 302. Recipient 4056 could present himself to the same or different electronic appliance 600' at a later time. The electronic appliance 600' could verify that recipient 4056 is who he says he is, and then play back the sender's recording.

Example—Doctor Management/Coordination of Health Records

FIG. 129 shows how system 4050 might be used to help a doctor 1000 manage and coordinate health records. In this example, after seeing a patient, doctor 5000 might use an electronic appliance 600 (such as a personal computer for example) to electronically create a patient record 5004 and a drug prescription 5006. The doctor 5000 could instruct electronic appliance 600 to package a copy of patient record 1004 and drug prescription 5006 into one or more secure electronic containers 302(1). Doctor 5000 could specify to electronic appliance 600 (in the form of electronic controls 4078) that:

neither document can be modified;
each document is highly confidential;
patient record 5004 may be revealed only to the patient's insurance company 5008; and
drug prescription 5006 may be revealed only to the patient 5002 and to the patient's chosen drug store 5010.

The doctor 5000 may then send container 302(1) to a trusted go-between 4700. Trusted go-between 4700 could be a computer within a doctor's office, or it could be a commercially operated trusted go-between specializing in health care transactions or usable in general types of transactions. Trusted go-between 4700 might be instructed by electronic controls 4078 to time and date stamp electronic container 302(1) upon receipt, and to store the electronic container within its secure archive 4702. It might also be instructed to maintain patient records 5004 completely confidential (indeed, controls 4078 may prevent the trusted go-between 4700 from itself having any access to these patient records), but to forward a copy of the patient records 5004 to the patient's insurance company 5008 so the insurance company can pay for the medical services rendered by the doctor 5000. For example, the trusted go-between 4700 in one example has no access to the content of the container 302(1), but does have a record of a seal of the contents. If trusted go-between 4700 has the seal, it can interact with other parties to confirm the contents of the seal—without needing to know or disclosing (as the case may be) the contents. Controls 4078 might also instruct trusted go-between 4700 to forward the drug prescription 5006 to the patient's selected drug store 5010 upon the request of patient 5002.

The patient 5002 could make such a forwarding request, for example, by operating an intelligent kiosk 600' at the drug store 5010. The patient's electronic request 5012 could be sent to trusted go-between 4700, which in response might retrieve the drug prescription 5006 from its secure archive and forward it electronically within a secure container 302(3) to the drug store 5010 chosen by patient 5002.

One of the patient records 5004 might be a consent form that was executed by patient 5002. To help prevent the patient 5002 from later repudiating his consent, doctor 5000 might register this consent form with trusted go-between 4700—which could then "witness" it by notarizing it and affixing its seal, date stamp and/or digital signature. Trusted go-between 4700 could provide this consent form 5014 to a court of law 5016 and/or medical malpractice company in the event that patient 5002 sued the doctor for medical malpractice.

Example—Complex Business Transaction

FIG. 130 shows an example of how system 4050 might be used to accomplish a real estate transaction. In this example, seller 5030 wants to sell his house 5032, and buyer 5034 wants to buy the house. The seller 5030 and buyer 5034 and their respective real estate agents 5036, 5038 write a legal contract which the seller and buyer then sign. The seller 5030 and buyer 5034 use an electronic appliance 600 to create an electronic version of contract 4068 (or the electronic execution techniques discussed above could be used to initially create the contract). They place the executed electronic version of the contract 4068 within one or more secure electronic containers 302(1), and send the contract to trusted go-between 4700.

Trusted go-between 4700 registers the contract 4068, and then creates an electronic list of rules based on contract 4068. A partial example rule list is shown in FIG. 130A. Although the FIG. 130A conditions are shown as being written on a clipboard, in the preferred embodiment the "clipboard" is electronically implemented by a computer and comprises one or more electronic control sets 4078 that specify the conditions that must be satisfied in order for the overall real estate transaction to settle.

Trusted go-between 4700 may need to communicate with each of a number of parties in order to determine whether the conditions have been satisfied. For example:

trusted go-between 4700 may need to confirm, via a secure communication 302(2) with an escrow bank 5040, that the buyer 5034 and buyer's agent 5038 have deposited a purchase money deposit with the escrow bank;
trusted go-between 4700 may assist buyer 5034 in creating and filing loan applications with one or more banks 5042, along with supporting documentation, and may require confirmation from the lending bank 5042 that the buyer's financing has been approved so the transaction can go forward;
trusted go-between may have to coordinate with an inspector, appraiser and/or surveyor 5044 to ensure that house 5032 has no termites, has an appraised value in excess of the value buyer 5034 is attempting to borrow from lender 5042, has been properly surveyed as required by the lender, etc.;
trusted go-between 4700 may need to coordinate with a lawyer 5046 to ensure that the title to the property for sale is clear and unencumbered; and
trusted go-between 4700 may need to communicate with other parties to take care of other details leading up to the transaction completion.

In this example, trusted go-between 4700 may receive electronic notifications in secure containers 302 as each step in the overall process is completed. As illustrated in FIG. A3A, trusted go-between 4700 can electronically check each completed condition off of its electronically-maintained condition list as it receives such event notifications. Trusted go-between 4700 maintains this electronic list 4704 in a secure, validated and authenticated manner using system 4050—requiring, for example, receipt of electronic containers having event notifications that are signed cryptographically with one or more digital signatures from the appropriate parties. In this way, trusted go-between 4700 can maintain a highly reliable and validated, authenticated audit of the transaction steps as the overall transaction proceeds.

In addition, trusted go-between 4700 may, if desired, be empowered to issue additional requirements and/or instructions to facilitate the progress of the transaction. For example, trusted go-between 4700 might be a private trusted go-between operated by lender 5042—and thus, might be empowered to select which lawyer 5046 to use and to send that lawyer, automatically, appropriate instructions and forms for completing the transaction. As another example, the trusted go-between 4700 may be part of the business operated by lawyer 5046 or other settlement agent, and may thus be empowered to select and instruct escrow bank 5040.

When trusted go-between 4700 determines, based on the electronic rules/control set 4704 and the notifications it has received that all conditions for settlement have been satisfied, the trusted go-between may allow the "atomic transaction" to settle by issuing appropriate notifications and/or instructions—once again using secure electronic containers 302 and the receipt, verification, authentication, and other mechanisms discussed above to ensure reliability, confidentiality and a high degree of trustedness. For example:

- The trusted go-between 4700 might instruct the lender 5042 to deposit the loan proceeds into loan escrow bank 5040. Upon receiving notification from escrow bank 5040 that the loan proceeds have been properly deposited and the money is available, the trusted go-between 4700 could instruct escrow bank 5040 to transfer the funds to seller's bank 5048 and thereby release the seller's outstanding mortgage on the property.
- Trusted go-between 4700 might also instruct escrow bank 5040 to transfer or otherwise pay the seller's agent 5036 and the buyer's agent 5038 their appropriate commissions as set forth in contract 4068.
- Trusted go-between 4700 might also notarize the deed which seller 5030 has executed in favor of buyer 5034, and could electronically file the deed with the court 5016 (or other governmental authority) for recordation.
- Trusted go-between 4700 might also at the same time file the lender's 5042 deed of trust and a release executed by the seller's bank 5048.

All of these various coordination steps can be performed nearly simultaneously, efficiently, rapidly and with an extremely high degree of trustedness based on the user of electronic containers 302 and the secure communications, authentication, notarization and archiving techniques provided in accordance with the present inventions.

Example—Court Filings and Docket Management

FIG. 131 shows how system 4050 could be used to manage filings in a court of law. In this example, the plaintiffs attorney 5050 and the defendant's attorney 5052 can electronically exchange court filings and other documents (e.g., letters, discovery requests, discovery responses, motions, briefs, responses, etc.) by sending secure containers 302 between their respective electronic appliances 600, 600'. Because of the high degree of security and trustedness provided by system 4050, even confidential information can be exchanged using this technique with little risk that the information will fall into the wrong hands (of course, the system cannot prevent people from making mistakes, in addition to the chance—however remote—that a determined adversary could dedicate sufficient resources to cracking the system (such as, for example, through brute force techniques to "crack" the algorithms). The lawyers can specifically specify who can open the containers 302 and have a very high degree of trust that no one other than the specified individuals (e.g., opposing counsel and the court 5056) will be able to access the information within.

For example, defendant's attorney 5052 can specify one container 302 for opening by his co-counsel, client or client's in-house counsel, and program another container 302 for opening only by opposing (plaintiffs) counsel 5050. Because of the unique trustedness features provided by system 4050, the defendant's attorney 5052 can have a high degree of trust and confidence that only the authorized parties will be able to open the respective containers and access the information they contain.

Appliances 600, 600' may issue highly trusted and reliable return receipts as described above. These highly trusted electronic return receipts may substitute for certificates of service if court 5016 permits.

The lawyers 5050, 5052 can also electronically file any of these exchanged documents with the court 5056 by sending the documents to the clerk 5054 via secure electronic containers 302. In this example, the clerk 5054 may actually be a computerized trusted go-between 4700 (represented here by a person but implemented in practice in whole or in part by one or more secure electronic appliances 600). The clerk 5054 may present a digital certificate evidencing that it is authorized to open a secure container 302 it has received. The clerk may then date stamp each received document (this may involve placing a seal 4200 on the document but more typically might involve simply placing a digital time signature on the document). The clerk 5054 may file the document electronically within a secure electronic archive 4702 that can provide a database for linking related documents together.

The judge 5056 might have a secure electronic appliance 600 in the courtroom or in chambers that could be used to view and/or print documents from the secure electronic archive 4702. The judge 5056 could instantly call up any filing to determine when it was received by the clerk 5054 and to review its contents. Different authorizations and/or encryption strengths could be used with respect to publicly available documents and documents under seal (for example, so that sealed documents could only be opened by the judge 5056 or her staff).

The judge 5056 could write her orders and opinions using electronic appliance 600. She could then send these documents within a secure electronic container 302(3) for filing by the clerk 5054 in secure electronic archive 4702, and for automatic service on the lawyers 5050, 5052.

In this example, the clerk/trusted go-between 4700 could also be used to ensure compliance with the local rules of court. For example, the clerk/trusted go-between 4700 could maintain, in electronic form, electronic controls 4078 indicating the time and formal requirements with respect to different kinds of filings. The clerk/trusted go-between 4700 could automatically check all incoming filings from the lawyers 5050, 5052 to ensure compliance with the local rules, and to issue notices and other appropriate forms in accordance with the local rules. Use of a dynamic interface technology may be used to generate and deliver a set of controls to the sender's system that defines the parameters of receipt—and default controls may be used to specify appropriate parameters, formats, etc.

FIG. 131 shows that this system can be extended to allow communications between defendant's counsel 5052, his co-counsel (e.g., defendant's in-house counsel) 5052A, and his client (e.g., the defendant's Chief Executive Officer) 5052B. Because of the high degree of trustedness and security provided by system 4050, there is no danger that privileged communications between defendant's CEO 5052B and defendant's litigating counsel 5052 will be disclosed to plaintiff's counsel 5050. On the other hand, defendant's litigating counsel 5052 could automatically distribute certain documents (e.g., court filings not under seal, discovery requests and responses, etc) to defendant's CEO 5052B and defendant's inside counsel 5052A in addition to sending them to the court 5016 and to plaintiff's counsel 5050. In this example, defendant's litigating counsel 5052 could enforce any/all of the following different electronic control set options on electronic container contents:

accessible by inhouse counsel 5052A and CEO 5052B only (e.g., for privileged, attorney-client communications);
  accessible by the court 5016, plaintiffs counsel 5050, inhouse counsel 5052A, CEO 5052B (e.g., for court filings not under seal);
  accessible by the court 5016, plaintiff's counsel 5050, and inhouse counsel 5052A but not CEO 5052B (e.g., for court filings under seal);
  accessible by the court 5016 only (e.g., for documents being reviewed in camera).

Note that in this example, documents can be controlled independently of where they are routed. For example, defendant's litigating counsel 5052 could specify electronic controls that would allow court 5016 to access a document that need not be filed with the court but which might be of interest to the court at a later date (e.g., letter between opposing counsel later used as an exhibit to a motion). The fact of document transmission (along with some information about the document such as document title and identifier) could be transmitted without actually transmitting the document itself—allowing the court to retrieve the document itself independently at a later time if desired.

Example—Patent Office Automation

FIG. 132 shows how system 4050 might be used for Patent Office automation. In this example, an inventor 5060 might file her patent application 5062 by sending it to the Patent Office 5064 in one or more secure electronic containers 302 (1). The high degree of trustedness, confidentiality and security provided in accordance with these inventions ensure that the patent application 5062 will arrive at the Patent Office 5064, and will not be disclosed to or accessed by anyone other than the Patent Office.

Upon receiving the patent application 5062, a trusted go-between 4700 within the Patent Office 5064 could open the container 302(1) and access the patent application 5062. Trusted go-between 4700 could electronically examine the patent application 5062 to ensure it meets all formal requirements, and could also date/time stamp the received patent application in order to document its filing date.

Trusted go-between 4700 could automatically issue the inventor 5060 a filing receipt based upon secure receipt of the patent application 5062 using the return receipt techniques described above. Trusted go-between 4700 could then deposit the patent application 5062 into a secure electronic archive 4702 to await examination. Trusted go-between 4700 could include appropriate routing information based on a routing slip as described above to route the patent application 5062 to the appropriate group and/or patent examiner 5064 within the Patent Office 5064.

A patent examiner 5064 could examine the patent application 5062 by requesting a copy of it from electronic archive 4702. All communications could take place within secure electronic containers 302(2) to ensure confidentiality and reliability—completely avoiding the problem of lost files. The patent examiner 5064 could conduct prior art searches using the same electronic appliance 600' used to review the patent application 5062. The examiner 5064 could print out a copy of the patent application 5062 as desired.

The patent examiner 5064 could also use electronic appliance 600' to draft office actions and notices. The examiner 5064 could communicate these notices and actions via trusted go-between 4700 to the inventor 5060. Trusted go-between 4700 could maintain copies of the examiner's actions and notices within secure electronic archive 4702—ensuring their confidentiality and also making sure they do not become lost. System 4050 could provide a return receipt when the inventor 5060 opened the electronic container 302 containing the examiner's actions or notices—thus proving in a highly reliable and trusted fashion that the inventor had in fact received what the examiner sent. Similarly, inventor 5060 could file responses (and could even teleconference with the examiner 5064) via electronic appliance 600. The high degree of trustedness and confidentiality provided by system 4050 along with the return receipt and other options discussed above provide a highly reliable, confidential communications means that can be used to demonstrate when items were actually filed.

Once the examiner—after conducting a lengthy prior art search and carefully analyzing the patent application 5062 to ensure that the invention is patentable—is fully and completely satisfied that the inventor 5060 is entitled to a patent, the examiner 5064 could instruct the trusted go-between 4700 to grant the application as a patent. Trusted go-between 4700 could retrieve a copy of the application 5062 from the secure electronic archive 4702, use automatic means to transform it into an issued patent, and insert a seal 4200 (for example, bearing the digital certificate of the Patent Office 5064) onto the document. The trusted go-between 4700 could then issue the granted patent 5066 to the inventor 5060 by sending it in a secure electronic container 302(3)—thus ensuring that it does not get lost and is in fact received by the inventor.

Members of the public could obtain a copy of the issued patent 5066 by requesting one from trusted go-between 4700. Trusted go-between 4700 could maintain a copy of the issued patent 5066 within secure electronic archive 4702, along with electronic controls 4078 that specify the document is a matter of public record and can be disclosed to members of the public. Other documents in secure electronic archive 4702 (e.g., patent applications 5062 that have not yet been published) can be maintained confidential by use of electronic controls 4078 specifying that only certain people (e.g., patent examiner 5064) can access them.

The FIG. 132 example also provides a convenient mechanism for registering invention disclosure documents with the patent office or other organization. For example, inventor 5060 could use electronic appliance 600 to file an invention disclosure document with the trusted go-between 4700. Trusted go-between 4700 would notarize or witness receipt of the document upon receipt by embedding the document with a digital signature specifying the trusted go-between's identity, the current time and date, and a hash value for use in an integrity check. Trusted go-between 4700 could then file the invention disclosure document within secure electronic archive 4702. At a later date, inventor 5062 could prove the invention disclosure document had been created as of a certain date by requesting trusted go-between 4700 to produce a copy of the invention disclosure document from secure electronic archive 4702. Trusted go-between 4700 would thus provide a secure, trusted independent corroboration of document creation—since it could demonstrate (based upon its imprinted digital signature) that it had received the document on a certain date and that the document had a certain contents.

The disclosure service could also simply send the inventor a signed hash value, and then discard the document; since the hash value could be used with a copy preserved by the inventor. The service could archive the signed hash value themselves as well (although that is not required).

Example—Tax Filing System

FIG. 133 shows an example of how system 4050 can be used to facilitate filing of income or other taxes. Sender 4052 can use electronic kiosk appliance 600 to file her income tax return 5070. Appliance 600 transmits the income tax return 5070 to the governmental taxing authority 5072 within a secure container 302(1). Secure container 302(1) ensures that the tax return 5070 is opened by no one other than the governmental tax authority 5072. System 4050 can electronically provide a return receipt to sender 4052 proving that tax authority 5072 received the tax return 5070.

Appliance 600 may help the taxpayer 4052 complete her tax return 5070. For example, the appliance 600 could ask a series of questions based on a preprogrammed electronic script. The appliance 600 could calculate the taxes owed, and—once taxpayer 4052 approved the tax return 5070— allow the taxpayer to electronically sign the return as described above. Appliance 600 could accept tax payments via credit or smart cards, debit authorizations from bank accounts, etc. Appliance 600 could also issue a paper or electronic receipt to the taxpayer 4052 assuring the taxpayer that the tax return 5070 has been filed. A court might accept this receipt as evidence of timely filing.

Tax authority 5072 may include an internal trusted go-between 4700 that registers and securely date stamps all tax return filings 5070 and places them into a secure electronic archive 4702. The trusted go-between 4700 can also analyze each tax return 5070 to ensure that it complies with electronic rules embodying the tax laws (some of this process could be performed by humans and some by computers if desired). Trusted go-between 4700 can provide, to a payment mechanism 5074, an electronic container 302(2) requesting the payment mechanism to issue a refund to (or collect a deficiency from) the tax payer 4052. In one example, payment can be in the form of electronic currency carried within one or more secure containers 302(3). If the return is structured appropriately for automated processing, tax calculations and application of relevant tax rules can also be automated by the trusted go-between.

Example—Inter and Intra Organization Communications

FIG. 102 (described above) shows an example of secure trusted electronic go-betweens for use within and outside of organizations such as corporations. As described above, the secure electronic go-betweens 700(A), 700(B) can be used to facilitate secure item handling and delivery within an organization. As one example, suppose a confidential memo needs to be approved by users 600(A)(1), 600(A)(3) and 600(A)(5) (who can each revise the memo) before being distributed to each of users 600(A)(2), 600(A)(7)-600(A)(10) and 600(A)(12) (none of whom can change the memo), with copies to users 600(A)(1), 600(A)(3) and 600(A)(5) (who also can't change the memo after all three of them have signed off on it) and to no one else. Private trusted go-between 4700(A) can maintain a rule set that specifies these requirements. Trusted go-between 4700(A) can:

- send the memo (in secure containers) in "round robin" fashion to each of users 600(A)(1), 600(A)(3) and 600(A)(5) for approval.
- If any one of these users changes the memo, then trusted go-between 4700(A) can circulate the revised memo to the other two for additional comments and revisions.
- Once all three of users 600(A)(1), 600(A)(3) and 600(A)(5) approve the memo, trusted go-between 4700(A) may be empowered to place each of their digital and/or handwritten signatures or initials on the memo, place it into one or more secure containers with a control set specifying it is read only and can only be read by users 600(A)(1)-600(A)(3), 600(A)(5), 600(A)(7)-600(A)(10) and 600(A)(12).
- Trusted go-between 4700(A) may then send a copy of the memo in a container to each of these users, or could require the same container to circulate from one to another.
- The trusted go-between 4700 may require the electronic controls to maintain a secure audit trail indicating where the container has been, who has opened it, who has accessed the memo it contains, and when. Trusted go-between 4700(A) might thus increase personal accountability by evidencing whether a particular person had seen a particular document, when, and for how long.

Organization A's Intranet 5104 might also be used to exchange and/or distribute highly confidential design specifications. System 4050 can provide a highly secure audit trail indicating who has had access to a container containing the confidential design specifications; when the person(s) accessed it; and what they did with the specification (print a copy, view it on screen for so many minutes, make a copy of it, etc.) System 4050 (with or without the assistance of a trusted go-between 4700(A) can also maintain, in digital form, a detailed record of who has "signed off" on the design specifications—thus ensuring personal accountability and providing a high degree of efficiency.

Private transaction authorities 4700(A), 4700(B) can also provide a "firewall" function to protect confidential information from escaping to outside of the respective organizations A, B. Suppose for example that organization A is an integrated circuit design house and organization B is an integrated circuit foundry. Organization A designs and specifies the circuit layout of a chip, producing a "tape out" that it sends to organization B. Organization B manufactures an integrated circuit based on the "tape out", and delivers chips to organization A.

System 4050 can be used to facilitate the above business transaction while protecting confidentiality within each of organizations A and B. For example:

- organization A's private trusted go-between 4700(A) can supervise an overall design and specification development effort within organization A. All communications take place in secure containers 302 over organization A's Intranet 5100(A) to maintain confidentiality. Trusted go-between 4700(A) can maintain a secure archive of historical design documents, works in progress, and specification versions as the design process progresses.
- Organization A's private trusted go-between 4700(A) can manage the final design specification development— ensuring that all conditions required to finalize the design specifications are followed.

Once the design specification has been finalized, trusted go-between 4700(A) can circulate it within secure containers 302 to those individuals within organization A that need to "sign off" on it. Their respective appliances 600(A)(1), . . . 600(A)(k) can affix and/or embed digital signatures, handwritten signatures, seals and/or electronic fingerprints as described above to indicate specification approval.

Upon being satisfied that the specification has been "signed off" by the appropriate people, trusted go-between 4700 (A) can send it over Internet 1104 within a secure container 302 to public trusted go-between 4700(C). Public trusted go-between 4700(C) may be a commercial trusted go-between retained by organizations A and B to act as a liaison between them. Organization A's private trusted go-between 4700(A) can filter (or protect) all information it sends to public trusted go-between 4700 (C) to ensure that organization B can access only that information intended for it. For example, private trusted go-between 4700(A) might provide additional electronic controls within the container to prevent organization B from seeing any detailed audit information showing where the specification has been within organization A.

The public trusted go-between 4700(C) might act as an independent trusted third party, notarizing the design specification to later evidence that organization A delivered it on a particular date and time in accordance with a contract.

Public trusted go-between 4700(C) could then forward the design specification (still within a secure container) over Internet 5104 to organization B's private trusted go-between 4700(B).

Organization B's private trusted go-between 4700(B) could automatically send a copy of the design specification over organization B's Intranet 5100(B) to the appropriate users 600(B)(1), 600(B),(N) within organization B. No one outside of organization B would need to know who received a copy of the specification. On the other hand, organization A's trusted go-between 4700(A) could, if desired, include electronic controls restricting access to only certain engineers within organization B—and these secure controls would be carried along into organization B and securely enforced by electronic appliances 600(B)(1), . . . , 600(B)(N).

Organization B's trusted go-between 4700(B) could manage the chip manufacturing process, ensuring that all steps and conditions required to manufacture chips in accordance with organization A's design specification are followed.

Example—Integration With Communications Switching

Telecommunications are becoming ubiquitous in post-industrial societies. As a convenience to customers, the trusted go-between could offer many of its services as part of, or in conjunction with providers of telecom services. In one non-limiting example shown in FIG. 134, a trusted go-between 4700 is co-located and integrated with a telephone switch that connects to a telephone or other telecommunications network via wires (or other connections) 5100 (in another example, the switch and trusted-go between 4700 cooperate, but are not co-located). In one example, a person with a laptop 5102 or other computer lacking a PPE 650 wishes nonetheless to take advantage of a subset of secure item delivery services. The computer 5102 is equipped with a fax modem and associated application software. The computer dials a special number which may be an "800" number and is connected to the trusted go-between 4700 who authenticates the sender using a pre-established password and/or stronger methods such as biometric measurements. The sender indicates the telephone number of fax machine to receive the document.

After selection of delivery options and trusted go-between services, and after making arrangements for payment, the sender's computer 5102 faxes the document pages 4058*d*, 4058*e*, 4058*h* to the trusted go-between 4700. In one example, the trusted go-between 4700 applies seals 4200 to each page 4058*d*, 4058*e*, 4058*f* of the faxed document and an additional seal for the overall document. The trusted go-between 4700 then faxes the sealed document to the recipient fax machine 5104. The trusted go-between 4700 also archives and notarizes the sealed document in case the sender or other authorized party requires proof that the document was sent on a particular time and date to a device with a particular telephone number. In the event that the sender's and/or recipient's appliance is VDE aware (e.g., fax machine 4014*c* equipped with a protected processing environment 650), this service will be provided with additional levels of security and trustedness.

In another example, the sender may prefer to have the document delivered in a secure container over a network such as the Internet, in which case, the sender may indicate the recipient's network address. The sender may connect a personal computer 5102 with a modem to another special number and send a digital item to the trusted go-between 4700 using Internet protocols. In this one example, the sender may not have yet installed VDE, and so the trusted go-between takes the document or item and puts it in a secure container along with controls selected by the sender and delivers the secure container to the recipient, who in this example, does have VDE installed.

These examples illustrate the more general point that the trusted go-between 4700 may provide a range of value-added services even to parties who do not yet have the VDE installed on their appliances, and can enhance the security and trustedness of item delivery nevertheless.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for securely managing electronic content represented in digital form, the method comprising the steps of:
   obtaining a first secure container containing a digital representation of the electronic content;
   receiving one or more controls governing interactions with the first secure container and which controls specify one or more permissions and/or restrictions relating to use of the electronic content, wherein the one or more controls are received separately from the first secure container;
   redistributing the first secure container to an intended recipient according to the one or more controls, wherein the first secure container is sent to the intended recipient in a separate transmission from the one or more controls being sent to the intended recipient; and
   maintaining a secure audit trail in a second secure container separate from the first secure container, the audit trail including indications of one or more of the following:
   where the first secure container has been, which users have opened the first secure container, and which users have accessed the electronic content.

2. The method of claim 1, wherein the electronic content is intra-organization electronic content and is created by a first user, and the intended recipient is a second user and both the first and second users belong to the same organization.

3. The method of claim 2, wherein the one or more controls govern at least which users can make changes to the electronic content.

4. The method of claim 1, wherein the electronic content relates to healthcare information.

5. The method of claim 4, wherein the electronic content is a patient record.

6. The method of claim 4, wherein the electronic content includes drug prescription information.

7. The method of claim 4, wherein the electronic content includes patient consent information.

8. The method of claim 1, wherein the first secure container is created using a trusted computer system.

9. The method of claim 1, further comprising the step of authenticating the intended recipient.

10. A tangible non-transitory computer-readable storage medium comprising program code, the program code being operable, when executed by an electronic appliance comprising a processor, to cause the electronic appliance to perform steps comprising:
   obtaining a secure container containing a digital representation of a electronic content;
   receiving one or more controls governing interactions with the secure container and which controls specify one or more permissions and/or restrictions relating to use of the electronic content, wherein the one or more controls are received separately from the secure container;
   redistributing the secure container to an intended recipient according to the one or more controls, wherein the first secure container is sent to the intended recipient in a separate transmission from the one or more controls being sent to the intended recipient; and
   maintaining a secure audit trail in a second secure container separate from the first secure container, the audit trail including indications of one or more of the following:
      where the first secure container has been, which users have opened the first secure container, and which users have accessed the electronic content.

11. The computer-readable medium of claim 10, further including program code that is operable, when executed by the electronic appliance, to cause the electronic appliance to perform the step of maintaining an audit trail, the audit trail including indications of one or more of the following:
   where the secure container has been, which users have opened the secure container, and which users have accessed the electronic content.

12. The computer-readable medium of claim 10, further including program code that is operable, when executed by the electronic appliance, to cause the electronic appliance to perform the step of authenticating the intended recipient.

13. A system comprising:
   a processor;
   a memory storing computer instructions that, when executed by the processor, cause the system to perform a method, the method comprising:
   obtaining a first secure container containing a digital representation of a electronic content;
   receiving one or more controls governing interactions with the first secure container and which controls specify one or more permissions and/or restrictions relating to use of the electronic content, wherein the one or more controls are received separately from the first secure container and the one or more controls specify an intended recipient;
   redistributing the first secure container to the intended recipient according to the one or more controls, wherein the first secure container is sent to the intended recipient in a separate transmission from the one or more controls being sent to the intended recipient; and
   maintaining a secure audit trail in a second secure container separate from the first secure container, the audit trail including indications of one or more of the following:
      where the first secure container has been, which users have opened the first secure container, and which users have accessed the electronic content.

14. The system of claim 13, wherein the electronic content is intra-organization electronic content and is created by a first user, and the intended recipient is a second user and both the first and second users belong to the same organization.

15. The system of claim 14, wherein the one or more controls govern at least which users can make changes to the electronic content.

16. The system of claim 13, wherein the electronic content relates to healthcare information.

17. The system of claim 13, wherein the memory further stores computer instructions that, when executed by the processor, cause the system to perform the step of maintaining a secure audit trail, the audit trail including indications of one or more of the following:
   where the first secure container has been, which users have opened the first secure container, and which users have accessed the electronic content.

18. The system of claim 17, wherein the audit trail is maintained in a second secure container separate from the first secure container.

19. The system of claim 13, wherein the memory further stores computer instructions that, when executed by the processor, cause the system to perform the step of authenticating the intended recipient.

* * * * *